(12) United States Patent
Liersch et al.

(10) Patent No.: US 12,347,331 B1
(45) Date of Patent: Jul. 1, 2025

(54) PLANNING, ADVICE, AND EXECUTION PLATFORM INCLUDING TECHNIQUES FOR IMPROVING ADVICE THROUGH USER INTERACTIONS

(71) Applicant: Wells Fargo Bank, N.A., San Francisco, CA (US)

(72) Inventors: Michael Liersch, New York, NY (US); Evelyn Varner, Philadelphia, PA (US); Karen McLean, Winchester, MA (US); David Joseph Furst, Boston, MA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 77 days.

(21) Appl. No.: 17/990,298

(22) Filed: Nov. 18, 2022

(51) Int. Cl.
| | |
|---|---|
| *G09B 19/00* | (2006.01) |
| *G06Q 40/06* | (2012.01) |
| *G09B 5/02* | (2006.01) |
| *G09B 5/06* | (2006.01) |

(52) U.S. Cl.
CPC ............ *G09B 19/00* (2013.01); *G06Q 40/06* (2013.01); *G09B 5/02* (2013.01); *G09B 5/065* (2013.01)

(58) Field of Classification Search
CPC .......... G09B 19/00; G09B 5/02; G09B 5/065; G06Q 40/06
See application file for complete search history.

(56) References Cited

U.S. PATENT DOCUMENTS

| | | | |
|---|---|---|---|
| 10,453,124 B1 * | 10/2019 | Voutour | ................. G06Q 40/00 |
| 10,909,582 B1 | 2/2021 | Brandt | |
| 10,943,298 B1 | 3/2021 | White | |
| 10,963,965 B1 | 3/2021 | Hughes | |
| 11,094,016 B1 | 8/2021 | Welz | |
| 11,164,265 B1 | 11/2021 | Chuprevich | |
| 11,244,385 B1 | 2/2022 | Fraser et al. | |
| 11,288,748 B2 * | 3/2022 | Jibowu | .................. G06Q 10/04 |
| 11,641,535 B2 * | 5/2023 | Van Scheltinga | ....... G10L 15/22 |
| | | | 370/352 |
| 11,775,891 B2 * | 10/2023 | Brown | ................ G06F 16/9535 |
| | | | 705/7.12 |

(Continued)

FOREIGN PATENT DOCUMENTS

RU    2726259 C1    7/2020

OTHER PUBLICATIONS

Nist, Engineering Statistics Handbook, 1.3.6.6.16. "Extreme Value Type 1 Distribution," Oct. 10, 2022, retrieved from: https://web.archive.org/web/20240000000000*/https://www.itl.nist.gov/div898/handbook/eda/section3/eda366g.htm (Year: 2022).

*Primary Examiner* — Scott S Trotter
(74) *Attorney, Agent, or Firm* — K&L Gates LLP

(57) ABSTRACT

Various embodiments described hereby include components of a planning, advice, and execution (PAE) system configured to deliver an advice, planning, and attainment experience that focuses on understanding clients as human beings and what they want to accomplish with their life. The PAE system, or one or more components thereof, may operate to provide technology-based solutions that continuously sync financial objectives with aspirations and values through the many moments of life. These technology-based solutions may empower humans to make financial decisions and attain life objectives, big or small, simple or complex, that make a real and lasting impact on their lives and future generations.

20 Claims, 61 Drawing Sheets

(56) References Cited

U.S. PATENT DOCUMENTS

| | | | |
|---|---|---|---|
| 11,862,172 B1 * | 1/2024 | Brandt | G06Q 40/03 |
| 2006/0074788 A1 | 4/2006 | Grizack et al. | |
| 2008/0215501 A1 | 9/2008 | Rojeck | |
| 2014/0122173 A1 | 5/2014 | Wang | |
| 2015/0317726 A1 | 11/2015 | Benartzi | |
| 2016/0267595 A1 | 9/2016 | Rauls et al. | |
| 2017/0076271 A1 | 3/2017 | Jones-McFadden et al. | |
| 2017/0076378 A1 | 3/2017 | Dintenfass et al. | |
| 2018/0039912 A1 | 2/2018 | Baker, IV | |
| 2020/0090148 A1 | 3/2020 | Lawrence | |
| 2020/0320894 A1 | 10/2020 | Davidson | |
| 2020/0349648 A1 | 11/2020 | Cosmano | |
| 2021/0042674 A1 | 2/2021 | Chan | |
| 2021/0304282 A1 | 9/2021 | Dintenfass et al. | |
| 2021/0304302 A1 | 9/2021 | Dintenfass et al. | |
| 2021/0366045 A1 * | 11/2021 | Young | G06Q 50/01 |
| 2022/0028003 A1 | 1/2022 | Evans | |
| 2022/0237700 A1 | 7/2022 | Sreenivasan | |

* cited by examiner

PLANNING, ADVICE, AND EXECUTION PLATFORM INCLUDING TECHNIQUES FOR IMPROVING ADVICE THROUGH USER INTERACTIONS

BACKGROUND

In general, planning can involve a comprehensive evaluation of an individual's current pay and future financial state by using current known variables to predict future income, asset values, and withdrawal plans. This often includes a budget which organizes an individual's finances and sometimes includes a series of steps or specific goals for spending and saving in the future. Financial planning can allocate future income to various types of expenses, such as rent or utilities, and also reserve some income for short-term and long-term savings. A financial plan is sometimes referred to as an investment plan, but in personal finance, a financial plan can focus on other specific areas such as risk management, estates, college, or retirement. Financial planning and goals are integral aspects of achieving an individual's life objectives. Oftentimes, individuals may seek advice, or coaching, to identify and/or obtain their life objectives. This advice, or coaching, may support an individual in achieving specific goals by providing training and guidance. Traditionally, financial planning has focused on individual monetary resources as opposed to seeking to understand and accomplish the life objectives of individuals.

BRIEF SUMMARY

Various embodiments described hereby include components of a planning, advice, and execution (PAE) system configured to deliver an advice, planning, and attainment experience that focuses on understanding clients as human beings and what they want to accomplish with their life. The PAE system, or one or more components thereof, may operate to provide technology-based solutions that continuously sync financial objectives with aspirations and values through the many moments of life. These technology-based solutions may empower humans to make financial decisions and attain life objectives, big or small, simple, or complex, that make a real and lasting impact on their lives and future generations.

The present disclosure thus includes, without limitation, the following example embodiments. Some implementations provide systems, devices, methods, and articles of manufacture for shared goals. An exemplary computer implemented method includes one or more of: receiving a request to create a shared financial goal from an account holder via a goal creation graphical user interface (GUI); determining, for the shared financial goal, an objective, a resource demand, and a time horizon; identifying a group of users associated with the shared financial goal based on input provided via the goal creation GUI, the group of users comprising a first user, a second user, and a beneficiary; classifying the first user as a first contributor with a first commitment to achieving the shared financial goal, wherein the first commitment includes a contribution of a first portion of the resource demand; classifying the second user as a second contributor with a second commitment to achieving the shared financial goal, wherein the second commitment includes a contribution of a second portion of the resource demand; and creating a data object for the shared financial goal based on the objective, the resource demand, and the time horizon, wherein interrogation of the data object by a respective device associated with a respective user in the group of users causes display of a customized planning, advice, and execution (PAE) experience for the respective user, wherein the customized PAE experience for each respective user in the group of users includes a collaborative task regarding achievement of the shared financial goal by the group of users.

Other implementations provide systems, devices, methods, and/or articles of manufacture for concentric shape visualizations. An exemplary computer-implemented method includes one or more of: identifying a set of shared goals associated with an account holder; determining a set of users associated with at least one of the set of shared goals, the set of users comprising first and second users; determining a first subset of shared goals from the set of shared goals, the first subset of shared goals associated with the first user and the account holder; determining a second subset of shared goals from the set of shared goals, the second subset of shared goals associated with the second user and the account holder; calculating an importance level of each user in the set of users relative to one or more shared goals in the set of shared goals associated with the account holder; generating customized experience data based on one or more of the set of shared goals, the first subset, the second subset, and the importance level of each user in the set of users; communicating the customized experience data to a user device, the customized experience data to cause the user device to do one or more of the following: generate a set of substantially concentric shapes in a graphical user interface (GUI), wherein the set of substantially concentric shapes are configured to visually communicate importance levels of different users in the set of users associated with one or more shared goals in the set of shared goals, create a first graphical icon corresponding to the first user, locate the first graphical icon in the GUI at a first shape in the set of substantially concentric shapes based on the importance level of the first user, create a second graphical icon corresponding to the second user, and locate the second graphical icon in the GUI at a second shape in the set of substantially concentric shapes based on the importance level of the second user.

Still other implementations provide systems, devices, methods, and/or articles of manufacture for utilizing subject matter experts to generate training data for machine learning (ML) models. An exemplary computer-implemented method includes one or more of: identifying a set of account information; analyzing the set of account information to determine a proposed type of advice corresponding to the set of account information; presenting the set of account information to a subject matter expert (SME) via a graphical user interface (GUI); presenting the proposed type of advice corresponding to the set of account information to the SME via the GUI; receiving input, from the SME via the GUI, regarding appropriateness of the proposed type of advice with respect to the set of account information; and generating training data for a machine learning (ML) model based on the input regarding the proposed type of advice.

Still other implementations provide systems, devices, methods, and/or articles of manufacture for utilizing an ML model to identify relevant advice types. An exemplary computer-implemented method includes one or more of: identifying training data for a machine learning (ML) algorithm including a plurality of samples, wherein each sample includes a user profile and one or more corresponding financial advice types from a set of financial advice types, the user profile including three or more of client data, account data, life event data, relationship data, and goal data, wherein the one or more corresponding financial advice types are recommended by at least one subject matter expert (SME) based on the user profile; training the ML algorithm with the training data to produce a trained ML algorithm that prioritizes types of financial advice for a user based on a projected utility the user will receive from each of the types of financial advice, wherein the projected utility is based on SME opinion and is estimated as a function of a user profile of the user and an error term indicative of SME uncertainty or bias; and producing a ranked list of the set of financial advice types for a respective user with the trained ML algorithm based on a respective user profile for the respective user.

Still other implementations provide systems, devices, methods, and/or articles of manufacture for utilizing a rules-based engine to identify relevant advice messages from relevant advice types. An exemplary computer-implemented method includes one or more of: identifying a scored list of advice types generated by a machine learning model for a target user, the scored list comprising a first advice type (FAT) with a first ML model score and a second advice type (SAT) with a second ML model score; creating a set of potential messages based on the scored list of advice types, the set of potential messages including a first subset of two or more potential FAT messages associated with the first advice type and a second subset of one or more potential SAT messages associated with the second advice type, wherein each potential FAT message in the first subset is associated with the first ML model score and each potential SAT message in the second subset is associated with the second ML model score; identifying account data regarding the target user; removing a first potential message from the set of potential messages based on comparison of the account data with a set of hard conditions; prioritizing a first potential FAT message in the first subset over a second potential FAT message in the first subset based on a set of tie-breaking rules; identifying contextual data regarding the target user; removing a first potential SAT message in the second subset from the set of potential messages based on the contextual data; removing the second potential FAT message from the set of potential messages based on a set of exclusivity rules and prioritization of the first potential FAT message over the second potential FAT message; prioritizing the potential messages remaining in the set of potential messages based on association with the first ML model score or the second ML model score; and communicating a threshold number of top ranked potential messages to the target user as one or more targeted messages.

Still other implementations provide systems, devices, methods, and/or articles of manufacture for utilizing user interactions to improve advice provided to users. An exemplary computer-implemented method includes one or more of: providing first advice content via a first graphical user interface (GUI) on a first device associated with a user, wherein the first advice content is selected to provide to the user based on a user dataset; monitoring input received via the first GUI; determining feedback regarding the first advice content based on input received via the first GUI; modifying the user dataset based on the feedback to produce an updated user dataset; and providing second advice content via a second GUI on a second device associated with the user, wherein the second advice content is selected to provide to the user based on the updated user dataset.

Still other implementations provide systems, devices, methods, and/or articles of manufacture for providing live assistance to users. An exemplary computer-implemented method includes one or more of: generating feedback data regarding a user based, at least in part, on input provided via a first graphical user interface (GUI) to arrive at a current view of the first GUI; determining to provide live assistance to the user based on the feedback data; analyzing a user dataset corresponding to the user to identify a suitable team member to provide assistance to the user; generating a summary of the user based, at least in part, on the feedback data, wherein the summary includes a process taken to arrive at the current view of the first GUI; providing the summary of the user to the suitable team member via a second GUI; and facilitating communication between the user and the suitable team member via the first and second GUIs.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
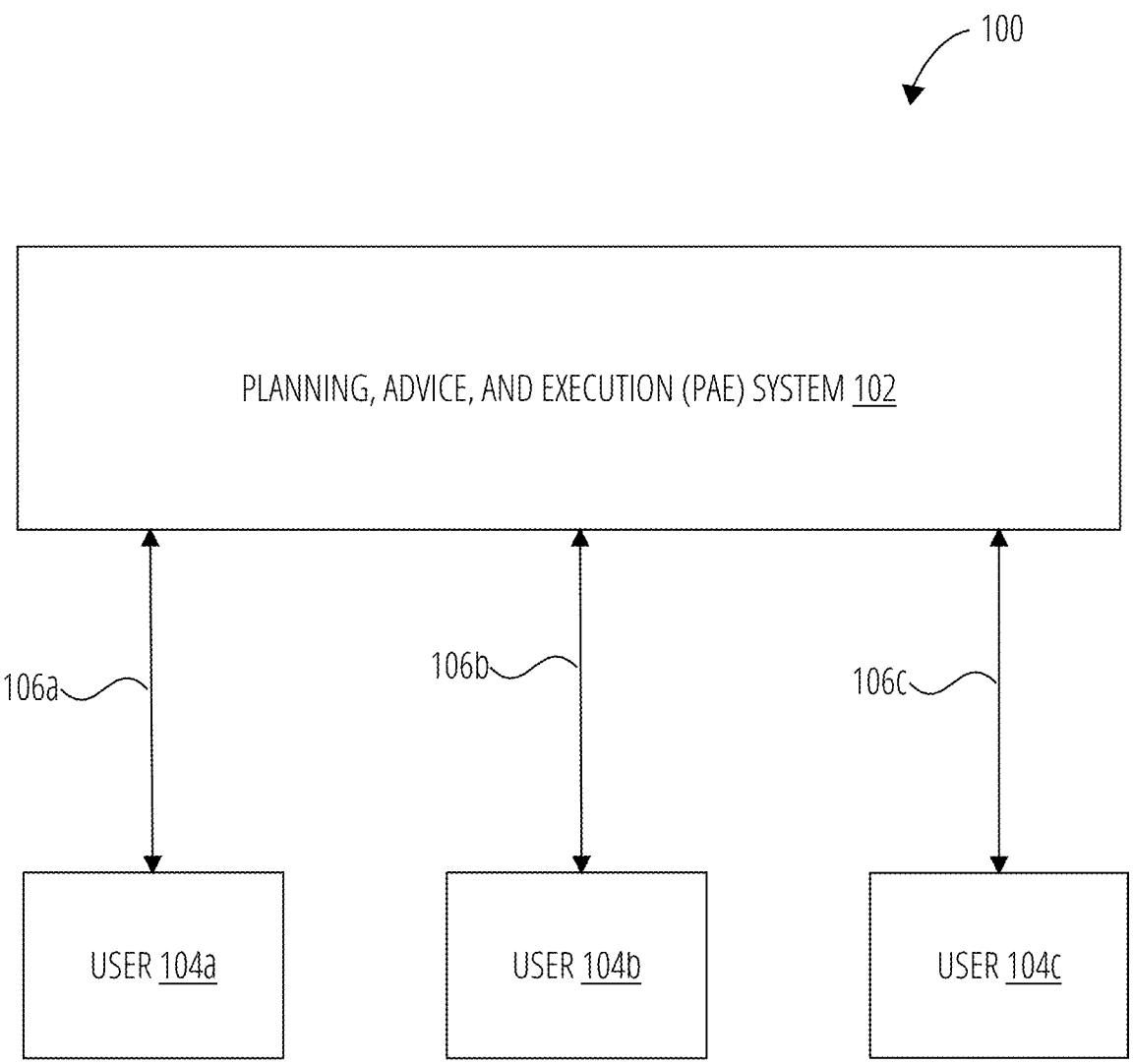
FIG. 1 illustrates an exemplary operating environment for a planning, advice, and execution (PAE) system according to one or more embodiments of the current disclosure.

Various embodiments are generally directed to techniques for providing a planning, advice, and execution (PAE) experience. More specifically, embodiments are directed to providing a customized PAE experience that focuses on understanding users as human beings and what they want to accomplish with their life. Some embodiments are particularly directed to a PAE system, or one or more components thereof, that operates to provide technology-based solutions that continuously sync financial objectives with a user's aspirations and values through the many moments of life. These technology-based solutions may empower users to make financial decisions and attain life objectives, big or small, simple, or complex, that make a real and lasting impact on their lives and future generations. In several embodiments, the PAE system creates a personal path for each user that provides a uniquely tailored experience to help them make more informed financial decisions. In several such embodiments, the PAE system can identify, distill, and present information in a way that provides users with the situational awareness they need to make the right decisions at the right moments, based on what is important to them. These and other embodiments are described and claimed.

Many challenges face existing systems for providing PAE experiences, such as providing a coherent experience tailored for each user. For example, most existing systems fail to provide an end-to-end PAE experience, and those that do rely extensively on subject matter experts to manually review and analyze user situations. However, requiring extensive review and analysis by subject matter experts can be technically infeasible to scale because of resource demand versus resource availability considerations. For example, the costs associated with extensive subject matter expert review and analysis can be prohibitively to a majority of users and/or providers. In another example, sufficient subject matter experts may not be available to review and analyze user situations in a timely manner. Further, existing systems have a singular focus on maximizing assets themselves instead of the impact of those assets, thereby failing to appropriately consider user values. Adding further complexity, existing systems may provide incompatible tools that utilize disparate data sources for different aspects of a PAE experience, making it difficult or impossible to gain an overall situation awareness and make informed decisions. For example, planning tools may be provided by a first vendor and use a first set of inputs, advice tools may be provided by a second vendor and use a second set of inputs, and execution tools may be provided by a third vendor and use a third set of inputs. Adding still further complexity, existing systems silo each user and fail to enable interactive and collaborative experiences. For example, tools are not provided to coordinate actions among multiple users toward achieving a shared goal. Such limitations can drastically reduce the usability and applicability of existing systems, contributing to inefficient systems, devices, and techniques with limited capabilities and poor customer experiences.

Various embodiments described hereby include a PAE system provides an intuitive, seamless, collaborative, and self-directed experience to individuals by identifying, customizing, and combining expertise, content, tools, and technology-based solutions that are relevant and advantageous to the overall user experience in view of the user's life, aspirations, values, and objectives. Further, by helping users to synchronize their values with their financial priorities and making sure they stay in sync over time, the PAE system maximizes the impact of users' resources, including assets, instead of simply maximizing the assets themselves. The PAE system can create a personal path for each user that provides a uniquely tailored experience to help them make more informed financial decisions. For example, the PAE system can identify, distill, and present information in a way that provides users with the situational awareness they need to make the right decisions at the right moments, based on what is important to them. Additionally, the personal path may include goals shared with others. Accordingly, the PAE system can provide different personal paths for different users with one or more shared goals between the different users. The PAE system may also provide tools to facilitate collaboration and accountability between multiple users associated with a shared goal.

Advisors working with users can greatly benefit from the PAE system as well. For example, the PAE system can give advisors valuable data (e.g., talking points, suggested products, important topics, probability of success, etcetera) on users and their lives, aspirations, values, and objectives. The PAE system can take much of the workload off of advisors by automatically reviewing, analyzing, and summarizing users. Accordingly, the PAE system can improve the capability, efficiency, capacity, and effectiveness of advisors in assisting and supporting users.

In these and other ways, components/techniques described hereby may be utilized to deliver improvements to various aspects of a PAE experience. For example, the improvements may be based around one or more of shared goal identification, creation, and implementation, concentric shape data visualizations, rule-based engines, training data generation, relevant advice type identification, feedback systems, and hybrid advisory systems. In some such examples, the improvements may include methods of arranging icons on a graphical user interface based on user data to customize the PAE experience for the user. In other such examples, the improvements may include methods of training machine learning models for advice type identification.

Further, one or more of the aspects, techniques, and/or components described hereby may be implemented in a practical application via one or more computing devices, and thereby provide additional and useful functionality to the one or more computing devices, resulting in more capable, better functioning, and improved computing devices that deliver technical effects and advantages over conventional computer technology including improvements to a variety of technical fields. Accordingly, one or more of the aspects, techniques, and/or components described hereby may be utilized to improve the technical fields of digital collaboration, automated decision-making (ADM), human-computer interaction (HCI), user interface (UI) engineering, user experience design, information architecture, data visualization, graphic communication, knowledge visualization, data analytics, artificial intelligence, machine learning, generation of training, validation, and test data sets, feedback systems, and/or data fusion.

For example, digital collaboration may be improved by enabling users to create and implement goals, such as through shared goals. In another example, ADM may be improved by suggesting goals, providing advice, and delivering insights to users and/or financial advisors, such as through rule-based engine and artificial intelligence. In yet another example, HCI may be improved by optimizing the human resources needed to accomplish the task, such as by using subject matter experts (SMEs) in generating training data. In yet another example, UI engineering may be improved by making it simple, intuitive, and efficient for users to accomplish objectives and gain situational awareness, such as with concentric shape visualizations. In yet another example, the structural design of shared information environments may be improved, such as through the use of shared goal data objects. In yet another example, data visualization may be improved by designing, constructing, arranging, and presenting data in a fashion most useful or empirically holistic for each user, such as by customizing the data and experience for each user. In yet another example, user experience may be improved by making information and services easy to locate and easy to use. In yet another example, machine learning may be improved by reducing the frequency that retraining is needed, such as by utilizing a rule-based engine in conjunction with a machine learning model. In yet another example, the process of creating a knowledgebase linking different systems and standards may be improved, such as by through hybrid advisory systems.

The specific and particular manners for achieving these improvements are described in more detail throughout this disclosure, such as with reference to one or more of the drawings. Further, one or more of the components described hereby may be implemented as a set of rules that improve computer-related technology by allowing a function not previously performable by a computer that enables an improved technological result to be achieved. Still further, many of the aspects, techniques, and/or components described hereby are unconventional or otherwise more than what is well-understood, routine, conventional activity in the field. For example, PAE system includes a non-conventional and non-generic arrangement of various computer components to reduce the frequency of training by using an advice engine that combines a rule-based engine with a machine learning model.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter. Aspects of the disclosed embodiments may be described with reference to one or more of the following figures. Some of the figures may include a logic flow and/or a process flow. Although such figures presented herein may include a particular logic or process flow, it can be appreciated that the logic or process flow merely provides an example of how the general functionality as described herein can be implemented. Further, a given logic or process flow does not necessarily have to be executed in the order presented unless otherwise indicated. Moreover, not all acts illustrated in a logic or process flow may be required in some embodiments. In addition, a given logic or process flow may be implemented by a hardware element, a software element executed by a processor, or any combination thereof.

FIG. 1 illustrates an exemplary operating environment 100 for a planning, advice, and execution (PAE) system 102 according to one or more embodiments of the current disclosure. Generally, the PAE system 102 may operate to provide one or more users with customized planning, advice, and execution experiences that maximize the impact of user resources based on user objectives and values. Operating environment 100 includes the PAE system 102 in conjunction with a plurality of users 104a, 104b, 104c interacting with the PAE system 102 to obtain customized experiences 106a, 106b, 106c, respectively. In some embodiments, FIG. 1 may include one or more components that are the same or similar to one or more other components of the present disclosure. Further, one or more components of FIG. 1, or aspects thereof, may be incorporated into, or excluded from, various embodiments of the present disclosure without departing from the scope of this disclosure. For example, user 104b, user 104c, customized experience 106b, and customized experience 106c may be excluded from operating environment 100 without departing from the scope of this disclosure.

As will be discussed in more detail below, the PAE system 102 may be configured to deliver advice, planning, and execution experiences that focus on understanding users as human beings and what they want to accomplish with their life. Accordingly, PAE system 102 may provide customized experience 106a to user 104a, customized experience 106b to user 104b, and customized experience 106c to user 104c. To this end, the PAE system 102, or one or more components thereof, may operate to provide solutions that continuously sync financial objectives with aspirations and values through the many moments of life. These solutions may empower users to make financial decisions and attain life objectives, big or small, simple, or complex, that make a real and lasting impact on their lives and future generations.

The PAE system 102 maximizes the impact of users' resources by helping users to synchronize their values with their financial priorities and making sure they stay in sync over time. The PAE system 102 provides an intuitive, seamless, and collaborative experience (e.g., customized experience 106a, 106b, 106c) to individuals by identifying, customizing, and combining expertise, content, tools, and solutions that are relevant and advantageous to the overall user experience. In some embodiments, the PAE system 102 creates a personal path for each user that provides a uniquely tailored experience (e.g., customized experience 106a, 106b, 106c) to help them make more informed financial decisions. For example, the PAE system 102 can identify, distill, and present information in a way that provides users with the situational awareness they need to make the right decisions at the right moments, based on what is important to them. Additionally, the customized experiences 106a, 106b, 106c may include goals shared with others (e.g., user 104a and user 104b may have a shared goal). Accordingly, the PAE system 102 can provide different customized experiences for different users with one or more shared goals between the different users. The PAE system 102 may also provide tools to facilitate collaboration and accountability between multiple users associated with a shared goal.

The PAE system 102 may utilize a consistent planning process combined with user specific information to deliver a uniquely tailored experience focused on helping people coherently navigate a broad spectrum of money decisions. In many embodiments, the consistent planning process may include an understanding phase, a planning phase, a proposal phase, an implementation phase, and a revisit phase. In some embodiments, one or more of the phases may be led by a financial advisor. The understanding phase may seek to uncover who the user is. For example, research-based questionnaires may be used to discover what a user truly values. The planning phase may seek to help people think about their money in more deliberate ways, guiding them toward outcomes that make the most impact based on their goals and objectives. The planning phase may uncover the complete person, explore available options, and/or provide a decision-making framework. The proposal phase enables people, through simulated scenarios, to see the real impact decisions can have on their plans. For example, opportunities that have emerged through the previous phases can be explored with options provided that can deliver on their goals. The implementation phase taps into an array of technology-based solutions provided by the PAE system to build a step-by-step plan to realize the user's goals. The implementation phase clearly identifies what needs to be done and why. The revisit phase ensures that a user's overall plan is either still tracking to the original goals or whether the plan needs to be adjusted to accommodate new goals or unexpected life events.

Figure 2:
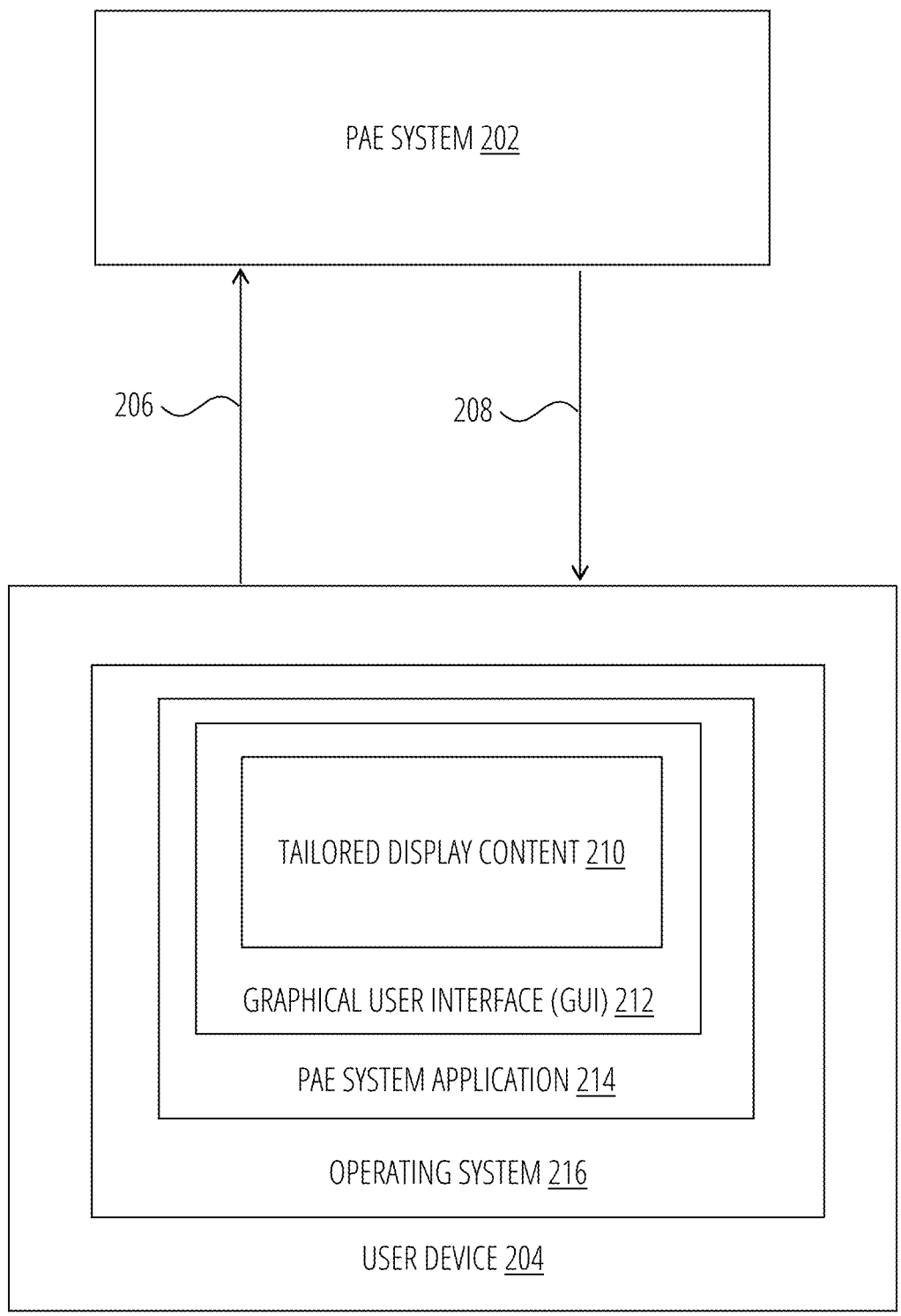
FIG. 2 illustrates various aspects of a PAE system in conjunction with a user device according to one or more embodiments of the current disclosure.

FIG. 2 illustrates various aspects of a PAE system 202 in conjunction with a user device 204 according to one or more embodiments of the current disclosure. Generally, the PAE system 202 may provide customized experience data 208 to user device 204 to cause tailored display content 210 to be presented via the GUI 212 of user device 204. In many embodiments, the customized experience data 208 may be generated by PAE system 202 based at least in part on feedback data 206 received from the user device 204. The user device 204 may include a PAE system application 214 accessible via an operating system 216 of the user device 204. The PAE system application 214 may generate the tailored display content 210 on GUI 212 based on the customized experience data 208. In various embodiments, the PAE system application 214 may be installed by a user. It will be appreciated that in various embodiments the PAE system application 214 may not be necessary to view the tailored display content 210. For example, the tailored display content 210 may be viewed via another application, such as a web browser. Accordingly, in some embodiments, the PAE experience may include a web-based experience.

In some embodiments, FIG. 2 may include one or more components that are the same or similar to one or more other components of the present disclosure. For example, the PAE system 202 may be the same or similar to PAE system 102. Further, one or more components of FIG. 2, or aspects thereof, may be incorporated into, or excluded from, various embodiments of the present disclosure without departing from the scope of this disclosure. For example, one or more of users 104a, 104b, 104c may receive their respective customized experience 106a, 106b, 106c as tailored display content 210 viewed on the GUI 212 of user device 204 without departing from the scope of this disclosure.

The user device 204 may be associated with a user of the PAE system 202. In some embodiments, the user device 204 may be associated with a user of the PAE system 202 based on login credentials provided to the PAE system application 214. Accordingly, in various embodiments, the feedback data 206 may include login credentials. More generally, feedback data 206 may include any data sent by the user device 204 to the PAE system 202.

The user device 204 may include any computing device capable of communicating with the PAE system 202 over a network. For example, user device 204 may include one or more of a mobile phone, a smart phone, a smart watch, a desktop computer, a laptop computer, a tablet, a virtual or augmented reality headset, an internet of things (IOT) device, a vehicle infotainment system, an automated teller machine, a point of sale (POS) device, an interactive kiosk, and the like. The PAE system 202 may include, or be implemented on, one or more computing devices utilized in providing aspects of a PAE experience, such as one or more servers, cloud services, data stores, and the like.

One or more administrator, SME, and assistance interfaces may operate in a similar manner to enable administrators, SMEs, team members, and advisors to interact with the PAE system and/or users as described hereby. Some embodiments may include a plurality of PAE system applications. For instance, separate PAE system applications may be provided for one or more of users, administrators, SMEs, team members, and advisors. In many embodiments, one or more of the interfaces may be web-based. For example, a URL may be utilized to access one or more of GUI 212, profile review tool 816, administrator interface 818, and/or support interface 1130. FIGS. 23A-23F illustrate an exemplary profile review tool 816.

Figure 3:
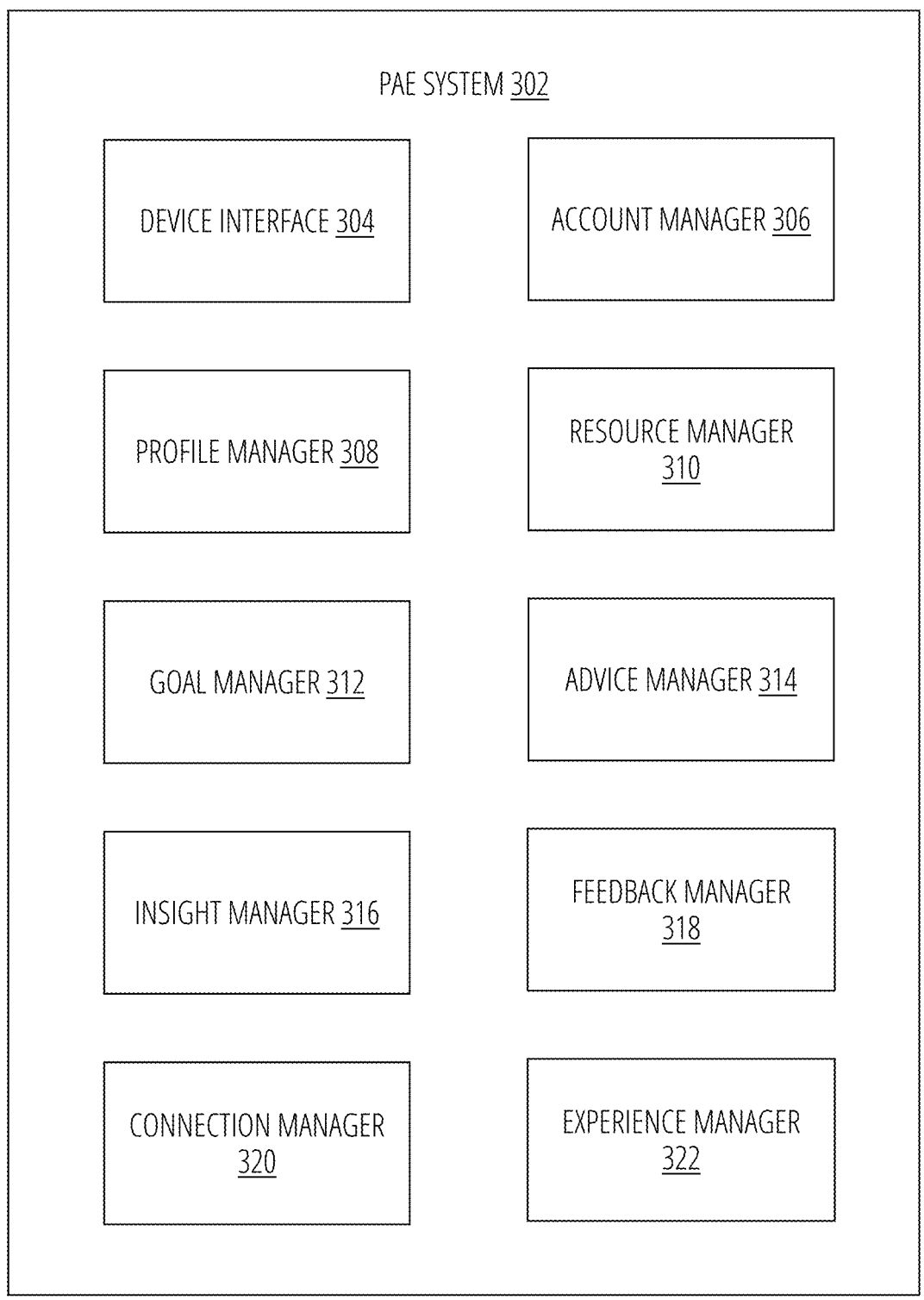
FIG. 3 illustrates exemplary components of a PAE system according to one or more embodiments of the current disclosure.

FIG. 3 illustrates exemplary components of a PAE system 302 according to one or more embodiments of the current disclosure. The components of PAE system 302 may interoperate to provide users with customized planning, advice, and execution experiences. In the illustrated embodiment, PAE system 302 includes a device interface 304, an account manager 306, a profile manager 308, a resource manager 310, a goal manager 312, an advice manager 314, an insight manager 316, a feedback manager 318, a connection manager 320, and an experience manager 322. In some embodiments, FIG. 3 may include one or more components that are the same or similar to one or more other components of the present disclosure. For example, PAE system 302 may be the same or similar to PAE system 202. Further, one or more components of FIG. 3, or aspects thereof, may be incorporated into, or excluded from, various embodiments of the present disclosure without departing from the scope of this disclosure. For example, experience manager 322 may be incorporated into PAE system 102. In another example, insight manager 316 may be excluded from PAE system 302. In yet another example, the experience manager 322 may be incorporated into the PAE system application 214 without departing from the scope of this disclosure. More generally, it will be appreciated that the various components of the described PAE system embodiments are exemplary, and a variety of configurations and components may be utilized to realize the functionality described hereby without departing from the scope of the disclosure. For example, one or more components of the PAE system 302, or portions thereof, may be located on user device 204. In another example, components illustrated in FIG. 24 may be utilized to implement techniques described hereby.

As previously mentioned, the components of PAE system 302 may interoperate to provide users with customized planning, advice, and execution experiences. Operations and functionality of the various components are described in more detail below. However, in various embodiments, the components of PAE system 302 may generally operate as follows.

The device interface 304 may provide connectivity with different user devices. In some embodiments, device interface 304 may include a network interface. The account manager 306 may create and administer accounts for each user. The user accounts may include account related data, such as preferences, credentials, personal data, and permissions data. For example, the preferences may include paper-free communications. In another example, the permissions may include data sharing permissions. Users may interact with the account manager 306 to create, view, and edit various account related data. For instance, a user may change their password via the account manager 306.

The profile manager 308 may create, maintain, and update profiles for each user. The user profiles may include information deemed relevant to providing a customized planning, advice, and execution experience to users. In various embodiments, the user profiles may be utilized by various components of the PAE system 302 to customize experiences for users. For example, a user profile may be utilized by the advice manager as input to a machine learning (ML) model. In such examples, the ML model may output a type of advice that is particularly relevant to a user based on the profile of the user. In some embodiments, the profile manager 308 may actively seek and identify potentially useful data regarding users. In some such embodiments, the profile manager 308 may draw conclusions or make inferences regarding a user based on available data. For example, if a user identifies that they prefer paper-free communications, the profile manager 308 may infer that a user values protecting the environment. In turn, other components of the PAE system may utilize this value to customize the PAE experience of the user, such as to promote, highlight, or offer more environmentally friendly options to the user.

The resource manager 310 may monitor resources, such as assets, belonging to a user. In some embodiments, the resource manager 310 may generate summaries or snapshots of the state of resources for users. In some embodiments, the resource manager 310 may analyze the flow and/or allocation of resources for a user.

The goal manager 312 may create and administer various goals for a user. In some embodiments, the goal manager 312 may assist users in identifying their goals. Goal manager 312 may also assist in creating a plan or set of tasks for accomplishing the goal. The goal manager 312 may also enable shared goals between a group of users. Further, different users in the group may have different commitments, tasks, and benefits associated with the shared goal. In various embodiments, the goal manager 312 may create data objects for goals that are accessible to users associated with the goals. Further, interrogation of the data object by a respective device associated with a respective user can cause display of a customized PAE experience for the respective user based, at least in part, on their involvement with the goal (e.g., contributor, beneficiary, creator, etcetera).

The advice manager 314 may provide advice to users. For example, advice manager 314 may utilize one or more machine learning models and/or one or more rules-based engines to provide relevant and useful advice to users. Advice may take a variety of forms including messages, recommendations, benefits, suggestions, tasks, and the like. Further, the advice manager 314 may perform simulations and/or examine multiple scenarios and outcomes to arrive at and/or include in advice content. The advice may be based on user data as well as contextual information. In some embodiments, the advice manager 314 includes components for generating training data and/or training the ML models. In many embodiments, advice content may include one or more benefits of the advice and one or more actions to obtain the benefits of the advice. Thus, the advice manager 314 can provide ways for users to act on the advice provided. For example, instead of simply recommending a user make more money, the advice manager 314 may provide one or more ways for the user to make more money. Further, the ways for the user to make more money may be based, at least in part, on their user profile. For instance, if the user values protecting the environment, the advice manager 314 may suggest working at a non-profit environmental sustainability company.

The insight manager 316 may provide insights to users. Insights, as compared to advice, may be more focused on probabilities and/or capabilities of a user. For instance, if a customer identifies purchasing a new home as a goal, the insight manager 316 may determine how much the customer is capable of affording to spend on a new home. In many embodiments, the insight manager 316 may enable a user to see how the insight was determined and/or what assumptions the insight was based on.

The feedback manager 318 may monitor user and device activities and interactions with the PAE system 302. Additionally, the feedback manager 318 may mine useful data from the activities and interactions. For example, feedback manager 318 may mine context data and/or strategic data from the activities and interactions.

The connection manager 320 may manage and control connections between and accessibility of components, entities, and data sources. The connection manager 320 may maintain a set of connections associated with a user, such as account connections, user connections, financial product connections, data source connections, shared goal connections, and advisor connections. In many embodiments, the connection manager 320 may include one or more of a data access controller, a data privacy manager, and an assistance interface. The assistance interface may enable a team member (e.g., financial advisor) to interact with and/or view data regarding a user. In some embodiments, the connection manager 320 may include one or more portions of a distributed event store and/or stream-processing platform.

The experience manager 322 may be responsible for one or more of orchestrating, aggregating, and synthesizing the data to facilitate customized PAE experiences for users. In various embodiments, the experience manager 322 may utilize other components of the PAE system 302 to put the experience together for a user. For example, the experience manager 322 may determine that currently the user needs one piece of advice, one insight, and a set of options for a current GUI view on a user device that is associated with a user goal. In such examples, the experience manager 1202 may interact with the advice manager 314 to obtain the piece of advice, the insight manager 316 to obtain the insight, and the goal manager 312 to obtain the set of options. Further, the experience manager 322 may format and package the data such that it causes the user device to present the customized experience on the GUI.

Using the systems, techniques, devices, and components disclosed hereby, the PAE system 302 can advantageously satisfy a variety of user needs. The PAE system 302 may provide users with clarity and empowerment on what they want their money to do for them and their family, friends, and/or associates via customized PAE experiences. For example, probabilities of success may be generated via insight manager 316. The PAE system 302 can provide advice for questions about their finances. For example, relevant considerations may be brought to the attention of users based on one or more of their context, personal data (e.g., life events), external factors (e.g., tax deadline), and the like. The PAE system 302 can identify, access, and communicate the resources pertinent to making informed money decisions, such as via resource manager 310. The PAE system 302 can assist users in identifying options that are available to them, such as based on where they are in their overall journey and where they want to go. The PAE system 302 can provide check-ins as life ebbs and flows so adjustments can be made to their plan, such as via goal manager 312. In some embodiments, check-ins may be performed in a discrete manner. For example, the PAE system 302 may wait for a period of time after a death to make a suggestion related to the death.

Further, using the systems, techniques, devices, and components disclosed hereby, the PAE system 302 may advantageously provide a number of values to users. The PAE system 302 can uncover a user's values, going beyond just dollars and cents, and explore the human side of what they're trying to accomplish, such as via profile manager 308. The PAE system 302 can help to answer the questions that pertain to the things most important to users and assists users in making informed decisions that are aligned with their values and goals, such as via insight manager 316. The PAE system 302 can provide bespoke guidance in a variety of specialized areas tied to the most important moments in users' lives, such as via advice manager 314. The PAE system 302 can examine multiple scenarios and outcomes based on individual user circumstances at that moment in time, such as via advice manager 314. The PAE system 302 can monitor progress and circumstances to address ever-evolving needs, such as via goal manager 312.

Generally, the components of PAE system 302 may interoperate to provide three primary services to users: (i) goals administration, (ii) personalized status, and (iii) automated custom messaging. Goal administration may enable users to identify, create, edit, and implement goals including goals shared with multiple users, such as via goal manager 312. Personalized status may provide customers with situational awareness regarding life objectives. The personalized status may include a quick view of key financial measures, such as generated by resource manager 310. Automated custom messaging may provide users with basic guidance and direction in the form of advice and/or insights regarding actions, content, and experiences, such as via advice manager 314 and/or insight manager 316.

In various embodiments, all messages may include an advice type that is used to group similar messages under a single type that can be utilized for prioritization. An exemplary advice type may include talking to family members about money matters. Exemplary messages under this advice type may include: (i) check out this podcast on talking to family about money; (ii) read this white paper on how to talk to family about money; and (iii) check out thirty-one reasons to talk to family about money. In one embodiment, between 100 and 1000 messages may be organized into 100 to 200 advice types.

A model (e.g., machine learning model) may be utilized to prioritize different advice types. For example, the model may help to prioritize messages that are presented to a user by using current information regarding the user (e.g., user profile 504) to rank advice times in terms of expected utility for the user. In many embodiments, the current information regarding the user may be continuously updated and revised, such as based on feedback data and/or data mining.

The messages (e.g., advice content and/or insights) that a user sees may be prioritized in two stages. In the first stage the model is executed, which will assign a value to each advice type. The value can then be used to sort the advice types in order of priority. In the second stage, rules are executed to determine which exact message is displayed. The rules can include rules used to determine message eligibility, break ties within an advice type, and filter messages that may only apply in a certain context. In many embodiments, the staged approach may reduce the frequency of model training as well as provide additional control points for personalizing the messages. This may result, at least in part, from the ability to maintain consistent advice types while still having the ability to change the messages within the advice type and how those messages are selected without needing to retrain the model.

The main objective of the model may be to prioritize the advice types that a user sees. The model may be developed using data collected from SMEs in the relevant fields (e.g., financial planning, life planning, life coaching, etcetera). The SMEs may be shown client profiles and asked to choose which advice type is more valuable to the customer between two different advice types. In this way, the model can provide an expected outcome over many SME reviews, thereby optimizing the human resources needed to accomplish the messaging task. Accordingly, the model is trained to replicate consensus suggestions among SMEs.

Numerous tests and evaluations may be performed to ensure the model operates as expected. For instance, the model may be continually compared to SMEs to ensure the model is at least as consistent as the SMEs. The model may be evaluated to ensure that the error term is not dominating, which would be indicative of the model performing no better than random chance. User feedback may be evaluated to determine the effectiveness of the messaging. For example, users should dismiss less than 50% of messages. Further, SMEs may be evaluated for inter-rater and intra-rater reliability. For example, SMEs should agree at least 60% of the time.

In various embodiments, PAE system 302, or one or more components thereof, may trigger physical manipulations.

For example, upon completing a shared goal, goal manager 312 may trigger a car title to be sent to a user and/or open a mailbox or safety deposit box. In another example, account manager 306 may cause a credit or debit card to be produced in response to a request from a user. In yet another example, goal manager 312 may calendar an event or meeting for one or more members of the shared goal. In yet another example, connection manager 320 may cause an internet of things (IOT) device to perform an action, such as adjusting a thermostat, turning on a light, or provide an audible reminder. In one embodiment, a thermostat may be adjusted according to a schedule in response to a shared goal to reduce utility costs of a home or business.

Figure 4:
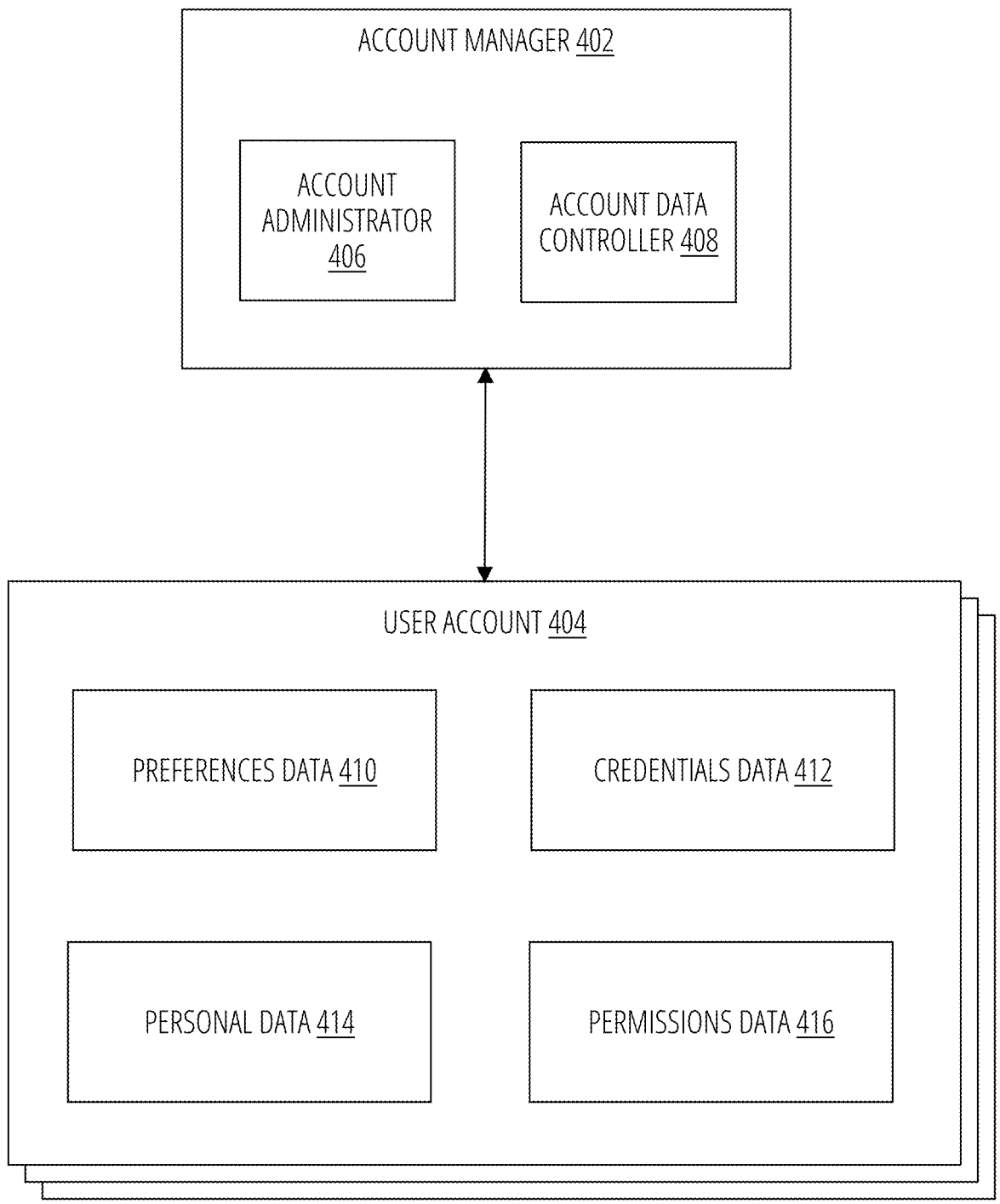
FIG. 4 illustrates an exemplary account manager in conjunction with a plurality of user accounts according to one or more embodiments of the current disclosure.

FIG. 4 illustrates an exemplary account manager 402 in conjunction with a plurality of user accounts 404 according to one or more embodiments of the current disclosure. The account manager 402 may handle the creation and administration of user accounts 404 for the PAE system. In the illustrated embodiment, account manager 402 includes an account administrator 406 and an account data controller 408. Further, each of the one or more user accounts 404 can include preferences data 410, credentials data 412, personal data 414, and permissions data 416. In some embodiments, FIG. 4 may include one or more components that are the same or similar to one or more other components of the present disclosure. For example, account manager 402 may be the same or similar to account manager 306. Further, one or more components of FIG. 4, or aspects thereof, may be incorporated into, or excluded from, various embodiments of the present disclosure without departing from the scope of this disclosure. For example, the functionality of account manager 402 may be incorporated into profile manager 308 without departing from the scope of this disclosure.

In various embodiments, user accounts 404 may serve as a repository for user data associated with the PAE system. For example, preferences data 410 may indicate preferred methods of contact (e.g., phone, text, paper-free, email, mail, and the like), frequency of contact, types of contact (marketing, educational, social, etcetera), display preferences (e.g., themes, text size, colors), sounds, and the like. Credentials data 412 may include user passwords, usernames, multi-factor authentication, private keys, public keys, known user devices, and the like. Personal data 414 may include a unique identifier, an account number, contact information, account age, and the like. Permissions data 416 may include data sharing permissions, tracking permissions, data access permissions, privacy permissions, connection permissions, and the like.

The account administrator 406 may provide user facing functionality for the creation and administration of user accounts 404 for the PAE system. For example, account administrator 406 may enable a user to change their password. Further, account administrator 406 may interact with account data controller 408 to update a password in the credentials data 412 of the user account 404. In another example, account administrator 406 may enable a user to update their contact information. In yet another example, account administrator 406 may enable a user to view and control the various connections associated with their PAE system account. These connections will be described in more detail below, such as with respect to connection manager 1102 in FIG. 11.

The account data controller 408 may create, maintain, and control access to data in user accounts 404. For example, account data controller 408 may control access by components of the PAE system to data in user accounts 404. In some such examples, the access may be controlled based on data within a respective user account, such as permissions data 416, preferences data 410, or credentials data 412. In some embodiments, account data controller 408 may create a repository and store data objects corresponding to each user account. In various embodiments, the account data controller 408 may format and/or package data for sending to various components, such as other components of the PAE system. For example, account data controller 408 may encrypt account data prior to sending it to another component. In another example, account data controller 408 may remove, anonymize, or redact portions of account data prior to sending it.

Figure 5:
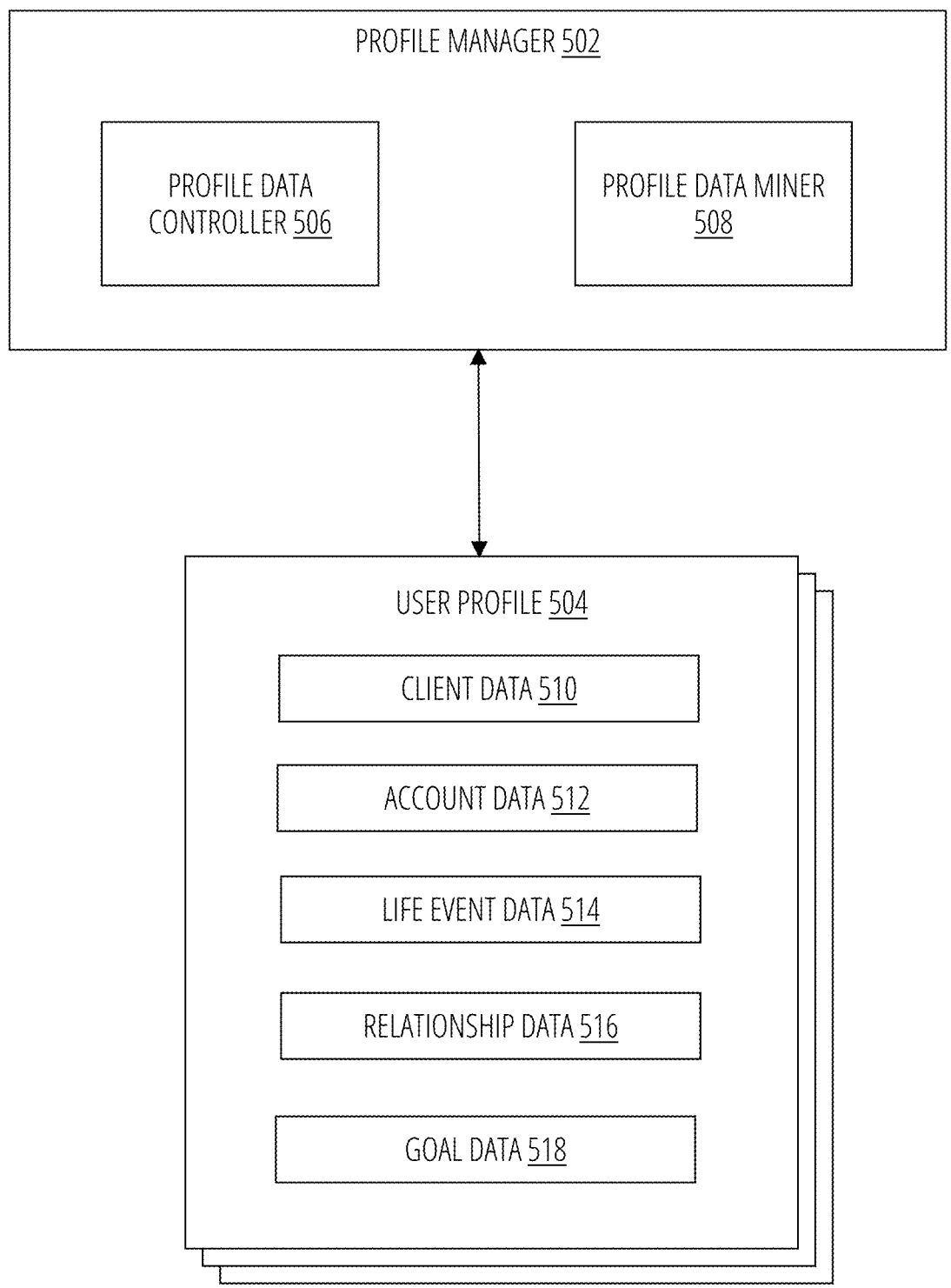
FIG. 5 illustrates an exemplary profile manager in conjunction with a plurality of user profiles according to one or more embodiments of the current disclosure.

FIG. 5 illustrates an exemplary profile manager 502 in conjunction with a plurality user profiles 504 according to one or more embodiments of the current disclosure. The profile manager 502 may create, maintain, and update a user profile 504 for each user. Each user profile 504 may include information relevant to providing a customized planning, advice, and/or execution experience to users. In the illustrated embodiment, profile manager 502 includes a profile data controller 506 and a profile data miner 508. Further, each of the one or more user profiles 504 can include client data 510, account data 512, life event data 514, relationship data 516, and goal data 518. In some embodiments, FIG. 5 may include one or more components that are the same or similar to one or more other components of the present disclosure. For example, profile manager 502 may be the same or similar to profile manager 308. Further, one or more components of FIG. 5, or aspects thereof, may be incorporated into, or excluded from, various embodiments of the present disclosure without departing from the scope of this disclosure. For example, profile data miner 508 may be excluded from profile manager 502 without departing from the scope of this disclosure.

In various embodiments, the user profile 504 serves as a repository for data useful for tailoring the PAE experience for different users. In several embodiments, the user profile 504 is indicative of a user values, characteristics, traits, and disposition. In the illustrated embodiment, user profile 504 includes client data 510, account data 512, life event data 514, relationship data 516, and goal data 518. The user profiles 504 may be utilized by various components of the PAE system to customize experiences for users. For example, a user profile may be utilized by the advice manager 314 as input to a machine learning (ML) model. In such examples, the ML model may output a type of advice that is particularly relevant to a user based on their user profile 504.

Client data 510 may include one or more of age, state of residence, income, net worth, industry of employment, business ownership, business value, home ownership, home value, last advisor contact, last client review, last trade date, product enrollments, last product usages, investment returns (e.g., Standard and Poor's (S&P) 500 returns, Europe, Australasia, and the Far East (EAFE) returns), volatility index (VIX), 10-year interest rate, inflation rate, acceptable risk levels, and the like.

Account data 512 may identify the various accounts and products associated with a user. Account data 512 can include one or more of the account types of the user, account locations, account balances, interest rates, recurring transfers, required minimum distributions (RMDs), fees, identified beneficiaries, account owner type, and trust status. Account types of the user may include one or more of taxable investment, traditional individual retirement arrangements (IRAs), Roth IRAs, employer retirement savings, deposit, health savings, mortgage, line of credit, loan, and the like. Account locations may include whether each account is an internal account or an external account. Account balances may include balances for investment accounts, balances for deposit accounts, principal owed on loans, and the like. Interest rates may include interest rates on loans, credit lines, accounts, and the like. Recurring transfers may include deposits or payments from investment or deposit accounts, minimum payments (e.g., for loans), and the like. Fees may include any fees associated with any identified accounts (e.g., the percent fee for an account). Identified beneficiaries may include any beneficiaries associated with any identified accounts. Account owner type may include whether the account owner is an individual, a business, or the like. Trust status may include whether accounts are held in a trust or not.

Additionally, in various embodiments, the account data 512 may include data based on feedback and/or interactions regarding the corresponding user. In various such embodiments, this feedback data may be utilized to improve recommendations provided to the user. For example, account data 512 may be utilized to track how many times a piece of advice has been displayed to a user. In another example, account data 512 may include a record of positive/negative feedback regarding various advice content.

Life event data 514 may include one or more life events and associated dates. For example, life event data 514 may include target retirement dates, birthdates, bankruptcy filings, school start dates, inheritance dates, employment start/stop dates, eligibility dates (e.g., Medicare, social security), distribution dates, and the like.

Relationship data 516 may include types and age of user relationships. For example, relationship data 516 may include marital status and the age of the marriage. In another example, relationship data 516 may identify dependents and their ages. In yet another example, relationship data 516 may include family members, business associates, partners, shared goal members, and the like, along with the respective relationship ages.

Goal data 518 may include one or more of goal types, goal subtypes, creation date, amount, amount type, start time, end time, status, and the like. The amount may correspond to the amount associated with the goal and the amount type may indicate frequency of contributions (e.g., per year, per month, lump sum). Status may indicate whether the goal is active, pending, paused, incomplete, and the like.

The profile data controller 506 may create, maintain, and control access to data in user profiles 504. For example, profile data controller 506 may control access by components of the PAE system to data in user profiles 504. In some such examples, the access may be controlled based on data within a respective user account, such as permissions data 416, preferences data 410, or credentials data 412 of user account 404. In some embodiments, profile data controller 506 may create a repository and store data objects corresponding to each user account.

In various embodiments, the profile data controller 506 may format and/or package data for sending to various components of the PAE system. For example, profile data controller 506 may encrypt account data prior to sending it to another component. In another example, profile data controller 506 may remove, anonymize, or redact portions of account data prior to sending it. In one embodiment, the profile data controller 506 may format data in the user profile 504 for input into a machine learning model, such as in response to a request from advice manager 314, experience manager 322, or connection manager 320. For example, profile data controller 506 may generate a multi-dimensional vector for input into a machine learning model based on one or more portions of the user profile 504. In such examples, a first dimension may correspond to a financial status of the user, a second dimension may correspond to a familial status of the user, a third dimension may correspond to values of the user, a fourth dimension may correspond to age of the user, a fifth dimension may correspond to an acceptable risk level of the user, and a sixth dimension may correspond to a goal of the user. In some embodiments, characteristics of the formatted data may be indicated by the requesting component.

The profile data miner 508 of profile manager 502 may actively seek and identify potentially useful data regarding users for inclusion in the user profile 504. In some such embodiments, the profile data miner 508 may draw conclusions or make inferences regarding a user based on available data. For example, if a user identifies that they prefer paper-free communications in the preferences data 410 of their user account 404, the profile data miner 508 may infer that a user values protecting the environment and store an indication of such in the user profile 504. In turn, other components of the PAE system may utilize this information to customize the PAE experience of the user, such as to promote, highlight, or offer more environmentally friendly options to the user.

In some embodiments, the data sources mined by the profile data miner 508 may be controlled based on preferences data 410 in the corresponding user account 404. In one embodiment, profile data miner 508 may scan publicly available information to identify potentially useful data for inclusion in the user profile 504. For example, profile data miner 508 may identify life event data 514 by scanning obituaries. In another example, profile data miner 508 may identify account data 512 by scanning property records for home ownership and/or real estate purchases. In several embodiments, the profile data miner 508 may interact with other components of the PAE system to update user profiles 504. In one embodiment, the profile data miner 508 may generate one or more questionnaires for completion by a user. In such embodiments, the questionnaires may be utilized to identify one or more aspirations, values, and objectives of a user. For example, a research-based questionnaire including a personality test may be used. In another example, the questionnaire may request the user to identify information about themselves for their user profile 504 (e.g., values, familial status, income, accounts, etcetera).

Figure 6:
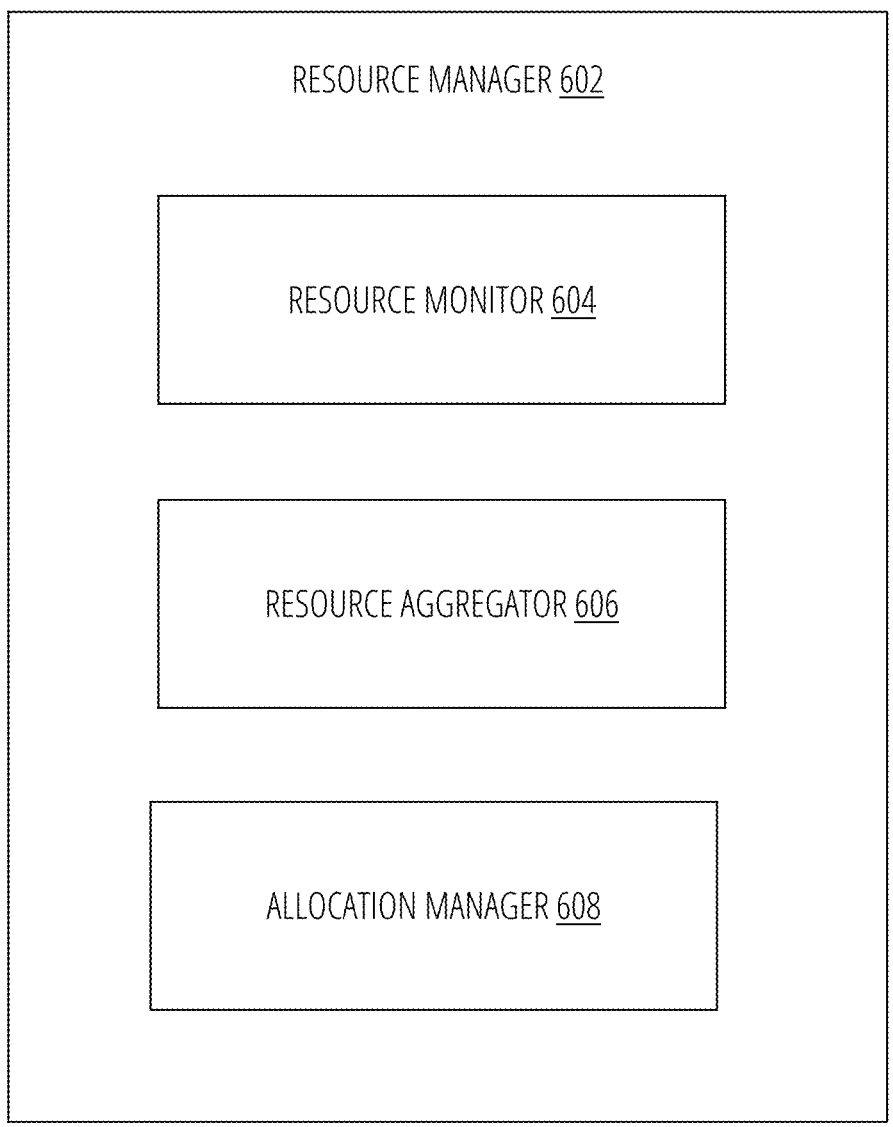
FIG. 6 illustrates an exemplary resource manager according to one or more embodiments of the current disclosure.

FIG. 6 illustrates an exemplary resource manager 602 according to one or more embodiments of the current disclosure. Generally, the resource manager 602 may monitor, analyze, and manager resources, such as assets, belonging to a user. In the illustrated embodiment, resource manager 602 includes a resource monitor 604, a resource aggregator 606, and an allocation manager 608. In some embodiments, FIG. 6 may include one or more components that are the same or similar to one or more other components of the present disclosure. For example, resource manager 602 may be the same or similar to resource manager 310. Further, one or more components of FIG. 6, or aspects thereof, may be incorporated into, or excluded from, various embodiments of the present disclosure without departing from the scope of this disclosure. For example, resource aggregator 606 and/or allocation manager 608 may be excluded from resource manager 602 without departing from the scope of this disclosure.

The resource manager 602 may collect, maintain, monitor, control, and analyze data regarding a user's resources. In several embodiments, the resource manager 602 may generate and/or administer updates, allocations, statuses, summaries, analysis, and projections for the resources of a user. For example, the resource monitor 604 may maintain an overview of the resources associated with a user and the allocations of those resources. In some embodiments, resource monitor 604 may monitor activity associated with user resources (e.g., assets, accounts, credit scores, investments, cash flow, and the like). For example, the resource monitor 604 may determine when accounts are opened, closed, and/or go into default. In another example, resource monitor 604 may determine when resources are moved into and out of accounts. In yet another example, resource monitor 604 may monitor changes in a user's credit score. In some embodiments, the resource monitor 604 may generate alerts or notifications based on changes to the resources of a user.

The resource aggregator 606 may maintain a financial snapshot of a user. For instance, resource aggregator 606 may calculate a status overview for a user (see e.g., status overview 1308 of FIG. 13C. In many embodiments, the resource aggregator 606 may calculate a net worth of a user. In some embodiments, the resource aggregator 606 may determine free cash flow or similar values for a user.

The allocation manager 608 may enable a user to control how their resources are allocated. In many embodiments, allocation manager 608 may enable a user to view, add, and edit their resource allocations. In many such embodiments, a user may set up one or more allocations via the allocation manager 608. For example, allocation manager 608 may transfer a set amount of money from a checking account to a savings account each time a paycheck is deposited into the checking account. In some embodiments, the allocation manager 608 may analyze the flow and/or allocation of resources for a user.

In several embodiments, other components of the PAE system may interact with the resource manager 602 for collecting resource related data. In several such embodiments, various components of the PAE system may request updates, allocations, statuses, summaries, analysis, and projections regarding the resources of a user. For example, goal manager 312 may interact with allocation manager 608 to set up an allocation for a goal created by the user. In another example, insight manager 316 may estimate disposable income for a user based on data from the resource manager 602. In yet another example, resource manager 602 may generate the underlying data for status overview 1308 of FIG. 13C in response to a request from experience manager 322.

In one embodiment, the resource manager 602 may interact with the profile manager 502 and provide data/updates to user profiles 504, such as regarding client data 510 or account data 512. For example, resource monitor 604 may routinely update the income in client data 510. In another example, resource aggregator 606 may routinely update the network in client data 510. In yet another example, allocation manager 608 may provide updates associated with recurring transfers or RMDs in account data 512. Further, by providing updated data for various portions of user profiles 504, the resource manager 602 may indirectly interact with advice manager 314 and affect the advice provided thereby.

Figure 7:
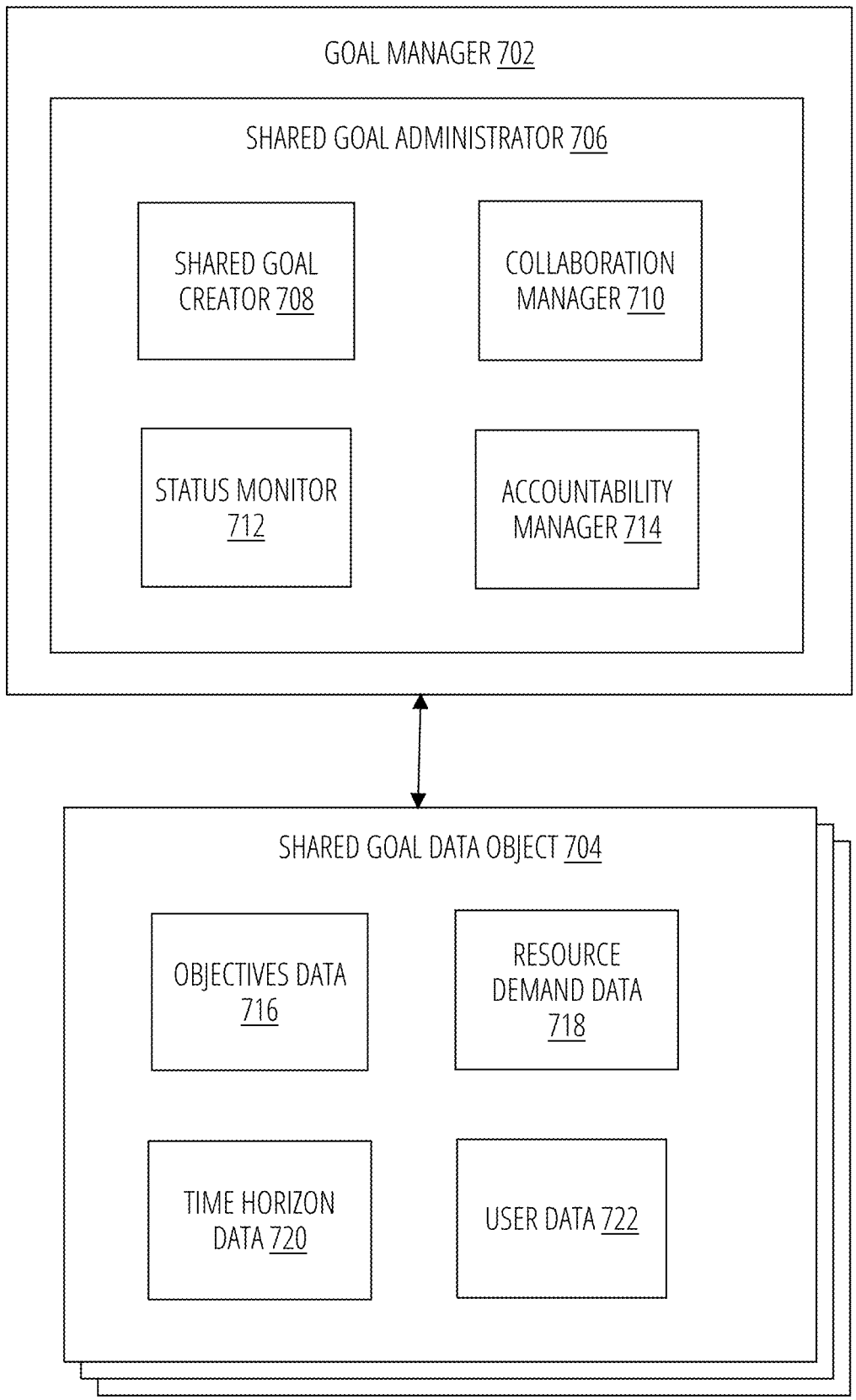
FIG. 7 illustrates an exemplary goal manager in conjunction with a plurality of shared goal data objects according to one or more embodiments of the current disclosure.

FIG. 7 illustrates an exemplary goal manager 702 in conjunction with a plurality of shared goal data objects 704 according to one or more embodiments of the current disclosure. The goal manager 702 may facilitate the creation and administration of various goals of users. As part of this, the goal manager 702 may generate and maintain a shared goal data object 704 for each of the shared goals. In the illustrated embodiment, the goal manager 702 includes a shared goal administrator 706 comprising a shared goal creator 708, collaboration manager 710, an accountability manager 714, and a status monitor 712. The shared goal data object 704 includes objectives data 716, resource demand data 718, time horizon data 720, and user data 722. In some embodiments, FIG. 7 may include one or more components that are the same or similar to one or more other components of the present disclosure. For example, goal manager 702 may be the same or similar to goal manager 312. Further, one or more components of FIG. 7, or aspects thereof, may be incorporated into, or excluded from, various embodiments of the present disclosure without departing from the scope of this disclosure. For example, collaboration manager 710 may be excluded from shared goal administrator 706 without departing from the scope of this disclosure.

The goal manager 702 may create and administer various goals for a user or group of users. In some embodiments, the goal manager 702 may assist users in identifying their goals. Goal manager 702 may also assist in creating a plan or set of tasks for accomplishing the goal. The goal manager 702 may also enable shared goals between a group of users, such as via shared goal administrator 706. Although embodiments are discussed with regard to shared goals, it will be appreciated that individual goals may be created and implemented also. A non-exhaustive list of exemplary goals, or categories of goals, can include building and protecting wealth, buying a home, general financial understanding, managing or transitioning a business, managing spending, starting or buying a business, making a big purchase, managing credit and debt, providing for education, preparing for emergencies, supporting dependents, engaging in giving and philanthropy, focusing on health care, making legacy and estate plans, providing for peace of mind, preparing for retirement, exploring tax planning strategies, and pursuing travel and leisure.

The shared goal administrator 706 includes shared goal creator 708, collaboration manager 710, accountability manager 714, and status monitor 712. The shared goal creator 708 may enable a user to create a shared goal and corresponding shared goal data object 704. A shared goal may refer to an objective that is shared by a group of users. The shared goal data object 704 may effectively include a plan for achieving the shared goal. This plan may include a timeline of actions, tasks, and/or occurrences for achieving the objective within the time horizon. Different users in the group may have different commitments, tasks, and/or benefits associated with the shared goal. Additionally, different portions of the shared goal data object 704 may be viewable by different users based on their different commitments, tasks, and/or benefits. In several embodiments, the shared goal data object 704 may be configured to output different sets of information depending on which user is interrogating it. In several such embodiments, the different sets of information may be used to provide customized experiences for each of the users. The process of creating a shared goal is discussed in more detail below, such as with respect to FIGS. 16A-16J.

Each shared goal data object 704 may define a shared goal. The objectives data 716 may include data and metadata regarding the goal itself (e.g., purchase a house or retire). In some embodiments, the objectives data 716 may include the plan and/or tasks for accomplishing the goal. The resource demand data 718 may include data and metadata regarding the resource demand of the goal. For instance, resource demand data 718 may identify each contributor and their commitment to the shared goal (e.g., $300 per month from each contributor). The time horizon data 720 may include data and metadata regarding timing of different aspects of the shared goal. For example, time horizon data 720 may include a start date of the goal and an end date of the goal. In another example, time horizon data 720 may include a timeline for the shared goal. In such examples, the timeline may include performance dates for various tasks for each user. The user data 722 may include data and metadata regarding users involved in the shared goal. The user data 722 may include information, such as contact information, avatars, profile data, account data, roles, commitments, and the like, for each of the members. For example, user data 722 may include unique identifiers for each of the members. In another example, user data 722 may identify the role of each member with respect to the shared goal (e.g., contributor, creator, beneficiary, etcetera). In some embodiments, the creator of a shared goal may be referred to as the primary user.

The collaboration manager 710 may facilitate users associated with a shared goal data object 704 to interact and work together to accomplish the goal. In some embodiments, collaboration manager 710 may include a service for users to communicate and interact regarding the shared goal. For example, collaboration manager 710 may provide a message board for shared goals. In some embodiments, collaboration manager 710 may promote communication between members of a shared goal, such as by providing reminders and/or recommendations to discuss aspects of the shared goal or to meet-up. In various embodiments, the collaborative experience can form one or more portions of the goal creation process. For example, a shared goal by a husband and wife to purchase a house may be collaboratively created. In such examples, the outline of the shared goal (e.g., purchase a house) may be initially formed and then a collaborative process to identify the exact house to purchase may be initiated by collaboration manager 710. In the collaborative process, each user may submit and discuss potential houses to purchase. In one embodiment, the collaborative process may include voting on different options.

The status monitor 712 may monitor the progress towards the goal. In some embodiments, the status monitor 712 may determine both individual progress towards the goal and group progress towards the goal. In some embodiments, the status monitor 712 may interact with the insight manager 902 to obtain a probability of success for the goal, which may be stored in the objectives data 716 of the shared goal data object 704. For example, status monitor 712 may periodically have the insight manager 902 update the probability of success. In another example, status monitor 712 may have the insight manager 902 update the probability of success in response to a request or one or more user actions (e.g., based on context data). In many embodiments, a combined probability of success may be generated for a set of goals, such as all goals associated with a user.

The accountability manager 714 may generate alerts and reminders for users. For example, when the performance of a user strays outside of a first threshold of performance, the accountability manager 714 may notify the user. Further, if the user strays outside of a second threshold of performance, the accountability manager 714 may notify the user and the goal creator. Still further, if the user strays outside of a third threshold of performance, the accountability manager 714 may notify all users associated with the shared goal. In some embodiments, the accountability manager 714 may generate alerts and reminders based on threshold probabilities of success. Alerts and reminders may come in the form of emails, texts, phone calls, mail, phone notifications, and the like. In one embodiment, the accountability manager 714 may notify an advisor to reach out to a user. In some embodiments, alerts and reminders may be generated and/or delivered based on one or more user preferences, such as in corresponding preferences data 410 for each user.

In various embodiments, one or more of the following operations may occur during operation of the PAE system. More specifically, one or more of the following operations may occur in the identification and/or creation of a shared goal, such as by goal manager 702 and/or based on input received via goal creation GUI 1600 of FIGS. 16A-16J.

A request to create a shared financial goal may be received from an account holder via a goal creation GUI. For example, a request to create shared goal 1428 may be received via goal creation GUI 1600. It will be appreciated that the user of a financial goal is exemplary and shared goals are not necessarily financial. In various embodiments, the account holder may comprise a primary user (e.g., primary user 2208) and/or a goal creator (e.g., creator 2008).

Figure 16A:
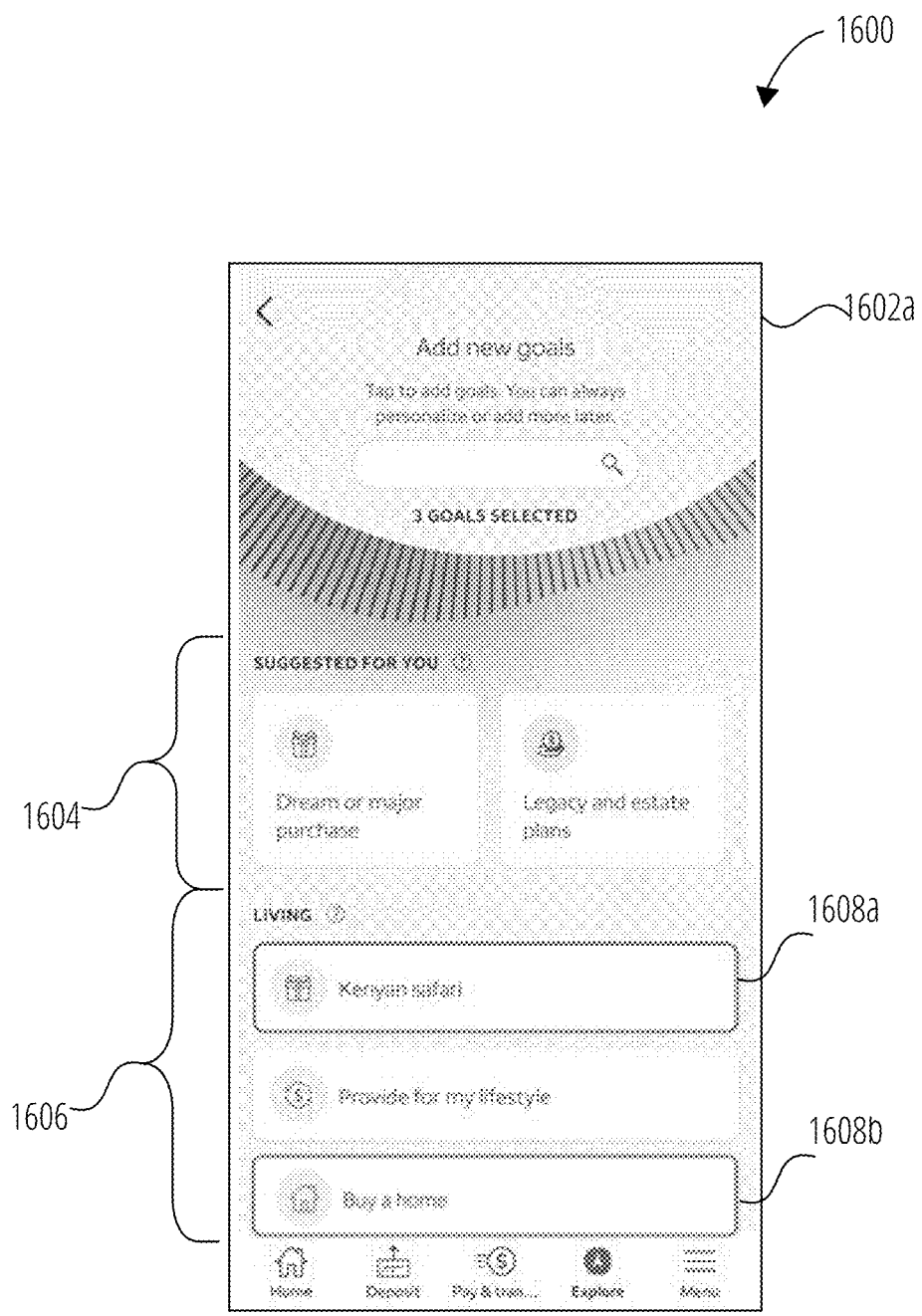
FIGS. 16A-16J illustrate various aspects of a goal creation GUI according to one or more embodiments of the current disclosure.
Figure 16B:
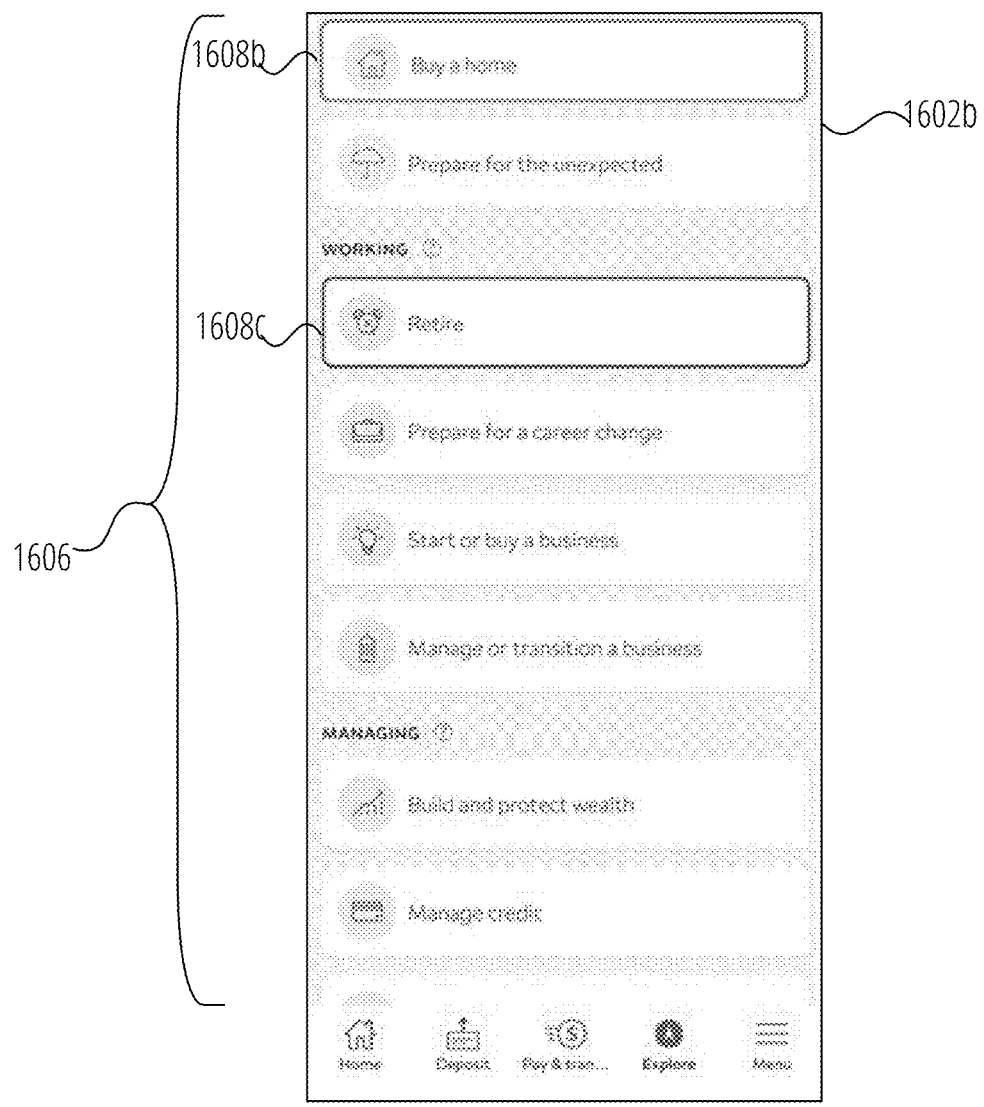
Figure 16C:
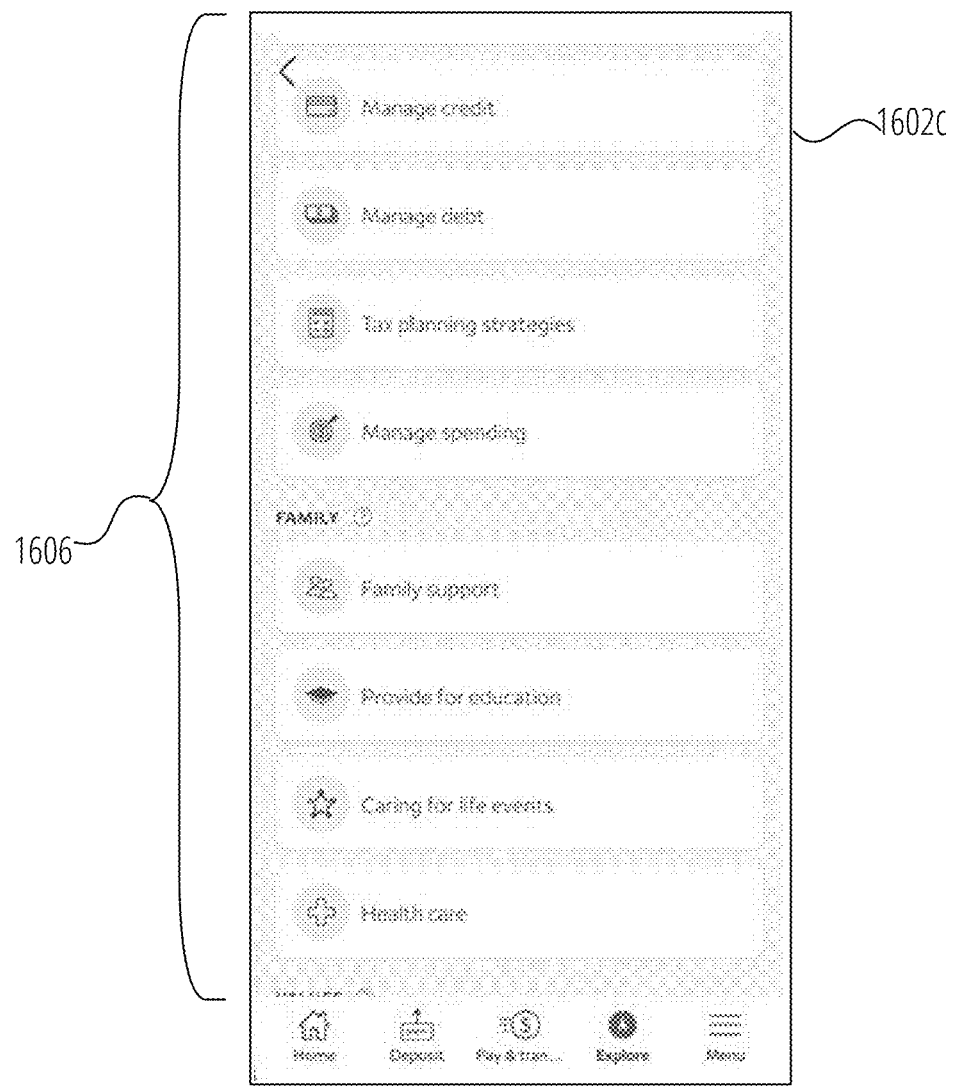
Figure 16D:
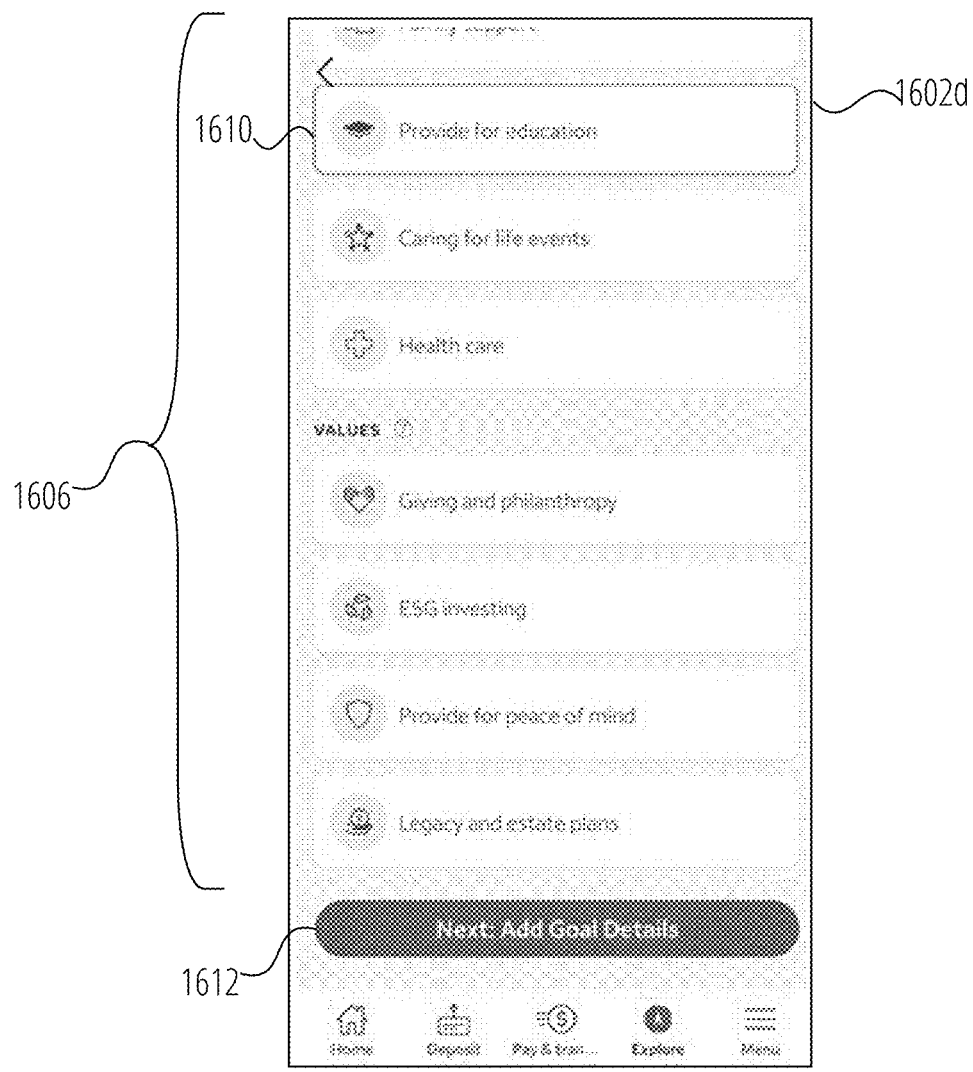
Figure 16E:
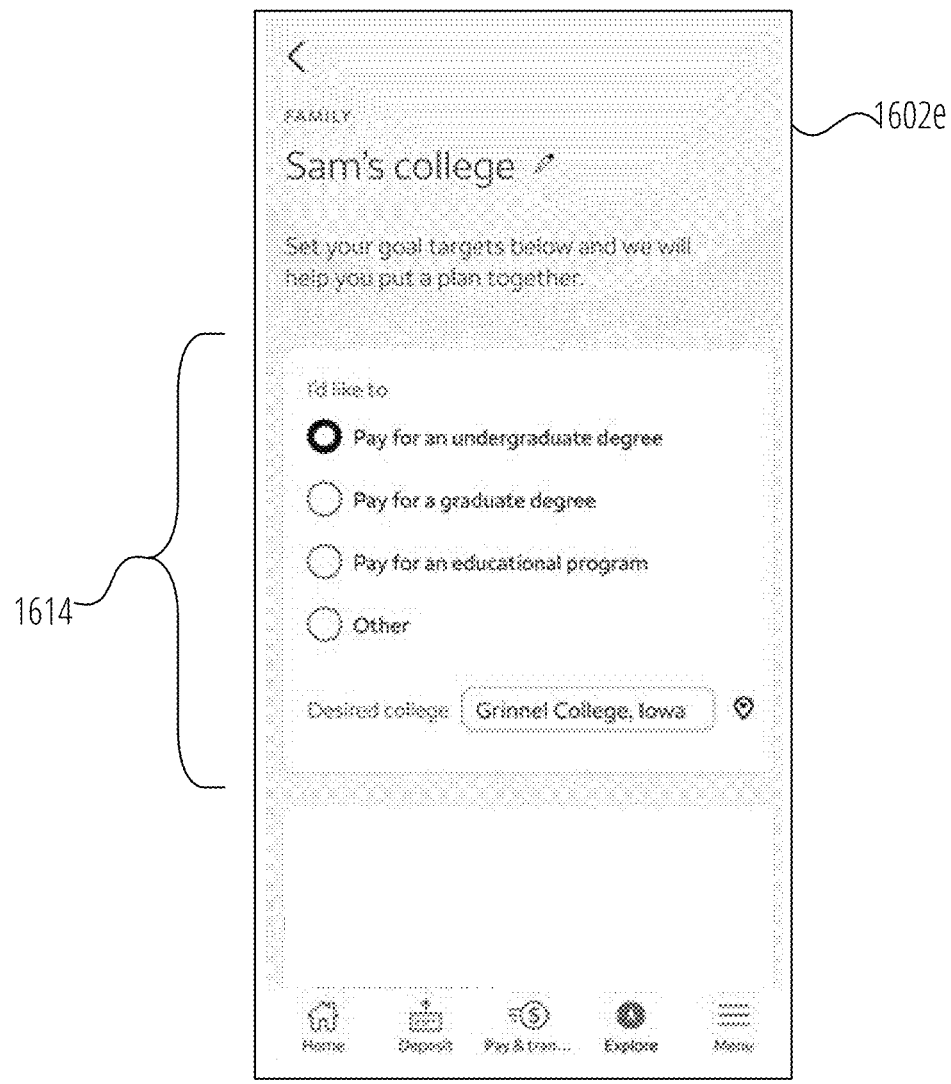
Figure 16F:
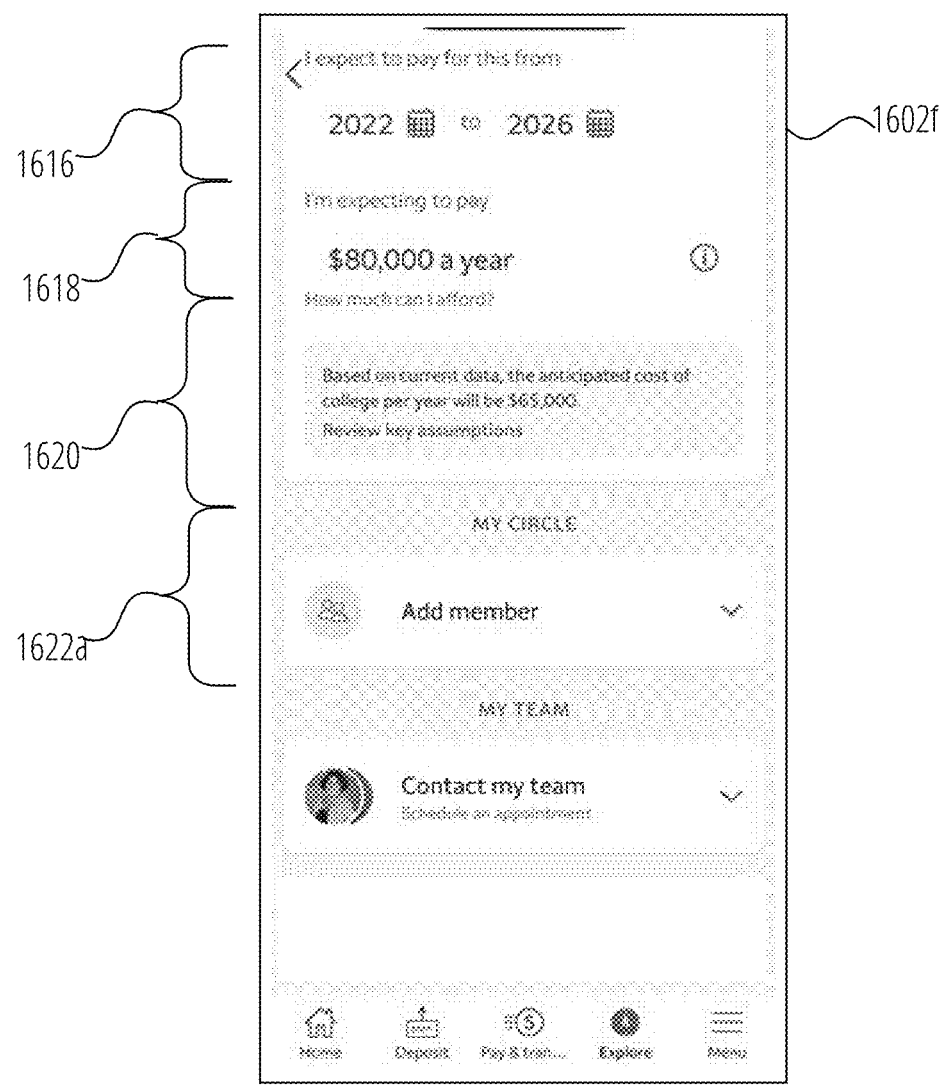
Figure 16G:
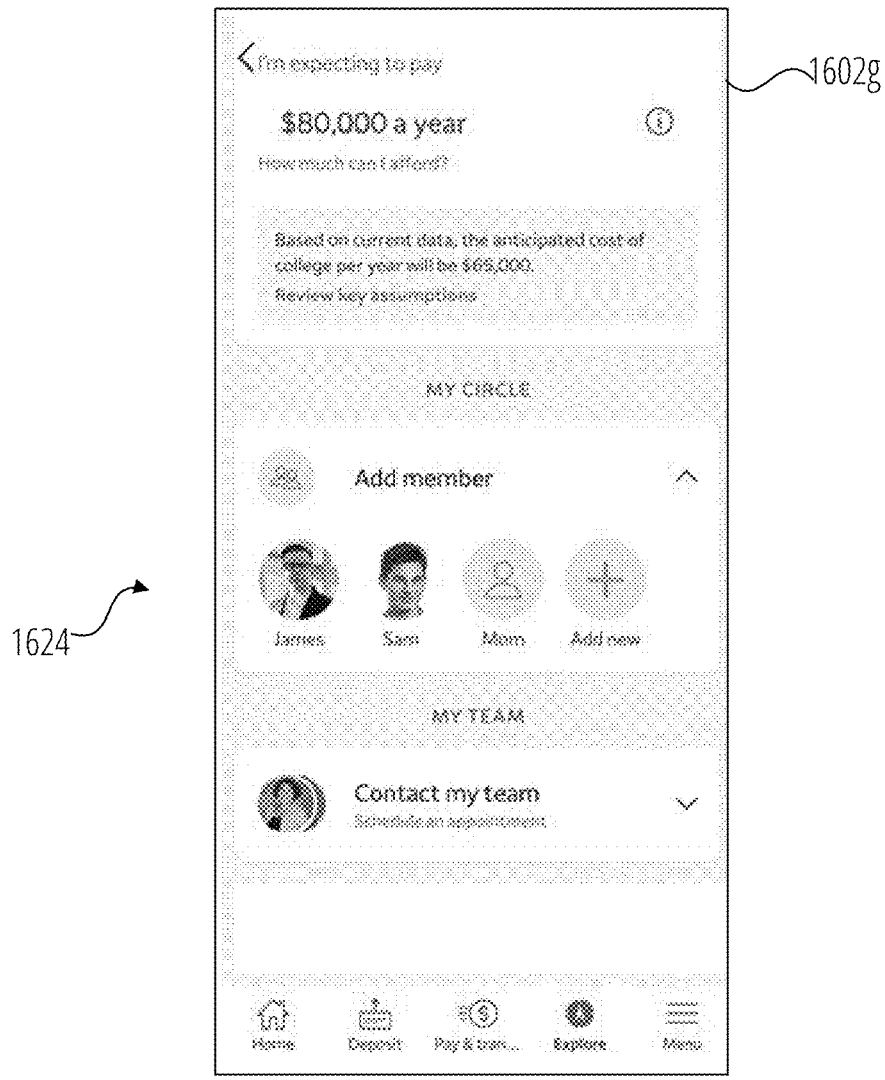

An objective, a resource demand, and a time horizon may be determined for the shared financial goal (see e.g., FIGS. 16E-16G). A group of users associated with the shared financial goal may be identified based on input provided via the goal creation GUI (see e.g., FIGS. 16G-16J). Further, the group of users may include a first user, a second user, and a beneficiary.

The first user may be classified as a first contributor with a first commitment to achieving the shared financial goal. The first commitment may include a contribution of a first portion of the resource demand. In various embodiments, the first user may comprise the creator of the shared goal.

The second user may be classified as a second contributor with a second commitment to achieving the shared financial goal. The second commitment may include a contribution of a second portion of the resource demand.

A data object may be created for the shared financial goal based on the objective, the resource demand, and the time horizon. For example, the data object may include shared goal data object 704. Further, the objectives data 716 may be generated based on the objective, the resource demand data 718 may be generated based on the resource demand, and the time horizon data 720 may be generated based on the time horizon. Further, the user data 722 may be generated based on the user group including contributors, beneficiaries, and corresponding details (e.g., benefits and commitments).

Interrogation of the data object by a respective device associated with a respective user in the group of users may cause display of a customized PAE experience for the respective user. For example, user data 722 may include read/write permissions data regarding data in the shared goal data object 704 for each of the users in the user group (see e.g., FIG. 20A versus FIG. 20B). In another example, advice and insights may be customized for each user, such as based on their profiles. Further, the customized PAE experience for each respective user in the group of users includes a collaborative task regarding achievement of the shared financial goal by the group of users (see e.g., collaborative tasks 1414a, 1414b, 2004, 2104).

In some embodiments, the account holder is the first user. A privilege level of the first user may be determined with respect to the shared financial goal based on the first user being the account holder that creates the shared financial goal. For example, creators of goals may automatically be given privileges to access all aspects of the shared goal. In many embodiments, the privileges for various users in the user group may be stored in user data 722 of shared goal data object 704. The PAE experience for the first user may be customized based on the privilege level of the first user. For example, shared goal detail GUI 1400 may be customized for the first user, at least in part, based on the privilege level of the first user to produce GUI views 1402*a*, 1402*b*.

A privilege level of the second user may be determined with respect to the shared financial goal based on the second user being classified as a contributor. For example, contributors to goals may automatically be given privileges to read, but not write to, all aspects of the shared goal. In many embodiments, the privileges of contributors (individually or collectively) and beneficiaries (individually or collectively) can be customized by the creator. The PAE experience for the second user may be customized based on the privilege level of the second user. For example, contributor goal detail GUI 2000 may be customized for the second user, at least in part, based on the privilege level of the second user to produce GUI views 2002*a*, 2002*b*. In various embodiments, the PAE experience of the second user may be customized to exclude content from the shared goal data object that is included in the PAE experience for the first user based on the privilege level of the first user being higher than the privilege level of the second user. For example, the first user may include the ability to edit details regarding other contributors and beneficiaries, while the second user may not have the ability to edit details regarding other contributors and beneficiaries.

Figure 14A:
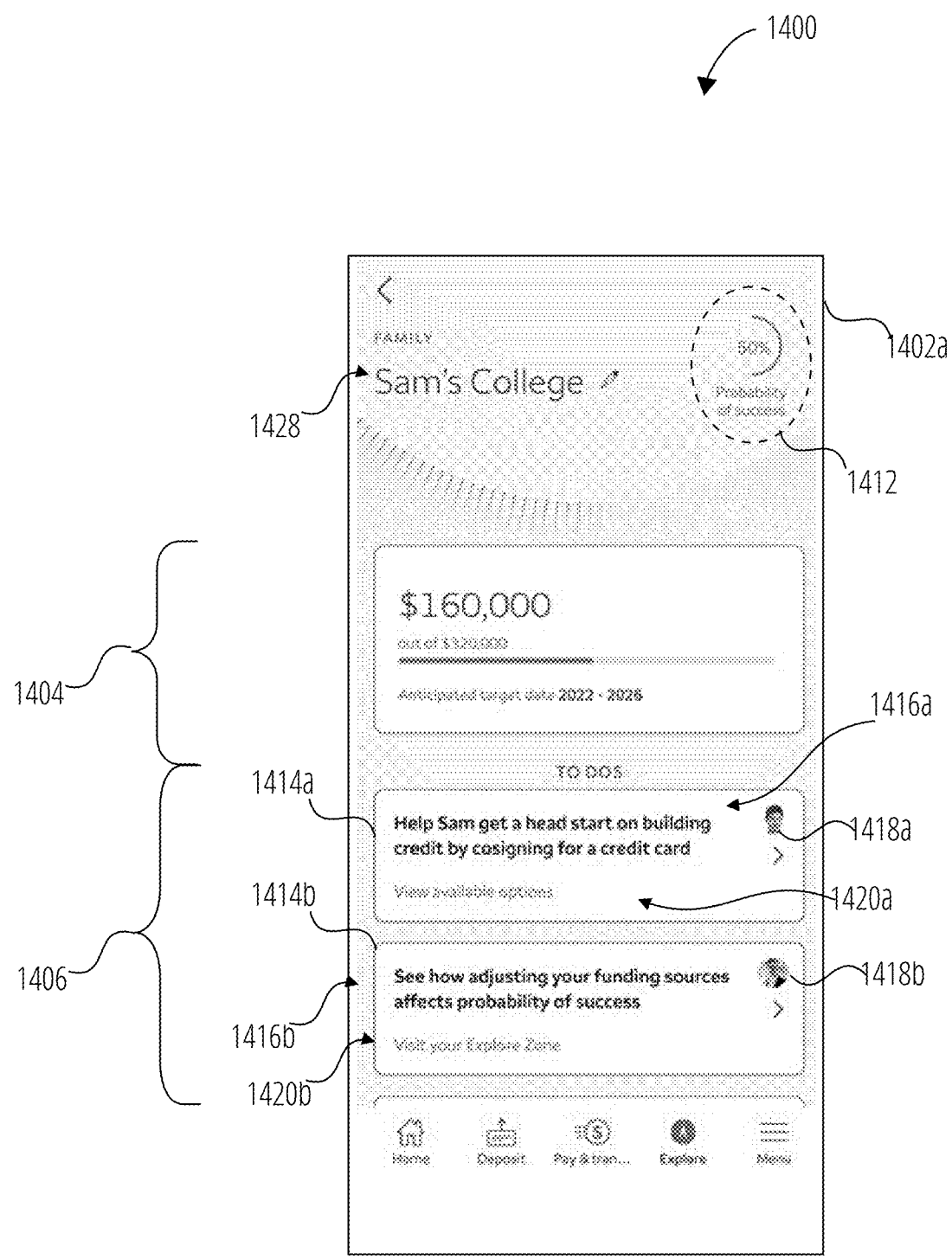
FIGS. 14A and 14B illustrate various aspects of a shared goal detail GUI according to one or more embodiments of the current disclosure.
Figure 20A:
FIGS. 20A and 20B illustrate various aspects of a contributor goal detail GUI according to one or more embodiments of the current disclosure.
Figure 21A:
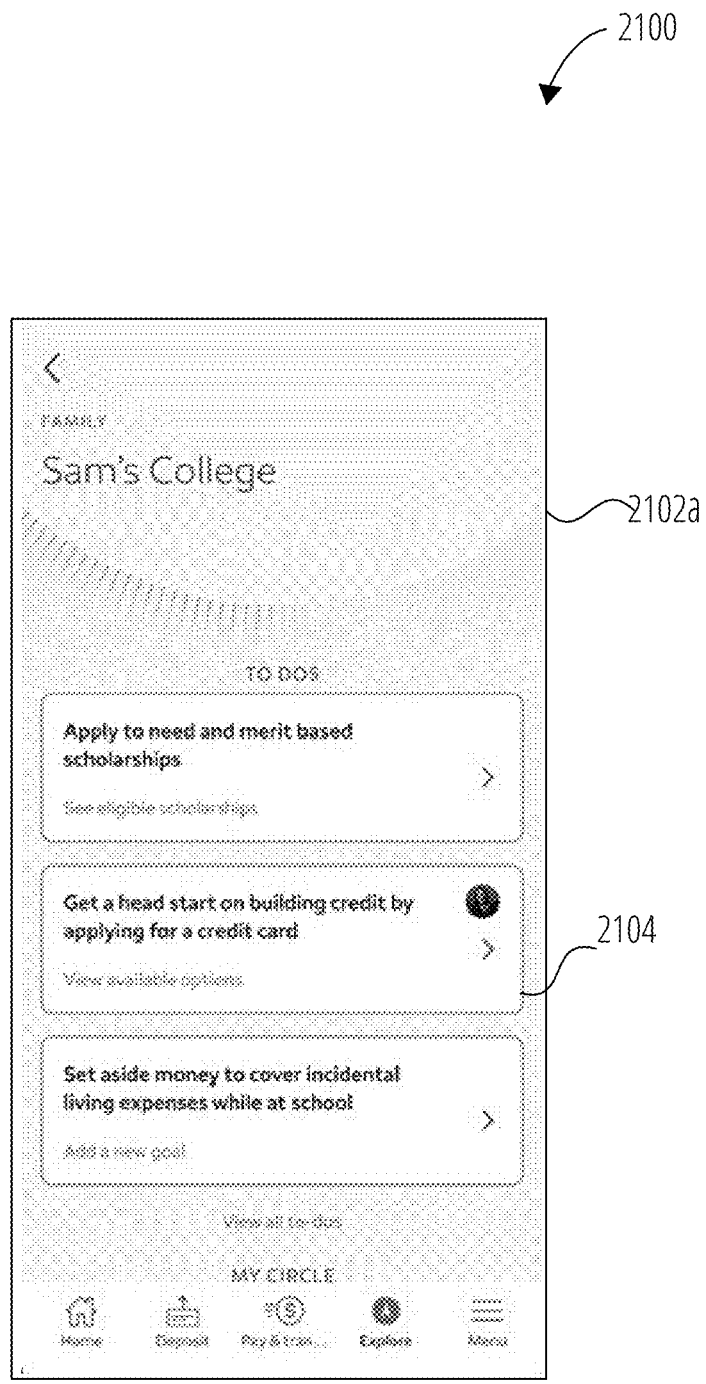
FIGS. 21A and 21B illustrate various aspects of a beneficiary goal detail GUI according to one or more embodiments of the current disclosure.

A privilege level of the beneficiary may be determined with respect to the shared financial goal. The privilege level of the beneficiary may be lower than the privilege levels of the first and second users. In various embodiments, the PAE experience of the beneficiary may be customized to exclude content from the shared goal data object that is included in the PAE experience for the first and second users based on the privilege level of the first and second users being higher than the privilege level of the beneficiary. In some embodiments, the content excluded from the PAE experience for the beneficiary includes one or more of a collaborative status regarding achievement of the shared financial goal by the group of users and a probability of success for the shared financial goal. For example, as shown in FIGS. 14A, 20A, and 21A, the probability of success 1412 and collaborative status 1404 shown in GUI view 1402*a* of shared goal detail GUI 1400 and GUI view 2002*a* of contributor goal detail GUI 2000 may be excluded from GUI view 2102*a* of beneficiary goal detail GUI 2100.

In several embodiments, the customized PAE experience for each contributor in the group of users may include a collaborative status regarding achievement of the shared financial goal by the group of users (see e.g., collaborative status 1404). In several such embodiments, the customized PAE experience for each contributor in the group of users includes a probability of success for the shared financial goal. In various embodiments, the probability of success may be determined, at least in part, with a Monte Carlo simulation performed based on projected financial market conditions. For example, insight engine 906 of insight manager 902 may perform a Monte Carlo simulation based on projected financial market conditions to determine probability of success 1412.

The customized PAE experience for the beneficiary may include display of a set of tasks for receiving the benefit from achieving the shared financial goal. For example, beneficiary goal detail GUI 2100 of FIGS. 21A and 21B may include a set of tasks for receiving the benefit of achieving a shared financial goal. In one embodiment, the set of tasks for the beneficiary include completing an application for admission or opening an account with a financial institution. For example, a task may include getting a head start on building credit by applying for a credit card. In another example, a task may include applying to need and merit-based scholarships.

In some embodiments, an existing goal associated with the account holder may be identified. The relative importance of the shared financial goal with respect to the existing goal may be determined, such as based on input provided via the goal creation GUI. In one embodiment, the relative importance may be automatically determined or suggested, such as based on account data and/or profile data. In some embodiments, the relative importance of the shared financial goal with respect to the existing goal may be presented in the customized PAE experience for the first user. For example, the relative importance of different goals to a user may be presented in concentric shape visualization GUI 2200.

In some embodiments, the second user may comprise the beneficiary. Accordingly, in various embodiments, a user may be both a contributor and a beneficiary. For example, a user may contribute time towards achieving a goal and receive a monetary benefit from accomplishing the goal. In another example, a user may contribute a portion of the money to purchase a car and receive the car as a benefit upon accomplishing the goal.

In various embodiments, the performance of one or more users may be tracked with respect to the shared financial goal to produce historical performance data. For example, status monitor 712 may track performance of each user in the user group for the shared financial goal. In some embodiments, the historical performance data may be stored in the shared goal data object 704, such as user data 722.

A projected performance of one or more users with respect to the shared financial goal may be generated. For example, accountability manager 714, such as in conjunction with advice manager 802 and/or insight manager 902, may generate projected performances for users with respect to shared goals. In some such example, the projected performances may be based on historical performance data. For example, a machine learning algorithm may be applied to the historical performance data of a user to generate a projected performance for the user.

A graphical representation comparing a planned performance of a user to the projected performance of a user may be presented as part of a customized PAE experience. For example, experience manager 1202 may present graphical representation comparing a planned performance of a user to the projected performance of a user. The planned performance may refer to the expected performance of the user according to the timeline of actions, tasks, and/or occurrences for achieving the objective within the time horizon. On the other hand, the projected performance may refer to the expected performance of the user according to their actual performance up to this point in time.

In some embodiments, accountability manager 714 may trigger presentation of the graphical representation comparing the planned performance of the user to the projected performance of the user. In some such embodiments, this may be in response to determining the user is outside of a target zone (e.g., threshold performance band) around the projected performance of the user. In one embodiment, the target zone may be +/−10% from the projected performance.

In some embodiments, it may be determined that the projected performance of a user is out of a target zone of the planned performance. In some such embodiments, a suggestion to bring the projected performance into the target zone of the planned performance may be provided. For example, accountability manager 714 may operate in conjunction with advice manager 802 to determine a suggestion to bring the projected performance into the target zone. For example, a user may contribute an addition $50 a month for 6 months to bring their projected performance into the target zone.

In various embodiments, classifying a user as a contributor to the shared financial goal may include one or more of the following. The user may be tagged to be a contributor based on input provided via the goal creation GUI.

The first commitment of the user to achieving the shared financial goal may be determined based on input provided via the goal creation GUI. For example, the first commitment to achieving the shared financial goal may be determined based on input provided to the goal creation GUI 1600.

A request to the user for the user to be the contributor with the first commitment may be generated. For example, collaboration manager 710 may generate the request to the user (see e.g., FIGS. 17A and 18A). Acceptance may be received from the first user to be the first contributor (see e.g., FIG. 18B). In response to receiving the acceptance, access to a portion of the data object may be provided. Further, this access causes interrogation of the data object by a device associated with the user to result in display of a customized PAE experience for the first user based on access to the portion of the data object (see e.g., FIGS. 18C, 18D, 20A, 20B).

In some embodiments a contract associated with the shared financial goal may be created based on the first commitment of the user to achieving the shared financial goal. Further, the user may be prompted to execute the contract as part of acceptance from the user to be the first contributor.

Figure 8:
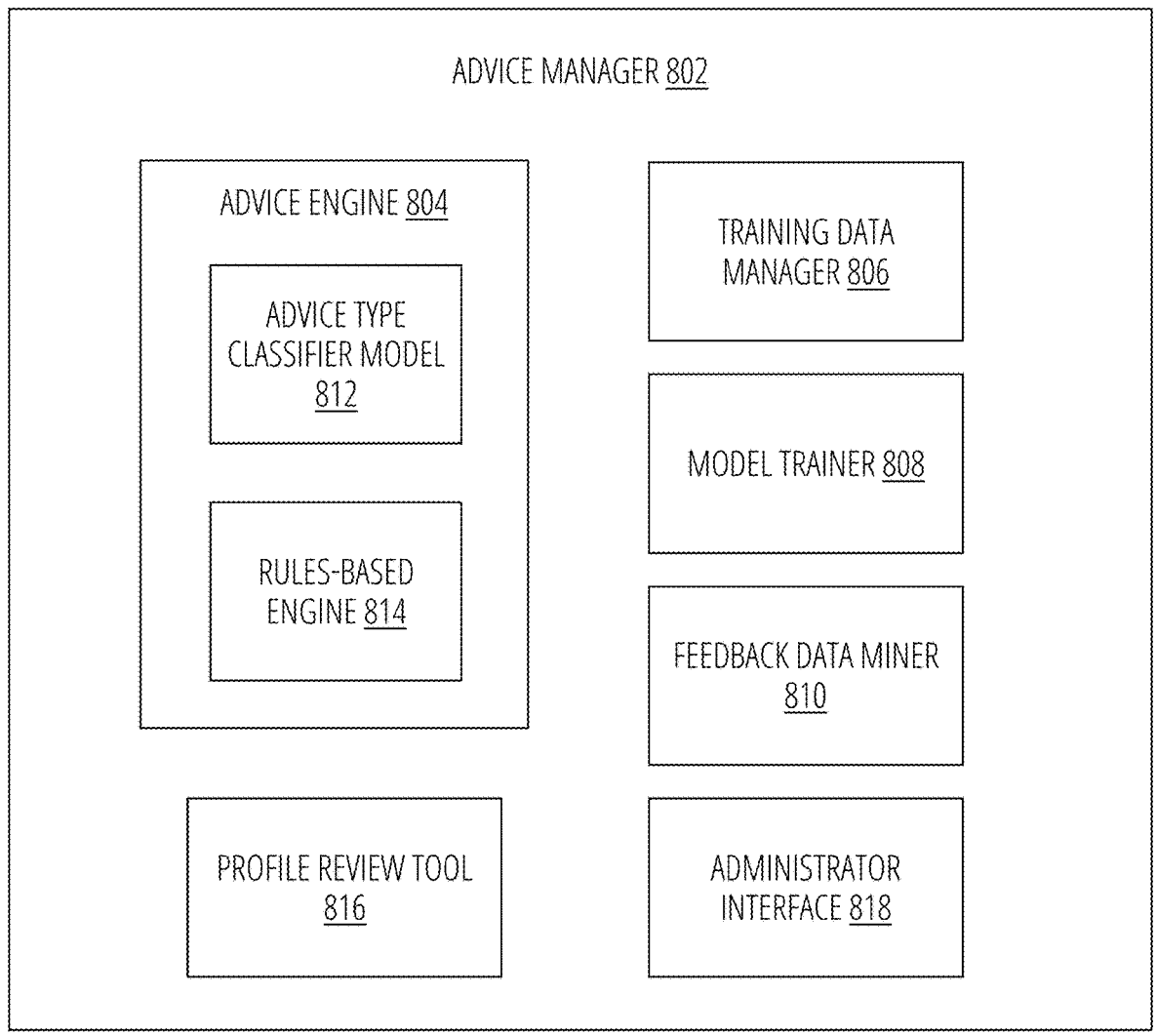
FIG. 8 illustrates an exemplary advice manager according to one or more embodiments of the current disclosure.
Figure 24:
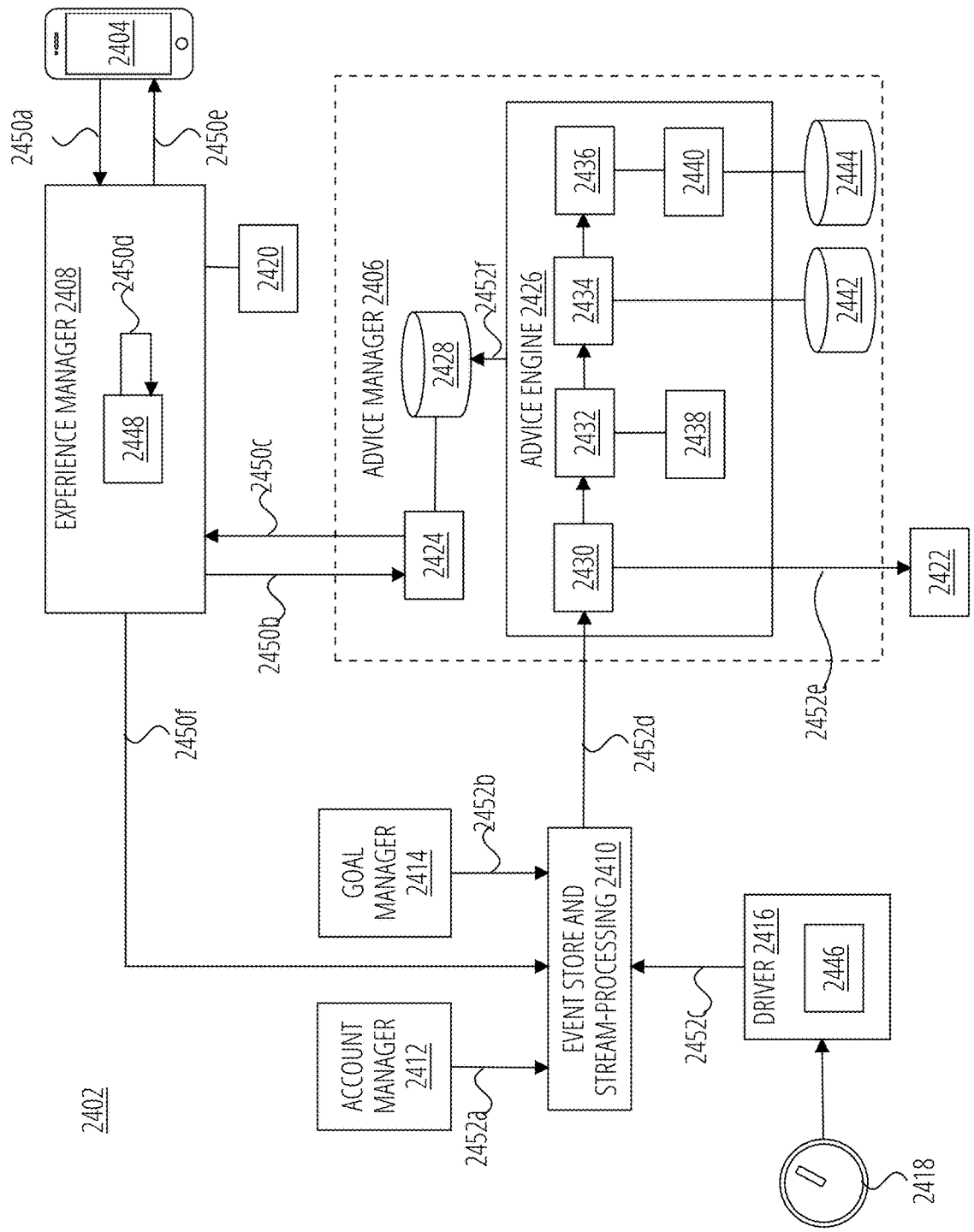
FIG. 24 illustrates an exemplary process flow for providing advice content according to one or more embodiments described hereby.

FIG. 8 illustrates an exemplary advice manager 802 according to one or more embodiments of the current disclosure. The advice manager 802 may provide advice content for users, such as based on their user profile. In the illustrated embodiment, the advice manager 802 includes an advice engine 804, a training data manager 806, a model trainer 808, a feedback data miner 810, a profile review tool 816, and an administrator interface 818. Further, the advice engine 804 may include an advice type classifier model 812 and a rules-based engine 814. In some embodiments, FIG. 8 may include one or more components that are the same or similar to one or more other components of the present disclosure. For example, advice manager 802 may be the same or similar to advice manager 314. Further, one or more components of FIG. 8, or aspects thereof, may be incorporated into, or excluded from, various embodiments of the present disclosure without departing from the scope of this disclosure. For example, feedback data miner 810 may be excluded from advice manager 802 without departing from the scope of this disclosure. FIG. 24 illustrates an exemplary process flow 2402 for providing advice content to user devices.

The advice manager 802 may provide advice content for users. For example, advice engine 804 may utilize one or more machine learning models (e.g., via advice type classifier model 812) and/or one or more rules-based algorithms (e.g., via rules-based engine 814) to provide relevant and useful advice to users. In many embodiments, the advice type classifier model 812 may be utilized to select an advice type and the rules-based engine 814 may be utilized to select the message under the advice type. Further, the advice may be based on user data (e.g., user profile 504) as well as contextual information (e.g., via feedback data miner 810 and/or feedback manager 1002). In many embodiments, the advice content may be tailored to maximize the impact of user resources, such as based on market projections, estimated income, etcetera.

The advice manager 802 includes training data manager 806 and model trainer 808 for generating training data and training the ML models, respectively. In many embodiments, advice content may include one or more benefits of the advice and one or more actions to obtain the benefits of the advice. Thus, the advice manager 802 can provide ways for users to act on the advice provided. For example, instead of simply recommending a user make more money, the advice manager 802 may provide one or more ways for the user to make more money. Further, the ways for the user to make more money may be based, at least in part, on their user profile. For instance, if the user values protecting the environment, the advice manager 802 may suggest working at a non-profit environmental sustainability company.

In some embodiments, advice manager 802 may generate advice content targeted to a user and/or advice content targeted to an advisor for the user. For example, advice regarding major changes may be sent to an advisor for communication to the user. In another example, advice content for the advisor regarding the client may be provided to advisors and/or team members, such as based on a specialty, experience level, or education of the advisor in view of the current situation of the user. In various embodiments, advice may be provided episodically and/or on demand.

In various embodiments, advice content may comprise, or refer to, messages. Each message may include an advice type that is used to group similar messages under a single type that can be utilized for prioritization. An exemplary advice type may include talking to family members about money matters. Exemplary messages under this advice type may include: (i) check out this podcast on talking to family about money; (ii) read this white paper on how to talk to family about money; and (iii) check out thirty-one reasons to talk to family about money. In one embodiment, between 100 and 1000 messages may be organized into 100 to 200 advice types.

Advice type classifier model 812 may utilize a model (e.g., machine learning model) to prioritize different advice types. For example, the model may help to prioritize messages that are presented to a user by using user profile 504 as input to rank advice types in terms of expected utility for the user. In many embodiments, the current information regarding the user may be continuously updated and revised, such as by profile manager 502.

The messages (e.g., advice content and/or insights) that a user sees may be prioritized in two stages. In the first stage the advice type classifier model 812 executes the model, which assigns a value to each advice type. The value can then be used to sort the advice types in order of priority. In the second stage, the rules-based engine 814 executes rules to determine which exact message is displayed. The rules can include rules used to determine message eligibility, break ties within an advice type, and filter messages that may only apply in a certain context. In many embodiments, the staged approach may reduce the frequency of model training as well as provide additional control points for personalizing the messages, such as altering based on time of year (e.g., season, holidays, important events, etc.). This may result, at least in part, from the ability to maintain consistent advice types while still having the ability to change the messages within the advice type and how those messages are selected without needing to retrain the model.

In various embodiments, rules may be added, removed, or edited via the administrator interface 818. Additionally, or alternatively, messages may be added, removed, or edited for different advice types via the administrator interface 818. The rules-based engine 814 will be discussed in more detail after the discussion of the advice type classifier model 812 below.

As previously mentioned, in many embodiments, the advice type classifier model 812 may comprise a machine learning (ML) model. In many such embodiments, the advice type classifier model 812 may be trained by model trainer 808 based on training data generated by model trainer 808 through the use of subject matter experts. The main objective of the model may be to prioritize the advice types that a user sees. The model may be developed using data collected from SMEs in the relevant fields (e.g., financial planning, life planning, life coaching, etcetera). The SMEs may be shown client profiles and asked to choose which advice type is more valuable to the customer between two different advice types. In this way, the model can provide an expected outcome over many SME reviews, thereby optimizing the human resources needed to accomplish the messaging task. Accordingly, the model is trained to replicate consensus suggestions among SMEs.

In various embodiments, the general theory for the model is that a user will receive some amount of unobservable utility from receiving the messages. The utility is known to an SME that is trained in and routinely performs planning services. The model is developed to provide the expected utility for a category of message (e.g., advice type) for a specific user if presented to a group of SMEs. Accordingly, the model provides a consensus utility across a group of SMEs. The utility value is inferred based on the choices the SMEs make between available messages. The model is then used to rank the types of messages that a customer may receive via the PAE system 102 and only provide valuable (i.e., high utility) messages for each user.

The model development process may be conducted by one or more of the training data manager 806, model trainer 808, and/or profile review tool 816. A general overview of the model development process may include (1) processes used to produce user profiles, (2) processes used to sample profiles and choices for SME reviews, (3) processes used for collecting expert reviews, and (4) processes used for model estimation and analysis. The results of these processes may be utilized to update various model parameters, such as for another iteration. An exemplary outline of model development with four stages is now provided. In the first stage, the necessary data (e.g., account information) may be organized into profiles (e.g., by profile manager 502). This includes sourcing of data that may be used as an independent variable in the model. In the second stage, the profiles may be samples and the choices made by the SMEs may be appended to the data (e.g., as metadata or a log file). In several embodiments, the choices are framed as a discrete choice between two different pieces of content. For example, the SME may be able to choose between advice type A, advice type B, or neither (see e.g., FIG. 23D). The output from this stage includes the data to present to the SMEs in profile review tool 816 for the SMEs to make choices. In some embodiments, the profile review tool may be separate from the advice manager 802. In one embodiment, the profile review tool may comprise a static web page.

In the third stage, SMEs may make recommendations through the profile review tool 816. This stage includes processes and controls in place to ensure that the data is correctly loaded and that the experts are engaged in the process. The output from this stage is the dependent variables to be modeled. In the fourth stage, the SME recommendations and the user profiles are used to estimate the model. The output from this stage is estimated model parameters. The four stages may then be repeated iteratively until the information gained is negligible. In each iteration, the model is improved, and the improved model is used to enhance the sampling approach in the second stage. If necessary, additional data may be acquired in the first stage.

Numerous tests and evaluations may be performed to ensure the model operates as expected. For instance, the model may be continually compared to SMEs to ensure the model is at least as consistent as the SMEs. The model may be evaluated to ensure that the error term is not dominating, which would be indicative of the model performing no better than random chance. User feedback may be evaluated to determine the effectiveness of the messaging. For example, users should dismiss less than 50% of messages. Further, SMEs may be evaluated for inter-rater and intra-rater reliability. For example, SMEs should agree at least 60% of the time. However, it is expected that inter-rater reliability will be much lower when the expected utilities of available choices are similar. Accordingly, expected utilities may be taken into account when determining inter-rater reliability, such as by being used to adjust the threshold percentage of agreement. In various embodiments, the specification for the utilities for individual advice types are separable. For example, although jointly estimated, the models for utilities can include a plurality of separate models, one to estimate the utility a user will receive from each, or subsets, of the various advice types.

In various embodiments, SMEs may routinely be asked to review profiles and provide recommendations to confirm model performance and support model monitoring. Each time this happens, it is possible that the estimated parameters change in a manner that improves the model. If the model improves substantially, the model may be updated to reflect the new parameters. In many embodiments, model improvement may be limited by the degree of agreement between SMEs. Accordingly, improvements to the model may coincide with improvements to inter-rater reliability. Accordingly, training data manager 806 and/or profile review tool 816 may provide instructions and educational resources for SMEs to better understand advice types. Improved understanding could come through explicit training on the exact content in the advice types, indirect exposure to information on the advice types through participating in the review process, or changes in composition of SMEs over time.

In many embodiments, the profile review tool 816 includes a GUI for SMEs to review profiles and/or provide input regarding the profiles reviewed (see e.g., FIGS. 23A-23F). In many such embodiments, the profile review tools may include features, such as advice, insights, and content, to assist SMEs in understanding advice types. In some embodiments, SMEs may provide recommendations based on synthetic data, such as simulated profiles, or real data. Accordingly, in various embodiments, training data manager 806 may generate simulated profiles, or portions thereof, such as based on statistical analysis of real data. For example, simulated profiles may be utilized until sufficient real data is collected to use real profiles (e.g., user profiles 504). In many embodiments, the target data for model development may be the profiles.

For model development, the data falls into two general categories. First is data that is currently accessible and second is data that will be accessible once collected as part of the PAE experience. Data in the first category is sourced from databases for a sample of clients. Data from the second category is simulated using a best-efforts approach. Note that even if the simulated data is not sampled using the true distribution that is ultimately observed in production, this is not a major concern. The principal concern would be that the sampling procedure introduced some systemic bias in the population used for model development.

A description of an exemplary model that may be utilized by one or more embodiments described hereby follows. A user, i, will receive utility, $u_{ij}$, from advice type, j. There is a set of $I_i$ advice types that are available to user i. As shown in Equation (1) below, this utility can be written as a simple function of user features $X_i$, product-specific parameters, $\beta_j$, and an error term, $\in_{ij}$.

$$u_{ij} = X_i \beta_j + \in_{ij} \quad \text{Equation (1)}$$

In Equation (1), the $\beta_j$ represents the vector of parameters to be estimated, one for each feature in $X_i$. As shown in Equation (2) below, the expected utility a user i will received from product j is $\bar{u}_{ij}$.

$$\bar{u}_{ij} = X_i \beta_j \quad \text{Equation (2)}$$

The vector of utilities can be written as $\bar{u}_i = X_i B$ for user i. This characterizes the final form of the model—it takes the known data about the user as characterized by v and translates it into the advice type utilities that can be used for ordering content shared with them.

Assuming that $\in_{ij}$ follows a type-1 extreme value distribution, then we can write the probability of choice j as shown in Equation (3) below.

$$pr(u_{ij} > u_{ij'} \forall j' \in J) = \frac{e^{\bar{u}_{ij}}}{\sum_{j' \in J} e^{\bar{u}_{ij'}}} \quad \text{Equation (3)}$$

In this model, the utility the user receives is determined by an expert panel (i.e., SMEs). This is the multinomial logistic regression model. The utility that a user actually receives cannot be known until after the user reviews the content, such as based on feedback, and it will not likely be measurable. However, the SMEs are in a good position to select content to share based on what they expect to deliver the most value to the user. Further, because users typically suffer from numerous biases when concerned with their finances, relying on expert opinion is justified. Given this, the error term, $\in$, can be interpreted as error in judgement coming from the SME's recommendation for a specific content item for a specific user.

In general, we can estimate our model by maximizing the likelihood we observe K choices given parameters $\beta$, as shown in Equation (4) below.

$$\underset{\beta}{\operatorname{argmax}} \prod_k^K pr(u_{ij} > u_{ij'} \forall j' \in J_i) \quad \text{Equation (4)}$$

Each time the probability is calculated, care must be taken to only consider the choice set available, J. This could be one choice out of every possible item of content. It could also be a choice from among a subset of possible content (e.g., out of only two or three items). For instance, if we have a binary choice between a and b, we can write the probability as shown below in Equation (5).

$$pr(u_{ia} > u_{ib}) = \frac{e^{X_i \beta_a}}{e^{X_i \beta_a} + e^{X_i \beta_b}} \quad \text{Equation (5)}$$

There is also the possibility that the choice is from among three options: a, b, or neither. In Equation (6) below, we set neither as the 'outside option' and normalize its utility to 0.

$$pr(u_{ia} > u_{ib} \text{ and } u_{ia} > 0) = \frac{e^{X_i \beta_a}}{1 + e^{X_i \beta_a} + e^{X_i \beta_b}} \quad \text{Equation (6)}$$

In general, we can include the 'outside option' by excluding it from the set J and writing the probability as shown in Equation (7) below.

$$pr(u_{ij} > u_{ij'} \forall j' \in J \cup o) = \frac{e^{X_i \beta_j}}{\sum_{j' \in J} e^{X_i \beta_{j'}}} \quad \text{Equation (7)}$$

Because there are so many items of content to select between, picking one item from among all items is typically too hard for experts. However, sampling only a few items makes their task more obtainable and consistent.

One criticism of the multinomial logistic regression model is the independence of irrelevant alternatives (IIA) assumption. This assumption requires that an additional choice added to the set will decrease the probability of all other choices by an equal fraction. However, this assumption often does not hold, especially when some choices are substitutes for each other. For instance, consider a consumer is choosing between three cars: a sports car, a truck, and a hybrid sedan. In this case, if a fourth choice is added as another hybrid, it is not expected that the probability of choosing the sports car or truck would change because the hybrid really is not similar to them. However, it would be expected that the probability of choosing the original hybrid option to decrease substantially since it is very similar to the new option. This would violate the IIA assumption.

With regard to the advice and insights disclosed hereby, the IIA assumption is not particularly critical. Firstly, although the model is a multinomial logit, only the ranking matters not the probability of a choice. Second, the user is not facing a discrete choice problem—they are allowed to consume all of the messages presented to them. Unlike the car case, they do not need to choose exclusively. Further, the SMEs providing the recommendations only provide binary choices. Therefore, the probability of their choices won't be impacted by alternatives in the same way that the traditional multinomial choice problem would be.

The described approach is similar to a ranked choice model. In a ranked choice model, after the first choice is made, the probability function is modified to only include choices that remain in the choice set. Some embodiments may include a rank-ordered multinomial logit model or an ordered multinomial model.

An alternative modeling approach for estimating either the utility or the probability of a give choice is shown in Equation (8) below.

$$pr(u_{ij} > u_{ij'} \forall j' \in J) = f(X_i) \quad \text{Equation (8)}$$

In many embodiments, input controls for the model may be utilized. Input control may include a form of preventative control designed to ensure the reliability of data outputs when the function of the model is operating as intended.

Input controls may be used to address the risks of incomplete and inaccurate source data. Examples of input controls utilized in embodiments described hereby may include one or more of the following. Data configuration controls to ensure that inputs conform to relevant standards or are within acceptable parameters. Data quality reports or conditional formatting to highlight non-conforming inputs. Reconciliation of input data back to source (and general ledger, where applicable).

In several embodiments, data processing controls for the model may be utilized. Data processing controls may include validations for ensuring that the model logic, which converts data inputs into data outputs, is properly developed for its intended purpose. Data processing control may involve using routines to thoroughly assess model risks in order to confirm model appropriateness and capability, effectively challenge model development, and communicate decisions regarding model use. Data processing controls typically address the risk of a model not performing as intended. Examples of data processing controls utilized in embodiments described hereby may include one or more of the following. Back-testing may be used to test historical data in order to measure accuracy. Parallel testing may perform validation in two independent controlled environments to confirm the processes will lead to the same result.

In various embodiments, output controls for the model may be utilized. Output controls are a form of detective controls designed to identify anomalies or errors in models. This control typically addresses the risk of inaccurate formulas or calculations, the risk of the model not being used for its intended purpose, and incomplete and inaccurate output data which may be caused by incomplete or inaccurate source data. Examples of output controls utilized in embodiments described hereby may include one or more of the following. Monitoring model performance with ongoing tracking, documentation, and evaluation of model performance. Reasonableness reviews of the data outputs by a competent individual (e.g., an SME). In some embodiments, the profile review tool 816 may include functionality for SMEs to review the reasonableness of the outputs (e.g., ranked list of advice types). Variance analytics may be used to compare the current output to historical output. Further, variances outside of expected error ranges may be analyzed and root causes for the variances identified. Comparing previous outputs to current actual data. Benchmarking against acceptable alternative models/approaches. User feedback regarding advice content, such as clicks, dismissals, etcetera. It will be appreciated that reference to a user interaction with a GUI, such as clicking, tapping, selecting, etcetera, should not be interpreted as limiting the type of GUI interaction. For example, reference to clicking on an item may include any type of user input that selects the item without departing from the scope of this disclosure. Similarly, swiping may include clicking and dragging.

As previously mentioned, a general overview of the model development process may include (1) processes used to produce user profiles, (2) processes used to sample profiles and choices for SME reviews, (3) processes used for collecting SME reviews, and (4) processes used for model estimation and analysis. Each of these processes will be described in more detail below.

The process flow for generating profiles to be used in model development will now be described in more detail. Generally, the model profile data process flow includes pulling available data from various databases to get raw data, simulating missing data based on available data to get augmented raw data, and generating a set of user profiles for use in model development. In various embodiments, one or more of the raw data, the augmented raw data, and the set of user profiles may be stored as user profile data. Typically, some data is not available as of the time of model development. However, since the dependent variable is created by experts reviewing data, reasonable values for missing data can be simulated and presented to the SMEs (or experts) as if it was sampled from a database. In some embodiments, missing values may be set to the mean value and/or supplemented by an additional independent variable with a value of one when the primary variable in question is missing and 0 otherwise. In various embodiments, one or more missing values may be inferred from observed data. For example, life events or family member may be inferred from observed data. To generate the set of user profiles for model development, once all data is available, it is organized into user profiles.

In many embodiments, the target data for model development includes the user profiles. In several embodiments, one or more portions of the profiles may be generated and/or maintained by profile manager 502 as one or more user profiles 504 (or portions thereof). In some embodiments, data may be added or removed from the user profiles 504 prior to being used in model development. In one embodiment, the profiles used for model development include client data, internal account data, external account data, people data, life event data, goals data, and markets data. The client data may include basic client data including age, occupation, credit score, income, and the like. For initial model development, client data may primarily include a mix of real and simulated data. The internal account data may include account level data for accounts that are either in brokerage or shadowed in brokerage from a financial institution. These accounts are linked back to the user. For initial model development, the internal account data may primarily include real data. External account data may include external account data that is available or otherwise identified by the user. For initial model development, external account data may primarily include real data. People data may include people identified as being part of the household of the user. For initial model development, people data may primarily include simulated data. Life event data may include events identified as being important in the life of the user. For initial model development, life event data may primarily include simulated data. Market data may include basic financial information such as market returns, interest rates, and the like.

The process flow to sample profiles and choices for SME reviews will now be described in more detail. An exemplary GUI for SME reviews is provided and described with respect to FIGS. 23A-23F. Generally, the set of user profiles for use in model development is utilized to create model inputs and produce a model input file. The model input file may be stored as user profile data. The model parameters and the model input file may be utilized to sample profiles and create choice sets. Profiles may then be assigned to SMEs. The final product of this process is the subset-set of profiles, choices, and SME assignments. These may be stored as user profile data (e.g., as a dashboard file). The subset-set of profiles, choices, and SME assignments may be presented via the profile review tool 816. The model is estimated on a subset of available data so that data is withheld for evaluating performance. This can be done by randomly assigning profiles to training and testing datasets.

More specifically, from among the available profiles, profiles are sampled for review with the SMEs. For sampling profiles, sampling a diverse set of profiles may be prioritized. That is, n profiles may be sampled such that the variance observed among each of the attributes is maximized. To do this, candidate profiles may be put into c groups using clustering (k-means, for instance) and n/c profiles may be sampled from each cluster. Profiles can be clustered based on the utilities estimated from the candidate model that is used for sampling the choice sets. This can ensure diversity in the choices presented and will also change the sampling approach as the model is improved. The model data used to estimate the utilities may be created in the model profile data process flow.

Alternatively, profiles may be clustered using the k attributes directly. However, one drawback may be that the sampling won't change as the SME's recommendation process is learned about. Another drawback may be that the different groups may have different utilities for different content—that is, several clusters may actually have very similar utilities for certain content.

Note that while unsupervised clustering may be regarded as a machine learning technique that, in general, as adding complexity to the model, in this scenario it is only used to help with sampling, and it is not used directly in the model specification or model estimation. As such, its use does not add much complexity to the model or present any adverse effects on estimation.

The clustering approach was not observed as having a meaningful impact on estimation. It is possible to recover the real parameters in simulated data without using any clustering as well as with a high number of clusters. It is also possible to recover the real parameters regardless of how the data is resampled (even if the original distribution of data is not preserved).

The process flow for collecting SME reviews will now be described in more detail. Generally, the sampled profiles may be posted to the profile review tool and experts may provide their input to be used as the dependent variable in the model. The dependent variable in the discrete choice setting is the choice that was made by the expert. This is presumed to be made based on a latent utility. In the profile review tool 816, this is represented as the triplet of choice a, choice b, and recommendation. The recommendation is either choice a, choice b, or neither. The independent variables in the model are derived from the profile that the experts see when they provide their reviews. The utilities are linear functions of the independent variables. The utilities are used as the output to rank order different advice types.

The subset-set of profiles, choices, and SME assignments may be loaded (e.g., from a dashboard file in user profile data) to lists, such as for each SME. The SME may then us the profile review tool to provide the assigned reviews. The expert response may then be saved, such as in the user profile data as an expert advice file. In various embodiments, this process may be performed in one or more phases. The final product of this process is the collection of the dependent variable to be used in model estimation.

More specifically, given a user profile, a task for the SME panel that will be used for model estimation needs to be generated. In the case of the models disclosed hereby, particularly related to content, there may be a very large number of choices. To make it easier for the SMEs to make choices, SMEs are provided with a choice between a pair of options. In each case, the expert can choose choice a, choice b, or neither (the outside option, a).

$$p_{i[ab]} = pr(u_{ia} > u_{ib} \text{ and } u_{ia} > 0) = \frac{e_j^{u_{ia}}}{1 + e_j^{u_{ia}} + e_j^{u_{ib}}} \quad \text{Equation (9)}$$

A challenge remains to decide which choices to present to the SMEs in order to efficiently learn the parameters, $\beta$. To do this, the change in probability from a change in some value, c, used in the calculation of the expected utility for product a is considered. Note this could be a change in a customer attribute, $x_{ik}$, or a change in a parameter, $\beta_{jk}$.

$$\frac{\partial p_{i[ab]}}{\partial c_a} = p_{i[ab]}(1 - p_{i[ab]})\frac{\partial \overline{u}_{ia}}{\partial c_a} \quad \text{Equation (10)}$$

For instance, consider a change with respect to a parameter, $\beta_{ak}$.

$$\frac{\partial p_{i[ab]}}{\partial \beta_{ak}} = p_{i[ab]}(1 - p_{i[ab]})x_{ik} \quad \text{Equation (11)}$$

Note that observations where the derivative is large will have a larger impact on estimation because the joint probability is being maximized. Although this may be hard at a 'feature' level, there is a common element regardless of what parameter the derivative is taken with: $p_{i\{ab\}}(1-p_{i\{ab\}})$.

One approach is to select content for the choice set, {a, b, o}, such that $p_{i\{ab\}}(1-p_{i\{ab\}})$ is large. This could be done by sampling {a, b}. If J is a large set, then there will be many possible combinations of a and b, requiring many calculations of $p_{i\{ab\}}$. They are randomly sampled according to a weighting based on the common component of the derivative across parameters. Because the probability of choosing a out of {a, b, o}, $p_{i\{ab\}}$ and the probability of choosing b out of the same set $p_{i\{ab\}}$ is important, the weighting we use takes the form of Equation (12) shown below.

$$w_{i\{ab\}} = \frac{[p_{i\{ab\}}(1 - p_{i\{ab\}})p_{i\{ba\}}(1 - p_{i\{ba\}})]^\alpha}{\sum_{xy'}[p_{i\{xy\}}(1 - p_{i\{xy\}})p_{i\{yx\}}(1 - p_{i\{yx\}})]^\alpha} \quad \text{Equation (12)}$$

Here, the tuning parameter, $\alpha$, can increase the focus on high values of the major component of the weighting formula: $p_{i\{ab\}}(1-p_{i\{ab\}})p_{i\{ab\}}(1-p_{i\{ab\}})$. In various embodiments, $\alpha$ is determined based on experiments using simulated data.

One challenge is how to estimate $\overline{u}^0{}_{ia} = X_i\beta_a{}^0$ before having any data. Simple business rules may be applied to build a set of priors on certain parameters to enable starting out with efficient sampling. Note that even with fairly strong priors, even unlikely choices will be sampled on occasion since the probabilities will be greater than 0. However, this may not be the case if the priors are sizeable enough. In some cases, restrictions may be placed on the parameters in order to encode certain business rules. For instance, if a certain topic should not be presented to a user unless they have a certain account type, then a large negative coefficient can be fixed on the indicator that they don't have this account currently. Also note that with initial parameters all set to 0, convergence still occurs.

The model parameters that are set to a non-zero level are done based on review of the advice types and associated messages, and the prioritization logic suggested by the SMEs. The initial values for parameters are not sizeable and there is no evidence they were important; However, this is done in part to ensure consistency across phases (parameters could have been set to 0). Further, the choice of $\alpha$ was not observed as having a meaningful impact on estimation. It is possible to recover the real parameters in simulated data without using any weighting adjustment on the choices presented to the experts. As previously described, to collect recommendations from the SMEs, client profiles may be reviewed through the profile review tool 816 (e.g., a static web page).

One consideration is the consistency between SMEs. Some disagreement among SMEs is expected and considered reasonable given the model specification—that is, the error term is specified in the model. However, if experts are in severe disagreement, then it may be hard to justify that experts are capable of performing the required task of making recommendations. SMEs are selected such that they perform some manner of planning related duties as part of their job function. To enable the measurement of inter-rater reliability, profiles are reviewed multiple times across experts through the profile review tool 816. This enables the comparison of recommendations across experts, across profiles, and across choices.

The primary approach to measuring inter-rater reliability can be defined as follows. Let $c_{i\langle ab\rangle k}$ be the choice of advice type out of the set of possible advice types {a, b, Ø} for profile i by expert k. If profile $i$ and choice <ab> is also reviewed by expert k', then $c_{i\langle ab\rangle k'}$ will also exist. A metric m is defined in Equation (13) below.

$$m_{i\langle ab\rangle\langle k,k'\rangle} = \begin{cases} 1 & \text{if } c_{i\langle ab\rangle k} = c_{i\langle ab\rangle k'} \\ 0 & \text{otherwise} \end{cases} \quad \text{Equation (13)}$$

Using this, if expert l shares $n_l$ reviews with other experts, then that expert's consistency with other experts is measured as shown in Equation (14) below.

$$\overline{m}_l = \frac{1}{n_l}\sum_{k=l} m_{i\langle ab\rangle\langle k,k'\rangle} \quad \text{Equation (14)}$$

Using the same approach, consistency for a given profile or a given advice type can also be measured. SMEs can be averaged over to improve estimates of which consistency at the advice type level to gain insight into which advice types are most challenging.

Based on the results from this, certain SMEs may be excluded based on the level of consistency with other SMEs. Note that since the choice set contains three elements, if l makes choices randomly, then $$\overline{m}_l = \frac{1}{3}$$

is expected. Moreover, if a sufficiently large $\overline{m}_l$ is seen, then the random choice behavior can be rejected. At a minimum, if it cannot be confirmed that l is not making random choices, then they can be excluded from the model. This does not rule-out the possibility that l is performing poorly relative to the other experts, but it does provide a hard condition for removal. Using the normal approximation to the binomial distribution, $\overline{m}_l > \alpha$ where $\alpha$ is based on N(np, np(1−p)) indicates that l is not making random choices. Other exclusions may be made based on substantial under-performance on a more ad-hoc manner depending on if specific experts seem to have unusual performance.

One important caveat to this is that choices are being sampled more frequently when there is evidence that the expected utilities are very similar. Because the expected utilities as similar, the choice is expected to become something of a coin flip—that is, it is driven by the error term. This is done, as previously stated, because sampling observations near to the decision boundary enables the model to better refine estimates. However, this also may reduce interrater reliability and reduce the upper-bound on model performance. This is not a problem for the model since it only strives to be as good as the experts. However, it is a potential problem for since performance may be pushed toward random, increasing the risk that the expert's performance will suggest they need to be excluded.

Area under the curve (AUC) can be used to evaluate the rater's reliability while taking into account differences in the probability of a given choice. In this case, the choice 'A' is set to the positive class and all SME recommendations are a binary choice. Then, the probability of making choice 'A' based on the model is used to calculate an expert level AUC. This is done with the expert's recommendations in the training data and with each expert's recommendations individually held out (that is, the model is re-estimated multiple times, once for each expert).

A potential approach to measuring reliability without concerns for how the choices are sampled is to normalize the result by how likely the observation is. Consider the following situation: expert k must choose an item from the set {a, b, Ø} for profile i. In this case, $c_{i\langle ab\rangle k}$=a would occur with probability p(a|i,<a, b>)=pr($u_{ia}$>$u_{ib}$ and $u_{ia}$>0), $c_{i\langle ab\rangle k}$=b would occur with probability p(a|i,<a, b>) and $c_{i\langle ab\rangle k}$=Ø would occur with probability p(Ø|i,<a, b>). Note that if p(a|i,<a,b>)=p(b|i,<a, b>)=p(Ø|i,<a, b>), then it is expected that experts perform at random chance—the expected utilities are equivalent, so the choice is really driven only by the error.

An alternative metric that takes the relative probability of choices into effect is defined as shown in Equation (15) below.

$$s_{ia<ab>k} = \frac{\overline{p}(c_{i\langle ab\rangle k}|i,\langle a,b\rangle)}{\max_j \overline{p}(j|i,\langle a,b\rangle)} \quad \text{Equation (15)}$$

This is the probability of SME's choice, under the model, divided by the largest probability among all possible choices. If all choices are equally likely, then any choice the expert makes will result in $s_{ia<ab>k}$=1. If one choice has a probability close to 1, and the expert makes that choice, then they will receive $s_{ia<ab>k}$ close to 0. Any time the expert chooses the option with the highest model probability, then $s_{ia<ab>k}$=1. However, $s_{ia<ab>k}$ will be greater than 0, even for a wrong choice, and will be higher as the model is less certain which choice will be made.

Following a similar procedure to before, we can aggregate to the expert level as shown in Equation (16) below.

$$\overline{s}_l = \frac{1}{n_l}\sum_{k=l} s_{ia\langle ab\rangle k} \quad \text{Equation (16)}$$

Note that this metric does not require joint reviews to occur. It is based on the model probabilities as a point of comparison, not other experts, so it is possible to use all data to calculate. This metric is useful for spotting outliers among the experts for further qualitative investigation.

The process flow used for model estimation and analysis will now be described in more detail. User profile data (e.g., dashboard file and expert advice file) may be utilized for model data preparation and production of a combined data file. The combined data file may be stored as user profile data. Next, model exploratory data analysis may be performed on the combined data file. Model estimation is then performed based on the results of the model exploratory data analysis and the combined data file. Model estimation may produce model parameters. In various embodiments, the number of model parameters will be at least as large as the number of advice types. Further, the output of the model estimation, the combined data file, and the model parameters may be used for determining inter-rater reliability. Model estimation may be reperformed if one or more SMEs need to be excluded based on the inter-rater reliability determinations. Aspects of model data preparation, exploratory analysis, and inter-rate reliability were previously discussed above, such as with regard to sampling, missing values, user profile data, choice selection, expert reliability, etcetera.

In many embodiments, model estimation relies on three processes to arrive at the final model characterization. First, there is the procedure to fit a given model to the data. This typically relies on a maximum likelihood procedure. Second, there is variable selection considered based on expert suggestions on which variables are important. Third, the model is estimated with a L1-penalty which induces sparsity and provides evidence about which variables are important. Based on the second and third processes, the model developers will state a final characterization which is generally the union of the set of variables selected by subject matter experts and the regularized model. Once variable selection is completed, the model is estimated without the penalty term. These processes are described in more detail below with respect to model estimation, regularization, and final variable selection.

In many embodiments, model estimation is based on the maximum likelihood procedure. The implementation for this can be in Python. Recall, the objective is to maximize the likelihood as in equation (4), and the probabilities can be estimated as in equation (6). To help make this explicit, let $a_i$ be the choice made from the set $\{a_i, b_i, \emptyset\}$, which is the choice set provided for observation i. Note that in some places i is considered to be a profile, but here we will take it to mean the observation comprised of a profile, choice set, and expert. We can write the likelihood for K observations succinctly as shown in Equation (17) below.

$$L = \prod_k^K \frac{e^{\bar{u}_{a_k}}}{1 + e^{\bar{u}_{a_k}} + e^{\bar{u}_{a_k}}} \qquad \text{Equation (17)}$$

The log of both sides can be taken to maximize the log likelihood, since the product of many small numbers will quickly go to 0 making maximization of the likelihood function hard.

$$ll = \prod_k^K \ln\left(\frac{e^{\bar{u}_{a_k}}}{1 + e^{\bar{u}_{a_k}} + e^{\bar{u}_{a_k}}}\right) \qquad \text{Equation (18)}$$

Recall that $\bar{u}_{a_i} = X_i \beta_{a_i}$. Given this, it is quite possible for large $x_i$ or large $\beta$ that $\bar{u}_{a_i}$ will become very large, leading to numerical issues when the exponentiation is done. To address this problem, the probability can be multiplied by 1 as shown in Equation (19) below.

$$\frac{e^{\bar{u}_{a_i}}}{1 + e^{\bar{u}_{a_i}} + e^{\bar{u}_{b_i}}} = \frac{e^{\bar{u}_{a_i}}}{1 + e^{\bar{u}_{a_i}} + e^{\bar{u}_{b_i}}} * \frac{e^{-z_i}}{e^{-z_i}} = \qquad \text{Equation (19)}$$

$$\frac{e^{\bar{u}_{a_i} - z_i}}{e^{-z_i} + e^{\bar{u}_{a_i} - z_i} + e^{\bar{u}_{b_i} - z_i}} = \frac{e^{\bar{u}^* a_i}}{e^{\bar{u}^* \phi_i} + e^{\bar{u}^* a_i} + e^{\bar{u}^* b_i}}$$

Doing this, allows the largest utility, to be set to 0 and the smaller utilities to be shifted down accordingly. That is, set $z_i = \max(\bar{u}_{a_i}, \bar{u}_{a_i}, 0)$. Since the exponential of a large negative value does not present the same numerical challenges (it is understood to be 0), this avoids any problems in the implementation. The adjusted likelihood is shown in Equation (20) below.

$$ll^* = \prod_k^K \ln\left(\frac{e^{\bar{u}^* a_k}}{e^{\bar{u}^* \phi_i} + e^{\bar{u}^* a_k} + e^{\bar{u}^* b_k}}\right) \qquad \text{Equation (20)}$$

The maximum likelihood problem is then written as shown in Equation (21) below.

$$\hat{\beta} = \text{argmax} \prod_k^K \ln\left(\frac{e^{\bar{u}^* a_k}}{e^{\bar{u}^* \phi_i} + e^{\bar{u}^* a_k} + e^{\bar{u}^* b_k}}\right) \qquad \text{Equation (21)}$$

In addition, note that the set of features with non-zero parameters could be different for each advice type, a. Since data collected from experts is limited and there are a large number of possible parameters, efficiency of the estimator is important. To make sure data is not wasted estimating parameters that are assumed to be 0, the constraint where $B_0$ is the set of parameters presumed to be 0 can also be added, as shown in Equation (22) below.

$$\beta_{ji} = 0 \forall \hat{\beta}_{ji} \in B_0 \qquad \text{Equation (22)}$$

Also, as a matter of efficient computation given the available solvers, the optimization problem can be written as a minimization problem. So, the estimation problem can be written as shown in Equation (23) below.

$$\hat{\beta} = \text{argmax} \prod_k^K -\ln\left(\frac{e^{\bar{u}^* a_k}}{e^{\bar{u}^* \phi_i} + e^{\bar{u}^* a_k} + e^{\bar{u}^* b_k}}\right) \qquad \text{Equation (23)}$$

$$\text{s.t. } \hat{\beta}_{ji} = 0 \ \forall \ \hat{\beta}_{ji} \in B_0$$

Given the number of parameters in the model, the need to include the regularization term and the need to include a larger number of restrictions, it was found that implementing the minimization procedure in a machine learning platform, such as TensorFlow, efficiently found the desired parameters. Convergence of parameters can also be demonstrated.

Referring to regularization, in general, one of the challenges estimating the model is that there is a very large number of possible parameters and a relatively small number of data points, especially in the early phases of expert reviews. When a model has a large number of parameters, many of which are believed to have a true value of 0, a penalty term can be introduced to the objective in the optimization problem. The L1 norm can be used because it is known to introduce sparsity—and empirically that is the case with this model. The new optimization problem is shown below in Equation (24).

$$\hat{\beta} = \operatorname{argmax} \prod_{k}^{K} \ln\left(\frac{e^{\overline{\pi}^* a_k}}{e^{\overline{\pi}^* \phi_i} + e^{\overline{\pi}^* a_k} + e^{\overline{\pi}^* b_k}}\right) - \lambda \sum_{c} \sum_{l} |\beta_{cl}| \qquad \text{Equation (24)}$$

The value for $\lambda$ may be selected based on a grid search. For each candidate value of $\lambda$, cross-validation is used to estimate model performance. The model with the best value of $\lambda$ is then selected for comparison with what subject matter experts propose.

In addition to $\lambda$, a cut-off is set for which parameters to eliminate form the model by setting to 0 (i.e., included in, $B_0$). That is, any $|\hat{B}_{jl}| < \xi$ can be set to 0 in the final model. This can be determined by grid search as well. For each candidate value of $\lambda$, various cutoffs, $\xi$, are used to estimate the model a second time without the regularization and instead implementing the restrictions implied. The performance of this restricted model (based on the results from the regularization) can then be used to determine the optimal hyper-parameters that define the model specification.

In various embodiment, the resulting optimal choices may be $\lambda = 0.0006$ and $\xi = 0.0012$. This approach can largely automate variable selection, which is especially helpful in large scale models. Second, this approach sets restrictions at the level of the advice type. That is, input data is not excluded from the overall model—rather, it is specific parameters that are restricted to 0. This allows the model to take in a super-set of inputs, but not waste data on estimating all parameters for each advice type.

Referring to final model estimation, in many embodiments, after the optimal hyper-parameters are chosen, the model is estimated on all data using the two-stage approach, where the first stage determines the restrictions and the second stage estimates the final parameters (no regularization) with the restrictions. This model is what is implemented in exemplary embodiments and for which performance is evaluated.

Alternatively, a machine learning model approach could be used (e.g., with a tree-based ensemble or a neural network) with both the user profile and the choice set as an input. In this strategy, the dependent variable is the chosen advice type. Note that in this case it is assumed that the model estimation procedure is able to efficiently learn the relationship between the choice set and the chosen element. However, safeguards against overfitting may be needed.

In-sample testing may be approached in several ways. First, the model performance can be reviewed in aggregate across all profiles and advice types. Second, the model performance can be reviewed within advice type. Third, the model performance can be reviewed based on differences in profiles. The model performance can also be reviewed by expert.

The overall performance of the model may be measured, primarily, based on the same strategy leveraged for measuring inter-rater reliability. That is, by measuring whether or not the model is consistent with experts. This is measured as in equation (14). As discussed previously, the model's performance is limited by the level of consistency among experts.

Although there is a benchmark for the model's performance (i.e., the inter-rater reliability level), the performance does not have an absolute interpretation. One way to address this is to calculate the AUC metric for the model. In order to calculate the overall AUC metric, the 'positive' class is anytime that the expert selects choice A, and the negative class is any other choice. The score is then the probability of choice A. This mixes together the model across the different advice types.

In addition to evaluating model performance across all jobs, model performance can be averaged over choice sets where each advice type is present. This may give an indication that the model is deficient for a specific advice type and suggest where additional sampling may be required or where the specification may be improved.

In addition to evaluating the overall model performance and the model performance on individual advice types, the model performance can be reviewed based on characteristics of the profiles being reviewed. For example, it is possible that certain types of user profiles will have lower performance and may warrant additional scrutiny. To accomplish this, the consistency between the model and the experts at the individual profile level may be initially determined. That is, for a certain profile i, where the model (k) makes a choice between the set {a, b, Ø}, the consistency with the set of experts that make the same choice (k') is calculated. The measure of consistency between experts and the model can be defined as shown in Equation (25) below.

$$m_{\cdot i} = \frac{1}{n_{\cdot i}} \sum m_{i(ab)(k,k')} \qquad \text{Equation (25)}$$

The question is then, are there any strong relationships between the profile and the degree of consistency. This can be done by estimating the very simple linear model shown in Equation (26) below.

$$\overline{m}_{\cdot i} = X_i \gamma + e_{\cdot i} \qquad \text{Equation (26)}$$

In this model, if any data in the user profile has a significant influence on the measure of consistency, as measured by the significance of $\gamma$, then it may warrant additional exploration. In particular, that data element may be either missing from the advice type utility specifications or it may be a data element that is leading to low inter-rater reliability and causing the model to struggle with estimation.

In various embodiments, one or more of the following operations may occur during operation of the PAE system. More specifically, one or more of the following operations may occur in utilizing the advice manager 802, such as to determine a relevant advice type with advice type classifier model 812.

Training data for a machine learning (ML) algorithm may be identified. For example, training data manager 806 may identify training data for the ML algorithm. The training data may include a plurality of samples that each include a user profile and one or more corresponding financial advice types from a set of financial advice types. Additionally, the user profile includes three or more of client data, account data, life event data, relationship data, and goal data. For example, the user profile may include user profile 504 with client data 510, account data 512, life event data 514, relationship data 516, and goal data 518. The one or more corresponding financial advice types may be recommended by at least one SME based on the user profile, such as via profile review tool 816. As discussed above, the training data, at least initially, may include simulated or synthetic data.

The ML algorithm may be trained with the training data to produce a trained ML algorithm that prioritizes types of financial advice for a user (e.g., client) based on a projected utility the user will receive from each of the types of financial advice (see e.g., Equations (1)-(8) and/or Equations (17)-(24) and corresponding descriptions). For example, the trained ML algorithm (or ML model) may comprise advice type classifier model 812 and be trained by model trainer 808 based on training data provided by training data manager 806. The projected utility may be based on SME opinion and be estimated as a function of a user profile of the user and an error term indicative of SME uncertainty or bias. For instance, the utility may be estimated as described with respect to Equations (1) and (2). In some embodiments, the error term may include a random error. In various embodiments, the error term may follow an extreme value distribution (see e.g., Equation (3)) and corresponding description. In various such embodiments, the extreme value distribution is of type-1. In several embodiments, the function for estimating the projected utility is a linear function.

A ranked list of the set of financial advice types may be produced with the trained ML algorithm for a respective user based on a respective user profile for the respective user. In some embodiments, the ranked list may be provided as input to rules-based engine 814. The ranked list may include a plurality of advice types ordered according to corresponding ML model scores generated by the advice type classifier model 812.

In some embodiments, the plurality of samples may include at least one sample including a user profile having life event data comprising a life event and a date corresponding to the life event. For example, user profile 504 may include life event data 514 that identifies a life event and a date corresponding to the life event. In some such examples, the life event may include a death of a family member, a graduation date, an employment date, a divorce date, and the like.

In various embodiments, the plurality of samples may include at least one sample including a user profile having relationship data comprising a familial relationship and an age of the familial relationship. For example, user profile 504 may include relationship data 516 that identifies a familial relationship and an age of the familial relationship. In some such examples, the familial relationship may include a child and a date of adoption or birth for the child, or the familial relationship may include a spouse and a date of marriage to the spouse.

In many embodiments, the plurality of samples may include at least one sample including a user profile having goal data comprising a goal, a start date of the goal, an end date of the goal, and at least one person the goal is shared with. For example, user profile 504 may include goal data 518 that includes a goal, a start date of the goal, an end date of the goal, and at least one person the goal is shared with. In some embodiments, the goal data 518 for a specific shared goal is determined based on the shared goal data object (e.g., shared goal data object 704) for that specific shared goal. For instance, the goal may be included in objectives data 716, the start date and the end date may be included in the time horizon data 720, and the at least one person the goal is shared with may be included in the user data 722. In various embodiments, the at least one person the goal is shared with is a beneficiary of the goal. In various such embodiments, the at least one person the goal is shared with is additionally, or alternatively, a contributor to the goal.

In various embodiments, one or more of the following operations may occur during operation of the PAE system. More specifically, one or more of the following operations may occur in utilizing the advice manager 802, such as to generate training data with training data manager 806 and/or profile review tool 816 to train the advice type classifier model 812 to generate ranked lists of relevant advice types.

A set of account information may be identified. For example, training data manager 806 may identify a set of account information. The set of account information may be analyzed to determine a proposed type of advice corresponding to the set of account information. In one embodiment, the proposed type of advice corresponding to the set of account information may be determined in a manner that efficiently learns one or more model parameters. For instance, the proposed type of advice corresponding to the set of account information may be determined as described with respect to the determination of choice sets above (see e.g., Equations (9)-(12)). In some embodiments, the set of account information comprises a user profile (e.g., user profile 504) comprising three or more of client data, account data, life event data, relationship data, and goal data. In various embodiments, at least a portion of a set of account information is simulated. For example, at least one of the client data, account data, life event data, relationship data, and goal data may be simulated.

The set of account information may be presented to a subject matter expert (SME) via a graphical user interface (GUI). The proposed type of advice corresponding to the set of account information may be presented to the SME via the GUI. For example, the set of account information and the proposed type of advice may be presented via the profile review tool 816. Input may be received, from the SME via the GUI, regarding appropriateness of the proposed type of advice with respect to the set of account information. For example, the input may be received via the profile review tool 816.

Training data for a ML model may be generated based on the input regarding the proposed type of advice, such as with training data manager 806. In various embodiments, the input regarding the proposed type of advice comprises acceptance or rejection of the proposed type of advice regarding appropriateness with respect to the set of account information. IN one embodiment, proposed type of advice for the client consists of a first proposed type of financial advice and a second proposed type of financial advice and the SME is enabled to provide input comprising a selection of either or neither of the first and second proposed types of financial advice, such as via the profile review tool 816.

The ML model may be trained, with the training data, to determine appropriate advice types based on an inputted set of account information (see e.g., Equations (1)-(8) and/or Equations (17)-(24) and corresponding descriptions). For example, advice type classifier model 812 may be generated by model trainer 808 based on training data produced by training data manager 806 in conjunction with profile review tool 816. In many embodiments, the ML model (e.g., advice type classifier model 812) may produce a ranked list of advice types as output. In many such embodiments, a type of advice to provide to a user device may be determined with the ML model.

In various embodiments, inputs provided by the SME may be monitored for a plurality of sets of account information. In various such embodiments, the inputs provided by the SME for the plurality of sets of account information may be analyzed to determine a reliability of the SME. For instance, the reliability may be determined as described with respect to Equations (13)-(16) and/or Equations (25) and (26). Further, in some embodiments, the reliability of the SME may be compared to a threshold reliability for SMEs.

SMEs with reliabilities falling below the threshold may be disqualified from providing input regarding proposed types of financial advice.

In various embodiments, inter-reliability and/or intra-reliability may be determined, such as with respect to a plurality of SME. One exemplary embodiment includes monitoring inputs and determining reliability for a first SME and a second SME, comparing the reliability of the first SME to the reliability of the second SME, and disqualifying the first SME from providing input regarding proposed types of financial advice based on comparison of the reliability of the first SME to the reliability of the second SME.

In various embodiments, one or more of the following operations may occur during operation of the PAE system. More specifically, one or more of the following operations may occur in utilizing the advice manager 802, such as to identify a message for a user with rules-based engine 814 based, at least in part, on the ranked list of relevant advice types produced by advice type classifier model 812. In many embodiments, rules-based engine 814 may apply prioritization and filtering logic to determine messages to be provided to a user.

A scored list (or ranked list) of advice types generated by a machine learning algorithm for a target user may be identified. For example, rules-based engine 814 may identify a scored list of advice types generated by advice type classifier model 812. The scored list of advice types may include a first advice type (FAT) with a first ML model score and a second advice type (SAT) with a second ML model score.

A set of potential messages may be created based on the scored list of advice types. The set of potential messages may include a first subset of two or more potential FAT messages associated with the first advice type and a second subset of one or more potential SAT messages associated with a second advice type. Each potential FAT message in the first subset may be associated with the first ML model score and each potential SAT message in the second subset may be associated with the second ML model score. It will be appreciated that advice, messages, and/or insights may take a variety of forms without departing from the scope of this disclosure. In some embodiments, each message may comprise a benefit included in advice content (e.g., benefit 1314 of advice content 1306*a*).

In various embodiments, the set of potential messages may comprise, or be included in, a two-dimensional array. In various such embodiments, the two-dimensional array may include a table with one or more of a message ID column, a message column, an advice type ID column, a model score column, and a tie-breaking column. In many embodiments, each message of the same advice type may have the same model score, but unique message IDs and messages. For example, a first message of a #142 advice type may comprise "consider the lifestyle changes that will occur as you transition to retirement" and a second message of the #142 advice type may comprise "consider living space and determine whether to downsize or relocate". The first message may have a model score of 6542, a message ID of 1, and a tie-breaking value of 1 while the second message may have a model score of 6542, a message ID of 2, and a tie-breaking value of 2. Further, a third message of a #143 advice type may comprise "understand Social Security and Medicare benefits" and a fourth message of the #143 advice type may comprise "understand the impact of divorce on your Social Security benefits". The third message may have a model score of 16354, a message ID of 3, and a tie-breaking value of 2 while the fourth message may have a model score of 16354, a message ID of 4, and a tie-breaking value of 1.

Account data regarding the target user may be identified. For example, account manager 402 may provide account data regarding the target user to rules-based engine 814. In another example, profile manager 502 may provide account data 512 regarding the target user to rules-based engine 814. In some embodiments, the account data comprises a user profile (e.g., user profile 504). A first potential message from the set of potential messages may be removed based on comparison of the account data with a set of hard conditions. Hard conditions may refer to rules that cause only the messages that satisfy the rule to be retained in the set of potential messages. In various embodiments, hard conditions may include minimums or maximums, required goals, required events, and the like. For example, hard conditions may include/exclude messages based one or more of no divorce life event, message already presented 'X' number of times, user does/doesn't have account type 'ABC'. In some embodiments, the hard conditions may be set via administrator interface 818.

A first potential FAT message in the first subset may be prioritized over a second potential FAT message in the first subset based on a set of tie-breaking rules. In one embodiment, prioritizing the first potential FAT message in the first subset over the second potential FAT message in the first subset based on the set of tie-breaking rules includes: (i) utilizing a pseudo random number generator to assign a first pseudo random number to the first potential FAT message and a second pseudo random number to the second potential FAT message; and (ii) comparing the first and second pseudo random numbers to prioritize the first potential FAT message over the second potential FAT message. In some embodiments, the tie-breaking rules may be set via administrator interface 818. In many embodiments, the tie-breaking rules may be utilized to generate values for the tie-breaking column. In some embodiments, prioritization of messages within each advice type may be provided. For example, the administrator interface 818 may be utilized to set the prioritization of messages within each advice type. The final order of the potential messages may be determined by removing all excluded messages, then sorting the remaining messages by the model score column and resolving any ties by the tie-breaking column.

Contextual data regarding the target user may be identified. For example, feedback manager 1002 and/or feedback data miner 810 may provide contextual data regarding the target user to rules-based engine 814. A first potential SAT message in the second subset may be removed from the set of potential messages based on the contextual data. IN some embodiments, the contextual data may include a current page of the target user and a focus of the current page of the target user. Further, the first potential SAT message in the second subset may be removed from the set of potential messages based on a focus of the first potential SAT message being irrelevant to the focus of the current page of the target user. For example, if the contextual data indicates the focus of the current page of the target user comprises purchasing a car, then the first potential SAT message may be removed because it focuses on obtaining a mortgage. Accordingly, each message may be associated with one or more contexts (e.g., goal creation GUI, primary user overview GUI, share goal detail GUI, task detail GUI, type of informational/education content being viewed, type of goal being created, type of task being edited, and the like). In some embodiments, the two-dimensional array of potential messages may include a column for context tags. In many embodiments, the context tags for each message may be set via administrator interface 818.

The second potential FAT message may be removed from the set of potential messages based on a set of exclusivity rules and prioritization of the first potential FAT message over the second potential FAT message. In one embodiment, the set of exclusivity rules may include only selecting a single potential FAT message for the one or more targeted messages. Exclusivity rules may be used to prevent multiple messages that are deemed to be too similar from being presented simultaneously. For example, only presenting one item from among advice types 132, 135, and 211 may comprise an exclusivity rule. In such examples, the message from the advice types 132, 135, and 211 that is presented may be determined based on the other prioritization and filtering logic of the rules-based engine 814. In many embodiments, the exclusivity rules may be set via the administrator interface 818.

The potential messages remaining in the set of potential messages may be prioritized based on association with the first ML model score or the second ML model score. In some embodiments, the potential messages remaining in the set of potential messages may also be prioritized based on the tie-breaking rules.

A threshold number of top ranked potential messages may be communicated to the target user as the set of one or more target messages. In some embodiments, communicating the threshold number of top ranked potential messages to the target user as the one or more targeted messages comprises presenting the threshold number of top ranked potential messages via a graphical user interface (e.g., primary user overview GUI 1300 of FIGS. 13A-13I). In many embodiments, the threshold number is set via the administrator interface 818.

In some embodiments, the account data regarding the target user may include an account value associated with the target user and the set of hard conditions may include a minimum account value for receipt of the first potential message. In some such embodiments, the first potential message may be removed from the set of potential messages based on the account value associated with the target user falling below the minimum account value for receipt of the first potential message.

In many embodiments, the account data regarding the target user includes a number of times the first potential message has been presented to the target user and the set of hard conditions may include a maximum number of times of presenting the first potential message to a user. In many such embodiments, the first potential message may be removed from the set of potential messages based on the number of times the first potential message has been presented to the target user exceeding the maximum number of times of presenting.

In various embodiments, the account data regarding the target user includes a set of account types of the target user and the set of hard conditions includes only presenting the first potential message to users without a first account type. In various such embodiments, the first potential message may be removed from the set of potential messages based on the set of account types of the target user including the first account type.

A new potential message may be created via an administrator graphical user interface, such as administrator interface 818. Further, the new potential message may be associated with the first advice type to create a new potential FAT message. A new tie-breaking rule in the set of tie-breaking rules may be created, such as via administrator interface 818. The new tie-breaking rule may prioritize the new potential FAT message over the first and second potential FAT messages based on a creation date of the new potential FAT message being more recent than creation dates of the first and second potential FAT messages.

Figure 9:
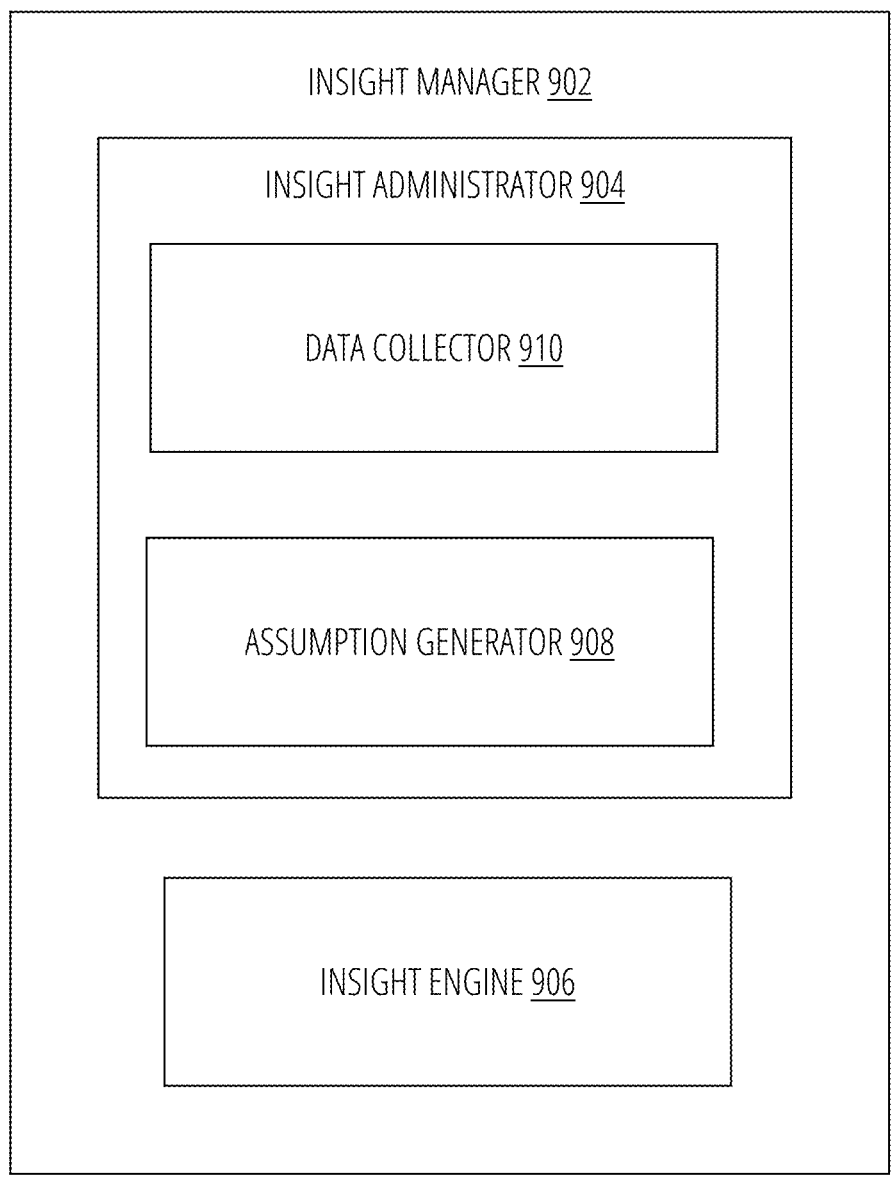
FIG. 9 illustrates an exemplary insight manager according to one or more embodiments of the current disclosure.

FIG. 9 illustrates an exemplary insight manager 902 according to one or more embodiments of the current disclosure. The insight manager 902 may provide useful insights to users. In the illustrated embodiment, insight manager 902 includes an insight administrator 904 and an insight engine 906. Further, the insight administrator 904 may include a data collector 910 and an assumption generator 908. In some embodiments, FIG. 9 may include one or more components that are the same or similar to one or more other components of the present disclosure. For example, insight manager 902 may be the same or similar to insight manager 316. Further, one or more components of FIG. 9, or aspects thereof, may be incorporated into, or excluded from, various embodiments of the present disclosure without departing from the scope of this disclosure. For example, assumption generator 908 may be excluded from insight administrator 904 without departing from the scope of this disclosure.

The insight manager 902 may provide insights to users. Insights, as compared to advice, may be more focused on probabilities and/or capabilities of a user. For instance, if a customer identifies purchasing a new home as a goal, the insight manager 902 may determine how much the customer is capable of affording to spend on a new home (see e.g., insight content 1620 of GUI view 1602*f* in goal creation GUI 1600). In many embodiments, the insight manager 902 may enable a user to see how the insight was determined and/or what assumptions the insight was based on (see e.g., insight content 1620 of GUI view 1602*f* in goal creation GUI 1600). The assumptions used by the insight manager 902 may be generated by assumption generator 908.

More generally, data collector 910 may collect the information available to generate an insight and assumption generator 908 may create any necessary information that is unavailable for generation of the insight. This data may then be passed to insight engine 906 for generation of the insight. In several embodiments, insight engine 906 may generate probabilities of success, such as for shared goals. In one embodiment, shared goal data object 704, or portions thereof, may be provided as input to insight engine 906, and, in response, insight engine 906 may generate a probability of success for the corresponding shared goal. For example, data collector 910 may obtain portions of the shared goal data object 704 to provide to the insight engine 906. In various embodiments, portions of one or more of a user account 404, user profile 504, shared goal data object 704, user activity dataset 1004, and user connection data 1104 may be used to generate insights, such as probabilities of success.

In various embodiments, assumption generator 908 may utilize various techniques to provide missing data. In some embodiments, assumption generator 908 may utilize statistical analysis and/or machine learning models to generate assumptions based on similar situations. For example, assumption generator 908 may simulate data for assumptions in a manner similar to that described hereby with respect to generating simulated data, such as simulated profile data.

Figure 10:
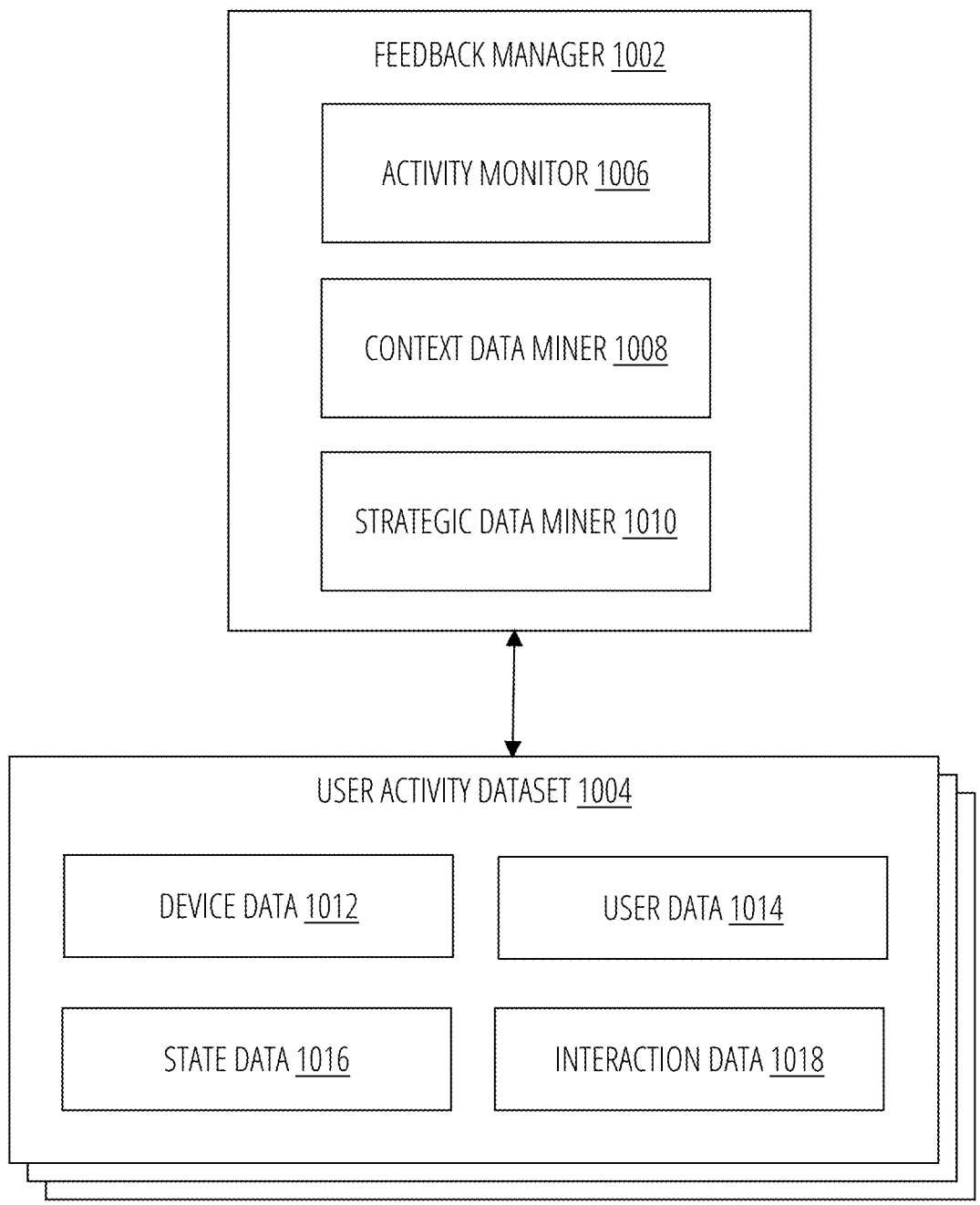
FIG. 10 illustrates an exemplary feedback manager in conjunction with a plurality of user activity datasets according to one or more embodiments of the current disclosure.

FIG. 10 illustrates an exemplary feedback manager 1002 in conjunction with a plurality of user activity datasets 1004 according to one or more embodiments of the current disclosure. The feedback manager 1002 may monitor activity of users to generate a user activity dataset 1004 for each user and harvest contextual or strategic data from the different user activity datasets 1004. In the illustrated embodiment, feedback manager 1002 includes an activity monitor 1006, a context data miner 1008, and a strategic data miner 1010. The activity monitor 1006 may monitor activity to identify one or more of device data 1012, user data 1014, state data 1016, and interaction data 1018 for users. The context data miner 1008 and strategic data miner 1010 may mine the data identified by the activity monitor 1006 to produce context data and strategic data, respectively, for users. In some embodiments, FIG. 10 may include one or more components that are the same or similar to one or more other components of the present disclosure. For example, feedback manager 1002 may be the same or similar to feedback manager 318. Further, one or more components of FIG. 10, or aspects thereof, may be incorporated into, or excluded from, various embodiments of the present disclosure without departing from the scope of this disclosure. For example, activity monitor 1006 may be integrated into device interface 304 or experience manager 322 without departing from the scope of this disclosure.

Generally, the feedback manager 1002 may operate to improve aspects of the PAE system based on information gleaned from interactions with the PAE system, such as based on feedback data 206. In various embodiments, feedback manager 1002 may produce and/or maintain a user activity dataset 1004 for each user. In many embodiments, this user activity dataset 1004 may be used, at least in part, to customize user PAE experiences, such as by using it to determine personalized advice. Feedback data 206 may include any data sent by the user device 204 to the PAE system 202 and feedback manager 1002 may utilize feedback data 206 to generate feedback data comprising the user activity dataset 1004. Accordingly, user activity dataset 1004 may include useful portions of feedback data 206 and conclusions drawn therefrom.

The activity monitor 1006 of feedback manager 1002 may monitor user and device activities and interactions with the PAE system, such as via feedback data 206. Additionally, the activity monitor 1006 may produce user activity dataset 1004 based on the activities and interactions. In such embodiments, context data miner 1008 may mine context data from the user activity dataset 1004 and strategic data miner 1010 may mine strategic data from the user activity dataset 1004. Further, the context and strategic data may be utilized to update data associated with the user (e.g., user account 404, user profile 504, and/or shared goal data object 704). In other embodiments, the components of feedback manager 1002 may collectively generate and update user activity dataset 1004. In still other embodiments, the context data miner 1008 and/or strategic data miner 1010 may generate user activity dataset 1004 based on activity monitored by activity monitor 1006.

In the illustrated embodiment, user activity dataset 1004 includes device data 1012, user data 1014, state data 1016, and interaction data 1018. Device data 1012 may include data pertaining to the user device, such as screen size, resolution, memory, processor, and the like. User data 1014 may refer to data regarding the user that is gleaned from input. For example, user data 1014 may include a birthdate of the user that was gleaned off of input provided for completing an application via the primary user overview GUI 1300. State data 1016 may refer to contextual data and/or a current status of the user. For instance, state data 1016 may be updated to reflect a change in circumstances for the user determined based on feedback data 206. Interaction data 1018 may include interactions between the user device and the PAE system. For example, interaction data 1018 may include the various pages and links a user has viewed. In many examples, interaction data 1018 may include the amounts of time the user viewed each of the various pages and links. In several embodiments, assistance manager 1110 may utilize one or more portions of user activity dataset 1004 to generate summaries of users, such as the process a user took to arrive at a current view of a GUI.

In various embodiments, one or more of the following operations may occur during operation of the PAE system. More specifically, one or more of the following operations may occur in the utilization of feedback, such as by profile data miner 508 of profile manager 502, feedback data miner 810 of advice manager 802, and/or components of feedback manager 1002.

First advice content may be provided via a first GUI on a first device associated with a user. For example, advice content may be provided via GUI 212 on user device 204 associated with the first user when the first user logged into the PAE system application 214 on user device 204. The first advice content may be selected to provide to the user based on a user dataset (e.g., one or more portions of user account 404, user profile 504, and/or user activity dataset 1004). Input received via the first GUI may be monitored. For example, activity monitor 1006 may monitor input received via primary user overview GUI 1300.

Feedback regarding the first advice content may be determined based on input received via the first GUI. In one embodiment, the feedback regarding the first advice content includes an explicit indication that the first advice content is irrelevant (or at least not desired). For example, the feedback may include dismissal of the first advice content by the user through options icon 1336. In another example, feedback may include clicking the action 1316 in advice content 1306a. In various embodiments, clicking the action 1316 in advice content 1306a may be identified as an interaction indicating that the advice in advice content 1306a (e.g., benefit 1314) was found helpful by the user.

The user dataset may be updated based on the feedback to produce an updated user dataset. For example, one or more portions of account data 512 in user profile 504 may be updated. In another example, one or more portions of user activity dataset 1004 may be updated. In yet another example one or more portions of user profile 504 and user activity dataset 1004 may be updated. In some embodiments, the data may be updated by profile data miner 508. In one embodiment, profile data miner 508 may analyze user activity dataset 1004 to update the user profile. In another embodiment, strategic data miner 1010 may cause profile manager 502 to update the user profile 504. In various embodiments, feedback data miner 810 may be utilized to generate and/or integrate the user dataset, or updates thereto. For example, feedback data miner 810 may integrate updated user activity dataset 1004 into advice engine 804 such that advice engine 804 provides advice based thereon.

Second advice content may be provided via a second GUI on a second device associated with the user. In some embodiments, the first device comprises the second device. For example, the second advice content may be provided via the same device but at a later point in time. In another embodiment, the first device may correspond to a mobile computer and the second device may correspond to a desktop computer.

The second advice content may be selected to provide to the user based on the updated user profile. For example, advice content 1306*c* may be provided to the user based on the updated user profile. In one embodiment, the advice content 1306*c* may be provided to the user instead of advice content 1306*a* in response to the user dismissing the advice content 1306*a* via options icon 1336. In another embodiment, the advice content 1306*c* may be provided to the user instead of advice content 1306*a* in response to the user clicking action 1316. In such other embodiments, advice content 1306*a* is implicitly deemed no longer relevant due to the user acting on the benefit 1314. Accordingly, account data 512 may be updated to reflect this and cause advice content 1306*c* to be displayed instead of advice content 1306*a*.

In some embodiments, the updated user dataset may comprise a first updated user data set. Further, a change in circumstances regarding the user may be determined. For example, a change in context from a page associated with retirement to a page associated with purchasing a home may be determined as a change in circumstances by context data miner 1008. In another example, profile data miner 508 may determine a change in circumstances based on identifying a new life event, such as the birth of a child.

The first updated user dataset may be updated based on the change in circumstances to produce a second updated user dataset. For example, context data miner 1008 may update state data 1016 to indicate the change in circumstances and produce a second updated user dataset. In another example, profile data miner 508 may update life event data 514 of user profile 504 to indicate the change in circumstances and produce a second updated user dataset. Third advice content may then be provided via a third GUI on a third device associated with the user. The third advice content may be selected to provide to the user based on the second updated user dataset and the third advice content may comprise the first advice content. For example, a user may dismiss advice content corresponding to opening a savings account for a child. Accordingly, the next time, alternative advice content may be provided to the user. However, a change of circumstances comprising the birth of a second child may be determined. In response to the birth of the second child, the advice content corresponding to opening a savings account for a child may be represented to the user.

In various embodiments, the feedback data may include an amount of time the content (e.g., advice, insight, recommendation, suggestions, etc.) was displayed on a user device, as well as how it was interacted with. In some embodiments, the feedback data may include a click on a link included in the first advice content. For example, the feedback data 206 may indicate that the user clicked on the action 1420*a* in collaborative task 1414*a*.

In many embodiments, the feedback may include an implicit component and/or an explicit component. For example, in one embodiment, the implicit component may include playing a video associated with the advice content and the explicit component may include a survey completed at the end of the video indicating that the advice content was useful. In many such embodiments, one or more data miners (e.g., profile data miner 508, feedback data miner 810, context data miner 1008, strategic data miner 1010 may identify the implicit component). Examples of implicit feedback may include clicking on links in advice content, viewing advice content for more than a threshold amount of time, viewing advice content for less than a threshold amount of time, completing an educational exercise, the amount of suggested content that is viewed, and performing actions in response to, or based on, the advice content. For example, implicit feedback may include the amount of a recommended video that is viewed. In such examples, viewing just the first few seconds of the recommended video may implicitly indicate the video was not particularly useful. However, viewing the recommended video to completion may implicitly indicate the video was useful.

As previously mentioned, in several embodiments the advice content may include a benefit and an action associated with obtaining the benefit. For example, the first advice content may comprise advice content 1306*a* with benefit 1314 and action 1316. In many embodiments, the action 1316 may comprise a task corresponding to a shared goal. In many such embodiments, the task may include a collaborative task with another user involved in the shared goal. For example, the collaborative task may include discussing a topic corresponding to the shared goal.

Figure 11:
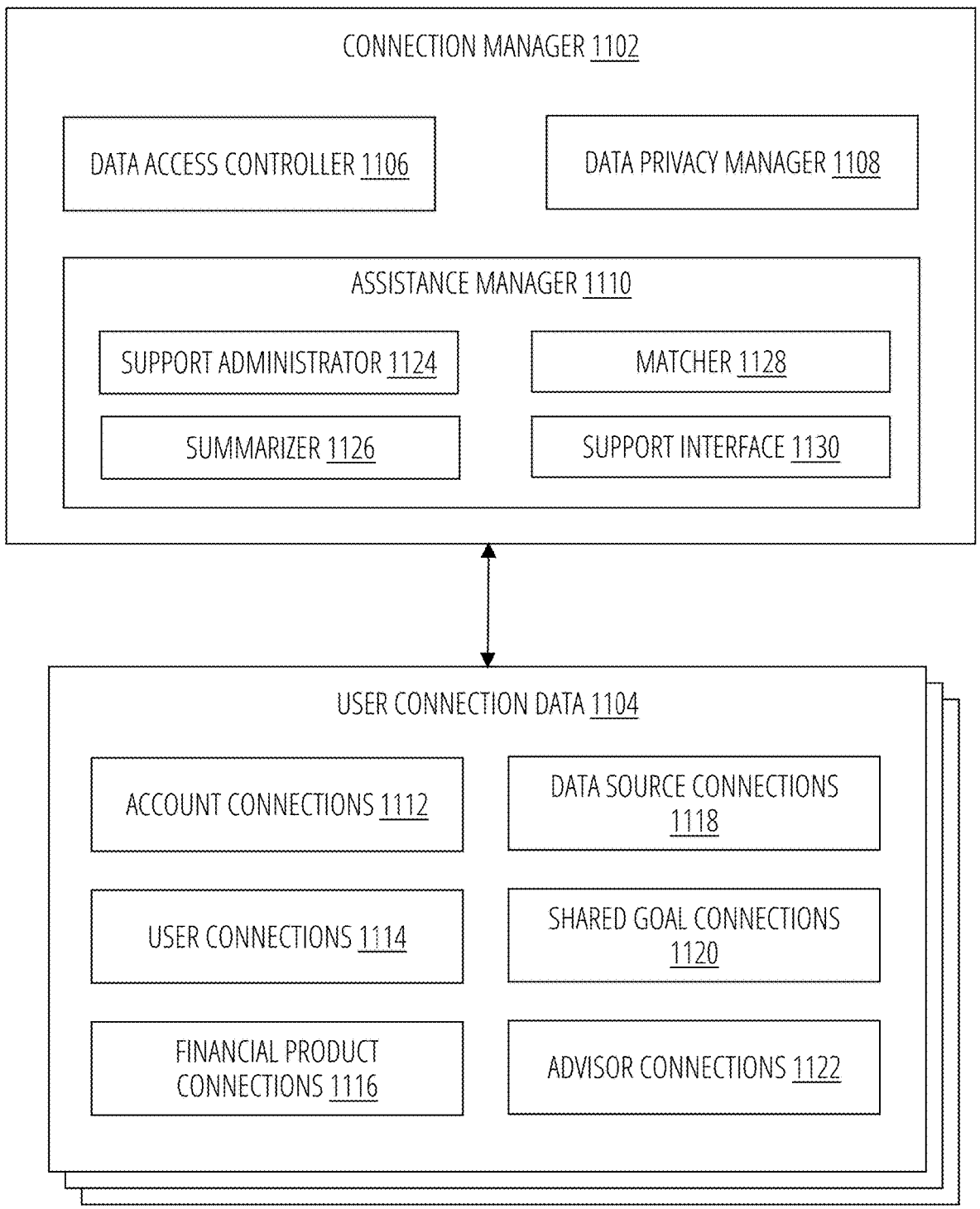
FIG. 11 illustrates an exemplary connection manager in conjunction with a plurality of sets of user connection data according to one or more embodiments of the current disclosure.

FIG. 11 illustrates an exemplary connection manager 1102 in conjunction with a plurality of sets of user connection data 1104 according to one or more embodiments of the current disclosure. The connection manager 1102 may manage and control connections between and accessibility of components, entities, and data sources. As part of this, the connection manager 1102 may generate and maintain user connection data 1104 for each user. In the illustrated embodiment, connection manager 1102 includes a data access controller 1106, a data privacy manager 1108, and an assistance manager 1110. Further, the assistance manager 1110 includes a support administrator 1124, a summarizer 1126, a matcher 1128, and a support interface 1130. The user connection data 1104 may include account connections 1112, user connections 1114, financial product connections 1116, data source connections 1118, shared goal connections 1120, and advisor connections 1122. In some embodiments, FIG. 11 may include one or more components that are the same or similar to one or more other components of the present disclosure. For example, connection manager 1102 may be the same or similar to connection manager 320. Further, one or more components of FIG. 11, or aspects thereof, may be incorporated into, or excluded from, various embodiments of the present disclosure without departing from the scope of this disclosure. For example, connection manager 1102 may be integrated into account manager 402 without departing from the scope of this disclosure. In another example, user connections 1114 may be excluded from user connection data 1104 without departing from the scope of this disclosure.

The connection manager 1102 may maintain a set of connections associated with a user (e.g., user connection data 1104), such as account connections 1112, user connections 1114, financial product connections 1116, data source connections 1118, shared goal connections 1120, and advisor connections 1122. In some embodiments, connection manager 1102 may act as a gate keeper for the exchange of data between various components of the PAE system. For example, data access controller 1106 may cause connection manager 1102 to block a request by data aggregator 1206 to obtain data regarding a user in response to the user being absent from user connections 1114. In one embodiment, other components of the PAE system may interrogate the appropriate user connection data 1104 to determine whether to fulfill data requests. For example, profile data controller 506 may interrogate user connection data 1104 to determine whether to provide a user profile 504 to the advice manager 802.

In various embodiments, the data access controller 1106 may generally control access to data in the PAE system, such as based on user connection data 1104. The data privacy manager 1108 may interact with data access controller 1106 to protect user privacy, such as based on permissions data 416 in user account 404. In some embodiments, data privacy manager 1108 may redact, anonymize, and/or remove data before it is made accessible by a component. For example, identifying information, such as name and account numbers, may be removed from data requested by insight manager 902 from resource manager 602 to estimate a probability of success for a savings goal or an amount available for a down payment.

The assistance manager 1110 may facilitate providing support to a user. In various embodiments, the support administrator 1124 may operate to identify when and/or how to provide assistance to the user. For example, support administrator 1124 may analyze feedback data (e.g., user activity dataset 1004) to determine how and when to provide assistance to a user. In various embodiments, support administrator 1124 may operate in conjunction with feedback manager 1002 and experience manager 1202 to determine how and when to provide assistance to a user. In various embodiments, assistance may be provided episodically.

The assistance manager 1110 may provide on-demand support to users. In many embodiments, users may explicitly request assistance, such as via service team icon 1320 in FIG. 13. In various embodiments, a user may submit things to the assistance manager 1110 for review, such as plans, goals, objectives, questions, appointment requests, and the like. In several embodiments, matcher 1128 may identify a suitable team member to assist with the request or submission.

When to provide assistance to a user may refer to the timing of providing assistance. For example, if a user sits in front of a GUI with a decision point for more than a threshold amount of time, the support administrator 1124 may determine to provide assistance to the user. In another example, support administrator 1124 may determine to wait a threshold period of time before providing assistance in response to a life event. In some such examples, assistance with executing a will in response to the death of a family member may be only provided, or suggested, after a grieving period has occurred. In various embodiments, features like this may humanize the PAE system to users.

In various embodiments, assistance may include check-ins, updates, proactive communications, reactive communications, periodic communications, and the like. In some embodiments, it may be determined to provide assistance to a user in a manner that does not require any interaction with the PAE system. Continuing with the previous example, a life event, such as the death of a family member, may trigger a check-in. In another example, a change in account value due to poorly performing investments may trigger a check-in from a financial advisor. In yet another example, updates may periodically be provided to users.

How to provide assistance to a user may refer to the format and/or type of assistance. For example, a user may be provided with assistance via a chat box generated in the GUI. In another example, a user may initially be provided with first advice comprising something to consider when faced with a decision point, the support administrator 1124 may determine the first advice was unsuccessful in assisting the user (such as based on feedback data), the user may then be provided with second advice comprising a suggested action regarding the decision point, the support administrator 1124 may determine the second advice was unsuccessful in assisting the user, the user may then be matched with and connected to a team member to provide live assistance to the user. Support administrator 1124 may determine whether to provide email, textual, telephonic, or video support to a user. In some embodiments, the format and/or type of assistance may be determined, at least in part, based on one or more preferences of the user (e.g., preferences data 410).

In several embodiments, support administrator 1124 may determine how to structure assistance to a user. In several such embodiments, assistance may be structured as a factor to consider, a potential action, a recommended action, or a warning. Further, assistance may be provided in the form of a question or a statement. For example, a factor to consider may include "Have you considered the tax effects of selling your home?", or "Please consider the tax effects of selling your home?", or "Did you know that selling your home this year may cost you an additional $10,000 in taxes." A potential action may include "If you wait to sell your home you could avoid negative tax effects", or "Why sell your home this year when waiting until next year may help you avoid negative tax effects?", or "Can you wait until next year to sell your home? Doing so can help you avoid negative tax effects." A recommended action may include "We recommend that you wait until next year to sell your home to avoid negative tax effects" or "To save $10,000 in taxes, we suggest that you wait until next year to sell your house." In many embodiments, one or more portions of the assistance may be based on the financial situation of the user. For example, support administrator 1124 may determine the user could save $10,000 in taxes based on analysis of their current financial situation and/or a goal that identifies the asking price for selling the home. In many embodiments, the advice itself (e.g., consider the tax effects of selling your home) is still generated by the advice manager 802. In some embodiments, advice and/or insights may be formatted in a similar matter, such as by advice manager 802 or experience manager 1202.

In some embodiments, the support administrator 1124 may analyze decisions and actions performed by a user. For example, support administrator 1124 may perform a statistical analysis of actions taken by a user based on actions taken by a plurality of other users in analogous scenarios. In such examples, if the action taken by the user is a statistical outlier, the support administrator 1124 may determine to provide assistance regarding the action.

The summarizer 1126 may generate a summary of the user, such as for assisting a team member in providing support to the user. Accordingly, the summarizer 1126 may generate summaries of users with relevant information on their current situation. In some embodiments, the summary may include various steps the user took to arrive at the current situation. For example, the summary may indicate the user viewed a first page for 37 seconds, clicked a first link, viewed a second page for 12 seconds, clicked a second link, and has been viewing a third page for 12 minutes. Additionally, the summary may include a summary of the information displayed on each page and/or link. Further, summarizer 1126 may generate a snapshot of the situation of the user. For example, this could include one or more portions of a financial summary generated by resource manager 602.

The matcher 1128 may enable a team member to be matched with and provide assistance to a user. For example, matcher 1128 may match the user to a suitable team member for assisting the user with their current issue. In various embodiments, each team member may have a corresponding profile that is used by matcher 1128 to identify the suitable team member. In some embodiments, matcher 1128 may utilize a machine learning model. For example, a user profile may be provided as input to the machine learning model and the suitable team member may be produced as output. In one embodiment, a summary of the user generated by summarizer 1126 may be utilized as input to the machine learning model.

Support interface 1130 may enable a team member (e.g., an advisor identified in advisor connections 1122) to interact with and/or view data regarding a user (e.g., the user corresponding to the user connection data 1104). In some embodiments, the support interface 1130 can support various communication functionalities, including screen sharing, screen control, and the like. In many embodiments, support interface 1130 may provide a team member with a GUI that enables them to view and interact with users in real-time. In one embodiment, assistance manager 1110 may generate a chat window in a GUI of the user (e.g., primary user overview GUI 1300, shared goal detail GUI 1400) that enables the team member to communicate with the user via a corresponding chat window in a GUI generated by support interface 1130.

In some embodiments, connection manager 1102 may include one or more portions of a distributed event store and/or stream-processing platform. For example, connection manager 1102, or components thereof, may enable users to subscribe to and publish data to any number of system and/or real-time applications. For example, account manager 402 and/or profile manager 502 may subscribe users to various topics and/or partitions offered by the connection manager 1102. In one embodiment, connection manager 1102 may store data, such as messages (e.g., key-value messages), from one or more processes called produces. The data may be partitioned into different topics with different partitions. Within a partition, the messages may be indexed and stored together with a timestamp. In some embodiments, the messages may be strictly ordered by their offsets (i.e., position of a message within a partition). Other processes, called consumers, may read messages from partitions. One or more brokers (e.g., a cluster of one or more servers) may be utilized to deliver streams of messages in a fault-tolerant manner. In many embodiments, partitions may be replicated on multiple brokers, such as to facilitate scalability.

A variety of application programming interfaces (APIs) may be utilized, such as by other components of the PAE system 102, to interact with the distributed event store and/or stream-processing platform. For example, one or more of the following APIs may be utilized. A producer API to permit applications to publish streams of records. A consumer API to permit an application to subscribe to topics and process streams of records. A connector API to import/export data from/to other systems, such as by executing reusable producer and consumer APIs that can link the topics to existing applications. A streams API that converts input streams to output and produces the results. An admin API to manage topics, brokers, and other objects of the distributed event store and/or stream-processing platform.

Using the systems, techniques, devices, and components disclosed hereby, the assistance manager 1110 can advantageously satisfy a variety of team member needs, such as financial advisors. The assistance manager 1110 can provide advisors the ability to understand who a client is and what is important to them, such as by enabling the advisor to see the user profile 504. The assistance manager 1110 can provide transparency into a client's financial picture and deliver a comprehensive PAE experience for the advisor and client to view together, such as via screen share functionality of the assistance manager 1110. The assistance manager 1110 can identify and provide access to resources and technology-based solutions for advisors to provide options to clients based on the goals, values, and financial situation of the user, such as via advice manager 802. The assistance manager 1110 can provide a consistent experience that can be leveraged for all clients but curated for each client's needs.

Further, using the systems, techniques, devices, and components disclosed hereby, the assistance manager 1110, can advantageously provide a number of values to team members, such as financial advisors. The assistance manager 1110 can allow advisors to focus on the client experience instead of the process, making planning easier and more collaborative. For instance, instead of manually calculating net worth, the net worth may be automatically calculated by resource manager 602. The assistance manager 1110 can expand the practice and effectiveness of advisors by leveraging a team of specialists and a full spectrum of financial services. The assistance manager 1110 can enhance the planning acumen and management proficiency of advisors, leveraging robust technology for an elevated client experience. For example, assistance manager 1110 may provide advice, insights, and the like for the advisor to consider regarding the user. Further, the assistance manager 1110 can retain and deepen client relationships to extend through multiple generations. For example, the assistance manager 1110 can identify familial relationships, such as based on interactions with profile manager 502.

In various embodiments, one or more of the following operations may occur during operation of the PAE system. More specifically, one or more of the following operations may occur in utilizing the assistance manager 1110, such as to identify when and how to provide live assistance to a user.

Feedback data regarding a user may be generated, at least in part, based on input provided via a first GUI to arrive at a current view of the first GUI. For example, feedback manager 1002 may generate user activity dataset 1004 for the user. In some embodiments, feedback data 206 may be utilized by feedback manager 1002 to generate the feedback data (i.e., user activity dataset 1004).

It may be determined to provide live assistance to the user based on the feedback data. For example, support administrator 1124 may analyze the feedback data to determine to provide live assistance to the user. More generally and as described in more detail below, a variety of factors can be analyzed to determine when to provide assistance to a user. In some embodiments, the effects of user actions may be utilized to determine whether to provide assistance to a user. For example, the amount of change in a probability of success may be utilized to determine when to provide assistance to a user. In one such example, the threshold amount of change in the probability of success may be set between 5 and 55 percent, such as at 10 percent. In various embodiments, the change in the probability of success may be utilized to determine a format for advice. For example, a small decrease in the probability of success (e.g., <5%) may cause corresponding advice to be presented as a factor to consider, a medium decrease in the probability of success (e.g., 5-10%) may cause the corresponding advice to be presented as a recommendation, and a large decrease in the probability of success (e.g., >10%) may cause the corresponding advice to be presented as a warning.

A user dataset may be analyzed to identify a suitable team member, or suitable subset of team members, to provide assistance to the user. For example, matcher 1128 may analyze one or more of user account 404, user profile 504, shared goal data object 704, user activity dataset 1004, user connection data 1104, and/or a summary of the user (e.g., generated by summarizer 1126) to identify a suitable team member to provide assistance to the user. In some embodiments, the suitable team member to provide assistance to the user is identified based on comparison of a user profile for the user and a member profile for the team member.

In some embodiments, the user may be assigned to a suitable subset of team members. In some such embodiments, the user may be assigned to one of a plurality of subsets of team members that correspond to different areas of specialty (e.g., retail banking, investments, commercial banking, bonds, stocks, certificates of deposit, mortgages, technology support, and the like). When a suitable subset of team members is identified, the team member to provide assistance to the user may be selected at random or based on a set of rules, such as in a similar manner as described with respect to rules-based engine 814. In some embodiments, the team member from the subset of team members may be selected based on personal characteristics and/or preferences of the user. For example, a team member at least 10 years older than the user may be selected. In another example, a team member of the same sex as the user may be selected. In one embodiment, a ML model may be utilized to match the user to a suitable team member or subset of team members. For example, the ML model may determine a team member, or a subset of team members, to assist the user in response to the user profile being provided as input, such as by matcher 1128. Additionally, or alternatively, a summary of the user may be utilized to identify the suitable team member, or subset of team members, to assist the user.

A summary of the user may be generated based, at least in part, on the feedback data. For example, summarizer 1126 may generate a summary of the user. In many embodiments, the summary may be directed to assisting the team member in providing the user the assistance they need. Accordingly, the summary may be tailored based on the issue the user is facing. For example, if the user is having issues regarding their investments, then the summary may include a snapshot of their investments. However, if the user is having technical issues, then the summary would not include a snapshot of their investments. Instead, the summary may include a snapshot of previous technical issues faced by the user. In various embodiments, the summary may include one or more of a goal, a financial state, a cash flow, a balance sheet, and one or more contributing factors to the financial state, the cash flow, or the balance sheet. For example, the amount of a monthly mortgage payment may comprise a contributing factor to the cash flow.

In various embodiments, the issue the user is facing, or at least the general class of issue, may be determined based on feedback data. In various such embodiments, the issue, or general class of issue, may be determined based on implicit or explicit indications in the feedback data. For example, the issue the user is facing may be identified as concerning their mortgage based on contextual data indicating the user is viewing information regarding their mortgage. In another example, the user may explicitly request assistance with a specific issue, such as via options icon 1336.

In various embodiments, the summary may include contextual data regarding the current view of the user GUI. In various such embodiments, the contextual data regarding the current view of the first GUI indicates the current view as providing information on a retirement goal of the user. In many embodiments, the summary may include a process taken to arrive at the current view. For example, the process taken to arrive at the current view may include (i) logging in at 9:04 am, (ii) viewing account balances for 1:57 minutes, (iii) viewing an overview of a goal shared with their wife concerning saving for retirement for 2:30 minutes, and (iv) currently viewing a task of the shared goal regarding rolling over 401k investment accounts and has been viewing for the last 8:53 minutes.

The summary of the user may be provided to the suitable team member, such as via support interface 1130, to assist the team member with getting up to speed on the user and the issue facing the user. Further, communication may be facilitated between the user and the suitable team member, such as via support interface 1130. In one embodiment, the support interface 1130 may generate a GUI with a chat window connected to a chat window in the GUI being viewed by the user. Accordingly, corresponding chat windows may be generated in first and second GUIs to facilitate communication between the user and the suitable team member.

In some embodiments, determining to provide live assistance to the user based on the feedback data includes: determining the current view of the user GUI includes a decision point; identifying an amount of time the decision point has been displayed on the current view of the user GUI based on the feedback data; and determining the amount of time the decision point has been displayed on the current view of the first GUI exceeds a threshold amount of time. For example, support administrator 1124 may determine to provide live assistance to a user in response to them viewing the decision point comprising creation confirmation icon 1634 in GUI view 1602*j* of goal creation GUI 1600 for over a threshold amount of time. In some embodiments, the threshold amount of time may be between 2 and 20 minutes, such as 3, 4, 5, or 6 minutes.

In many embodiments, determining to provide live assistance to the user based on the feedback data includes: identifying an action taken with respect to a shared goal of the user based on the feedback data; performing a statistical analysis on the action taken with respect to the shared goal; and determining the action taken with respect to the shared goal is a statistical outlier. In many embodiments, the statistical analysis is based on actions taken by a plurality of other user on a plurality of other analogous shared goals. For example, support administrator 1124 may perform a statistical analysis on the resource demand 1618 provided in GUI view 1602*f* of goal creation GUI 1600. Further, support administrator 1124 may determine that the amount provided for resource demand 1618 is a statistical outlier with respect to the resource demand provided for a plurality of other users that created a goal with an objective to pay for an undergraduate degree. In one embodiment, the statistical analysis may only be performed with users that create a goal with an object to pay for an undergraduate degree at the same school. It will be appreciated that statistical analysis of user actions may be performed on a variety of actions, not just actions with respect to a shared goal. For example, a statistical analysis regarding an action taken on an account may be performed, such as the contributions to different types of investments in a retirement account.

In various embodiments, determining to provide live assistance to the user based on the feedback data includes: determining the current view of the user GUI includes a decision point; providing first advice comprising a consideration regarding the decision point; determining the first advice was unsuccessful in assisting the user based on the feedback data; providing second advice comprising a suggested action regarding the decision point; and determining the second advice was unsuccessful in assisting the user based on the feedback data. More generally, the type of assistance provided by the PAE system may begin with simple automated advice and then be elevated in response to the advice being unsuccessful in assisting the user. For example, advice may initially include automatically generated considerations for the user, then automatically-generated suggested actions, and ultimately live assistance. In this and other ways the system can improve how customer service is provided, such as by only providing live assistance to users that require it. In some embodiments, the advice may comprise a warning regarding an action.

In many embodiments, suitable team members may be provided with advice and/or insights regarding the user, such as via support interface 1130. For example, assistance manager 1110 may interoperate with advice manager 802 to suggest a course of action for the suitable team member to take with respect to the user. The course of action may include one or more actions for the user to take. In many embodiments, the support interface 1130 may provide a first GUI that enables the suitable team member to provide input via the first GUI to take an action for the user in the user GUI. In some embodiments, the current view of the user GUI may be displayed on the GUI of the support interface 1130. Accordingly, assistance manager 1110 may facilitate various screen sharing functionalities between suitable team members and users. In many embodiments, this may enable team members, such as financial advisors, to lead users through one or more aspects of their PAE experience.

Figure 12:
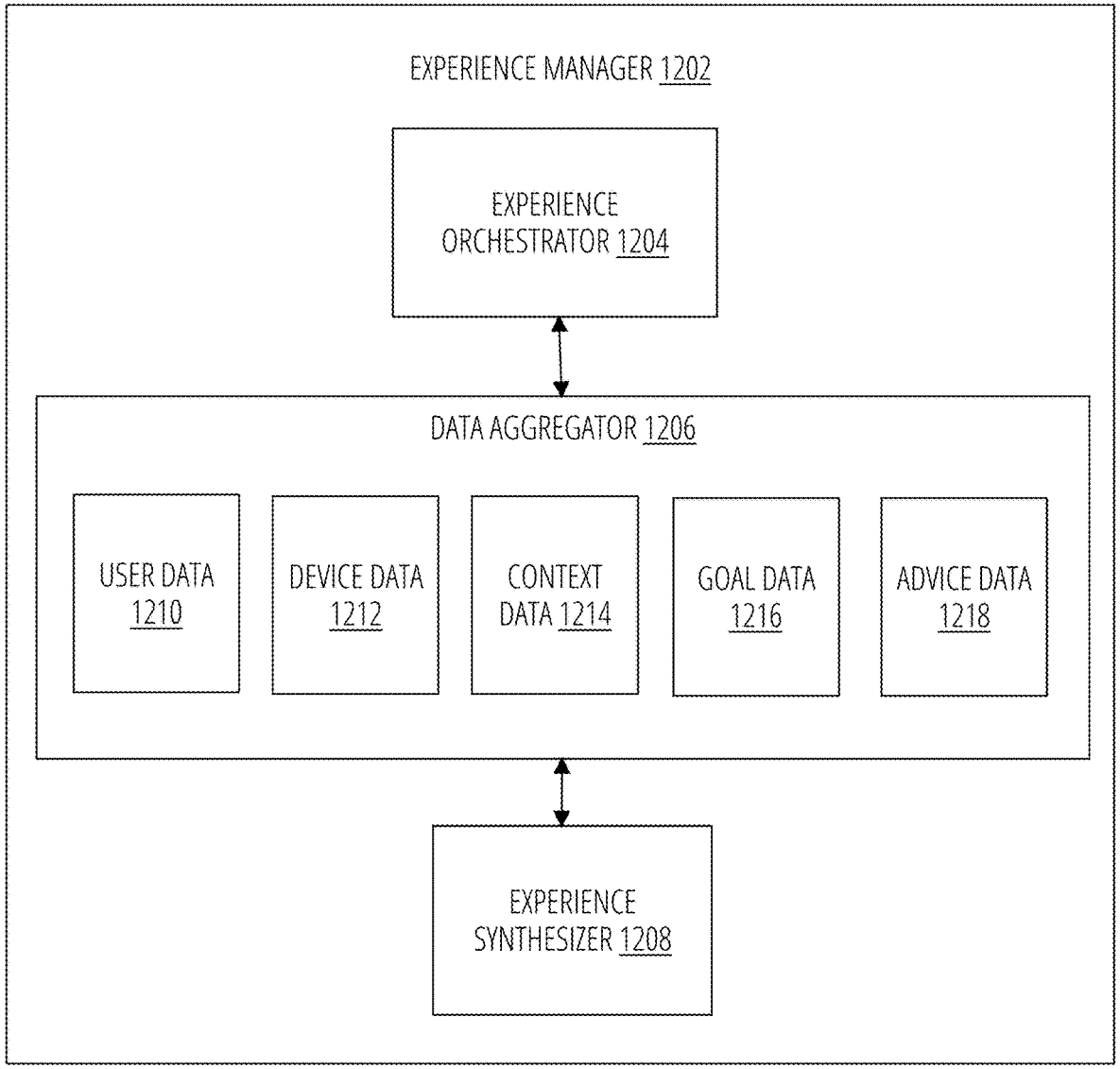
FIG. 12 illustrates an exemplary experience manager according to one or more embodiments of the current disclosure.

FIG. 12 illustrates an exemplary experience manager according to one or more embodiments of the current disclosure. The experience manager 1202 may determine, collect, and package the data to facilitate customized PAE experiences for users. For example, experience manager 1202 may communicate the requisite data in the proper format to cause a user device to generate one or more GUIs to provide a user with a PAE experience customized for them. In the illustrated embodiment, the experience manager 1202 includes an experience orchestrator 1204, a data aggregator 1206, and an experience synthesizer 1208. Further, the data aggregator 1206 is illustrated with user data 1210, device data 1212, context data 1214, goal data 1216, and advice data 1218. In some embodiments, FIG. 12 may include one or more components that are the same or similar to one or more other components of the present disclosure. For example, experience manager 1202 may be the same or similar to experience manager 322. Further, one or more components of FIG. 12, or aspects thereof, may be incorporated into, or excluded from, various embodiments of the present disclosure without departing from the scope of this disclosure. For example, one or more components, or functionalities, of experience manager 1202 may be located on a user device without departing from the scope of this disclosure. In another example, data aggregator 1206 may be integrated into experience orchestrator 1204 and/or other components of PAE system 302 without departing from the scope of this disclosure.

The experience manager 1202 may be responsible for orchestrating and synthesizing the data to facilitate customized PAE experiences for users. In various embodiments, the experience manager 1202 may utilize other components of the PAE system to put the experience together for a user. For example, the experience manager 1202 may determine that currently the user needs one piece of advice, one insight, and a set of options for a current GUI view on a user device that is associated with a user goal. In such examples, the experience manager 1202 may interact with the advice manager 802 to obtain the piece of advice, the insight manager 902 to obtain the insight, and the goal manager 702 to obtain the set of options. Further, the experience manager 1202 may format and package the data (e.g., as customized experience data 208) such that it causes the user device to present the customized experience on the GUI. In many embodiments, the experience manager 1202 may format advice to customize the advice to a user. For example, advice can be phrased as a question or a statement. Further, advice can be provided as a factor to consider, suggestion, recommendation, warning, and the like. Accordingly, experience manager 1202 may determine how to format the advice based on data regarding the user. For example, the first time a piece of advice is provided it may be provided as a suggestion, the next time the piece of advice may be provided as a recommendation, and the third time the piece of advice may be provided as a warning.

More generally, the experience orchestrator 1204 may determine which items of data are presently needed to provide the customized PAE experience. For example, the experience orchestrator 1204 may identify the elements and data needed by a user device to generate tailored display content 210 on GUI 212 to provide the customized PAE experience (e.g., customized experience data 208). In several embodiments, the experience orchestrator 1204 may utilize the data aggregator 1206 to collect the data to determine what data is needed by the user device to generate the customized experience and to collect the needed data.

The data aggregator 1206 may request, locate, filter, and/or collect data as directed by the experience orchestrator 1204. In some embodiments, the data aggregator 1206 may push data to the experience orchestrator 1204. For instance, data aggregator 1206 may monitor a data feed or data stream and provide relevant data to experience orchestrator 1204 as needed, such as user data 1210, device data 1212, and/or context data 1214.

The experience synthesizer 1208 may format, package, and send the data (e.g., as customized experience data 208) such that it causes the user device to present the customized experience on the GUI (e.g., as tailored display content 210 on GUI 212 of user device 204). It will be appreciated that the experience synthesizer 1208 may send the data by communicating it to device interface 304 in a manner and/or format that causes device interface 304 to send it to the user device.

In one embodiment, the experience manager 1202 may function as follows. The data aggregator 1206 may pass device data 1212 and context data 1214 to experience orchestrator 1204. The experience orchestrator 1204 may utilize the device data 1212 to identify a specific user and cause data aggregator 1206 to collect user data 1210 from account manager 402 and/or profile manager 502 in response. Additionally, the experience orchestrator 1204 may utilize data aggregator 1206 to collect context data 1214 regarding the specific user from feedback manager 1002. In various embodiments, the context data 1214 may include one or more portions of a user activity dataset 1004 corresponding to the specific user. The experience orchestrator 1204 may determine the specific user has a low-risk appetite based on the user data 1210, is viewing a shared goal on a mobile device using a PAE system application based on the device data 1212 and the context data 1214, and the specific user presently needs tasks for a specific contributor and three items of advice content regarding shared tasks with the specific contributor based on the context data 1214. In response the experience orchestrator 1204 may cause the data aggregator 1206 to collect the relevant goal data 1216 (i.e., the tasks for the specific contributor) from goal manager 702 and the advice data 1218 (i.e., the three items of advice content).

Additionally, experience orchestrator 1204 may cause data aggregator 1206 to provide the appropriate data inputs to the advice manager 802 to cause the advice manager 802 to generate the advice data 1218. For example, experience orchestrator 1204 may cause data aggregator 1206 to obtain a user profile 504 from profile manager 502 and provide it to advice manager 802 as input. Further, the experience orchestrator 1204 may cause data aggregator 1206 to provide one or more portions of user data 1210, device data 1212, and context data 1214 to the advice manager 802 as input. In another example, experience orchestrator 1204 may cause data aggregator 1206 to interrogate, or cause shared goal administrator 706 to interrogate, the shared goal data object 704 associated with the shared goal. The experience synthesizer 1208 may then format and package the goal data 1216 and advice data 1218 into customized experience data for communication to the user device. Further, the PAE system application installed on the user device may be caused to generate tailored display content representative of at least a portion of the customized PAE experience in response to receipt of the customized experience data.

Figure 13A:
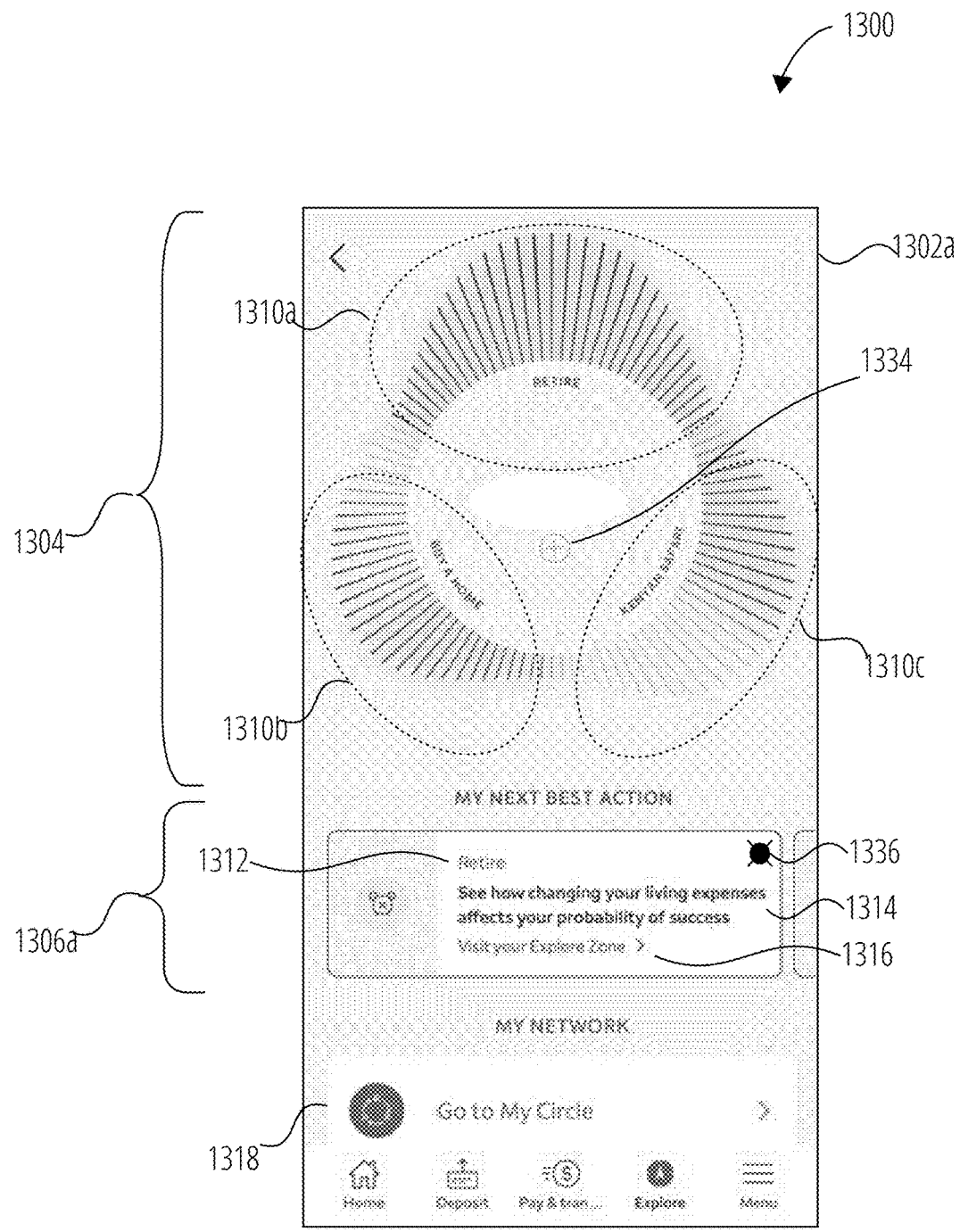
FIGS. 13A-13I illustrate various aspects of a primary user overview GUI according to one or more embodiments of the current disclosure.
Figure 13B:
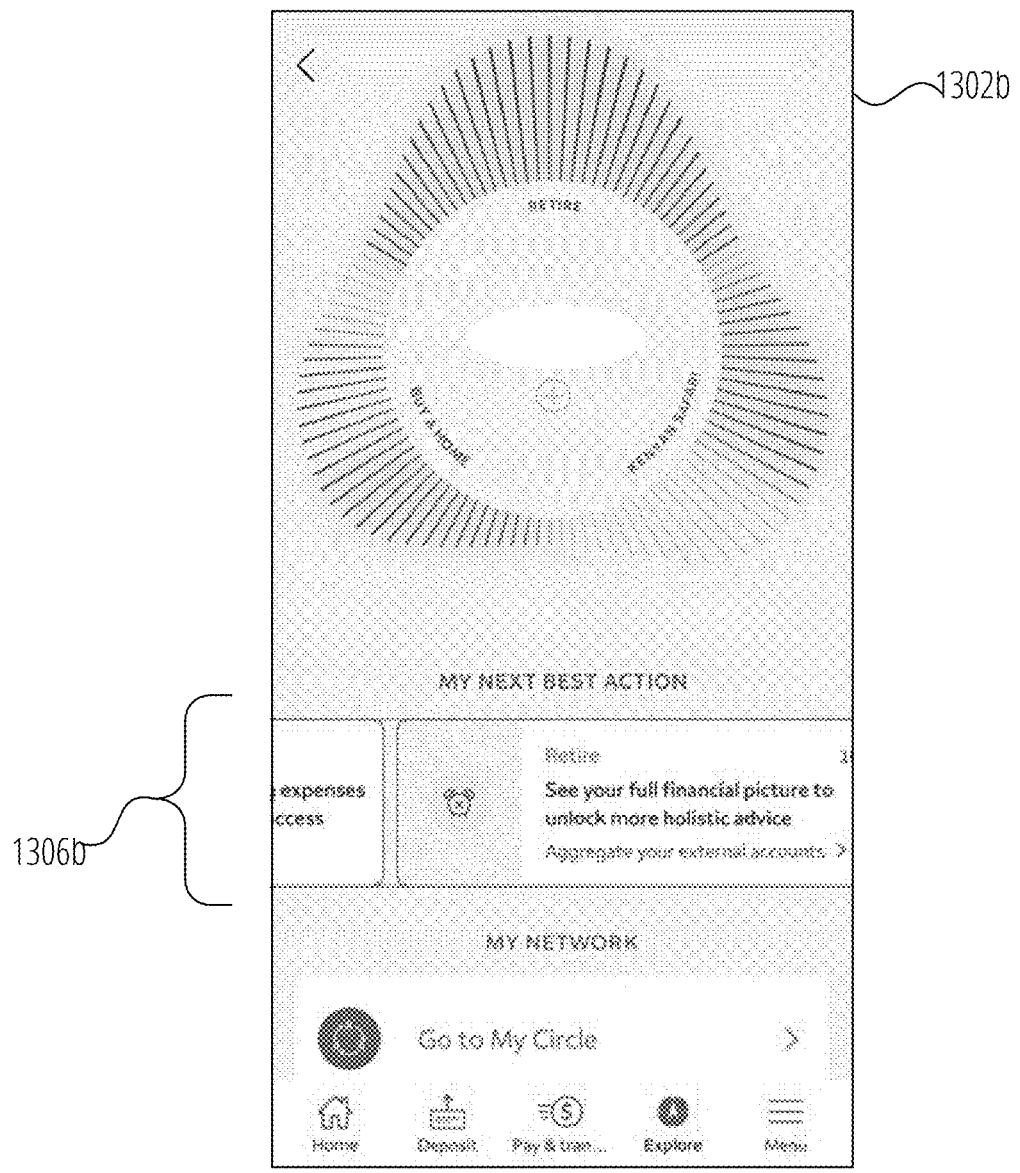
Figure 13C:
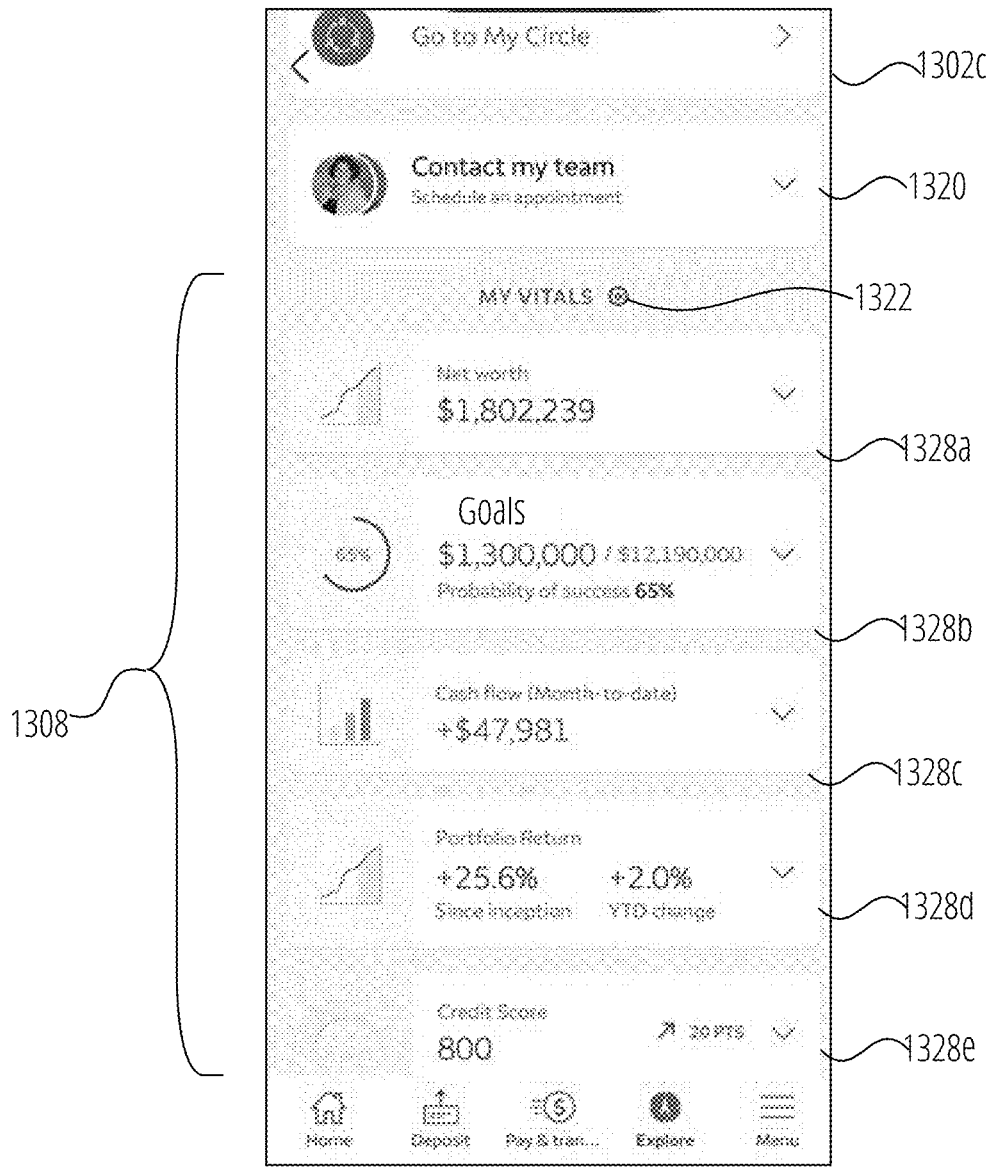
Figure 13D:
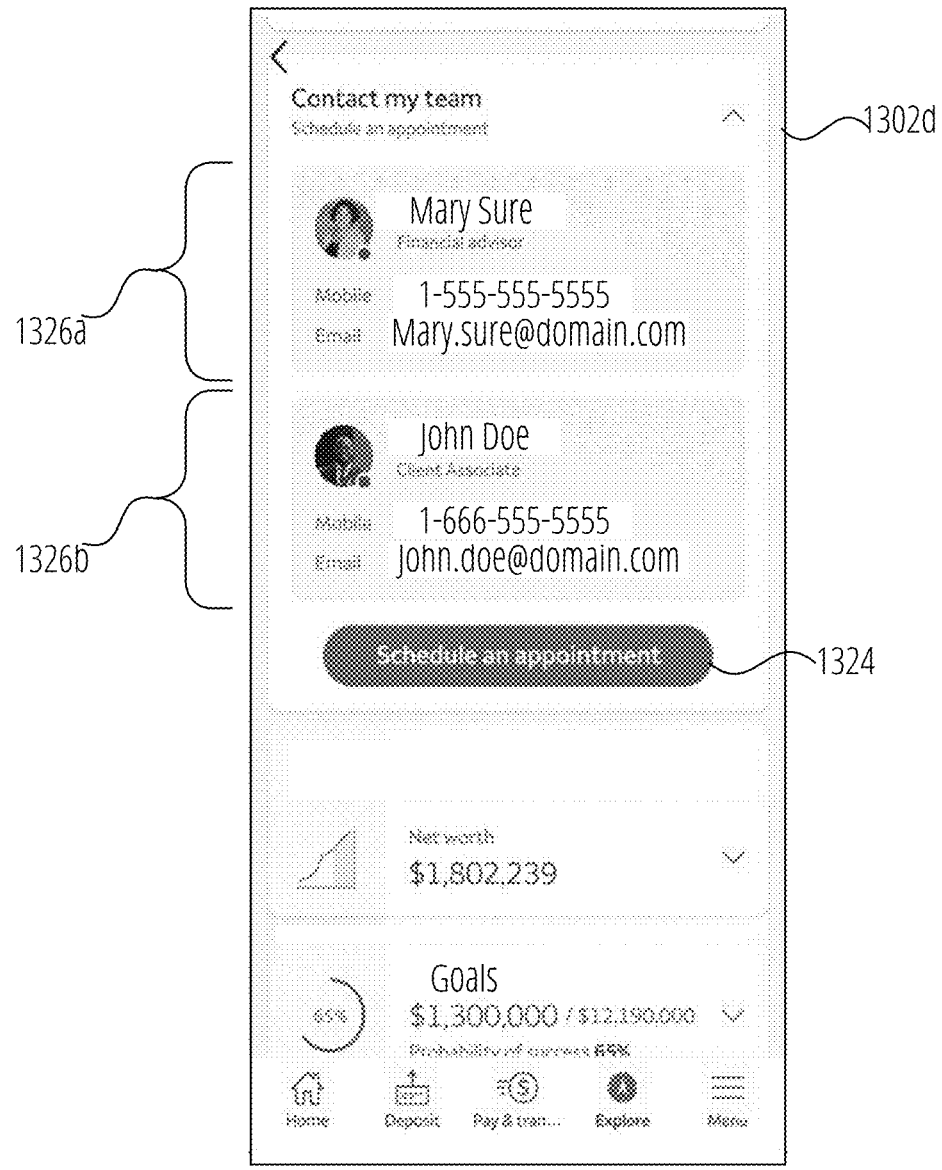
Figure 13E:
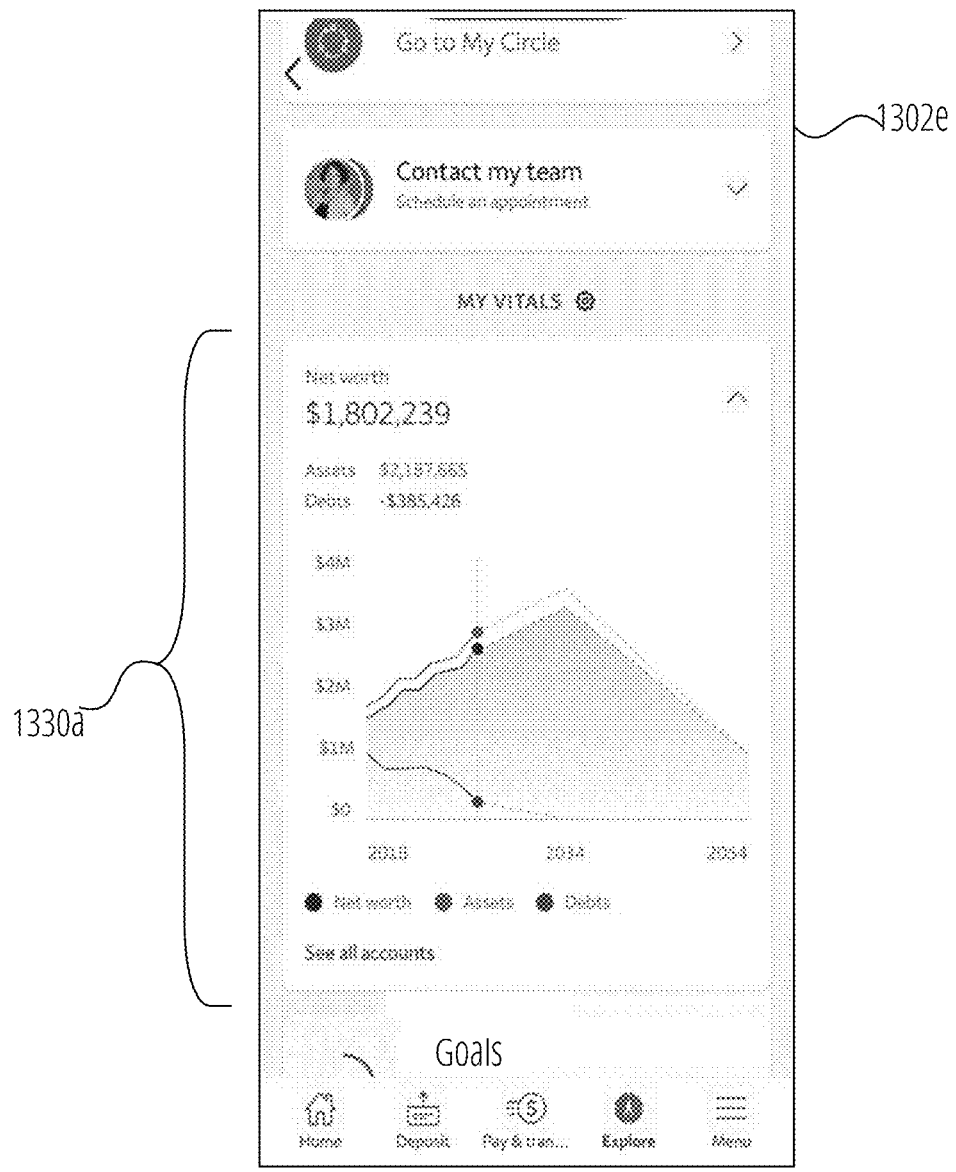
Figure 13F:
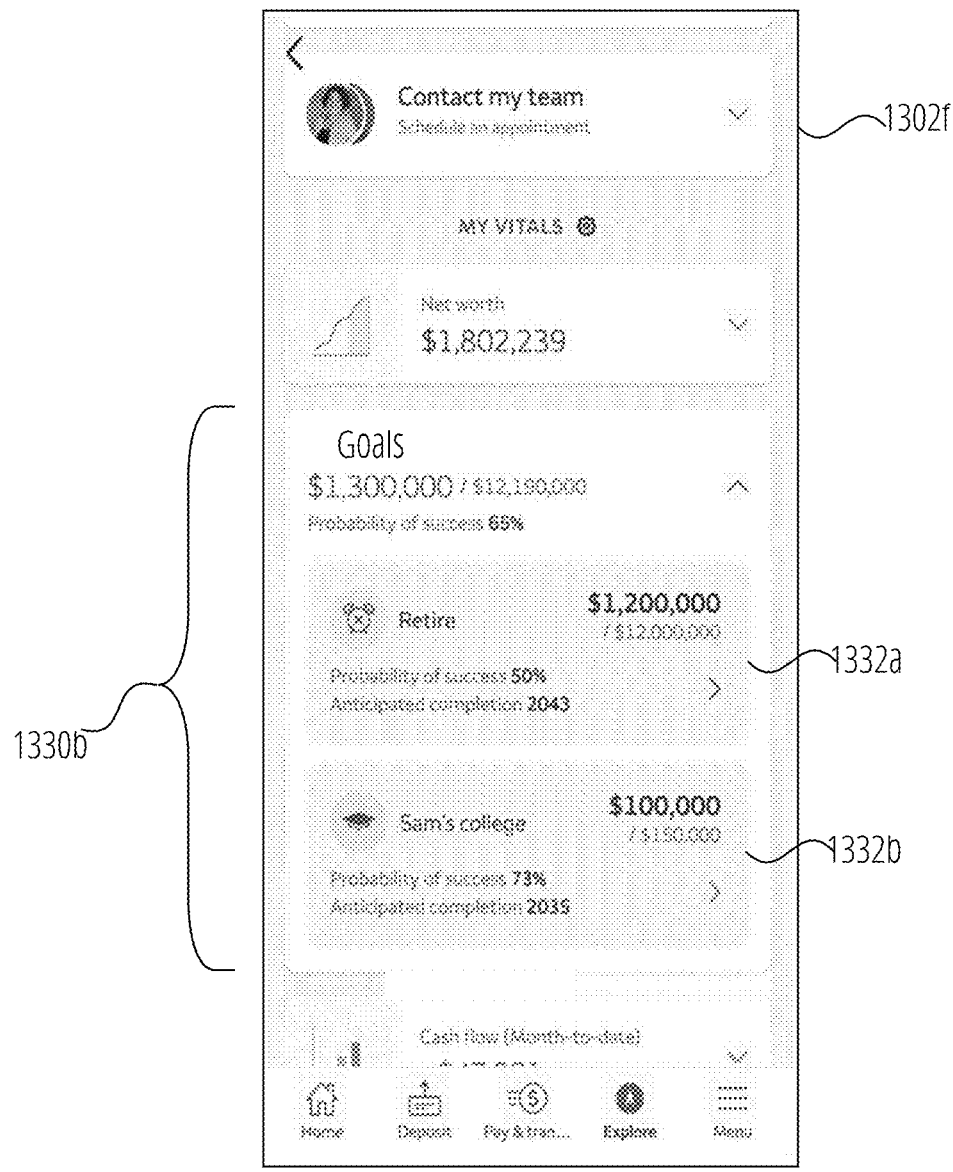
Figure 13G:
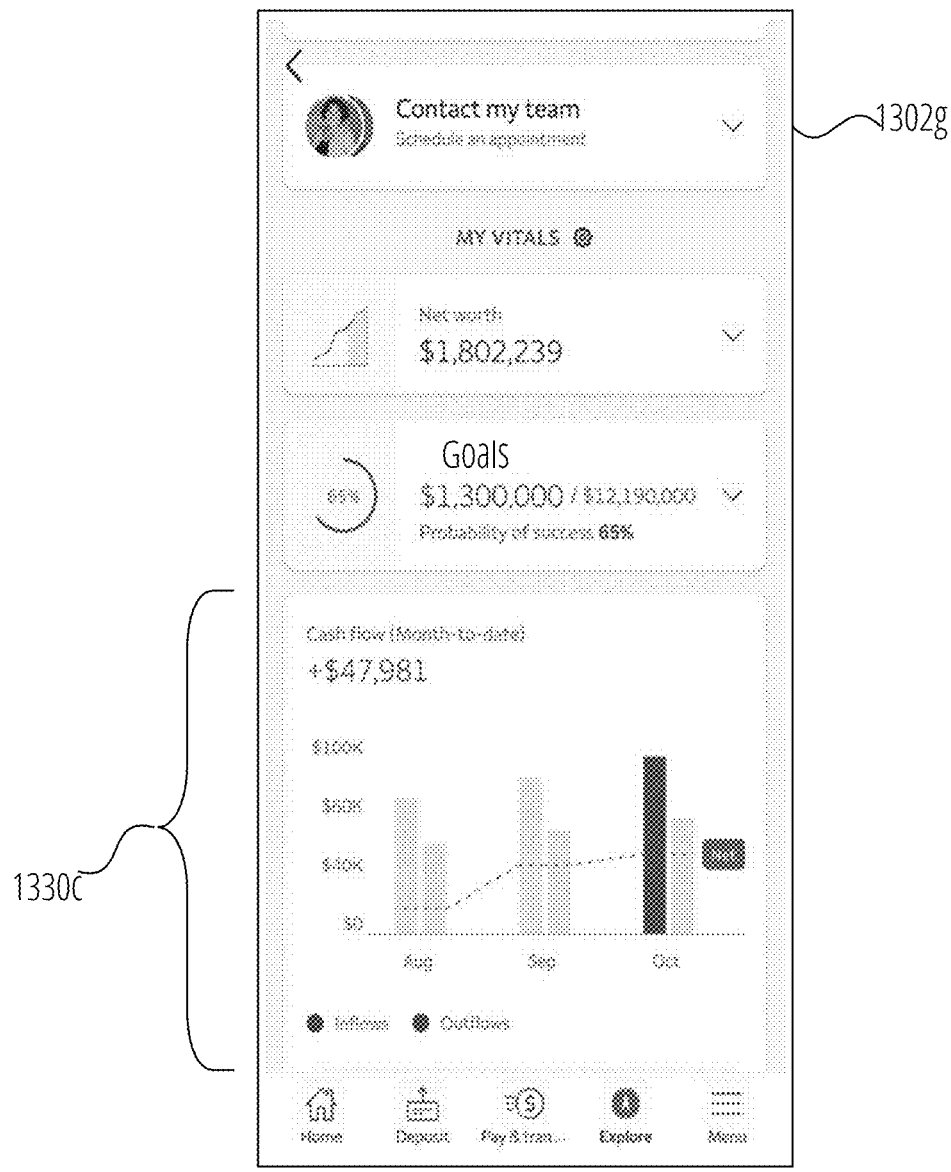
Figure 13H:
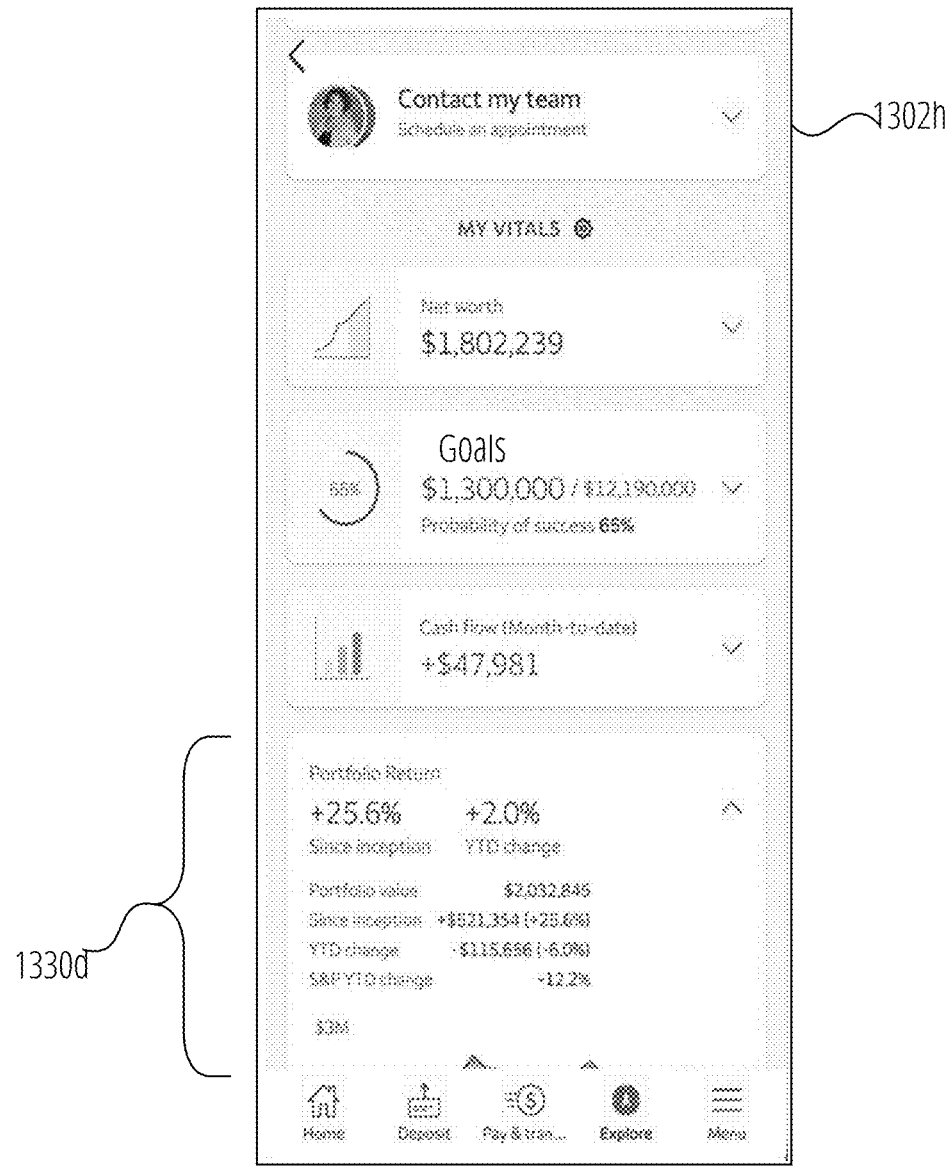

FIGS. 13A-13I illustrate various aspects of a primary user overview GUI 1300 according to one or more embodiments of the current disclosure. The primary user overview GUI 1300 results in an improved user interface for electronic devices at least through the specific manners of providing (e.g., by displaying) a customized PAE experience to a user described below. For example, the primary user overview GUI 1300 may provide a specific improvement over existing systems by displaying customized goal indicators to a user in a customized goals overview along with actionable items generated based on accomplishing at least one of the goals in the customized goals overview. FIG. 13A illustrates GUI view 1302*a* of primary user overview GUI 1300, FIG. 13B illustrates GUI view 1302*b* of primary user overview GUI 1300, FIG. 13C illustrates GUI view 1302*c* of primary user overview GUI 1300, FIG. 13D illustrates GUI view 1302*d* of primary user overview GUI 1300, FIG. 13E illustrates GUI view 1302*e* of primary user overview GUI 1300, FIG. 13F illustrates GUI view 1302*f* of primary user overview GUI 1300, FIG. 13G illustrates GUI view 1302*g* of primary user overview GUI 1300, FIG. 13H illustrates GUI view 1302*h* of primary user overview GUI 1300. In various embodiments, primary user overview GUI 1300 including GUI views 1302*a*, 1302*b*, 1302*c*, 1302*d*, 1302*e*, 1302*f*, 1302*g*, 1302*h*, 1302*i* illustrate various instances of tailored display content 210 generated by user device 204 based on customized experience data 208 provided by PAE system 202. Further, one or more PAE systems, or components thereof, may be utilized to realize the functionality described with respect to FIGS. 13A-13I, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Referring to FIG. 13A, GUI view 1302*a* of primary user overview GUI 1300 includes a goals overview 1304, advice content 1306*a*, and concentric shape visualization icon 1318. The goals overview 1304 includes goal indicators 1310*a*, 1310*b*, 1310*c* and goal creation icon 1334. The advice content 1306*a* includes goal 1312, benefit 1314, action 1316, and options icon 1336. The primary user overview GUI 1300 may be accessed by a user logging into their account, such as a financial services account. In some embodiments, GUI view 1302*a* may represent a home screen, such as a home screen in PAE system application 214.

The goals overview 1304 presents a graphical representation of the goals associated with the user. The goals may include individual and shared goals. The goals overview 1304 includes a visual indication of a number of goals associated with the user. Accordingly, the goals overview 1304 includes three goal indicators 1310*a*, 1310*b*, 1310*c* represented by three regions with lengthened radial lines. Under the radial lines a title of the goal is provided. Thus, goal indicator 1310*a* corresponds to a retirement goal, goal indicator 1310*b* corresponds to a home purchase goal, and goal indicator 1310*c* corresponds to a Kenyan safari goal. Additionally, goals overview 1304 includes goal creation icon 1334, which enables a user to create a new goal. Creation of a new goal is described in more detail below, such as with respect to FIGS. 16A-16J. In some embodiments, selection of the goal creation icon 1334 may cause GUI view 1602*a* of goal creation GUI 1600 in FIG. 16A to be displayed. In various embodiments, goals overview 1304 enables users to readily ascertain and add to their goals as part of their PAE experience.

The advice content 1306*a* includes goal 1312, benefit 1314, action 1316, and options icon 1336. In many embodiments, advice content may include one or more benefits of the advice and one or more actions to obtain the benefits of the advice. Thus, customized PAE experiences provide actionable items for users to obtain, or understand aspects of, their goals. In some embodiments, the action 1316 and the benefit 1314 may be combined into a single element. For example, the benefit 1314 may include a link to the action 1316. In many embodiments, the action 1316 may include a link to internal or external resources, such as calculators, applets, applications, informational resources, videos, and the like. In some embodiments, advice manager 802 may determine the benefit 1314 as output and the experience manager 1202 may construct, or determine, one or more other portions of the advice content 1306*a*, such as based on the benefit 1314.

In the illustrated embodiment, advice content 1306*a* relates to the retirement goal of goal indicator 1310*a*. The advice content 1306*a* suggests that the user benefit by seeing how changing their living expenses affects their probability of successfully achieving their retirement goal. Additionally, the advice content 1306*a* includes a link to visit their 'Explore Zone', which can provide the user with a GUI allowing them to adjust their living expenses and see how it affects their probability of success.

In some embodiments, the PAE system may collect information and feedback through advice content. For example, a user may utilize options icon 1336 to provide explicit feedback on the advice content 1306*a*, such as by dismissing or otherwise indicating the advice content is not relevant. In another example, feedback may be collected based on actions taken with respect to the advice content 1306*a*. For instance, clicking on the action 1316 may provide an implicit indication that the advice content 1306*a* is useful to a user. Further, feedback may be collected based on actions taken subsequent to clicking on the action 1316. For example, visiting the 'Explore Zone' to adjust living expenses and see how it affects probability of success may enable the system to collect information regarding the living expenses of the user. In one such example, the system may determine the user owns a home with a $2600 monthly mortgage payment based on the user providing living expenses information to see how adjustments in living expenses can affect probability of success.

The concentric shape visualization icon 1318 may enable a user to access a concentric shape visualization GUI to gain awareness regarding the impacts of various goals and other users on them. The concentric shape visualization GUI will be described in more detail below, such as with respect to concentric shape visualization GUI 2200 of FIGS. 22A-22G. In these and other ways, primary user overview GUI 1300 may provide an intuitive method for a user to gain situational awareness while also enabling the user to quickly drill down into the details and considerations utilized to provide the situational awareness.

Referring to FIG. 13B, GUI view 1302b of primary user overview GUI 1300 includes one or more portions of GUI view 1302a in addition to advice content 1306b. In various embodiments, GUI view 1302b may be generated and/or displayed in response to horizontally swiping on advice content 1306a in GUI view 1302a. In various such embodiments, one or more items of advice content may be included in a carousel GUI element integrated into the primary user overview GUI 1300. Items of advice content may provide a 'next best action' that is customized for the user. In the illustrated embodiment, the carousel GUI element is located between the "MY NEXT BEST ACTION" and the "MY NETWORK" headings in the primary user overview GUI 1300. More generally, one or more carousel GUI elements may be included in various GUIs and/or GUI views disclosed hereby.

In the illustrated embodiment, advice content 1306b relates to the retirement goal of goal indicator 1310a. The advice content 1306b suggests that the user benefit by seeing their full financial picture to unlock more holistic advice. Additionally, the advice content 1306b includes a link to aggregate their external accounts, which can provide the user with a GUI allowing them to add external accounts, such as via connection manager 1102. As indicated by the benefit of advice content 1306b, adding external accounts can provide the PAE system with additional information that can enable an improved and more customized PAE experience with more holistic advice.

Referring to FIG. 13C, GUI view 1302c of primary user overview GUI 1300 includes one or more portions of GUI view 1302b in addition to service team icon 1320 and status overview 1308 with a status overview settings icon 1322 and status icons 1328a, 1328b, 1328c, 1328d, 1328e (or collectively status icons 1330). In various embodiments, GUI view 1302c may be generated and/or displayed in response to vertically swiping in GUI view 1302b.

The status overview 1308 may include a plurality of numerical values that provide an overview of the financial state of the user. In the illustrated embodiment, the status overview 1308 includes a first status icon 1328a including a net worth value, a second status icon 1328b including an aggregate goals value with an aggregate probability of success, a third status icon 1328c including a cash flow value, a fourth status icon 1328d including a portfolio return value, and fifth status icon 1328e including a credit score.

In various embodiments, one or more values for the status overview 1308 may be generated by resource manager 602. In one embodiment, the goal manager 702 and the resource manager 602 may interact to determine an aggregate goal value and a current progress to the aggregate goal value. In some embodiments, the aggregate probability of success may be generated by insight manager 902. In some such embodiments, the insight manager 902 and one or more of the goal manager 702 and resource manager 602 may interact to determine the aggregate probability of success. A user may customize one or more aspects of the status overview 1308 via the status overview settings icon 1322, such as which values are displayed. Additionally, status overview settings icon 1322 may enable a user to customize one or more aspects of the status details displayed in response to clicking on one of the status icons 1330. In some embodiments, feedback regarding one or more items in the status overview 1308 may be provided via status overview settings icon 1322. The service team icon 1320 may enable a user to schedule an appointment with a service team member.

Referring to FIG. 13D, GUI view 1302d of primary user overview GUI 1300 includes one or more portions of GUI view 1302c in addition to team member details 1326a, team member details 1326b, and appointment scheduling icon 1324. In various embodiments, GUI view 1302d may be generated and/or displayed in response to clicking on the service team icon 1320.

As previously mentioned, clicking on the service team icon 1320 enables a user to schedule an appointment with a service team member. In various embodiments, the team members provided may be automatically selected, such as by matcher 1128, based on user data. For example, geographic location, net worth, age, goals, account types, and the like may be utilized by the PAE system to identify team members that are well suited to servicing the user. Further, the types of team members may be automatically determined based on user data. For example, teams may include investment advisors only when a user has investments accounts of a minimum threshold value. In the illustrated embodiment, the team includes first and second members with team member details 1326a, 1326b, respectively. The first team member includes a financial advisor, and the second team member includes a client associate. The user may select appointment scheduling icon 1324 to create an appointment with a selected advisor. In various embodiments, the user may select one or more of a virtual, in-person, telephone, video conference, email, text appointment with the selected advisor. In many embodiments, scheduling icon 1324 may enable a user to engage with the assistance manager 1110. In one embodiment, the team members included under the service team icon 1320 may be determined, at least in part, by the assistance manager 1110.

Referring to FIG. 13E, GUI view 1302e of primary user overview GUI 1300 includes one or more portions of GUI view 1302c in addition to status details 1330a. In various embodiments, GUI view 1302e may be generated and/or displayed in response to clicking on the status icon 1328a. The status details 1330a include a detailed view of net worth for the user. In the illustrated embodiment, the status details 1330a include a graph of the net worth, assets, and debts of the user over time. In some embodiments, status details 1330a may be generated by experience manager 1202 based on values provided by resource manager 602. Additionally, the status details 1330a may include a link to view all accounts utilized to calculate the net worth of the user. In this and other ways, primary user overview GUI 1300 may provide an intuitive method of gaining an overview of the situation of the user while also enabling the user to quickly drill down into the details and considerations used in producing the overview.

Referring to FIG. 13F, GUI view 1302f of primary user overview GUI 1300 includes one or more portions of GUI view 1302c in addition to status details 1330b with goals 1332a, 1332b. In various embodiments, GUI view 1302f may be generated and/or displayed in response to clicking on the status icon 1328b. In this and other ways, primary user overview GUI 1300 may provide an intuitive method of gaining an overview of the situation of the user while also enabling the user to quickly drill down into the details and considerations used in producing the overview. In the illustrated embodiment, the status details 1330b include a current progress, a value, a probability of success, and an anticipated completion date is provided for each of goals 1332a, 1332b. Additionally, clicking on a specific goal may link to more details on the goal.

Referring to FIG. 13G, GUI view 1302g of primary user overview GUI 1300 includes one or more portions of GUI view 1302c in addition to status details 1330c. In various embodiments, GUI view 1302g may be generated and/or displayed in response to clicking on the status icon 1328c. The status details 1330c include a detailed view of cash flow for the user. In the illustrated embodiment, the status details 1330c include a graph of the cash flow, including inflows and outflows, of the user over time. In some embodiments, status details 1330c may be generated by experience manager 1202 based on values provided by resource manager 602. Additionally, the status details 1330c may include a link to view details used to calculate the cash flow of the user. In this and other ways, primary user overview GUI 1300 may provide an intuitive method of gaining an overview of the situation of the user while also enabling the user to quickly drill down into the details and considerations used in producing the overview.

Referring to FIG. 13H, GUI view 1302h of primary user overview GUI 1300 includes one or more portions of GUI view 1302c in addition to status details 1330d. In various embodiments, GUI view 1302h may be generated and/or displayed in response to clicking on the status icon 1328d. In this and other ways, primary user overview GUI 1300 may provide an intuitive method of gaining an overview of the situation of the user while also enabling the user to quickly drill down into the details and considerations used in producing the overview. In the illustrated embodiment, the status details 1330d include a return since inception, a year-to-date change, a portfolio value, a change in value since inception, a year-to-date change in value, and the year-to-date change of a benchmark.

Figure 13I:
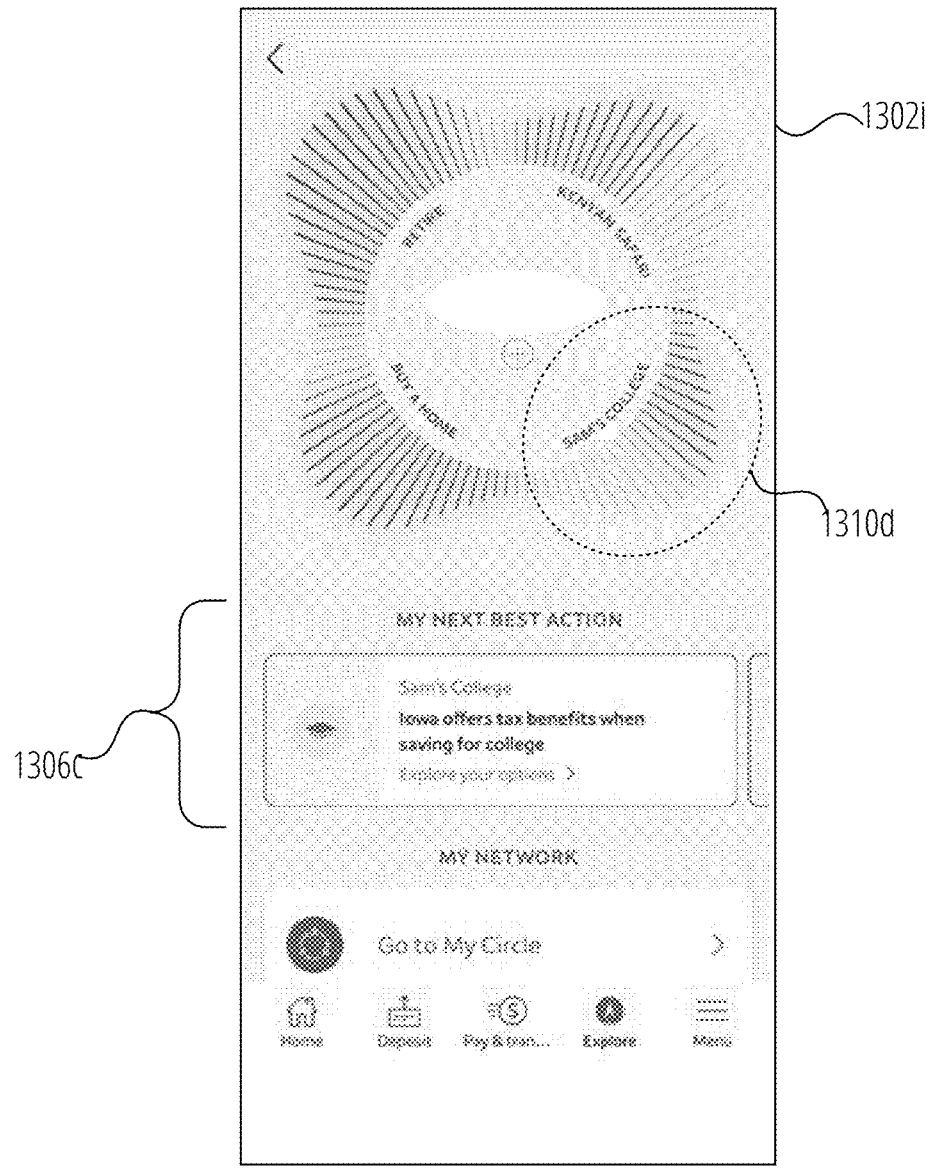

Referring to FIG. 13I, GUI view 1302i of primary user overview GUI 1300 includes one or more portions of GUI view 1302a with the addition of goal indicator 1310d to goals overview 1304 and advice content 1306c in place of advice content 1306a. The addition of goal indicator 1310d may result from the creation of a new goal of college savings for a dependent titled "Sam's College" as will be described in more detail below, such as with respect to FIGS. 16A-16J. For example, goal indicator 1310d may be generated in primary user overview GUI 1300 in response to clicking the creation confirmation icon 1634 in GUI view 1602j of goal creation GUI 1600.

In the illustrated embodiment, advice content 1306c relates to the new goal of college savings for a dependent. The advice content 1306c suggests that the user benefit from tax benefits offered by Iowa when saving for college. The advice content 1306c may be determined by the PAE system, at least in part, based on user data indicating that the user lives in Iowa. Additionally, the advice content 1306c includes a link to explore options to obtain the tax benefits. For example, the link may take a user to an application to obtain the tax benefits. In some embodiments, the system may populate one or more portions of the application based on user data. In various embodiments, a user must grant the PAE system with permission to populate external interfaces (e.g., the application to obtain tax benefits located on a site provided by Iowa). For example, a user may grant the PAE system with the appropriate permissions via account manager 402.

Figure 14B:
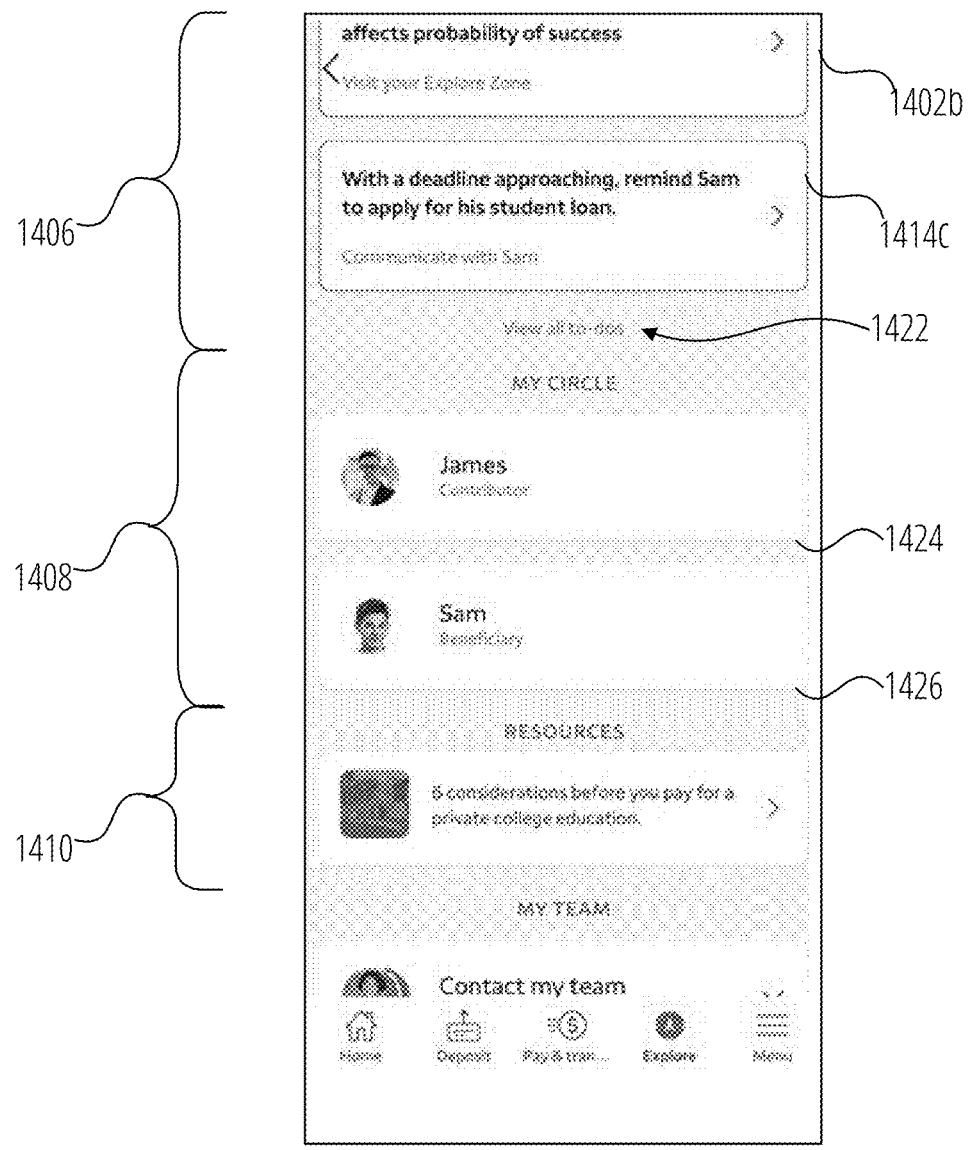

FIGS. 14A and 14B illustrate various aspects of a shared goal detail GUI 1400 according to one or more embodiments of the current disclosure. The shared goal detail GUI 1400 results in an improved user interface for electronic devices at least through the specific manners of providing (e.g., by displaying) a customized PAE experience to a user described below. For example, the shared goal detail GUI 1400 may provide a specific improvement over existing systems by displaying a collaborative status of a shared goal in conjunction with a probability of success and a task list with actionable items for accomplishing the shared goal. FIG. 14A illustrates GUI view 1402a of shared goal detail GUI 1400 and FIG. 14B illustrates GUI view 1402b of shared goal detail GUI 1400. In various embodiments, shared goal detail GUI 1400 including GUI views 1402a, 1402b illustrate various instances of tailored display content 210 generated by user device 204 based on customized experience data 208 provided by PAE system 202. Further, one or more PAE systems, or components thereof, may be utilized to realize the functionality described with respect to FIGS. 14A and 14B, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Referring to FIG. 14A, GUI view 1402a of shared goal detail GUI 1400 includes a collaborative status 1404, a task list 1406, and a probability of success 1412 for the shared goal 1428. The task list 1406 includes collaborative task 1414a with benefit 1416a, associated user 1418a, and action 1420a and collaborative task 1414b with benefit 1416b, associated user 1418b, and action 1420b. The primary user overview shared goal detail GUI 1400 may be accessed by clicking on goal indicator 1310d in GUI view 1302i of primary user overview GUI 1300 or by clicking on goal 1332b in GUI view 1302f of primary user overview GUI 1300.

The collaborative status 1404 may include a current progress, a goal value, and an anticipated target completion date for the shared goal 1428. In the illustrated embodiment, the anticipated target completion data includes a range of dates for completion of the goal. In the range of dates for completion of the goal, the soonest completion date may correspond to optimal performance of the goal and the latest completion data may correspond to suboptimal performance of the goal.

The task list 1406 may include the most relevant tasks (e.g., based on urgency) associated with the shared goal 1428. All tasks associated with the shared goal 1428 may be viewed by clicking on the task detail icon 1422 shown in GUI view 1402b of FIG. 14B. These tasks may correspond to advice content generated by the advice manager 802. Accordingly, each task may include a benefit and an action. Further, each task may be either a collaborative task or an individual task. Collaborative tasks may require actions, or result in adjustments of the currently required actions, from one or more other users in addition to the user, while individual tasks may only require actions, or result in adjustments of the current required actions, from the user. The task list 1406 includes collaborative tasks 1414a, 1414b in GUI view 1402a and individual task 1414c in GUI view 1402b.

The collaborative task 1414*a* includes benefit 1416*a* of helping Sam get a head start on building credit by cosigning for a credit card and actions 1420*a* of viewing available options. The collaborative task 1414*a* may be considered a collaborative task because it requires Sam to apply for the credit card. Accordingly, the associated user 1418*a* is Sam.

The collaborative task 1414*b* includes benefit 1416*b* of seeing how adjusting the funding sources for the shared goal affects probability of success and action 1420*b* of visiting the 'Explore Zone', which can provide the user with a GUI allowing them to adjust the funding sources for the shared goal and see how it affects the probability of success for the shared goal. The collaborative task 1414*b* may be considered a collaborative task because it may result in adjustments of the currently required contributions by the associated user 1418*b* to the shared goal 1428.

Referring to FIG. 14B, GUI view 1402*b* of shared goal detail GUI 1400 includes one or more portions of GUI view 1402*a* in addition to user group 1408, advice content 1410, as well as individual task 1414*c* and task detail icon 1422 in place of collaborative task 1414*a* and collaborative task 1414*b* in task list 1406. The user group 1408 includes contributor 1424 and beneficiary 1426. In various embodiments, GUI view 1402*b* may be generated and/or displayed in response to vertically swiping in GUI view 1402*a*.

In GUI view 1402*b*, task list 1406 includes individual task 1414*c*. Individual task 1414*c* includes a benefit of reminding Sam to apply for a student loan and an action of communicating with Sam. The individual task 1414*c* may be considered an individual task because providing a reminder to another user does not require any action or adjust any required action of the other user.

The user group 1408 includes the different members of the shared goal. In the illustrated embodiment, user group 1408 includes the contributor 1424 James and the beneficiary 1426 Sam. It will be appreciated that any number of contributors and/or beneficiaries may be associated with a shared goal.

The advice content 1410 may include educational resources and considerations regarding the shared goal 1428. The task list 1406 and advice content 1410 illustrate alternative formats for displaying messaging including advice and insights. In some embodiments, the six considerations indicated in advice content 1410 may be presented in a carousel GUI element.

Figure 15A:
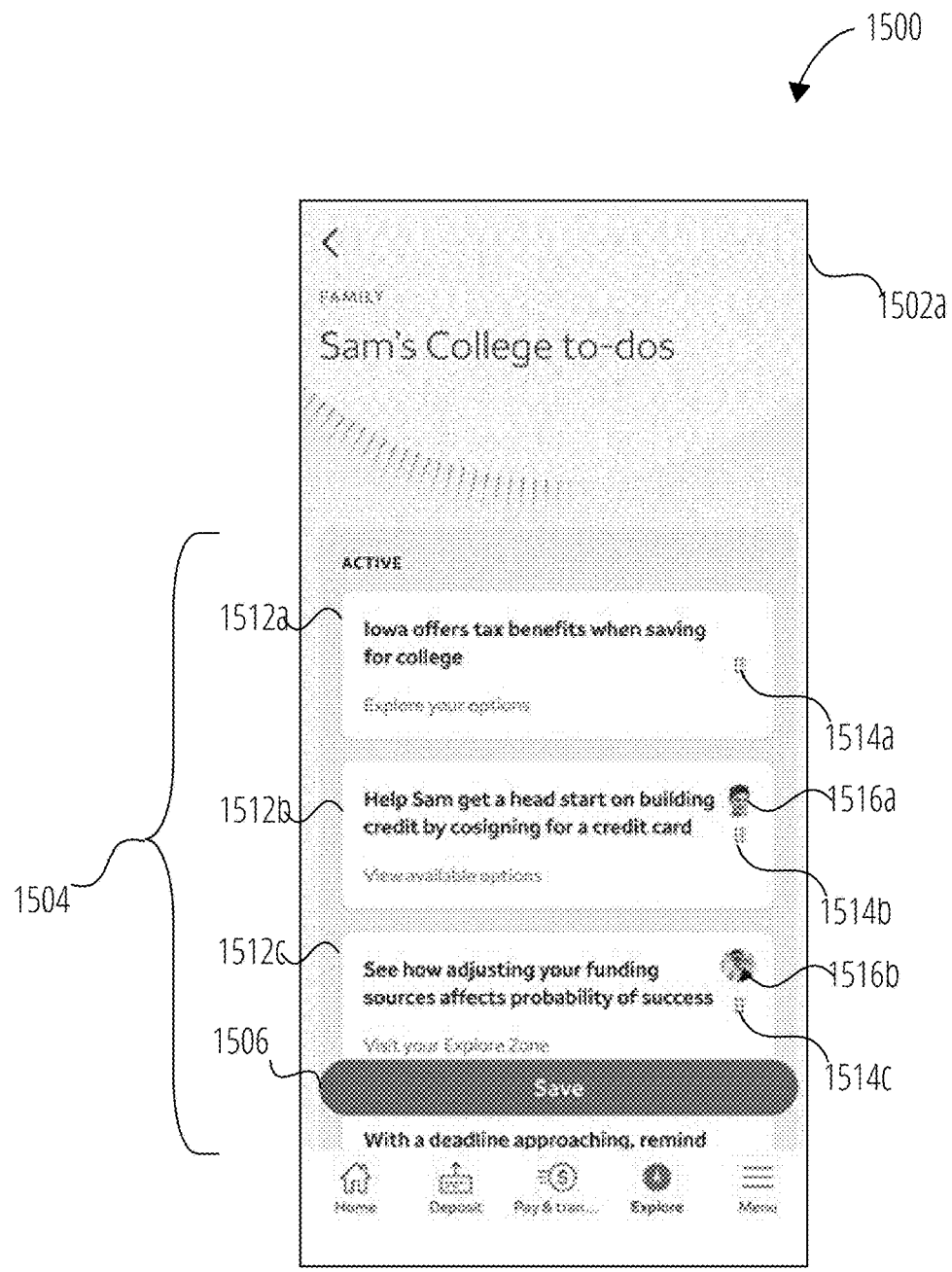
FIGS. 15A and 15B illustrate various aspects of a tasks detail GUI according to one or more embodiments of the current disclosure.
Figure 15B:
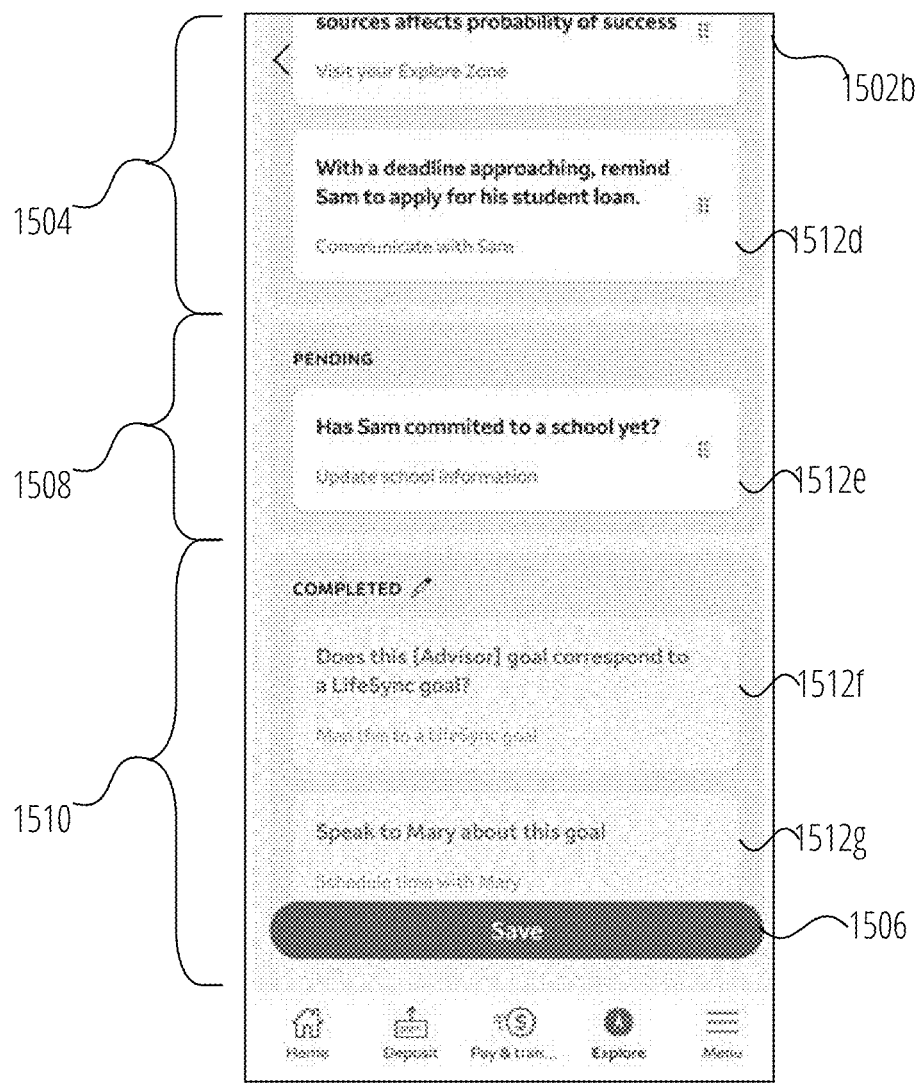

FIGS. 15A and 15B illustrate various aspects of a tasks detail GUI 1500 according to one or more embodiments of the current disclosure. The tasks detail GUI 1500 results in an improved user interface for electronic devices at least through the specific manners of providing (e.g., by displaying) a customized PAE experience to a user described below. For example, the tasks detail GUI 1500 may provide a specific improvement over existing systems by displaying active, pending, and completed shared goal task lists in conjunction with the ability to reprioritize each of the active and pending shared goal tasks along with indications of associated users for the various tasks. FIG. 15A illustrates GUI view 1502*a* of tasks detail GUI 1500 and FIG. 15B illustrates GUI view 1502*b* of tasks detail GUI 1500. In various embodiments, tasks detail GUI 1500 including GUI views 1502*a*, 1502*b* illustrate various instances of tailored display content 210 generated by user device 204 based on customized experience data 208 provided by PAE system 202. Further, one or more PAE systems, or components thereof, may be utilized to realize the functionality described with respect to FIGS. 15A and 15B, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Referring to FIG. 15A, GUI view 1502*a* of tasks detail GUI 1500 includes an active shared goal task list 1504 and a change confirmation icon 1506. The active shared goal task list 1504 includes task 1512*a* with relocation icon 1514*a*, task 1512*b* with relocation icon 1514*b* and associated user 1516*a*, and task 1512*c* with relocation icon 1514*c* and associated user 1516*b*. In various embodiments, GUI view 1502*a* may be generated and/or displayed in response to clicking on task detail icon 1422 in GUI view 1402*b* of shared goal detail GUI 1400.

In various embodiments, tasks may be reprioritized by clicking and dragging on the corresponding relocation icon. Changes can be saved by clicking on the change confirmation icon 1506.

Referring to FIG. 15B, GUI view 1502*b* of tasks detail GUI 1500 includes one or more portions of GUI view 1502*a* in addition to task 1512*d* in place of tasks 1512*a*, 1512*b*, 1512*c* in active shared goal task list 1504, a pending shared goal task list 1508 with task 1512*e*, and completed shared goal task list 1510 with tasks 1512*f*, 1512*g*. In various embodiments, GUI view 1502*b* may be generated and/or displayed in response to vertically swiping in GUI view 1502*a*.

In some embodiments, pending shared goal task list 1508 includes tasks that require completion by another user. In the illustrated embodiment, the task 1512*e* requires that Sam commit to a school. In response to Sam committing to a school, school information may be updated. The updated school information may be utilized to generate additional tasks and/or refine existing tasks. For example, the system may determine an annual cost of the school and use the annual cost of the school to update one or more aspects of the goal and/or corresponding tasks, such as the required contributions for the goal. More generally, performance of one or more actions related to advice content, such as tasks, can cause the system to update, modify, or generate new user data, probabilities of success, insights, messages, and/or advice content. In various embodiments, user data may refer to any data that is associated with the user, such as data in one or more of user account 404, user profile 504, shared goal data object 704, user activity dataset 1004, and user connection data 1104.

The completed shared goal task list 1510 include shared goal tasks that have already been complete. In some embodiments, a completion date for each task in the completed shared goal task list 1510 may be included. In various embodiments, the completion date for one or more tasks may be compared to the target completion date for the one or more tasks to update the collaborative status, target date, and/or probability of success.

Figure 16H:
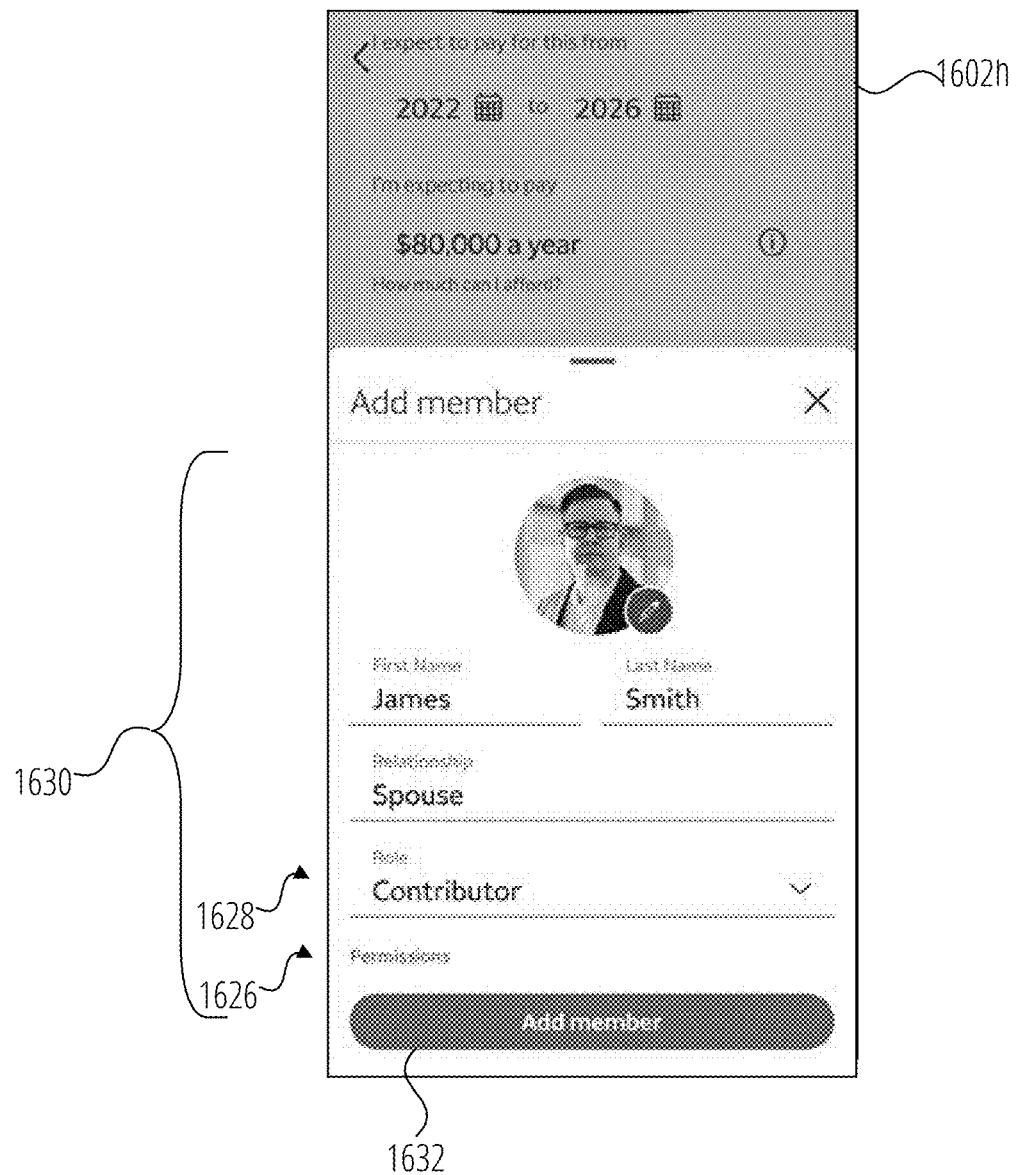
Figure 16I:
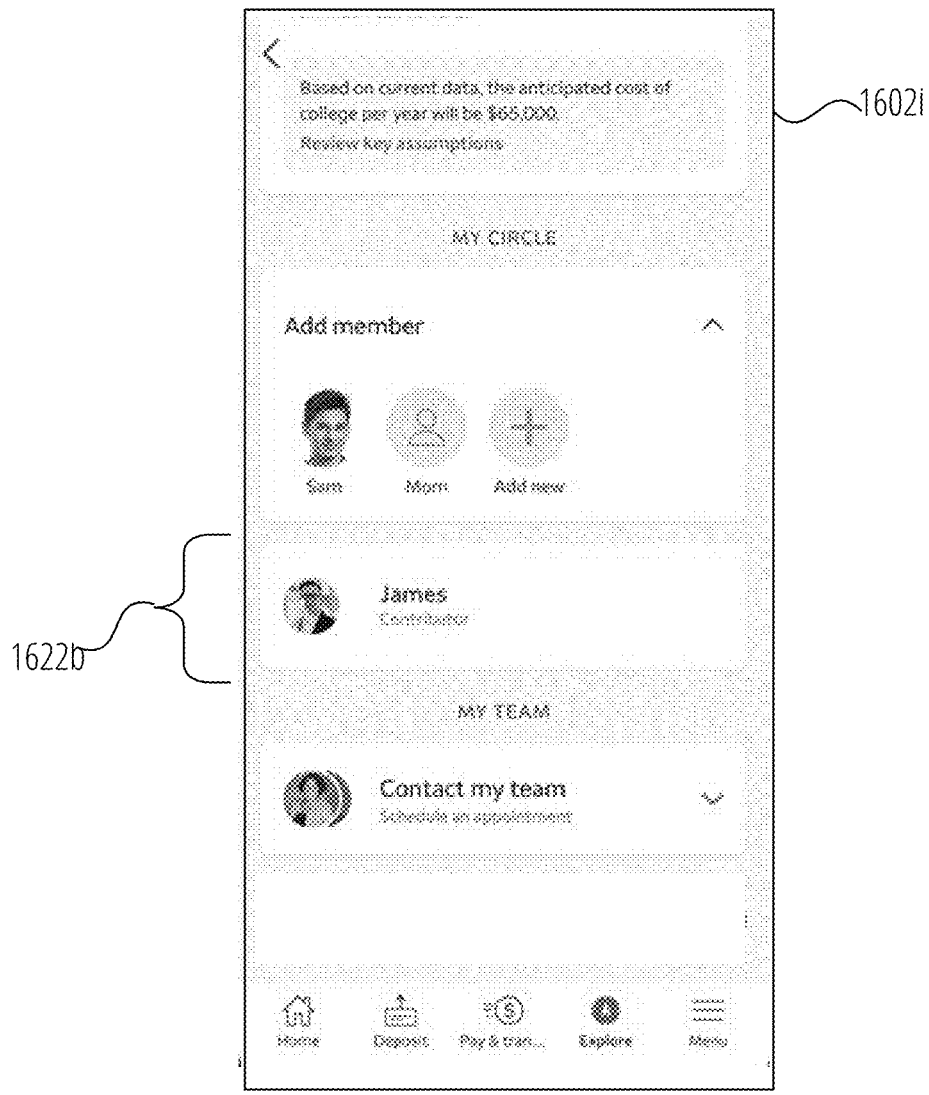
Figure 16J:
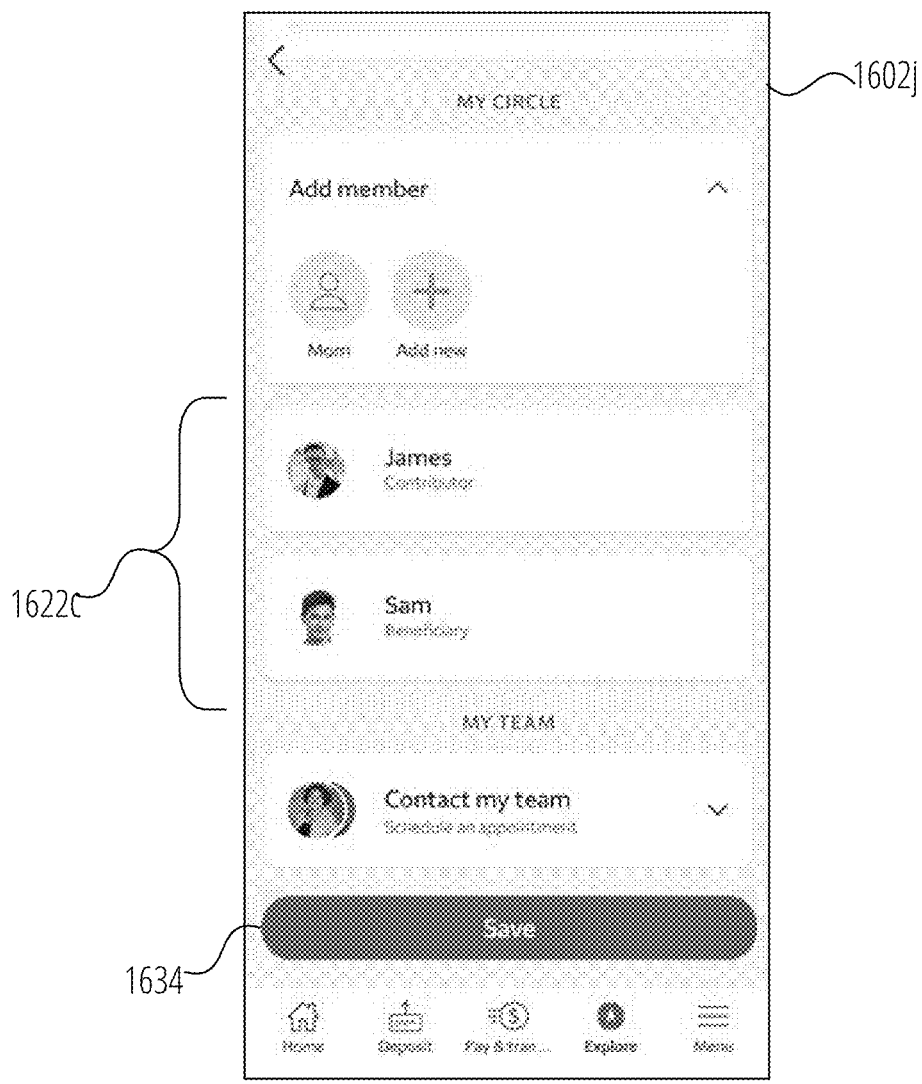

FIGS. 16A-16J illustrate various aspects of a goal creation GUI 1600 according to one or more embodiments of the current disclosure. The goal creation GUI 1600 results in an improved user interface for electronic devices at least through the specific manners of providing (e.g., by displaying) a customized PAE experience to a user described below. For example, the goal creation GUI 1600 may provide a specific improvement over existing systems by providing a guided process with customized insights and advice for creating a shared goal aligned with the values and capabilities of a user. FIG. 16A illustrates GUI view 1602*a* of goal creation GUI 1600, FIG. 16B illustrates GUI view 1602*b* of goal creation GUI 1600, FIG. 16C illustrates GUI view 1602c of goal creation GUI 1600, FIG. 16D illustrates GUI view 1602d of goal creation GUI 1600, FIG. 16E illustrates GUI view 1602e of goal creation GUI 1600, FIG. 16F illustrates GUI view 1602f of goal creation GUI 1600, FIG. 16G illustrates GUI view 1602g of goal creation GUI 1600, FIG. 16H illustrates GUI view 1602h of goal creation GUI 1600, FIG. 16I illustrates GUI view 1602i of goal creation GUI 1600, and FIG. 16J illustrates GUI view 1602j of 1600. In various embodiments, goal creation GUI 1600 including GUI views 1602a, 1602b, 1602c, 1602d, 1602e, 1602f, 1602g, 1602h, 1602i, 1602j illustrate various instances of tailored display content 210 generated by user device 204 based on customized experience data 208 provided by PAE system 202. Further, one or more PAE systems, or components thereof, may be utilized to realize the functionality described with respect to FIGS. 16A-16J, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Referring to FIG. 16A, GUI view 1602a of goal creation GUI 1600 includes an advice content 1604 and goal selection icons 1606 with existing goals 1608a, 1608b. In various embodiments, GUI view 1602a may be generated and/or displayed in response to clicking on goal creation icon 1334 in GUI view 1302a of primary user overview GUI 1300.

Advice content 1604 includes suggested goals for the user (or primary user or shared goal creator). In various embodiments, the suggested goals for the user may be based on one or more items of user data, such as client data 510, account data 512, life event data 514, relationship data 516, and/or goal data 518 in user profile 504. For example, suggested goals may be based, at least in part, on recently completed goals and existing goals. In another example, if user data indicates that a user does not have an estate plan and/or if the user is above a threshold age, then a suggested goal may include legacy and estate plans. In the illustrated embodiment, the suggested goals in advice content 1604 include a dream or major purchase and legacy and estate plans. In various embodiments, the information provided via the goal creation GUI 1600 may be utilized, such as by goal manager 702, to create a shared goal data object 704.

Goal selection icons 1606 include the goals available to a user. Additionally, GUI view 1602a may include a search bar for finding goals. In some embodiments, users may create custom goals of any type. Also, generic goals may be further defined. For example, a generic goal of providing for education may be further defined as providing for Sam's college. In goal selection icons 1606, existing goals of the user may be indicated, such as via a box, as shown for existing goals 1608a, 1608b, 1608c. Accordingly, goals without a box may be selectable by the user. In the illustrated embodiment, goals are grouped by different goal types. As shown in FIGS. 16A-16D, the goal types may include living, working, managing, family, and values. Exemplary living type of goals include Kenyan safari, provide for my lifestyle, buy a home, and prepare for the unexpected. Exemplary working type goals include retire, prepare for a career change, start, or buy a business, and manager or transition a business. Exemplary managing type goals include build and protect wealth, manage credit, manage debt, tax planning strategies, and manage spending. Exemplary family type goals include family support, provide for education, caring for life events, and health care. Exemplary values type goals include giving and philanthropy, environmental, social, and governance investing, providing for peace of mind, and legacy and estate plans.

Referring to FIG. 16B, GUI view 1602b of goal creation GUI 1600 includes one or more portions of GUI view 1602a with a different set of icons shown in goal selection icons 1606 including existing goal 1608c. In various embodiments, GUI view 1602b may be generated and/or displayed in response to vertically swiping in GUI view 1602a.

Referring to FIG. 16C, GUI view 1602c of goal creation GUI 1600 includes one or more portions of GUI view 1602b with a different set of icons shown in goal selection icons 1606. In various embodiments, GUI view 1602c may be generated and/or displayed in response to vertically swiping in GUI view 1602b.

Referring to FIG. 16D, GUI view 1602d of goal creation GUI 1600 includes one or more portions of GUI view 1602c with a different set of icons shown in goal selection icons 1606 including new goal selection 1610 in addition to selection confirmation icon 1612. In various embodiments, GUI view 1602d may be generated and/or displayed in response to vertically swiping in GUI view 1602c. In the illustrated embodiment, the user selects new goal selection 1610 for the new goal. In various embodiments, selection confirmation icon 1612 may be generated and/or displayed in response to clicking on new goal selection 1610.

Referring to FIG. 16E, GUI view 1602e of goal creation GUI 1600 includes potential goal objectives 1614. In some embodiments, GUI view 1602e may be generated and/or displayed in response to clicking on the selection confirmation icon 1612 in GUI view 1602d. In GUI view 1602e, the user may further define aspects of the goal. In the illustrated embodiment, the user has added the title 'Sam's college' to the goal. Further, the user has identified pay for an undergraduate degree as the goal objective from the potential goal objectives 1614. In various embodiments, objectives data 716 of shared goal data object 704 may be generated, at least in part, based on the identified objective.

The potential goal objectives 1614 for the provide for education goal includes pay for an undergraduate degree, pay for a graduate degree, pay for an educational program, and other. In various embodiments, potential goal objectives 1614 may provide common objectives associated with the selected goal. Additionally, potential goal objectives 1614 may allow the user to define the goal objective, such as by selecting other. Further, the potential goal objectives 1614 may enable the user to identify a particular school/facility for the goal. In some embodiments, one or more aspects of the goal, such as corresponding tasks, insights, and advice, may be determined, or further defined, based on identification of the particular school/facility for the goal. For example, a goal value and/or probability of success may be determined based, at least in part, on the particular school/facility for the goal.

Referring to FIG. 16F, GUI view 1602f of goal creation GUI 1600 includes time horizon 1616, resource demand 1618, insight content 1620, and user group 1622a including no users. In various embodiments, GUI view 1602f may be generated and/or displayed in response to vertically swiping in GUI view 1602e. In GUI view 1602f, the user may further define aspects of the goal. More specifically, the user may provide, or define, the time horizon 1616, resource demand 1618, and user group 1622a. In many embodiments, the user may define a total resource demand for the shared goal (e.g., resource demand 1618) as well as defining themselves as a beneficiary or a contributor along with a corresponding benefit or commitment, respectively. In various embodiments, time horizon data 720 of shared goal data object 704 may be generated, at least in part, based on the provided time horizon 1616. Similarly, resource demand data 718 of shared goal data object 704 may be generated, at least in part, based on the provided resource demand 1618. Further, user data 722 of shared goal data object 704 may be generated, at least in part, based on the provided user group 1622c.

Additionally, insight content 1620 may be provided to assist the user in further defining aspects of the goal. In various embodiments, the insight manager 902 may generate insight content 1620. Insight content 1620 may also include a link to review the assumptions that were used to generate the insight. In many embodiments, the assumptions may be generated by assumption generator 908 of insight manager 902. In the illustrated embodiment, insight content 1620 includes the anticipated cost of the school per year, which is determined based on identification of the particular school/facility in GUI view 1602e. Additionally, an amount the user can afford, or a link thereto, may be provided. The amount the user can afford may be determined based on the resources of the user, such as the resources determined by resource manager 602.

Referring to FIG. 16G, GUI view 1602g of goal creation GUI 1600 includes one or more portions of GUI view 1602h in addition to potential group members 1624. In various embodiments, GUI view 1602g may be generated and/or displayed in response to vertically swiping and/or clicking on 'Add member' in GUI view 1602f. In some embodiments, potential group members 1624 include suggested group members, such as determined by advice manager 802 or insight manager 902 based on data regarding the primary user. For example, relationship data 516 in user profile 504, shared goal data objects 704 associated with other goals, and/or user connection data 1104 may be used to determine potential group members 1624.

Referring to FIG. 16H, GUI view 1602h of goal creation GUI 1600 includes one or more portions of GUI view 1602g in addition to user details 1630 and addition confirmation icon 1632. In various embodiments, GUI view 1602h may be generated and/or displayed in response to clicking on the 'James' icon of the potential group members 1624 in GUI view 1602g. The user details 1630 includes user classification 1628 and permissions icon 1626. In several embodiments, the user details 1630 are set by the primary user.

The user classification 1628 may be used to define the roles of members being added to the user group 1622c. In the illustrated embodiment, 'James' is being added to the user group 1622a as a contributor. In various embodiments, in response to identifying 'James' as a contributor may cause the system to request a commitment from 'James' to be defined. For example, the commitment from 'James' may include an amount and/or frequency of a monetary contribution towards the goal. However, commitments and benefits are not necessarily monetary and may include anything that can be contributed or received. For example, commitments may include time, skills, services, and the like. In another example, benefits may include education, a car, lessons, and the like. In some embodiments, role data for each user associated with the shared goal may be stored in user data 722 of shared goal data object 704. The permissions icon 1626 may be used to set permissions (e.g., read and/or write) associated with the shared goal. In some embodiments, permissions data for each user associated with the shared goal may be stored in user data 722 of shared goal data object 704.

Referring to FIG. 16I, GUI view 1602i of goal creation GUI 1600 includes one or more portions of GUI view 1602g with user group 1622b including one member. In some embodiments, GUI view 1602i may be generated and/or displayed in response to selection of the addition confirmation icon 1632 in GUI view 1602h.

Referring to FIG. 16J, GUI view 1602j of goal creation GUI 1600 includes one or more portions of GUI view 1602g with user group 1622c including two members and creation confirmation icon 1634. In various embodiments, GUI view 1602j may be generated and/or displayed in response to adding 'Sam' from the potential group members 1624 in a manner that is the same or similar as described with respect to the addition of the first member to user group 1622b. In some embodiments, one or more of GUI view 1302i of FIG. 13I, GUI view 1702a of OS GUI 1700a, and GUI view 1702b of OS GUI 1700b may be generated and/or displayed in response to selection of the creation confirmation icon 1634 in GUI view 1602j of goal creation GUI 1600. Further, creation of the shared goal data object 704 and/or the storing of data therein, may not occur until the creation confirmation icon 1634 is selected.

Figure 17B:
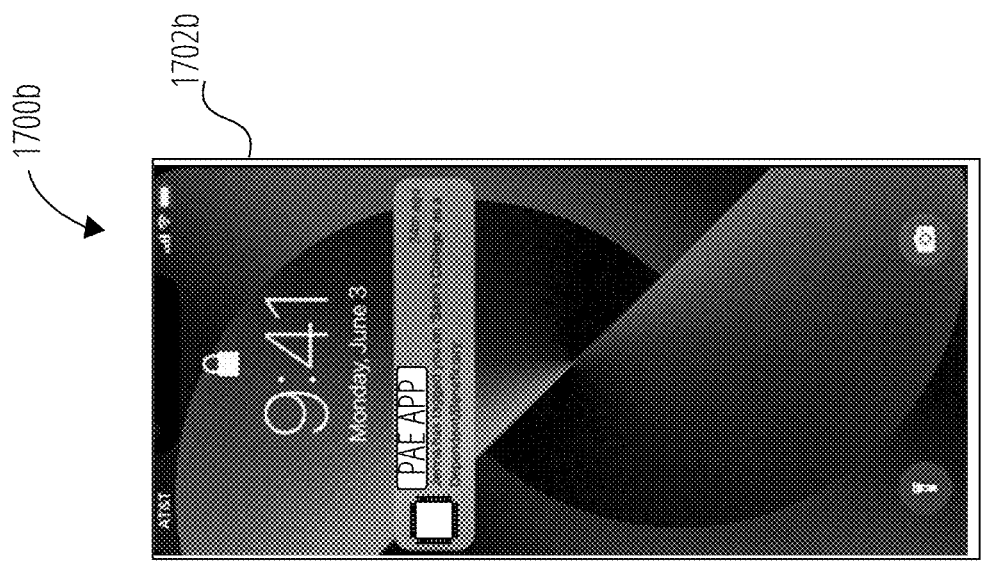
FIGS. 17A and 17B illustrate various aspects of an operating system (OS) GUI according to one or more embodiments of the current disclosure.
Figure 17A:
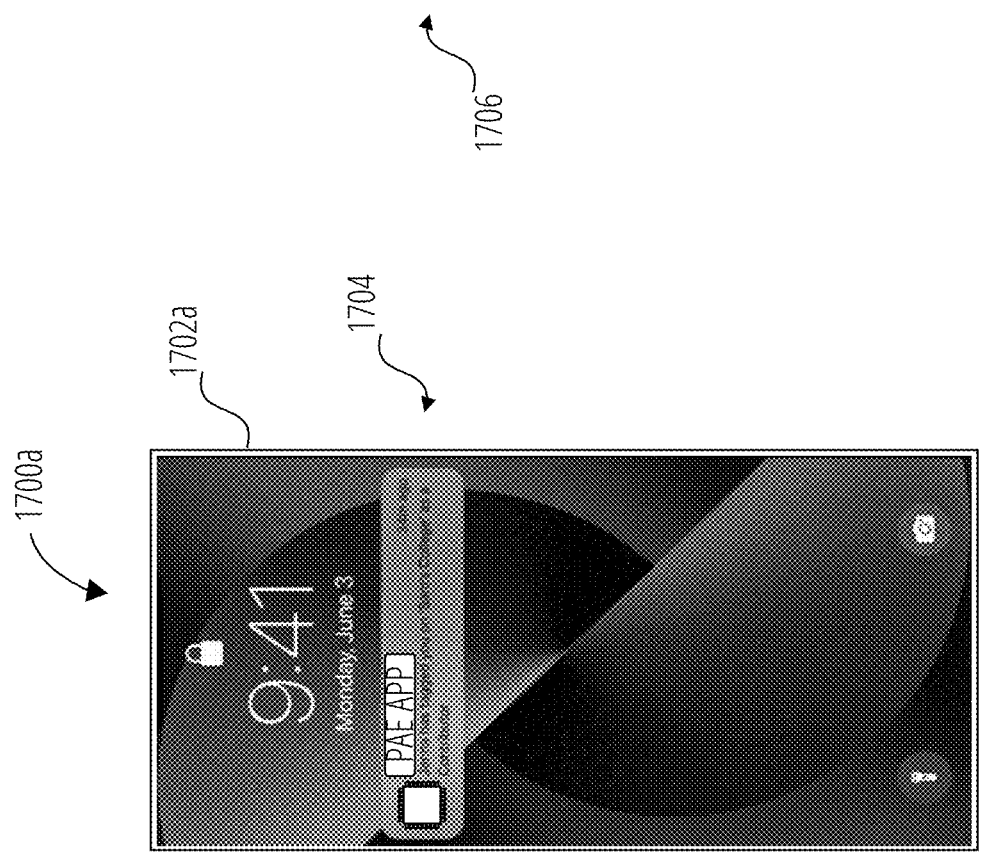

FIGS. 17A and 17B illustrate various aspects of an operating system (OS) GUIs 1700a, 1700b according to one or more embodiments of the current disclosure. The OS GUIs 1700a, 1700b result in improved user interfaces for electronic devices at least through the specific manners of providing (e.g., by displaying) a customized PAE experience to a user described below. For example, OS GUI 1700a may provide a specific improvement over existing systems by automatically displaying a contributor request notification for a shared goal in a lock screen of an operating system on a device of a user based on creation of a shared goal and tagging of the user as a contributor for the shared goal by another user on a different device. In another example, OS GUI 1700b may provide a specific improvement over existing systems by automatically displaying a beneficiary request notification for a shared goal in a lock screen of an operating system on a device of a user based on creation of a shared goal and tagging of the user as a beneficiary for the shared goal by another user on a different device. FIG. 17A illustrates GUI view 1702a of OS GUI 1700a and FIG. 17B illustrates GUI view 1702b of OS GUI 1700b. In various embodiments, OS GUIs 1700a, 1700b including GUI views 1702a, 1702b illustrate various instances of tailored display content 210 generated by the operating system 216 of user device 204 based on customized experience data 208 provided by PAE system 202. Further, one or more PAE systems, or components thereof, may be utilized to realize the functionality described with respect to FIGS. 17A and 17B, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Referring to FIG. 17A, GUI view 1702a of OS GUI 1700a includes contributor request notification 1704. In various embodiments, GUI view 1702a of OS GUI 1700a may be generated and/or displayed on a device associated with a contributor (e.g., contributor 1424 of FIG. 14B) to the goal created in response to selection of the creation confirmation icon 1634 in GUI view 1602j of goal creation GUI 1600. In various embodiments, the contributor request notification 1704 includes a name of the person that tagged the receiver (e.g., the shared goal creator), a name of the shared goal, and an indication of the role of the receiver with respect to the shared goal. Further, the contributor request notification 1704 may be structured as a statement. Accordingly, in the illustrated embodiment, contributor request notification 1704 states "Jenna has tagged you on 'Sam's College' as a Contributor". In some embodiments, such as when the person tagged does not have a PAE system account, the contributor request notification 1704 may be provided in an email, paper mail, an automated call, and the like. In some such embodiments, the contributor request notification 1704 may include a link to create a PAE system account.

Referring to FIG. 17B, GUI view 1702b of OS GUI 1700b includes beneficiary request notification 1706. In various embodiments, GUI view 1702b of OS GUI 1700b may be generated and/or displayed on a device associated with a beneficiary (e.g., beneficiary 1426 of FIG. 14B) to the goal created in response to selection of the creation confirmation icon 1634 in GUI view 1602j of goal creation GUI 1600. In many embodiments, the beneficiary request notification 1706 includes a name of the person that tagged the receiver (e.g., the shared goal creator), a name of the shared goal, and an indication of the role of the receiver with respect to the shared goal. Further, the beneficiary request notification 1706 may be structured as a statement. Accordingly, in the illustrated embodiment, beneficiary request notification 1706 states "Jenna has tagged you on 'Sam's College' as a Dependent/Beneficiary". In various embodiments, such as when the person tagged does not have a PAE system account, the contributor beneficiary request notification 1706 may be provided in an email, paper mail, an automated call, and the like. In some such embodiments, the contributor request notification 1704 may include a link to create a PAE system account.

Figure 18A:
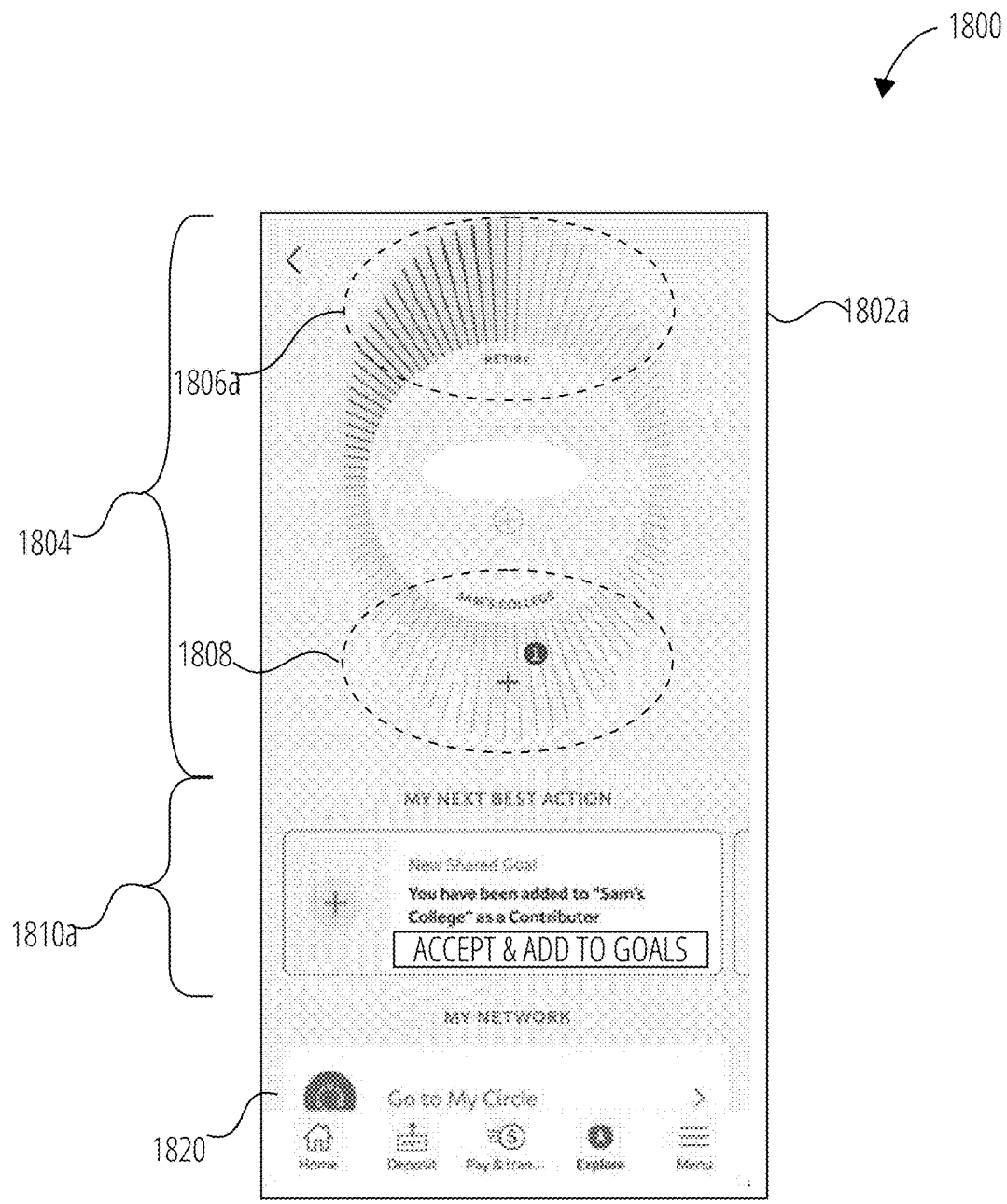
FIGS. 18A-18D illustrate various aspects of a contributor overview GUI according to one or more embodiments of the current disclosure.
Figure 18B:
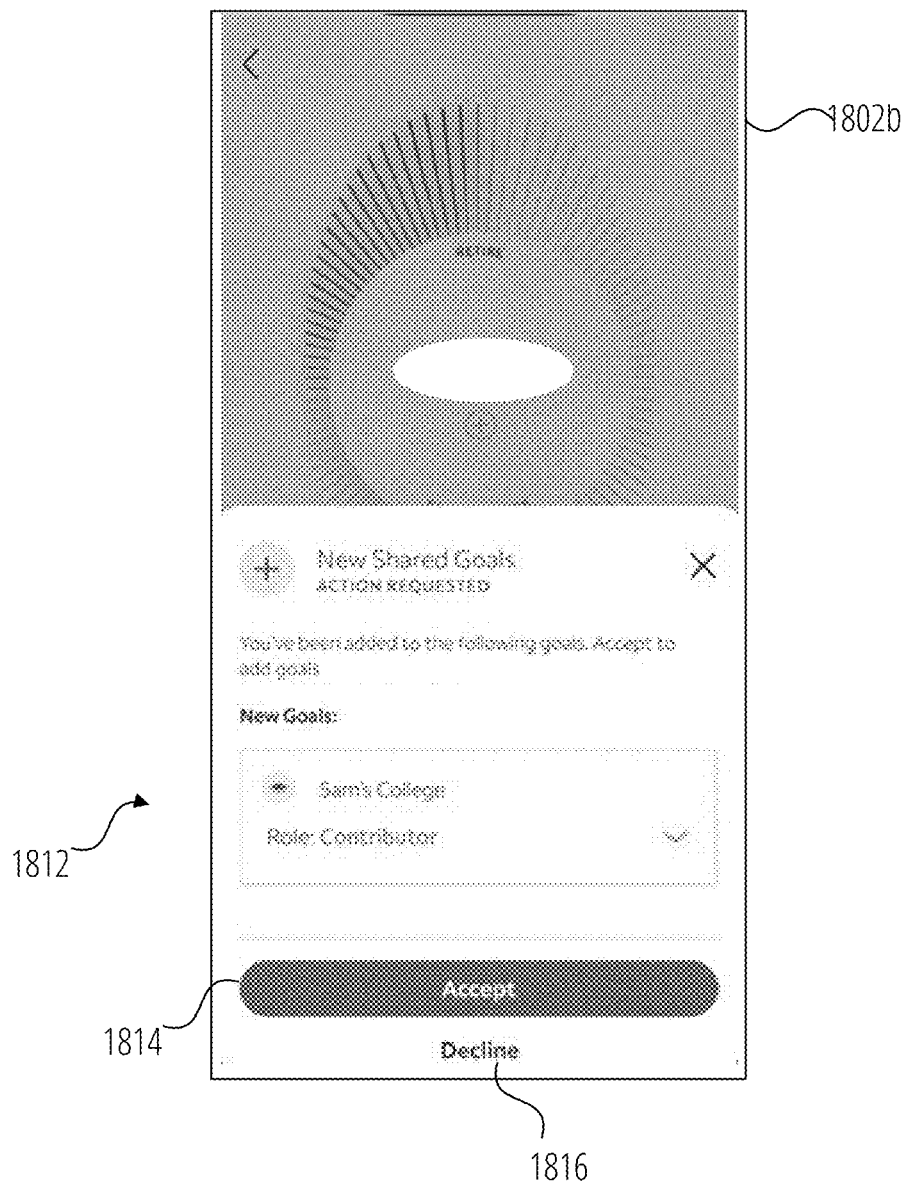
Figure 18C:
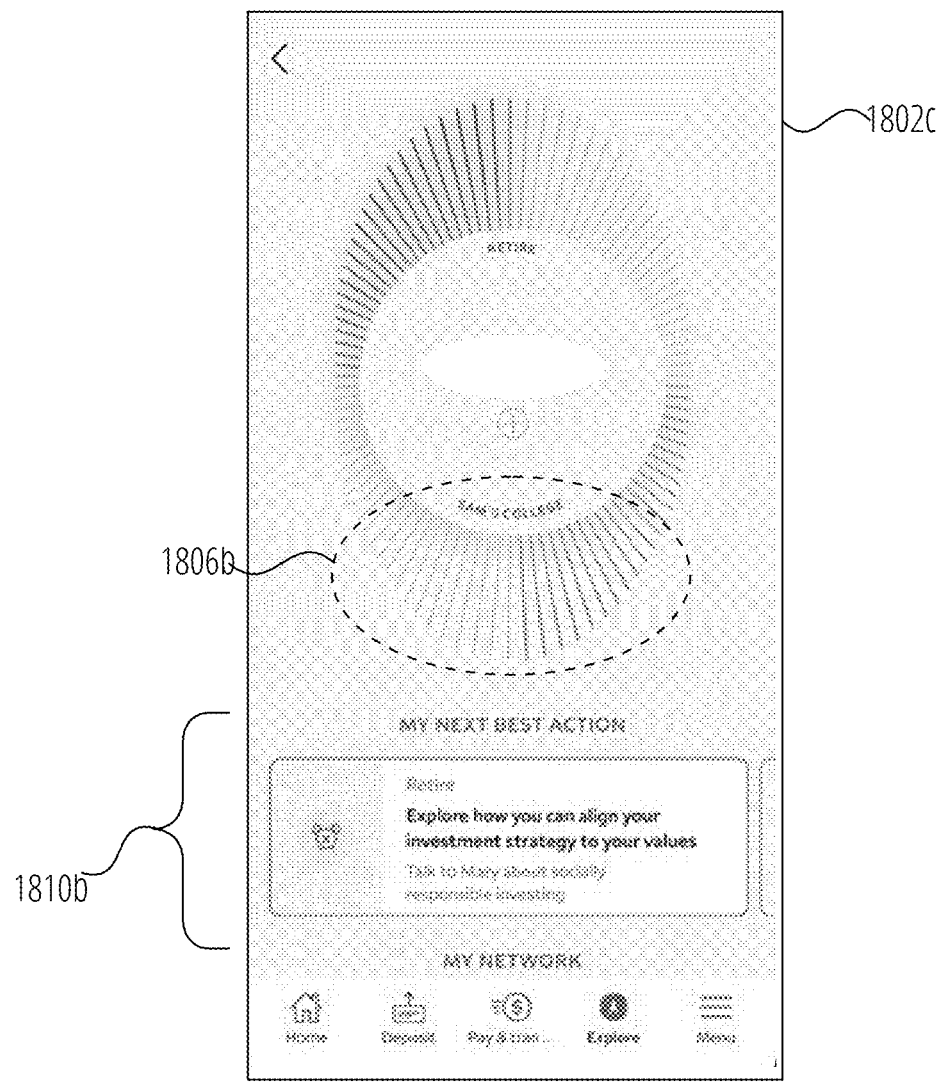
Figure 18D:
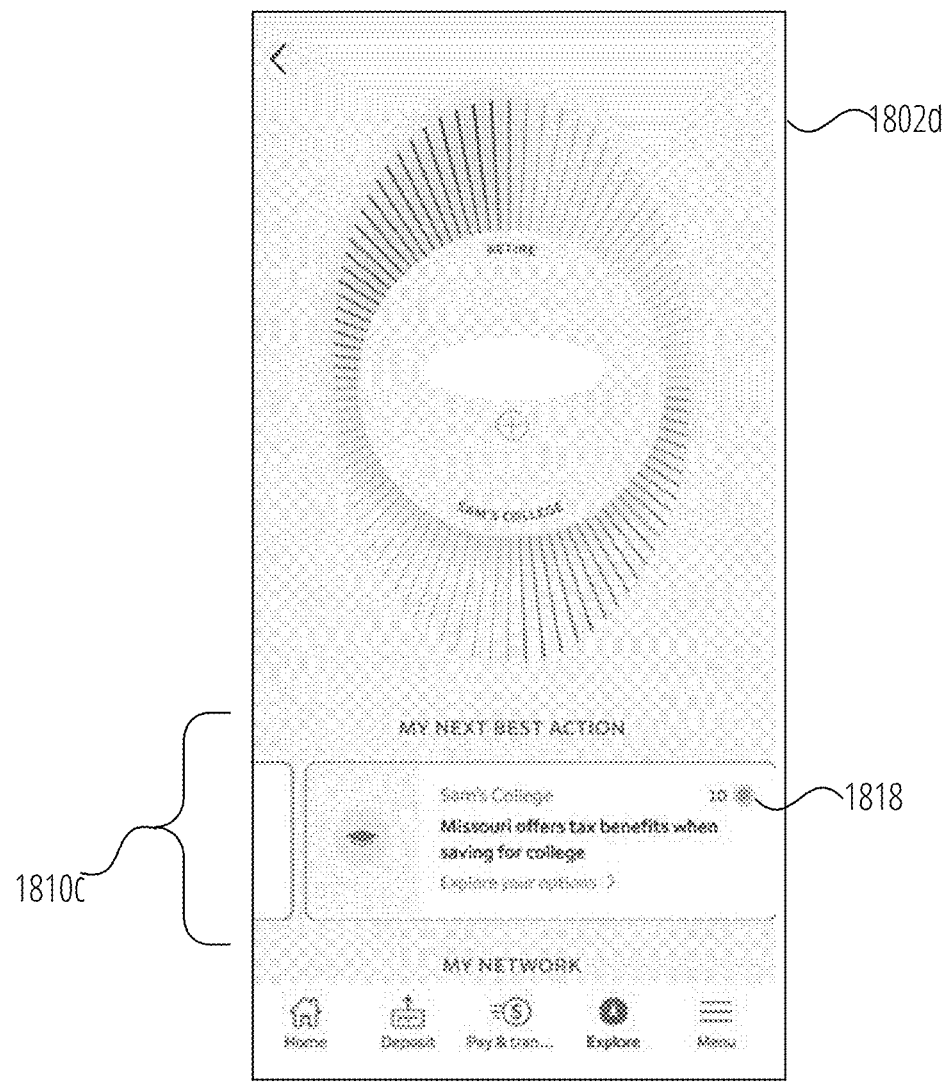

FIGS. 18A-18D illustrate various aspects of a contributor overview GUI 1800 according to one or more embodiments of the current disclosure. The contributor overview GUI 1800 results in an improved user interface for electronic devices at least through the specific manners of providing (e.g., by displaying) a customized PAE experience to a user described below. For example, the contributor overview GUI 1800 may provide a specific improvement over existing systems by displaying customized goal indicators including a new goal request indicator to a user in a customized goals overview along with actionable items generated based on accepting and/or accomplishing at least one of the goals in the customized goals overview. Contributor overview GUI 1800 may be similar to primary user overview GUI 1300. FIG. 18A illustrates GUI view 1802a of contributor overview GUI 1800, FIG. 18B illustrates GUI view 1802b of contributor overview GUI 1800, FIG. 18C illustrates GUI view 1802c of contributor overview GUI 1800, and FIG. 18D illustrates GUI view 1802d of contributor overview GUI 1800. In various embodiments, contributor overview GUI 1800 including GUI views 1802a, 1802b, 1802c, 1802d illustrate various instances of tailored display content 210 generated by user device 204 based on customized experience data 208 provided by PAE system 202. Further, one or more PAE systems, or components thereof, may be utilized to realize the functionality described with respect to FIGS. 18A-18D, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Contributor overview GUI 1800 may be similar to primary user overview GUI 1300 except from the perspective of contributor 1424. Accordingly, contributor overview GUI 1800 may generally include the same format as primary user overview GUI 1300, but include content tailored for the contributor 1424. Referring to FIG. 18A, GUI view 1802a of contributor overview GUI 1800 includes goals overview 1804, advice content 1810a, and concentric shape visualization icon 1820. The goals overview 1804 may include goal indicator 1806a and new goal request indicator 1808. In some embodiments, GUI view 1802a may be generated and/or displayed in response to selection of the contributor request notification 1704 in GUI view 1702a of OS GUI 1700a, such as by contributor 1424.

The content tailored for the contributor 1424 may include advice content 1810a that has been customized for the contributor 1424. In the illustrated embodiment, the advice content 1810a indicates that the contributor 1424 has been added to "Sam's College" shared goal. Additionally, advice content 1810a includes a link to accept participation in the shared goal and add it to their goals.

Referring to FIG. 18B, GUI view 1802b of contributor overview GUI 1800 includes one or more portions of GUI view 1802a in addition to new goal details 1812, acceptance icon 1814, and rejection icon 1816. In various embodiments, GUI view 1802b may be generated and/or displayed in response to selection of new goal request indicator 1808 or advice content 1810a in GUI view 1802a. The new goal details 1812 identifies the new goal and the requested role. In various embodiments, clicking on new goal details 1812 may display the commitment requested (e.g., $200 per month). In many embodiments, if the new goal is rejected (e.g., by clicking the rejection icon 1816), a user may be given an opportunity to counter the request, such as by suggesting a different commitment (e.g., $150 per month). In some embodiments, if the new goal is accepted (e.g., by clicking on acceptance icon 1814), a user may be asked to make a contractual commitment to the shared goal. For example, an electronic signature may be requested. In some embodiments, an electronic signature may be requested in place of acceptance icon 1814.

Referring to FIG. 18C, GUI view 1802c of contributor overview GUI 1800 includes advice content 1810b and goal indicator 1806b. In some embodiments, GUI view 1802c may be generated and/or displayed in response to selection of acceptance icon 1814 in GUI view 1802b. In GUI view 1802c, goal indicator 1806b is added in response to acceptance of the shared goal. Additionally, advice content 1810a may be provided. In the illustrated embodiment, the advice content 1810b relates to the retirement goal associated with goal indicator 1806a instead of the new goal associated with goal new goal request indicator 1808. The advice content 1810b includes a benefit of exploring how the investment strategy of the user can be aligned with their values. The advice content 1810b also includes an action of talking to Mary about socially responsible investing. In various embodiments, Mary may correspond to a user in the user group for the retirement goal. In other embodiments, Mary may correspond to a team member (e.g., financial advisor).

Referring to FIG. 18D, GUI view 1802d of contributor overview GUI 1800 includes advice content 1810c with task points 1818. In various embodiments, GUI view 1802d may be generated and/or displayed in response to horizontally swiping on advice content 1810b in GUI view 1802b. In the illustrated embodiment, the advice content 1810c relates to the new goal associated with goal indicator 1806b. The advice content 1810c includes a benefit of obtaining tax benefits from Missouri when saving for college. The advice content 1810c may be determined by the PAE system, at least in part, based on user data indicating that the user lives in Missouri. Additionally, the advice content 1810c includes a link to explore options to obtain the tax benefits. For example, the link may take a user to an application to open a savings account to obtain the tax benefits. In some embodiments, the system may populate one or more portions of the application based on user data. In various embodiments, a user must grant the PAE system with permission to populate external interfaces (e.g., the application to obtain tax benefits located on a site provided by Iowa). For example, a user may grant the PAE system with the appropriate permissions via account manager 402.

Additionally, advice content 1810*c* includes task points 1818. In various embodiments, the task points 1818 may be utilized to motivate users to complete goal related tasks. In various such embodiments, the amount of task points may be assigned by a goal creator. In some embodiments, the amount of collected task points may be utilized, at least in part, to determine a progress of the shared goal. In various embodiments, obtaining task points may be included as part of the commitment of a user. In one embodiment, the task points 1818 may be given as rewards for completing tasks. In one such embodiment, collected task points may be spent on items, such as gift cards. In at least one embodiment, task points may be utilized to determine, at least in part, insights and/or advice. For example, task points may be utilized to determine a probability of success. In such examples, the more task points the higher the probability of success. In another example, advice may be tailored based on task points. In such examples, more task points may indicate a user is more fluent in using the PAE system and therefore doesn't need advice with as much detail. For example, advice to create a new goal may include step-by-step instructions on how to create the goal when a user has a relatively small amount of task points. However, when a user has a relatively large amount of task points, the advice may simply provide a link to the goal creation GUI 1600.

Figure 19A:
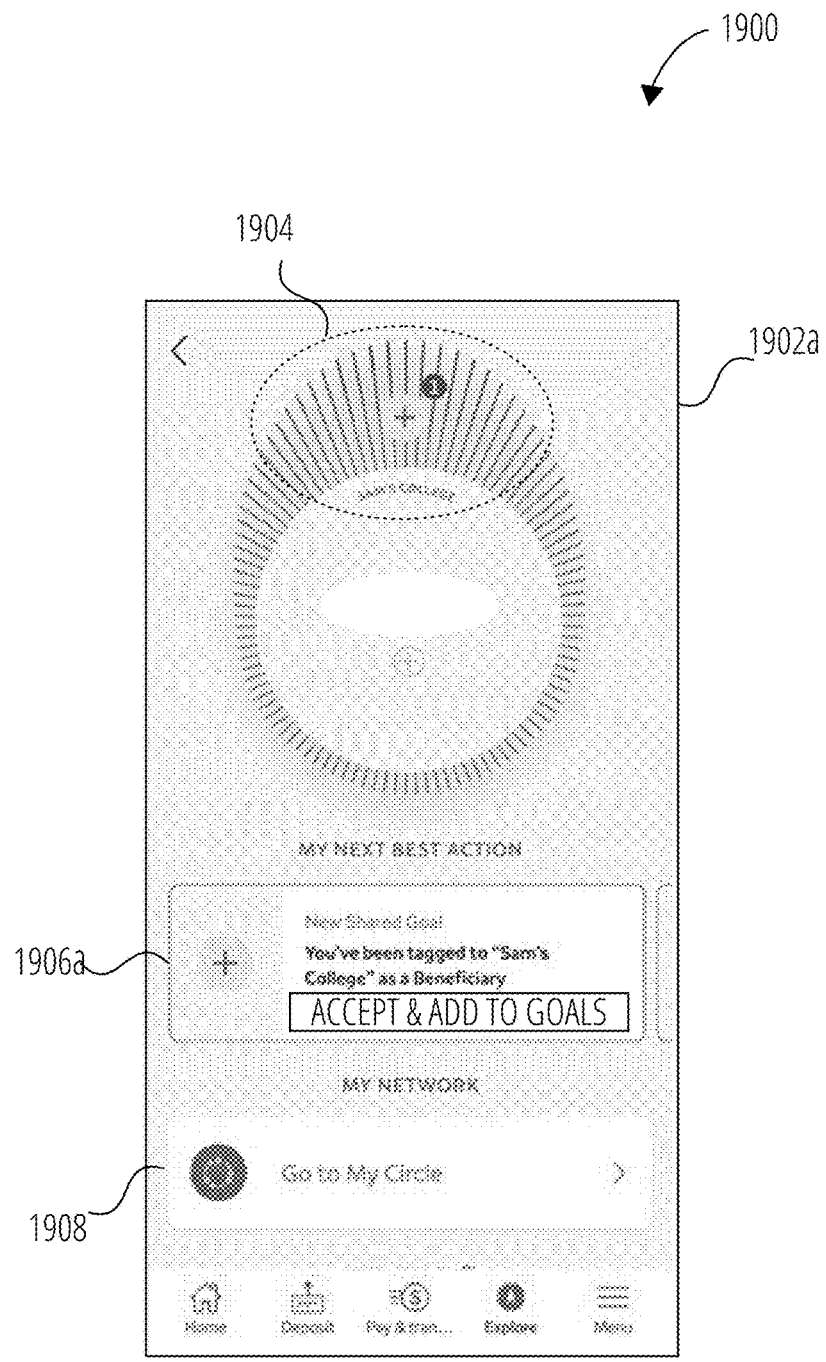
FIGS. 19A-19C illustrate various aspects of a beneficiary overview GUI according to one or more embodiments of the current disclosure.
Figure 19B:
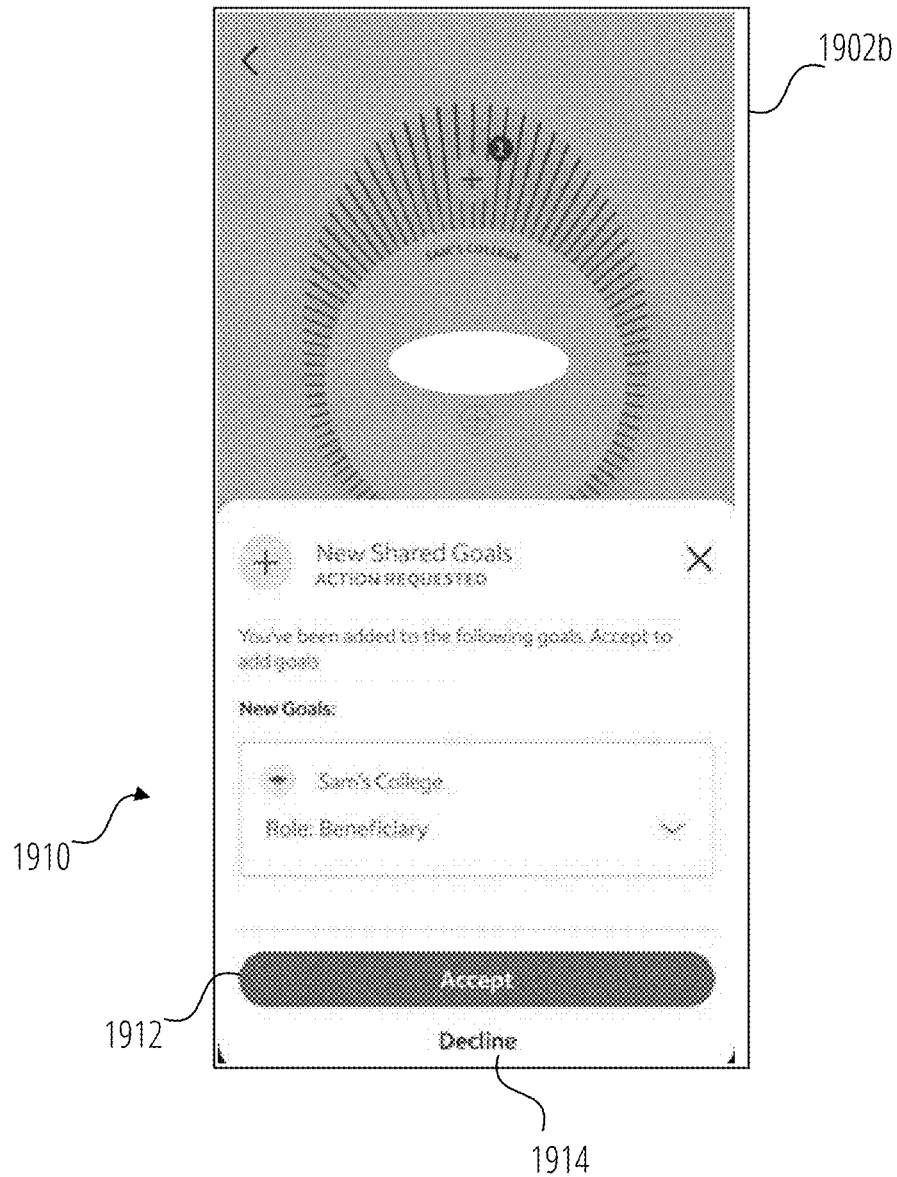
Figure 19C:
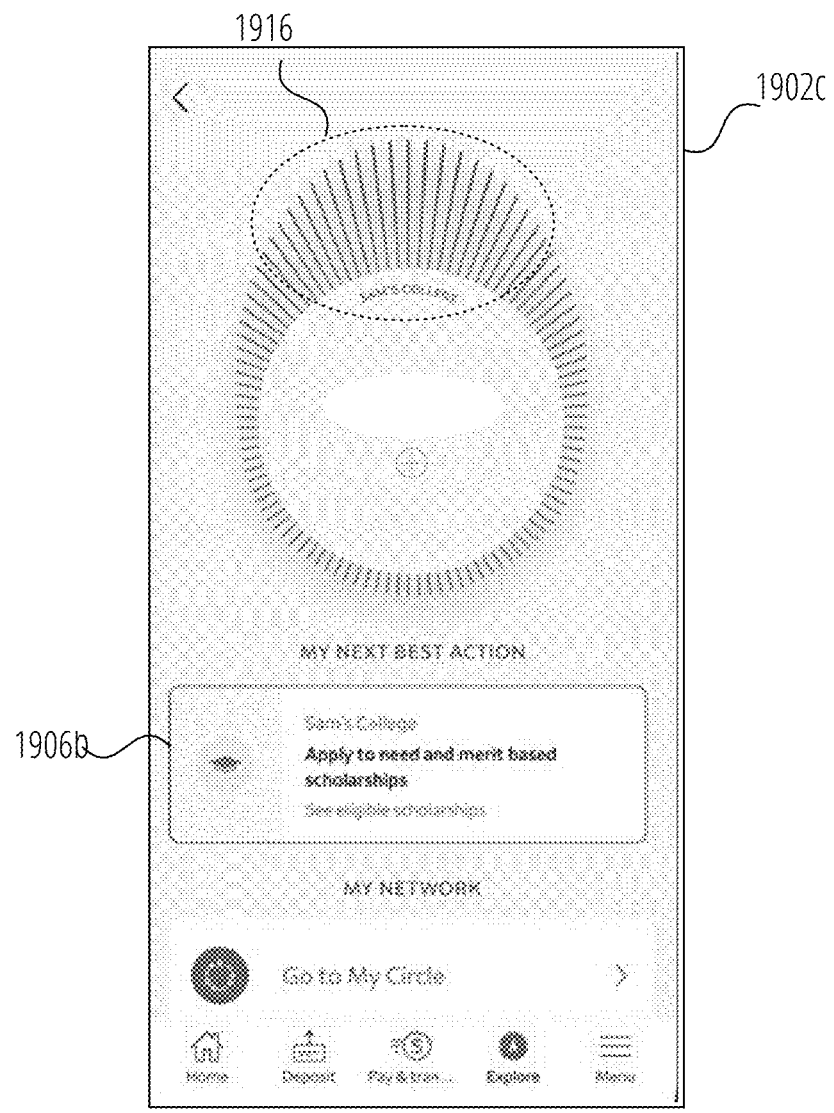

FIGS. 19A-19C illustrate various aspects of a beneficiary overview GUI 1900 according to one or more embodiments of the current disclosure. The beneficiary overview GUI 1900 results in an improved user interface for electronic devices at least through the specific manners of providing (e.g., by displaying) a customized PAE experience to a user described below. For example, the beneficiary overview GUI 1900 may provide a specific improvement over existing systems by displaying customized goal indicators including a new goal request indicator to a user in a customized goals overview along with actionable items generated based on accomplishing and/or accepting at least one of the goals in the customized goals overview. FIG. 19A illustrates GUI view 1902*a* of beneficiary overview GUI 1900, FIG. 19B illustrates GUI view 1902*b* of beneficiary overview GUI 1900, and FIG. 19C illustrates GUI view 1902*c* of beneficiary overview GUI 1900. In various embodiments, beneficiary overview GUI 1900 including GUI views 1902*a*, 1902*b*, 1902*c* illustrate various instances of tailored display content 210 generated by user device 204 based on customized experience data 208 provided by PAE system 202. Further, one or more PAE systems, or components thereof, may be utilized to realize the functionality described with respect to FIGS. 19A-19C, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Beneficiary overview GUI 1900 may be similar to primary user overview GUI 1300 and contributor overview GUI 1800 except from the perspective of beneficiary 1426. Accordingly, beneficiary overview GUI 1900 may generally include the same format as primary user overview GUI 1300 and contributor overview GUI 1800, but include content tailored for the beneficiary 1426. Referring to FIG. 19A, GUI view 1902*a* of beneficiary overview GUI 1900 includes new goal request indicator 1904, advice content 1906*a*, and concentric shape visualization icon 1908. GUI view 1902*a* of beneficiary overview GUI 1900 may be the same or similar to GUI view 1802*a* of contributor overview GUI 1800. In some embodiments, GUI view 1902*a* may be generated and/or displayed in response to selection of the beneficiary request notification 1706 in GUI view 1702*b* of OS GUI 1700*b*, such as by beneficiary 1426. In the illustrated embodiment, the new goal is the first goal of the user. Accordingly, the user may have created a PAE system account in response to an email notification that they had been added to the goal. In several embodiments, the user may have utilized a link in the email notification to create a PAE system account. Additionally, or alternatively, the user may have utilized a link in the email notification to download and install the PAE system application.

Referring to FIG. 19B, GUI view 1902*b* of beneficiary overview GUI 1900 includes one or more portions of GUI view 1902*a* in addition to new goal details 1910, acceptance icon 1912, and rejection icon 1914. GUI view 1902*b* of beneficiary overview GUI 1900 may be the same or similar to GUI view 1802*b* of contributor overview GUI 1800. In various embodiments, GUI view 1902*b* may be generated and/or displayed in response to selection of new goal request indicator 1904 or advice content 1906*a* in GUI view 1902*a*.

The new goal details 1910 identifies the new goal and the requested role. In various embodiments, clicking on new goal details 1910 may display the benefit to be received. In various such embodiments, the benefit may be displayed in a nonnumerical manner. For example, the benefit may include college tuition instead of saying $5000 a year or $5000 a year for college tuition. In other embodiments, the benefit may be displayed in a numerical manner (e.g., $200 per month). In many embodiments, if the new goal is rejected (e.g., by clicking the rejection icon 1914), a user may be given an opportunity to counter the request, such as by suggesting a different benefit (e.g., $150 per month). In some embodiments, if the new goal is accepted (e.g., by clicking on acceptance icon 1912), a user may be asked to make a contractual commitment to the shared goal. For example, an electronic signature may be requested. In some embodiments, an electronic signature may be requested in place of acceptance icon 1912.

Referring to FIG. 19C, GUI view 1902*c* of beneficiary overview GUI 1900 includes advice content 1906*b* and goal indicator 1916. In some embodiments, GUI view 1902*c* may be generated and/or displayed in response to selection of acceptance icon 1912 in GUI view 1902*b*. In GUI view 1902*c*, goal indicator 1916 is added in response to acceptance of the shared goal. Additionally, advice content 1906*b* may be provided. In the illustrated embodiment, the advice content 1906*b* relates to the new goal associated with new goal request indicator 1904. The advice content 1906*b* includes a benefit of applying to need and merit-based scholarships. The advice content 1906*b* also includes an action of seeing eligible scholarships. In many embodiments, the eligible scholarships may be based on user data regarding one or more associated users, such as users in the user group of the shared goal. For example, the household income for the user may be determined based on the income of a parent of the user. The parent of the user may or may not be a user in the user group of the shared goal. In such examples, the household income may be utilized to identify one or more eligible scholarships. In some embodiments, the PAE system may assist in applying for one or more of the scholarships, such as based on user data of one or more users. For example, the system may populate one or more portions of the application based on user data.

Figure 20B:
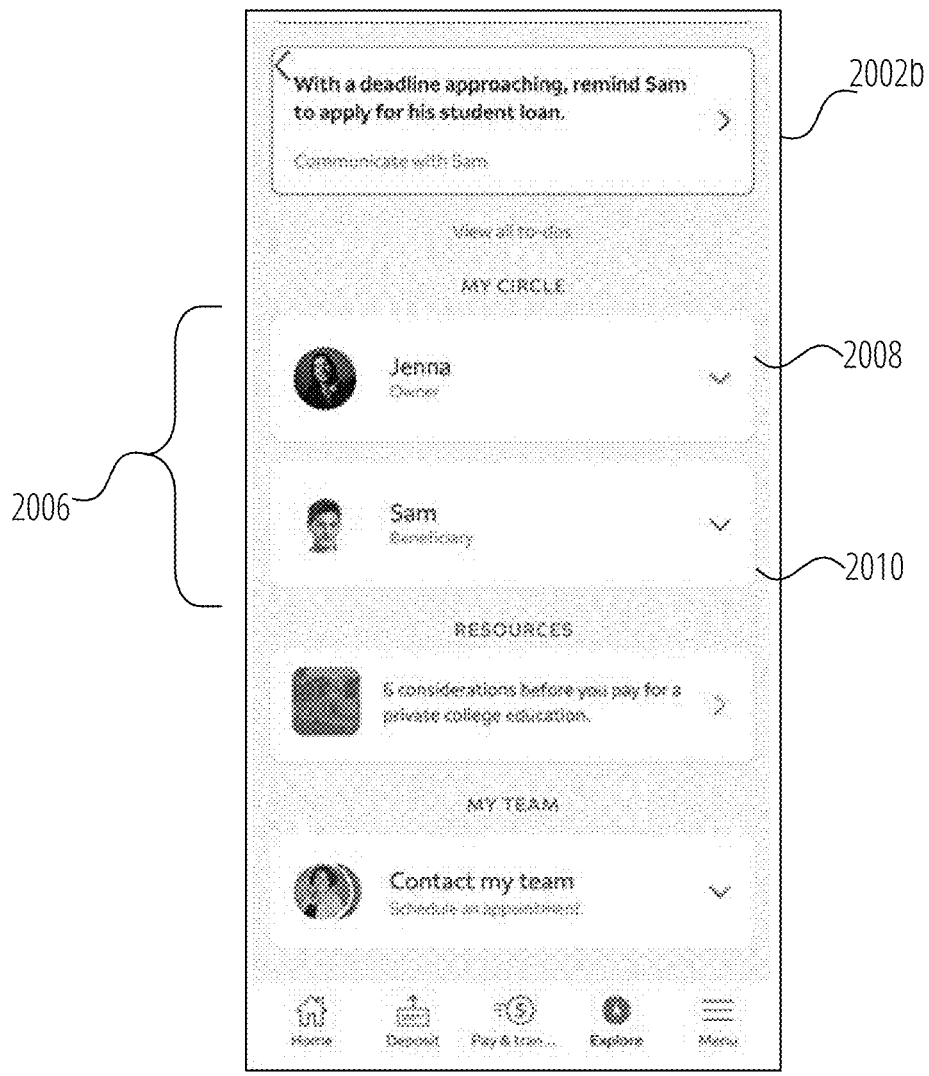

FIGS. 20A and 20B illustrate various aspects of a contributor goal detail GUI 2000 according to one or more embodiments of the current disclosure. The contributor goal detail GUI 2000 results in an improved user interface for electronic devices at least through the specific manners of providing (e.g., by displaying) a customized PAE experience to a user described below. For example, the contributor goal detail GUI 2000 may provide a specific improvement over existing systems by displaying a collaborative status of a shared goal in conjunction with a probability of success and a task list with actionable items for accomplishing the shared goal. FIG. 20A illustrates GUI view 2002*a* of contributor goal detail GUI 2000 and FIG. 20B illustrates GUI view 2002*b* of contributor goal detail GUI 2000. In various embodiments, contributor goal detail GUI 2000 including GUI views 2002*a*, 2002*b* illustrate various instances of tailored display content 210 generated by user device 204 based on customized experience data 208 provided by PAE system 202. Further, one or more PAE systems, or components thereof, may be utilized to realize the functionality described with respect to FIGS. 20A and 20B, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Contributor goal detail GUI 2000 may be similar to shared goal detail GUI 1400 except from the perspective of contributor 1424. Accordingly, contributor goal detail GUI 2000 may generally include the same format as shared goal detail GUI 1400, but include content tailored for the contributor 1424. Referring to FIG. 20A, GUI view 2002*a* of contributor goal detail GUI 2000 includes collaborative task 2004. In some embodiments, GUI view 2002*a* may be generated and/or displayed in response to selection of goal indicator 1806*b* in GUI view 1802*c*.

Referring to FIG. 20B, GUI view 2002*b* of contributor goal detail GUI 2000 includes user group 2006 with creator 2008 and beneficiary 2010. In some embodiments, GUI view 2002*b* may be generated and/or displayed in response to swiping vertically in GUI view 2002*a*.

Figure 21B:
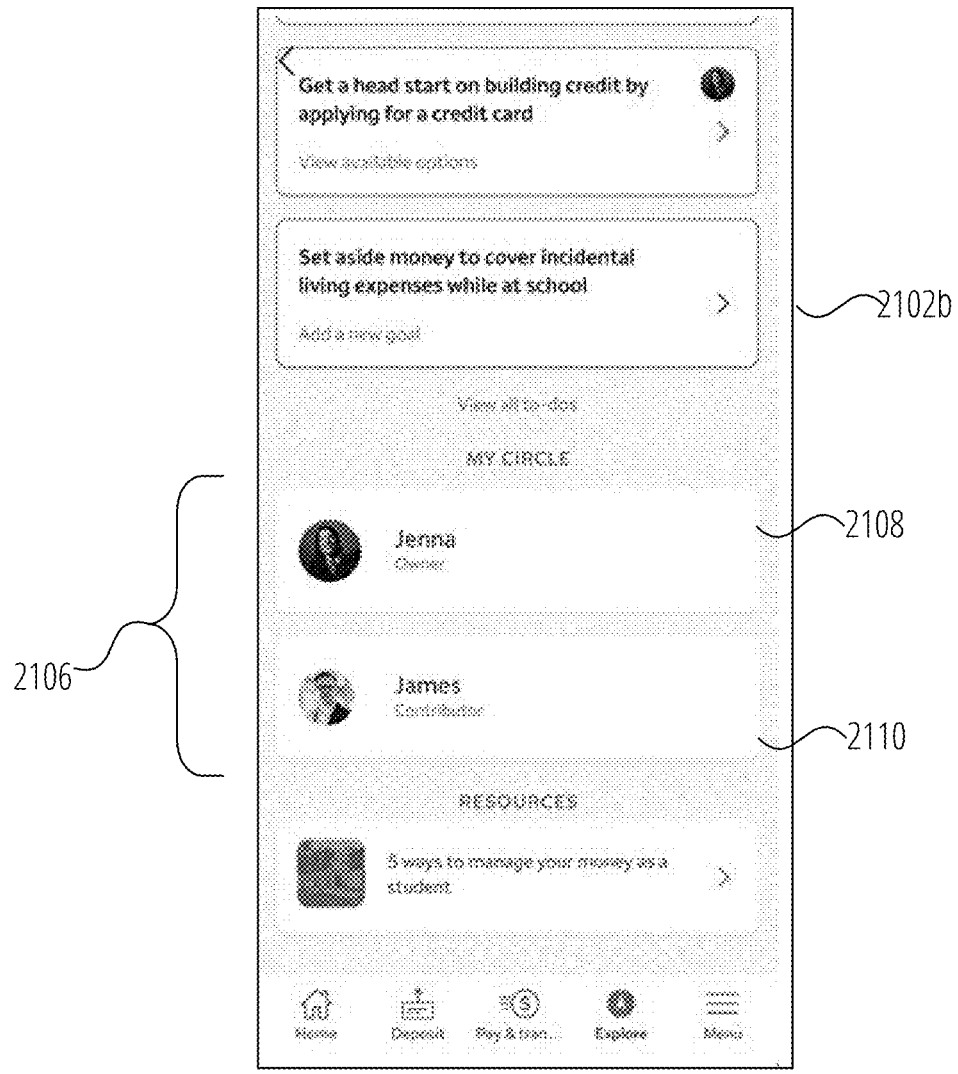

FIGS. 21A and 21B illustrate various aspects of a beneficiary goal detail GUI 2100 according to one or more embodiments of the current disclosure. The beneficiary goal detail GUI 2100 results in an improved user interface for electronic devices at least through the specific manners of providing (e.g., by displaying) a customized PAE experience to a user described below. For example, the beneficiary goal detail GUI 2100 may provide a specific improvement over existing systems by displaying a task list with actionable items and associated users for accomplishing the shared goal. FIG. 21A illustrates GUI view 2102*a* of beneficiary goal detail GUI 2100 and FIG. 21B illustrates GUI view 2102*b* of beneficiary goal detail GUI 2100. In various embodiments, beneficiary goal detail GUI 2100 including GUI views 2102*a*, 2102*b* illustrate various instances of tailored display content 210 generated by user device 204 based on customized experience data 208 provided by PAE system 202. Further, one or more PAE systems, or components thereof, may be utilized to realize the functionality described with respect to FIGS. 21A and 21B, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Beneficiary goal detail GUI 2100 may be similar to shared goal detail GUI 1400 except from the perspective of beneficiary 1426. Accordingly, beneficiary goal detail GUI 2100 may generally include the same format as shared goal detail GUI 1400, but include content tailored for the beneficiary 1426. Referring to FIG. 21A, GUI view 2102*a* of beneficiary goal detail GUI 2100 includes collaborative task 2104. In some embodiments, GUI view 2102*a* may be generated and/or displayed in response to selection of goal indicator 1916 in GUI view 1902*c*. Additionally, a collaborative status (e.g., collaborative status 1404) is hidden in GUI view 2102*a*. The collaborative status may be hidden based on one or more privileges and/or permissions of the user. For example, beneficiaries of shared goals may be prevented from seeing monetary amounts associated with shared goals. In many embodiments, these privileges and/or permissions may be set by the creator of the shared goal (see e.g., permissions icon 1626 of FIG. 16H). In various embodiments, the privileges and/or permissions may be stored in a shared goal data object, such as in user data. In various such embodiments, in response to interrogating the shared goal data object, users may only be provided with data that they have permission to access.

Referring to FIG. 21B, GUI view 2102*b* of beneficiary goal detail GUI 2100 includes user group 2106 with creator 2108 and contributor 2110. In some embodiments, GUI view 2102*b* may be generated and/or displayed in response to swiping vertically in GUI view 2102*a*.

In the illustrated embodiment, beneficiary goal detail GUI 2100 includes a plurality of tasks (which comprise advice content with benefits and actions) for their customized PAE experience. One task includes the benefit of applying to need and merit-based scholarships and an action of seeing eligible scholarships. Another task includes the benefit of getting a head start on building credit by applying for a credit card with an action of viewing available options. Yet another task includes the benefit of setting aside money to cover incidental living expenses while at school and the action of adding it as a new goal.

Figure 22A:
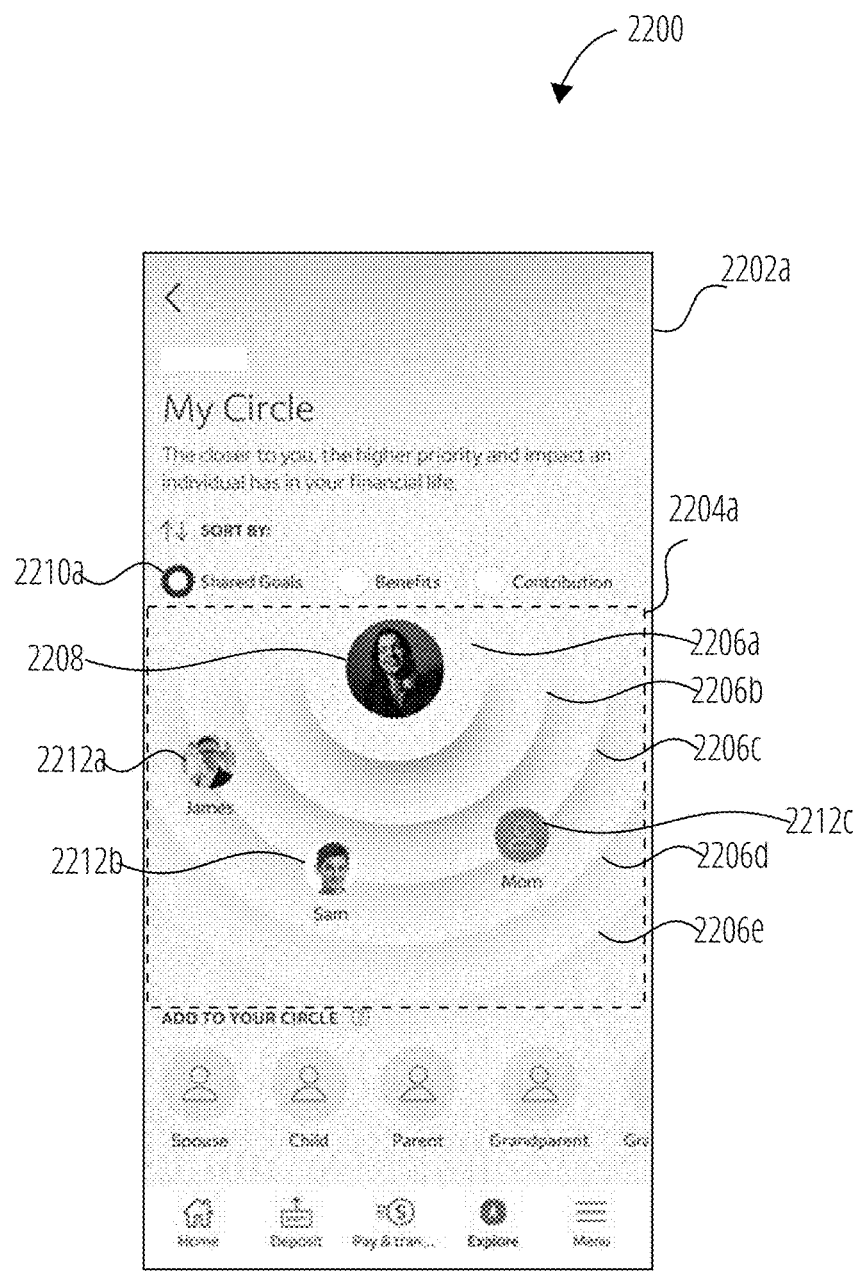
FIGS. 22A-22G illustrate various aspects of a concentric shape visualization GUI according to one or more embodiments of the current disclosure.
Figure 22B:
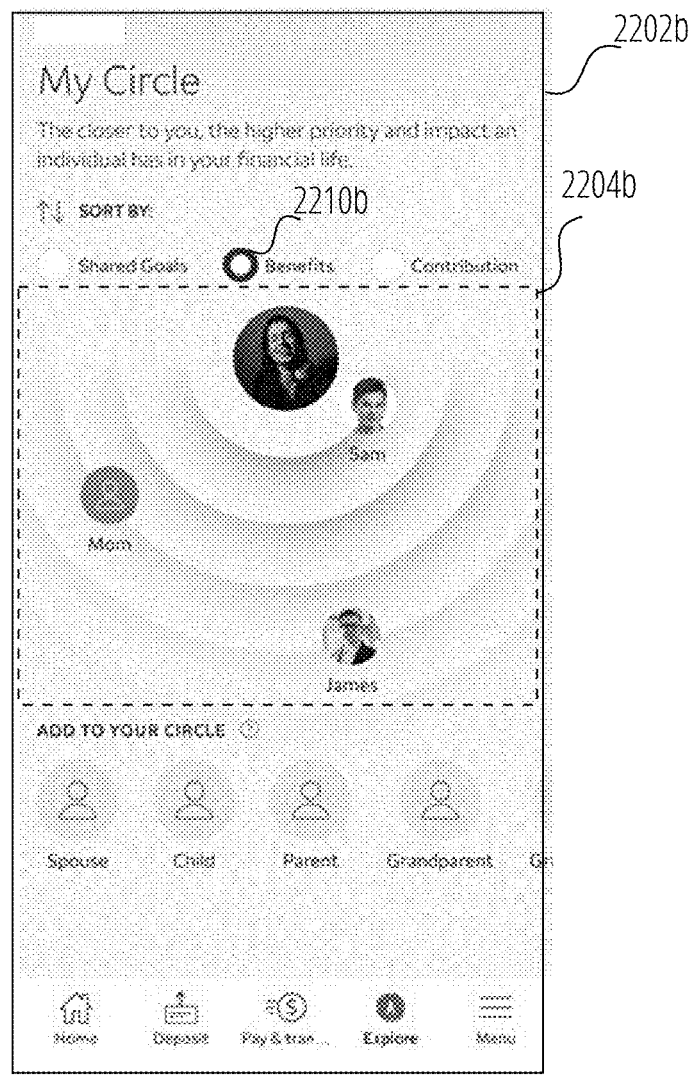
Figure 22C:
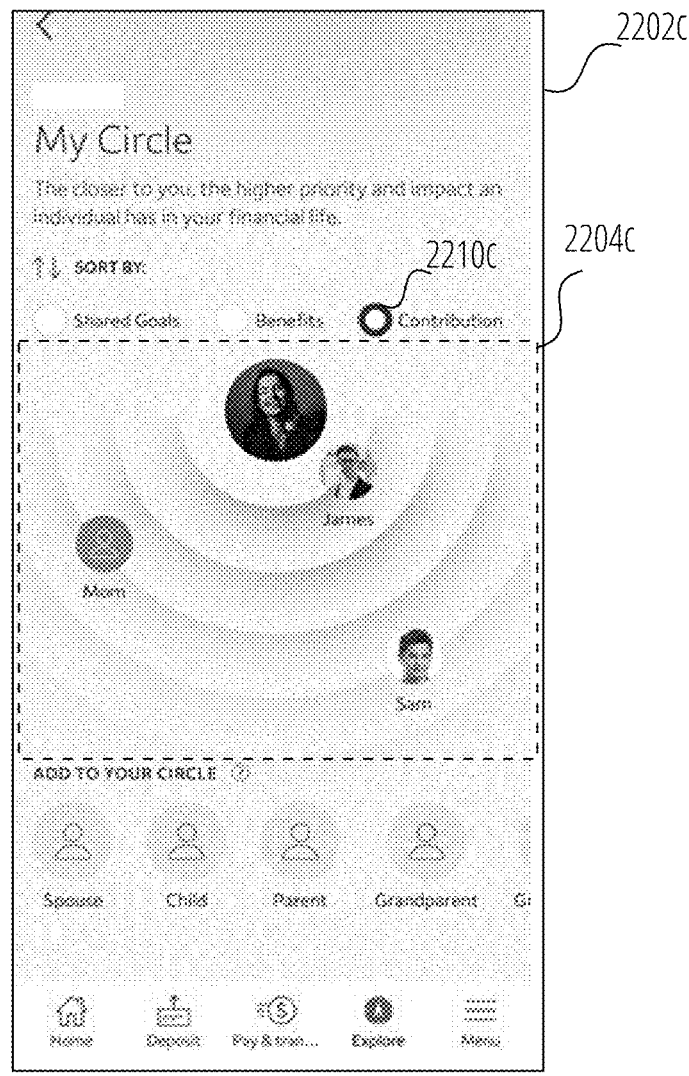
Figure 22E:
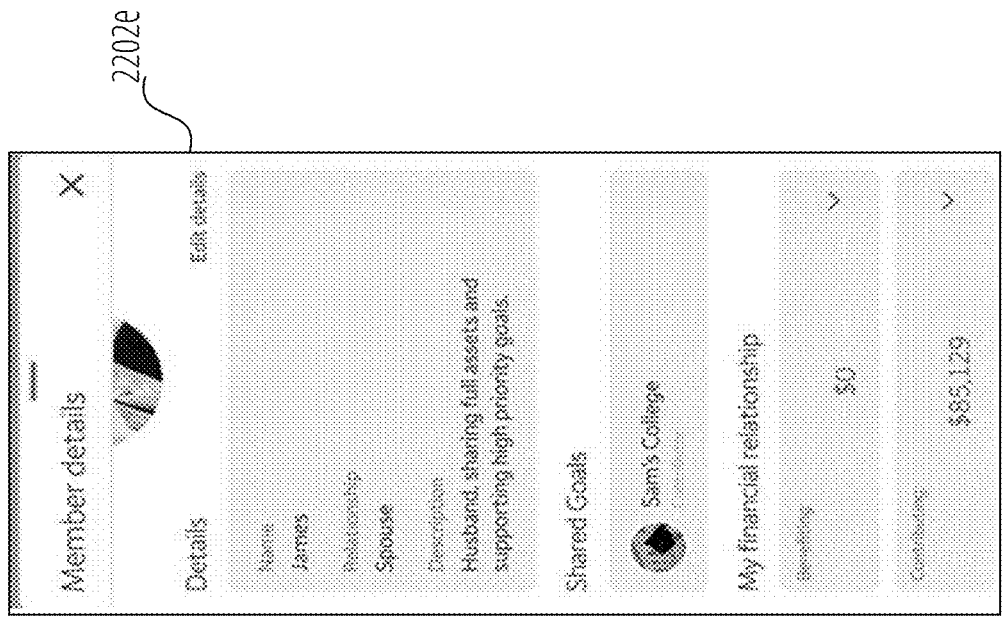
Figure 22D:
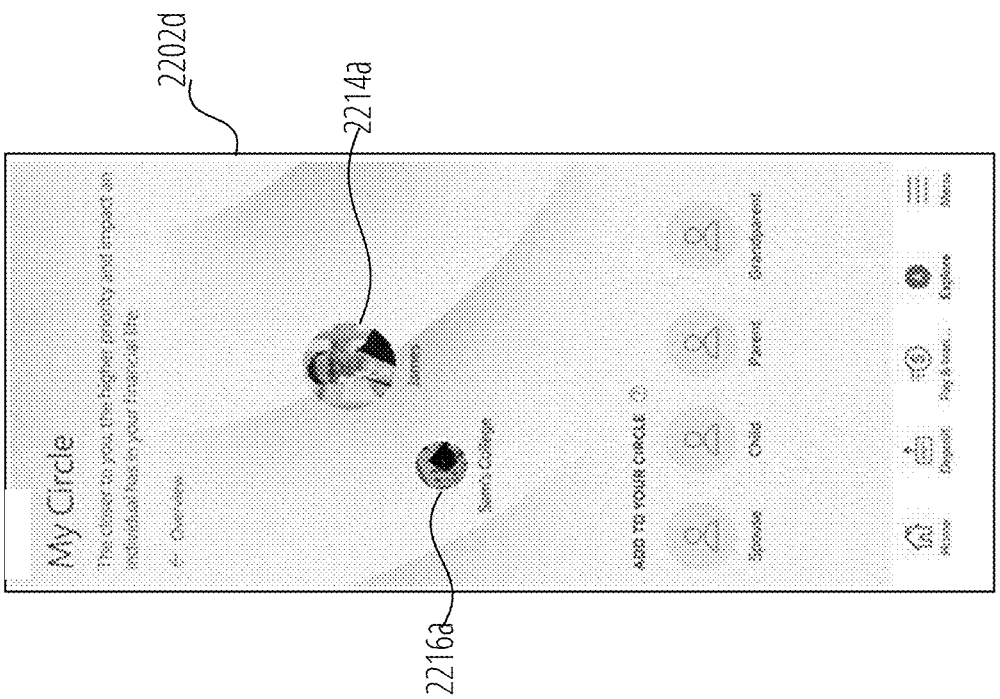
Figure 22G:
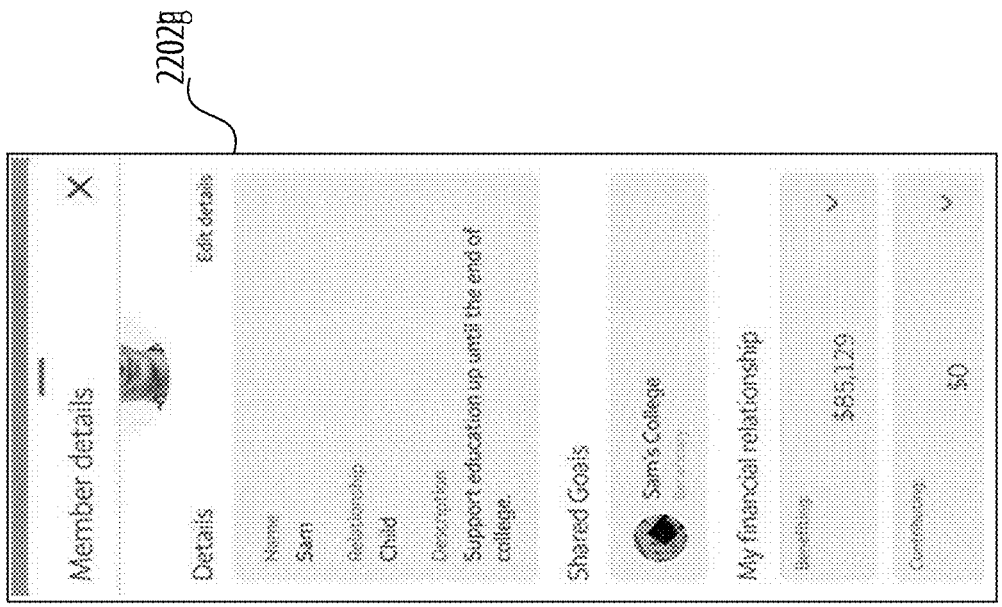
Figure 22F:
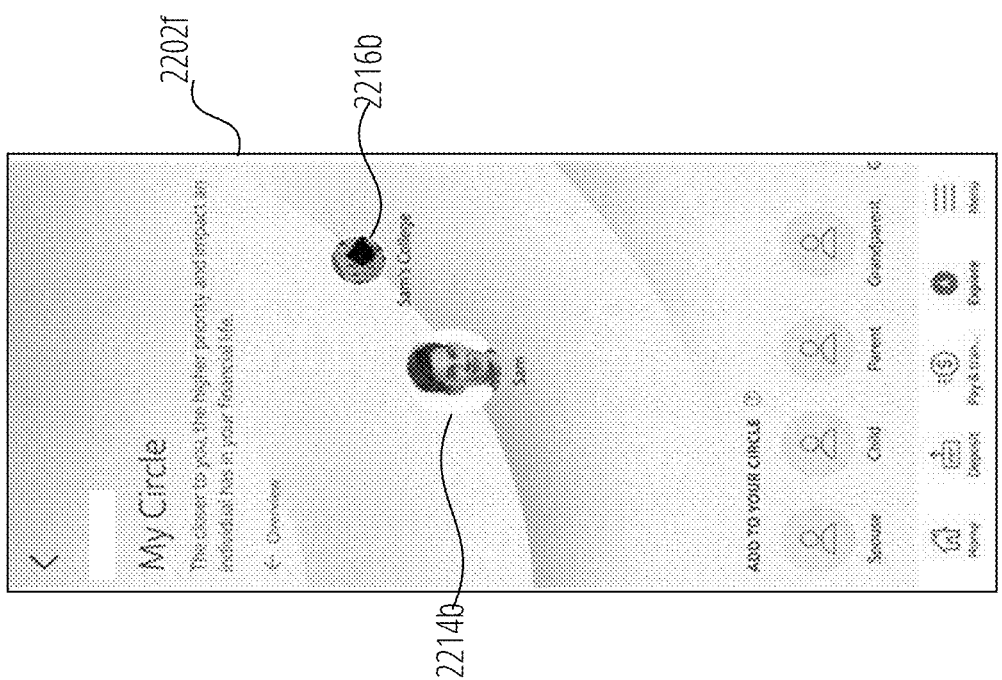

FIGS. 22A-22G illustrate various aspects of a concentric shape visualization GUI 2200 according to one or more embodiments of the current disclosure. The concentric shape visualization GUI 2200 results in an improved user interface for electronic devices at least through the specific manners of providing (e.g., by displaying) a customized PAE experience to a user described below. For example, the concentric shape visualization GUI 2200 may provide a specific improvement over existing systems by displaying a concentric shape set that succinctly conveys, via a visualization, the relevance of other users to the financial life of a primary user. Additionally, the relevance of other users is provided in relation to each other, making skewed involvement of specific users very apparent (e.g., an acquaintance should not appear closer than a spouse). FIG. 22A illustrates GUI view 2202*a* of concentric shape visualization GUI 2200, FIG. 22B illustrates GUI view 2202*b* of concentric shape visualization GUI 2200, FIG. 22C illustrates GUI view 2202*c* of concentric shape visualization GUI 2200, FIG. 22D illustrates GUI view 2202*d* of concentric shape visualization GUI 2200, FIG. 22E illustrates GUI view 2202*f* of concentric shape visualization GUI 2200, FIG. 22F illustrates GUI view 2202*g* of concentric shape visualization GUI 2200, and FIG. 22G illustrates GUI view 2202*h* of concentric shape visualization GUI 2200. In various embodiments, concentric shape visualization GUI 2200 including GUI views 2202a, 2202b, 2202c, 2202d, 2202f, 2202g, 2202h illustrate various instances of tailored display content 210 generated by user device 204 based on customized experience data 208 provided by PAE system 202. Further, one or more PAE systems, or components thereof, may be utilized to realize the functionality described with respect to FIGS. 22A-22G, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Referring to FIG. 22A, GUI view 2202a of concentric shape visualization GUI 2200 includes concentric shape set 2204a generated based on positioning criteria 2210a. In the illustrated embodiment, concentric shape set 2204a includes concentric shapes 2206a, 2206b, 2206c, 2206d, 2206e (or concentric shapes 2206), primary user 2208, and connected user icons 2212a, 2212b, 2212c (or connected user icons 2212). In some embodiments, the concentric shapes may include portions of concentric shapes. The illustrated concentric shapes are portions of circles. However, other concentric shapes, or portions of concentric shapes, may be utilized, such as squares, triangles, oval, etcetera.

Each of the connected user icons are associated with a user that has at least one shared goal with primary user 2208. A first user is associated with connected user icon 2212a, a second user is associated with connected user icon 2212b, and a third user is associated with connected user icon 2212c. In several embodiments, GUI view 2202a may be accessed by selecting concentric shape visualization icon 1318 in GUI view 1302i of primary user overview GUI 1300. In many embodiments, the concentric shape sets 2204a, 2204b, 2204c may enable the primary user 2208 to quickly ascertain situational awareness regarding the involvement of different users in their current situation.

Positioning criteria 2210a includes shared goals with the primary user 2208. Accordingly, users with more shared goals with primary user 2208 will appear closer to the primary user 2208 in concentric shape set 2204a. In the illustrated embodiment, the first user associated with connected user icon 2212a, the second user associated with connected user icon 2212b, and the third user associated with connected user icon 2212c all share the same number of shared goals with primary user 2208. Accordingly, all of the connected user icons 2212 are located on the same concentric shape. In the illustrated embodiment, all of the connected user icons 2212 are located on concentric shape 2206c. However, the connected user icons 2212 may appear on alternative concentric shapes without departing from the scope of this disclosure as long as all the connected user icons appear on the same concentric shape. In this manner, concentric shape set 2204a allows primary user 2208 to readily ascertain their relative involvement with different users in shared goals.

Referring to FIG. 22B, GUI view 2202b of concentric shape visualization GUI 2200 includes concentric shape set 2204b generated based on positioning criteria 2210b. Concentric shape set 2204b may be the same as concentric shape set 2204a except with the connected user icons 2212a, 2212b, 2212c ordered based on positioning criteria 2210b instead of positioning criteria 2210a. In various embodiments, GUI view 2202b may be accessed by selecting positioning criteria 2210b in GUI view 2202a.

Positioning criteria 2210b includes benefits from the primary user 2208. Accordingly, users that benefit more from the primary user 2208 will appear closer to the primary user 2208 in concentric shape set 2204b. In various embodiments, the benefit a user receives from the primary user 2208 may be determined based on a collective amount of resources (e.g., money) the user receives from the primary user 2208. For example, if the primary user 2208 is involved in two shared goals with a person and in the first shared goal the primary user 2208 contributes $200 to the benefit of the person and in the second shared goal the primary user 2208 benefits $100 from contributions from the person, then the person would benefit $100 from the primary user 2208.

In the illustrated embodiment, the first user associated with connected user icon 2212a benefits the least from the primary user 2208. This may be a result of the first user only being a contributor on shared goals with the primary user 2208, thus the first user would not benefit any from primary user 2208. The second user associated with connected user icon 2212b benefits the most from the primary user 2208. This may be a result of the second user only being involved in shared goals with primary user 2208 in which the second user is a beneficiary and the primary user 2208 is a contributor on, thus the second user would only benefit from primary user 2208. The third user associated with connected user icon 2212c benefits more from the primary user 2208 than the first user and less from the primary user 2208 than the second user. This may result from the second and third users being beneficiaries on the shared goal, but the third user benefits less than the second user. Alternatively, this may be a result of the third user being a contributor to a first shared goal with the primary user 2208 and a beneficiary to a second shared goal with the primary user 2208. In this manner, concentric shape set 2204b allows primary user 2208 to readily ascertain the benefit different users obtain from them. Further, concentric shape set 2204b allows primary user 2208 to readily identify a user that is improperly benefiting from them. For example, an acquaintance being located closer to primary user 2208 than a dependent in concentric shape set 2204b provide an obvious indication that the acquaintance may be improperly benefiting from the primary user 2208.

Referring to FIG. 22C, GUI view 2202c of concentric shape visualization GUI 2200 includes concentric shape set 2204c generated based on positioning criteria 2210c. Concentric shape set 2204c may be the same as concentric shape set 2204a except with the connected user icons 2212a, 2212b, 2212c ordered based on positioning criteria 2210c instead of positioning criteria 2210a. In various embodiments, GUI view 2202c may be accessed by selecting positioning criteria 2210c in GUI view 2202a.

Positioning criteria 2210c includes contributions to the primary user 2208. Accordingly, users that contribute more to the primary user 2208 will appear closer to the primary user 2208 in concentric shape set 2204b. In various embodiments, the contribution the primary user 2208 receives from a user may be determined based on a collective amount of resources (e.g., money) the user provides to the primary user 2208. For example, if the primary user 2208 is involved in two shared goals with a person and in the first shared goal the primary user 2208 benefits $200 from the contribution of the person and in the second shared goal the primary user 2208 contributes $100 to the benefit of the person, then the contribution of the person to the primary user 2208 would be $100.

In the illustrated embodiment, the first user associated with connected user icon 2212a contributes the most to the primary user 2208. This may be a result of the first user being a contributor on shared goals that the primary user 2208 benefits from. In some embodiments, contributions to certain users associated with the primary user 2208 (e.g., spouse, dependent, etcetera) may be considered a contribution to the primary user 2208. For example, if the primary user 2208 would be responsible for a contribution to a first person, but for the contribution of a second person, the contribution of the second person to the first person may be considered a contribution to the primary user 2208.

The second user associated with connected user icon 2212b contributes the least to the primary user 2208. This may be a result of the second user only being involved in shared goals with primary user 2208 in which the second user is a beneficiary and the primary user 2208 is a contributor on, thus the second user would not contribute to the primary user 2208.

The third user associated with connected user icon 2212c contributes more to the primary user 2208 than the second user and less to the primary user 2208 than the first user. This may result from the first and third users being contributors on the shared goal, but the third user contributes less than the first user. Alternatively, this may be a result of the third user being a contributor to a first shared goal with the primary user 2208 and a beneficiary to a second shared goal with the primary user 2208. In this manner, concentric shape set 2204c allows primary user 2208 to readily ascertain the contribution that different users provide to them. Further, concentric shape set 2204c allows primary user 2208 to readily identify a user that is improperly contributing to them. For example, a dependent being located closer to primary user 2208 than a spouse in concentric shape set 2204c would provide an obvious indication that the spouse may be improperly contributing to the primary user 2208.

Further, comparison of the first, second, and third concentric shape sets 2204a, 2204b, 2204c may also provide important indications regarding the financial life of the primary user 2208. For example, a user that has fewer shared goals with the primary user 2208 than other users, but also benefits from the primary user 2208 the most may indicate that the involvement of the user in the financial life of the primary user 2208 need more investigation.

Referring to FIG. 22D, GUI view 2202d of concentric shape visualization GUI 2200 includes a connected user 2214a in conjunction with one or more goals shared with the primary user 2208 (e.g., shared goal 2216a). In various embodiments, GUI view 2202d may be generated and/or displayed in response to clicking on connected user icon 2212a in one of GUI views 2202a, 2202b, 2202c. The connected user 2214a corresponds to the connected user icon 2212a. The GUI view 2202d provides an overview of the goals that are shared between connected user 2214a and primary user 2208. In the illustrated embodiment, connected user 2214a and primary user 2208 may have shared goal 2216a in common.

Referring to FIG. 22E, GUI view 2202e of concentric shape visualization GUI 2200 includes details on the connected user 2214a. In some embodiments, GUI view 2202e may be generated and/or displayed in response to clicking on connected user 2214a in GUI view 2202d. The GUI view 2202e may provide a detailed view of the relationship between connected user 2214a and primary user 2208 that includes details on the connected user 2214a, the shared goals, and a numerical representation of how much the connected user 2214a benefits from primary user 2208 and how much they contribute to primary user 2208. In some embodiments, one or more of the shared goal data objects corresponding to the shared goals, the user profiles, and the user accounts may be utilized to generate the detailed view of the relationship between connected user 2214a and primary user 2208.

The details on the connected user 2214a may include name, relationship, and a description. The description may provide a textual summary of the relationship between the primary user 2208 and the connected user 2214a. In the illustrated embodiment, the description includes "Husband, sharing full assets, and supporting high priority goals." In many embodiments, the description may be automatically generated (or at least an automatically generated suggestion for the description) by the PAE system based on user data and shared goal data objects for the primary user 2208 and/or the connected user 2214a. For example, the description may be generated, at least in part, by advice manager 802, insight manager 902, and experience manager 1202. In some embodiments, the description may be generated by a machine learning algorithm.

Referring to FIG. 22F, GUI view 2202f of concentric shape visualization GUI 2200 includes a connected user 2214b in conjunction with one or more goals shared with the primary user 2208 (e.g., shared goal 2216b). In various embodiments, GUI view 2202f may be generated and/or displayed in response to clicking on connected user icon 2212b in one of GUI views 2202a, 2202b, 2202c. The connected user 2214b corresponds to the connected user icon 2212b. The GUI view 2202g provides an overview of the goals that are shared between connected user 2214b and primary user 2208. The connected user 2214b and primary user 2208 have shared goal 2216b in common. In the illustrated embodiment, shared goal 2216b is the same as shared goal 2216a. However, this is not necessary. Additionally, a plurality of shared goals may be displayed without departing from the scope of this disclosure.

In various embodiments, the positioning of the shared goals with respect to a connected user (e.g., connected user 2214a, 2214b) in the shared goal overviews (e.g., GUI views 2202d, 2202f) may have significance. For example, shared goals in which the connected user is a contributor may be displayed on the left side of the connected user while shared goals in which they are a beneficiary may be displayed on the right side. Accordingly, shared goal 2216a is displayed on the left sign of connected user 2214a in GUI view 2202d and shared goal 2216b is displayed on the right side of connected user 2214b in GUI view 2202f.

Referring to FIG. 22G, GUI view 2202g of concentric shape visualization GUI 2200 includes details on the connected user 2214b. In some embodiments, GUI view 2202g may be generated and/or displayed in response to clicking on connected user 2214b in GUI view 2202h. The GUI view 2202g may provide a detailed view of the relationship between connected user 2214b and primary user 2208 that includes details on the connected user 2214b, the shared goals, and a numerical representation of how much the connected user 2214b benefits from primary user 2208 and how much they contribute to primary user 2208. In several embodiments, one or more of the shared goal data objects corresponding to the shared goals, the user profiles, and the user accounts may be utilized to generate the detailed view of the relationship between connected user 2214b and primary user 2208.

The details on the connected user 2214b may include name, relationship, and a description. The description may provide a textual summary of the relationship between the primary user 2208 and the connected user 2214b. In the illustrated embodiment, the description includes "Support education up until the end of college." In several embodiments, the description may be automatically generated (or at least an automatically generated suggestion for the description) by the PAE system based on user data and shared goal data objects for the primary user 2208 and/or the connected user 2214a. For example, the description may be generated, at least in part, by advice manager 802, insight manager 902, and experience manager 1202. In one embodiment, portions of the shared goal data objects for the common shared goals (e.g., objectives data 716) and/or user profiles (e.g., relationship data 516) may be utilized to generate the description. In some embodiments, the description may be generated by a machine learning algorithm.

In various embodiments, one or more of the following operations may occur during operation of the PAE system. More specifically, one or more of the following operations may occur in receiving concentric shape visualizations as part of a customized PAE experience, such as via concentric shape visualization GUI 2200. In many embodiments, the PAE system application 214 may generate, based on customized experience data 208, the concentric shape visualizations on user device 204 as tailored display content 210 presented via GUI 212. In various such embodiments, the customized experience data 208 may be generated by experience manager 1202.

A set of shared goals associated with an account holder may be identified, such as based on goal data 518 in user profile 504. In some embodiments, the account holder may be primary user 2208. A set of users associated with at least one goal in the set of shared goals may be determined. The set of users may include first and second users. For example, the set of users may include connected user 2214a and connected user 2214b. A first subset of shared goals from the set of shared goals that is associated with the first user and the account holder may be determined. A second subset of shared goals from the set of shared goals that is associated with the second user and the account holder may be determined. For example, these subsets may be determined based on one or more user profiles and/or shared goal data objects associated with the account holder, the first user, and/or the second user.

An importance level of each user in the set of users relative to one or more shared goals in the set of shared goals associated with the account holder may be calculated. In some embodiments, the importance level may comprise a number of goals shared with the primary user.

Customized experience data may be generated based on one or more of the set of shared goals, the first subset, the second subset, and the importance level of each user in the set of users. For example, experience synthesizer 1208 may generate customized experience data 208. The customized experience data may be communicated to a user device. For example, customized experience data 208 may be communicated to user device 204.

Further, the customized experience data 208 may cause the user device 204 to generate a set of substantially concentric shapes, create first and second graphical icons, and locate the first and second graphical icons on the set of substantially concentric shapes, such as described below.

A set of substantially concentric shapes may be generated in a GUI (e.g., concentric shape visualization GUI 2200). The set of substantially concentric shapes may be configured to visually communicate importance levels of different users in the set of users associated with one or more shared goals in the set of shared goals. For example, each of concentric shape sets 2204a, 2204b, 2204c are configured to visually communicate importance levels of different users in the set of users associated with one or more shared goals in the set of shared goals.

A first graphical icon corresponding to the first user may be created, such as connected user icon 2212a. The first graphical icon in the GUI may be located at a first shape in the set of substantially concentric shapes based on the importance level of the first user. For example, connected user icon 2212a is located at concentric shape 2206d in FIG. 22B.

A second graphical icon corresponding to the second user may be created, such as connected user icon 2212b. The second graphical icon in the GUI may be located at a second shape in the set of substantially concentric shapes based on the importance level of the second user. For example, connected user icon 2212b is located at concentric shape 2206a in FIG. 22B.

In various embodiments, the importance level of the first user relative to one or more shared goals in the set of shared goals associated with the account holder is calculated based on a number of shared goals in the first subset of shared goals (see e.g., FIG. 22A). In some embodiments, the importance level of the first user relative to one or more shared goals in the set of shared goals associated with the account holder is calculated based on an amount of benefit the first user receives from the set of shared goals associated with the account holder (see e.g., FIG. 22B). In many embodiments, the importance level of the first user relative to one or more shared goals in the set of shared goals associated with the account holder is calculated based on an amount of contribution the first user provides towards the set of shared goals associated with the account holder (see e.g., FIG. 22C).

In several embodiments, the GUI comprises an overview GUI, the first graphical icon is selectable in the overview GUI, and, in response to selection of the first graphical icon, a details GUI comprising an indication of the first subset of shared goals may be displayed. For example, the overview GUI may comprise GUI view 2202a and the details GUI may comprise GUI view 2202e. An account holder graphical icon may be created based on data associated with the account holder and located approximately at a center of the set of substantially concentric shapes (see e.g., primary user 2208 in FIGS. 22A-22C).

In many embodiments, at least one of the substantially concentric shapes comprises at least a portion of a ring, such as shown in concentric shape set 2204a. In some embodiments, graphical icons located closer to a center of the set of substantially concentric shapes have a higher importance level than graphical icons located further from the center of the set of substantially concentric shapes (see e.g., concentric shape sets 2204a, 2204b, 2204c).

Data associated with each of the first user and the second user may be retrieved. For example, one or more portions of user data 722 in shared goal data object 704 may be retrieved. The first graphical icon corresponding to the first user may be created based on the data associated with the first user and the second graphical icon corresponding to the second user may be created based on the data associated with the second user. In some such embodiments, the data associated with the first user comprises a profile picture of the first user.

Figure 23A:
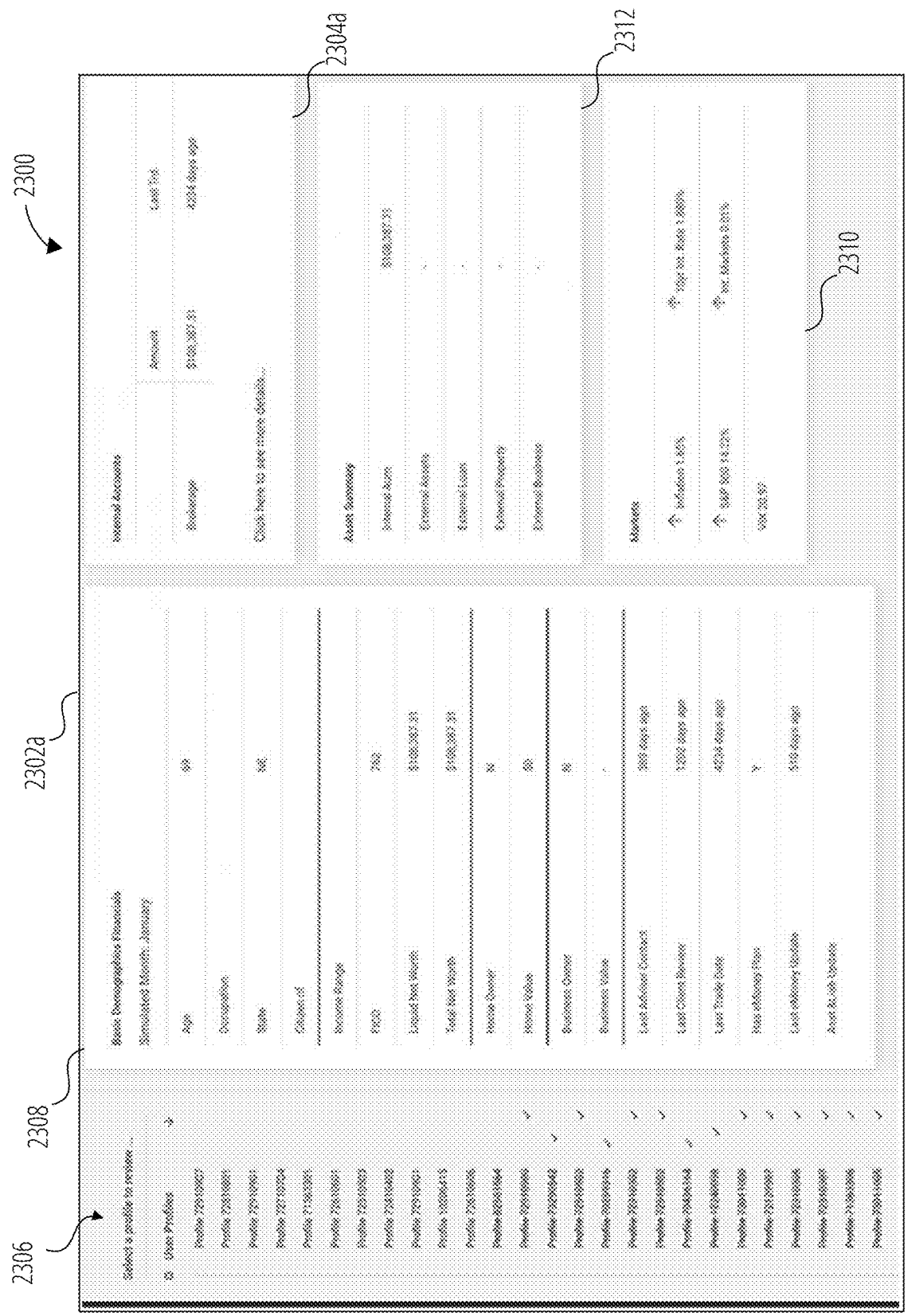
FIGS. 23A-23F illustrate various aspects of a subject matter expert (SME) GUI according to one or more embodiments of the current disclosure.
Figure 23B:
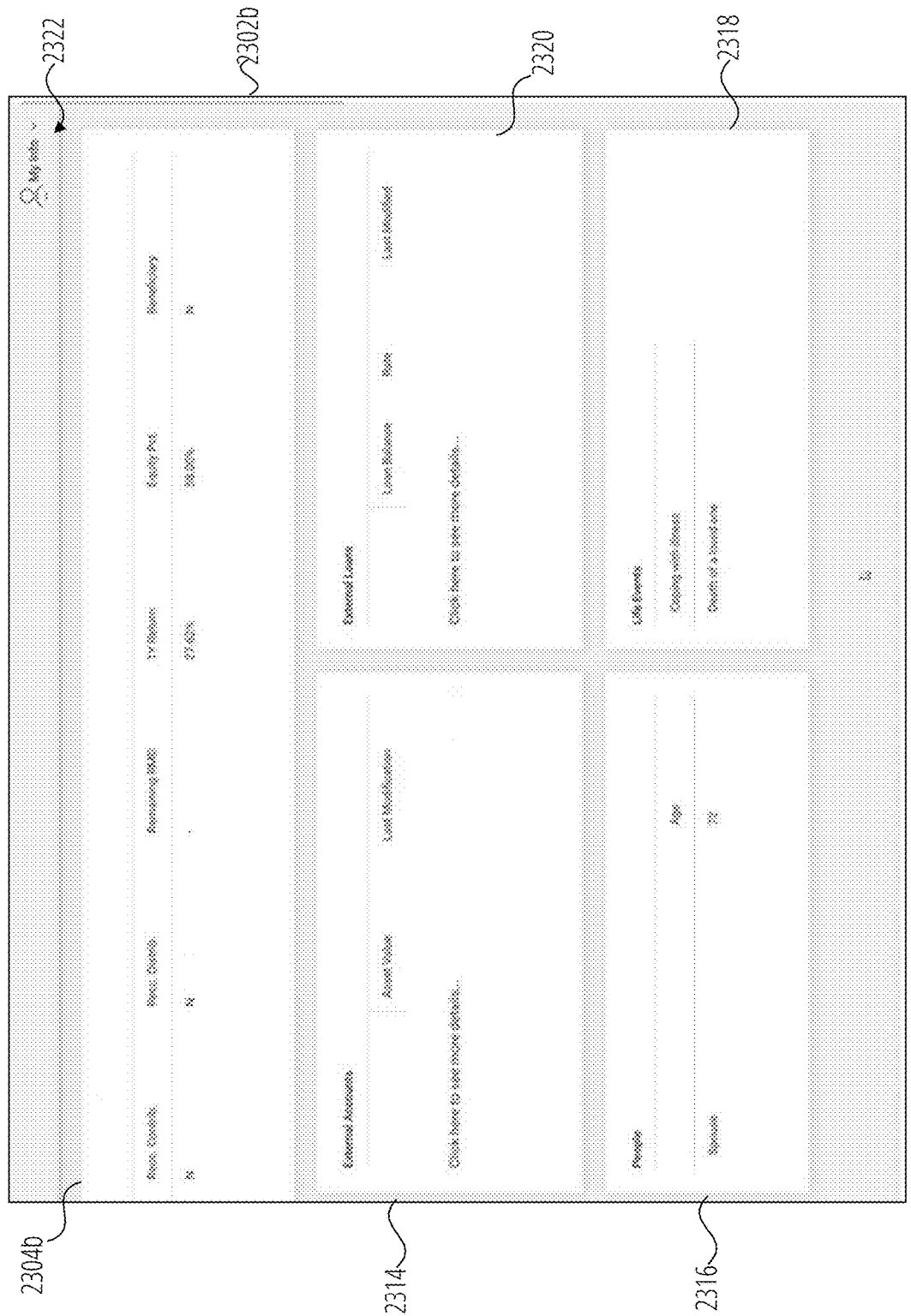
Figure 23C:
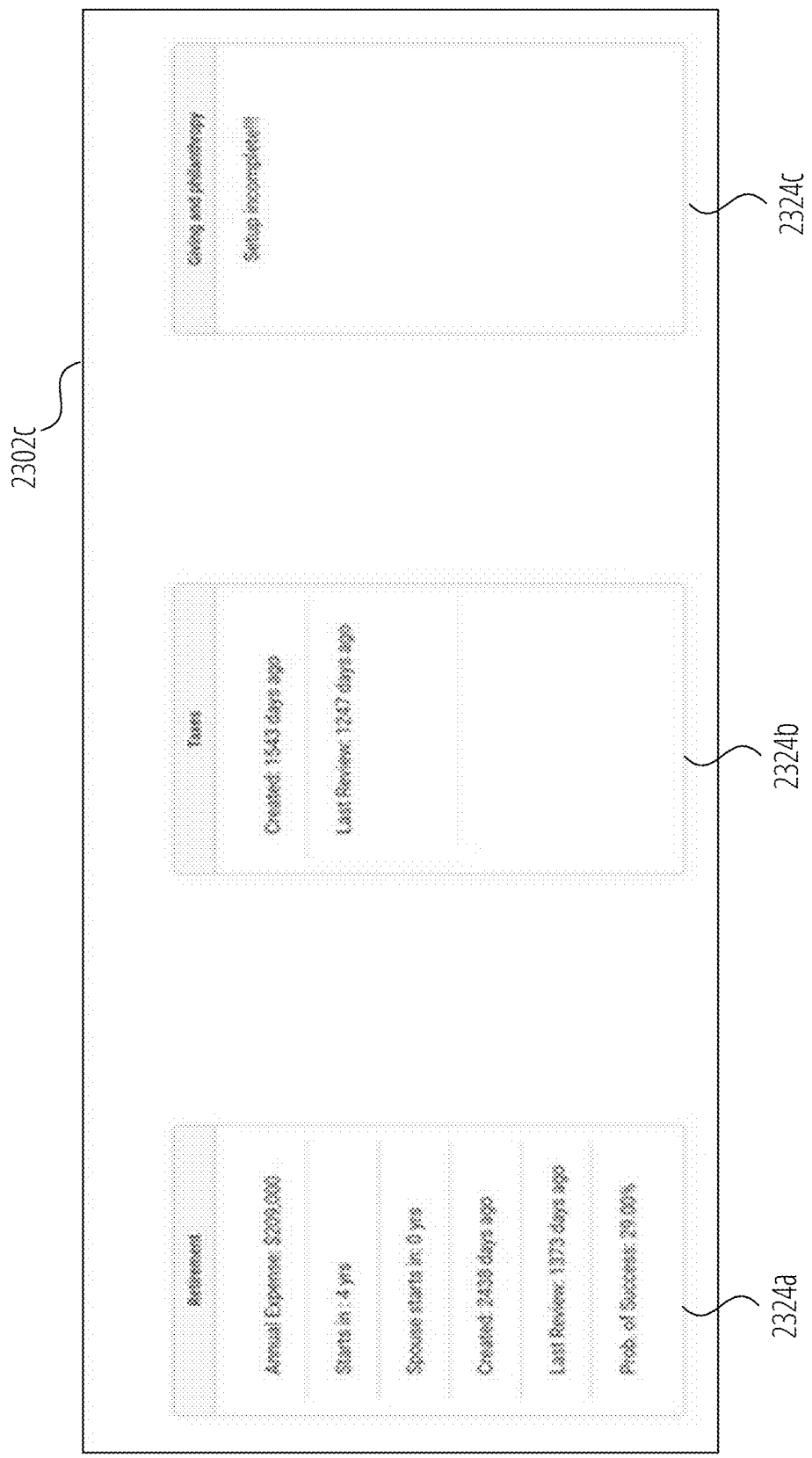
Figure 23D:
Figure 23E:
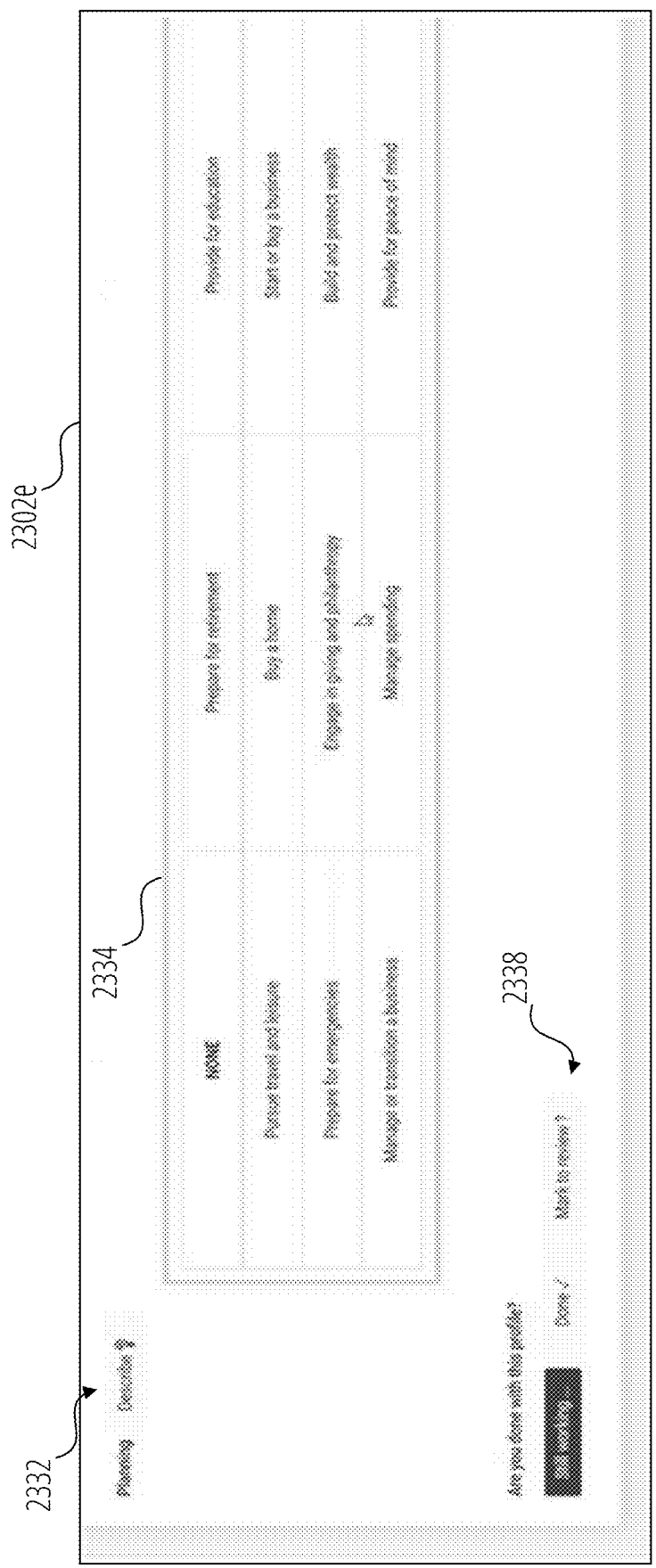
Figure 23F:
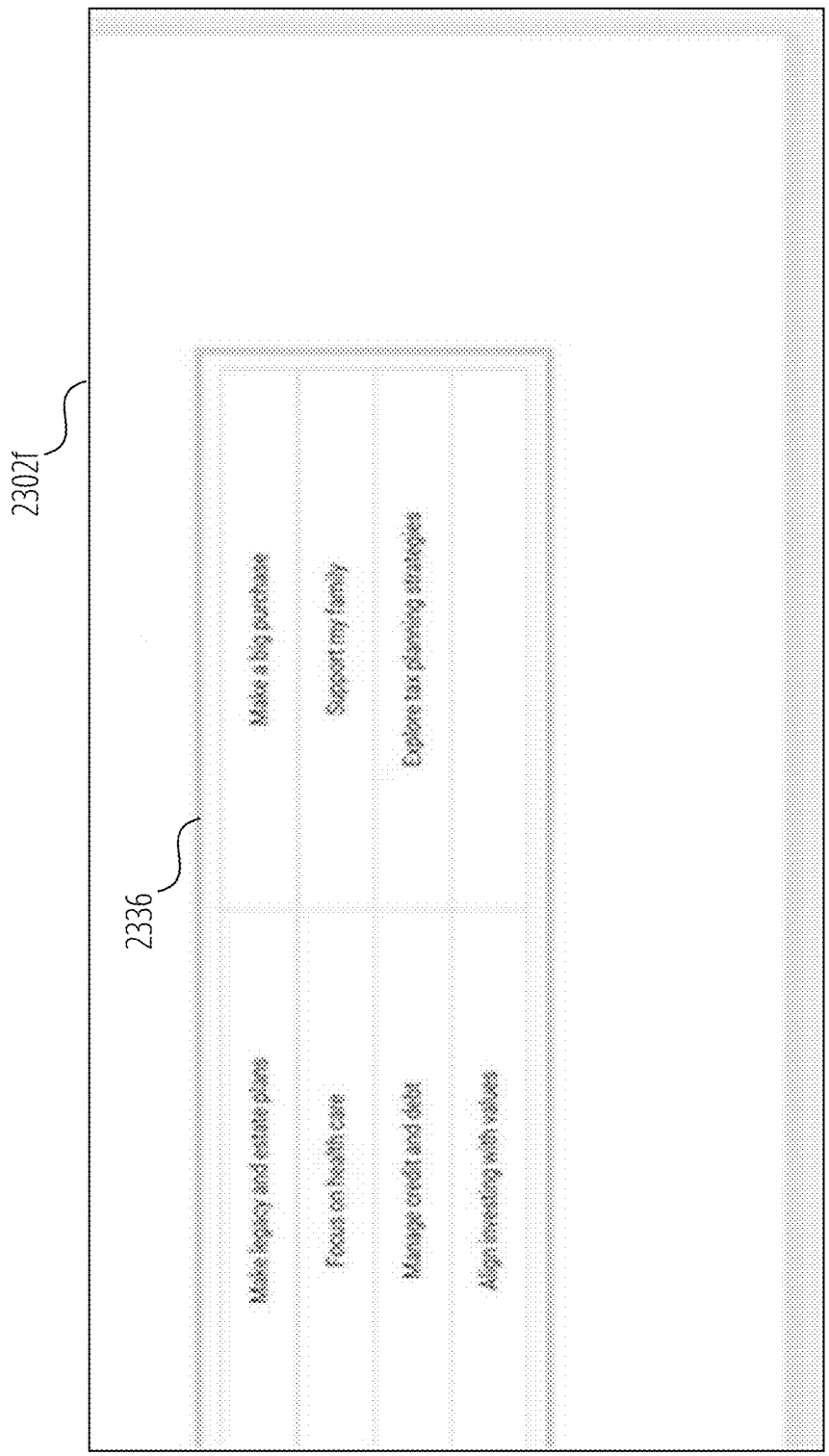

FIGS. 23A-23F illustrate various aspects of an SME GUI 2300 according to one or more embodiments of the current disclosure. The SME GUI 2300 results in an improved user interface for electronic devices at least through the specific manners of providing (e.g., by displaying) a customized review experience to an SME described below. For example, the SME GUI 2300 may provide a specific improvement over existing systems by displaying customized sets of data and options for SMEs to provide advice in a manner to facilitate the generation of training data for ML models described hereby. FIG. 23A illustrates GUI view 2302*a* of SME GUI 2300, FIG. 23B illustrates GUI view 2302*b* of SME GUI 2300, FIG. 23C illustrates GUI view 2302*c* of SME GUI 2300, FIG. 23D illustrates GUI view 2302*d* of SME GUI 2300, FIG. 23E illustrates GUI view 2302*e* of SME GUI 2300, and FIG. 23F illustrates GUI view 2302*f* of SME GUI 2300. In various embodiments, SME GUI 2300 including GUI views GUI view 2302*a*, 2302*b*, 2302*c*, 2302*d*, 2302*e*, 2302*f* illustrate various instances of an interface for a profile review tool (e.g., profile review tool 816) provided by PAE system 202. Further, one or more PAE systems, or components thereof, may be utilized to realize the functionality described with respect to FIGS. 23A-23F, such as device interface 304, account manager 402, profile manager 502, resource manager 602, goal manager 702, advice manager 802, insight manager 902, feedback manager 1002, connection manager 1102, and/or experience manager 1202. Embodiments are not limited in this context.

Referring to FIG. 23A, GUI view 2302*a* of SME GUI 2300 includes an internal accounts left table portion 2304*a* (internal accounts right table portion 2304*b* in FIG. 23B), profile review table 2306, basic demographics financials table 2308, markets table 2310, and asset summary table 2312. As previously described, one or more portions of the profiles may be synthetic, simulated, randomized, and/or missing. For example, the current month may be simulated. In such examples, the current month may be simulated because advice may change based on time of year. For instance, advice regarding saving for holiday presents may only be provided at appropriate times of the year. In various embodiments, data may be removed to simulate scenarios in which portions of profile data are not available. In various such embodiments, this technique may be utilized to produce robust models that can make accurate recommendations based on partial or incomplete profile data.

The profile review table 2306 may include a set of profiles for an SME to review. In various embodiments, the SME can select any of the profiles to bring up the corresponding information. In various embodiments, the profile review table 2306 may provide indications of profiles that have been reviewed and/or are awaiting review. For example, strikethrough and/or checks may be utilized to indicate a profile has been reviewed. In one embodiment, a first indicator (e.g., strikethrough) may indicate whether an SME has provided the required input for a profile and a second indicator (e.g., checkmark) may indicate that the required input for the profile has been submitted to the PAE system.

The basic demographics financials table 2308 may include basic information regarding a user (or simulated user). In the illustrated embodiment, the basic demographics financials table 2308 includes data (or at least a position for data) related to a current month, an age, an occupation, a state, a citizenship, an income range, a credit score, a liquid net worth, a total net worth, a home ownership, home value, business ownership, business value, last advisor contact, last client review, last trade date, plan memberships, membership updates, assets updates, and liabilities updates.

The asset summary table 2312 may include a summary of assets associated with the profile. In the illustrated embodiment, the asset summary table 2312 includes data (or at least a position for data) related to internal assets, external assets, external loans, external property, and external business. The markets table 2310 may include market data and indicators that may affect financial decisions. In the illustrated embodiment, the markets table 2310 includes data (or at least a position for data) related inflation, interest rates, and market indexes. The internal accounts table 2304 may include a summary of internal accounts associated with the profile. In the illustrated embodiment, the internal accounts left table portion 2304*a* includes data (or at least a position for data) related to internal brokerage accounts, such as value and last trade indications.

Referring to FIG. 23B, GUI view 2302*b* of SME GUI 2300 includes internal accounts right table portion 2304*b*, external accounts table 2314, people table 2316, life events table 2318, external loans table 2320, and SME menu 2322. As previously mentioned, the internal accounts table 2304 may include a summary of internal accounts associated with the profile. In the illustrated embodiment, the internal accounts right table portion 2304*b* includes data (or at least a position for data) related to contributions, distributions, required minimum distributions, yearly return, equity percentage, and beneficiaries.

The external accounts table 2314 may include a summary of external accounts associated with the profile. In the illustrated embodiment, the external accounts table 2314 includes data (or at least a position for data) related to asset value and last modification. The people table 2316 may include a summary of important people associated with the profile. In the illustrated embodiment, the people table 2316 includes data (or at least a position for data) related to family members and their age.

The external loans table 2320 may include a summary of external loans associated with the profile. In the illustrated embodiment, the external loans table 2320 includes data (or at least a position for data) related to loan balance, interest rate, and last modification. The life events table 2318 may include a summary of important and/or relevant life events associated with the profile. In the illustrated embodiment, the life events table 2318 includes data (or at least a position for data) related to deaths and illnesses. Additionally, the SME menu 2322 may enable the SME to access a menu of options, such as to log off or exit.

Referring to FIG. 23C, GUI view 2302*c* of SME GUI 2300 includes a table for each goal associated with the profile including goal table 2324*a*, 2324*b*, 2324*c*. The goal tables may provide relevant information regarding the goal. For example, goal table 2324*a* includes a retirement goal with an annual expense, a retirement start date, a spousal retirement start date, a creation date, a last reviewed date, and a probability of success. In another example, goal table 2324*b* includes a taxes goal with a creation date and a last reviewed date. In yet another example, goal table 2324*c* includes a giving and philanthropy goal with an indication that the goal has not been completely set up. In various embodiments, such indications (e.g., incomplete setup) may still convey valuable information regarding the profile. For example, goal table 2324*a* still indicates the profile is interested in giving and philanthropy. Additionally, an incomplete setup may indicate a lack of understanding (and therefore ripe for advice).

Referring to FIG. 23D, GUI view 2302*d* of SME GUI 2300 enables an SME to provide feedback and/or recommendations based on the profile, such as related to content suggestions. As previously described, SMEs may asked to indicate option A, option B, or neither options in response to two suggested items of advice content. Accordingly, the illustrated embodiment includes choice column 2328*a*, choice column 2328*b*, and recommendation column 2330.

For example, based on the profile illustrated in FIGS. 23A-23C, an SME may be asked to choose to recommend to create a budget, review liability insurance coverage, or neither. In some embodiments, the 'A' and 'B' options may be based on previously provided recommendations. Aspects of option determination by the PAE system was previously described in more detail above. Additionally, GUI view 2302d includes a feedback icon 2326 that may enable an SME to provide feedback regarding one or more items of the SME GUI 2300. For example, insights behind recommendations may be provided via feedback icon 2326. In an alternative, or additional example, the SME may click on the feedback icon 2326 to get instructions for providing feedback and/or recommendations.

Referring to FIGS. 23E and 23F, GUI views 2302e, 2302f of SME GUI 2300 enable an SME to provide feedback and/or recommendations based on the profile, such as related to planning. In the illustrated embodiment, GUI view 2302e includes recommendation left table portion 2334, feedback icon 2332, and review controls 2338 and GUI view 2302f includes recommendation right table portion 2336. In various embodiments, an SME may make zero or more planning recommendations, such as by selecting one or more of the icons in the recommendation table 2334, 2336. In one embodiment, the planning recommendations may include goal recommendations. Additionally, feedback icon 2332 that may enable an SME to provide feedback regarding one or more items of the SME GUI 2300. For example, insights behind recommendations may be provided via feedback icon 2332. In an alternative, or additional example, the SME may click on the feedback icon 2332 to get instructions for providing feedback and/or recommendations.

FIG. 24 illustrates a process flow 2402 for providing advice content according to one or more embodiments described hereby. In various embodiments, process flow 2402 may be implemented by one or more components of a PAE system disclosed hereby (e.g., PAE system 302). As will be described in more detail below, the process flow 2402 includes steps 2450a, 2450b, 2450c, 2450d, 2450e, 2450f (collectively referred to as steps 2350). Additionally, process flow 2402 includes background processes 2452a, 2452b, 2452c, 2452d, 2452f, 2452e (collectively referred to as background processes 2452). In various embodiments, the background processes 2452 may occur regardless of interaction between the user device 2404 and experience manager 2408 while the steps 2350 may occur in response to, or as part of, interaction between the user device 2404 and experience manager 2408. The illustrated embodiment includes user device 2404, advice manager 2406, experience manager 2408, event store and stream-processing 2410, account manager 2412, goal manager 2414, driver 2416, timing device 2418, other resources 2420, and domain services 2422. The advice manager 2406 includes advice service 2424, advice engine 2426, prioritized client messaging 2428, message repository 2442, and rules 2444. The advice engine 2426 includes data aggregator 2430, prioritize 2432, get messages 2434, filter messages 2436, model 2438, and rules engine 2440. The experience manager 2408 includes experience synthesizer 2448. The driver 2416 includes user set 2446.

In some embodiments, FIG. 24 may include one or more components that are the same or similar to one or more other components of the present disclosure. For example, advice manager 2406 may be the same or similar to advice manager 802. In another example, event store and stream-processing 2410 may be the same or similar to connection manager 320. In yet another example, experience manager 2408 may be the same or similar to experience manager 1202. In yet another example, user device 2404 may be the same or similar to user device 204. Further, one or more components of FIG. 24, or aspects thereof, may be incorporated into, or excluded from, various embodiments of the present disclosure without departing from the scope of this disclosure. For example, advice service 2424 may be incorporated into advice manager 802 without departing from the scope of this disclosure. In another example, event store and stream-processing 2410 may be incorporated into PAE system 302 without departing from the scope of this disclosure. In yet another example, driver 2416 may be incorporated into profile manager 308. In yet another example, feedback manager 1002 may be incorporated into experience manager 2408. More generally, it will be appreciated that the various steps, processes, and components of the process flow 2402 are exemplary and a variety of configurations and components may be utilized to realize the functionality described hereby without departing from the scope of the disclosure.

In various embodiments, the process flow 2402 may begin at step 2450a. At step 2450a, credentials may be provided via user device 2404 for a user to login to their account. For example, a username and password may be provided at step 2450a. In some embodiments, this may cause the user device 2404 to be associated with the user.

At step 2450b, messaging (e.g., advice content, tasks, insights, benefits, actions) may be requested from the advice manager 2406. In some embodiments, messaging may be requested in response to logging into an account. In various embodiments, messaging may be requested at various points of interaction with the user device 2404. In some embodiments, a request payload may be provided to advice manager 2406 to obtain the messages. In some such embodiments, the model 2438 may be deployed as a model service that is stateless and receives all necessary model inputs through a request payload.

In some embodiments, operation of the advice manager 2406 may be triggered by the request for messages. In other embodiments, operation of the advice manager 2406 may occur periodically. In various embodiments, operation of the advice manager 2406 may proceed as follows. The data aggregator 2430 may collect relevant information for generating the advice (e.g., one or more portions of one or more of user account 404, user profile 504, shared goal data object(s) 704, user activity dataset 1004, and user connection data 1104). In one embodiment, data aggregator 2430 may get an up-to-date user profile 504 for the user from profile manager 502. In various embodiments, information included in the request may be utilized to identify the appropriate user. The relevant information may then be passed to prioritize 2432, where the model 2438 may prioritize the different advice types based on the relevant information. Next, get messages 2434 may create a set of potential messages. At filter messages 2436, the set of potential messages may be filtered to produce a final set of prioritized messages for the user. The final set of prioritized messages for the user may then be stored at prioritized client messaging 2428.

Proceeding from step 2450b to step 2450c, one or more messages comprising advice content may be provided to the experience manager 2408 by the advice manager 2406. Continuing to step 2450d, the experience manager 2408 may determine which, when, and/or where to display the one or more of the messages received from the advice manager 2406. For example, experience synthesizer 2448 may determine when and/or where to display the messages as part of delivering a customized PAE experience. At step 2450e, the selected messages may be provided (e.g., as tailored display content 210) to user device 2404 for presentation on a GUI (e.g., GUI 212).

Proceeding to step 2450f, feedback or information regarding the messages or user may be received. For example, one or more user actions regarding the messages, such as clicks, views, screen time, dismissal, and the like, may be provided to the event store and stream-processing 2410. In another embodiment, indication of a login may be provided to the event store and stream-processing 2410. In various embodiments, the event store and stream-processing 2410 may utilize the feedback to update one or more preferences and/or prioritized client messaging 2428. More generally, event store and stream-processing 2410 may update one or more items of data regarding one or more users based on received notifications and data. For example, event indications coming into event store and stream-processing 2410 may trigger the advice engine 2426 to update the prioritized client messaging 2428 for one or more users. In one example, prioritized client messaging 2428 may be updated in response to a user logging in, or creating a goal, or performing one or more other interactions with the PAE system.

In some embodiments, the updated preferences may affect future messaging. For example, the feedback may cause the one or more components (e.g., advice manager 2406) to update one or more settings, preferences, and/or rules (e.g., rules 2444) such that a particular message that the user dismissed will not be provided to the user device 2404 again. In another example, feedback from a user indicating a message was helpful may cause the advice engine 2426 to assign more utility to messages of the same type, thereby increasing the likelihood that messages of that type are provided to that user.

In many embodiments, the feedback may cause the advice manager 2406 to update rules 2444 such that a particular message that the user dismissed will not be provided to the user device 2404 again until a second event occurs. For example, in response to a user dismissing advice regarding opening a college savings account, the rules 2444 may be updated such that advice regarding opening a college savings account will not be displayed to the user again for 3 years. In some such example, the number of years may be based on profile data regarding the user (e.g., age of user, age of child, etcetera). In another example, in response to a user dismissing advice regarding refinancing a house, the rules 2444 may be updated such that advice regarding refinancing a house will not be displayed to the user again until it is determined that a house has been purchased, such as based on a life event or completion of a goal.

In various embodiments, the process flow 2402 may be supported by background processes 2452. In several embodiments, the background processes 2452 may occur in a continual or periodic manner that is not dependent upon interaction with user device 2404.

In background process 2452a, account manager 2412 may provide notifications related to internal and/or external accounts of one or more users to event store and stream-processing 2410 by account manager 2412. For example, account manager 2412 may provide a notification identifying a new investment account of the user. In such examples, event store and stream-processing 2410 may update one or more datastores (e.g., prioritized client messaging 2428) to cause the advice manager 2406 to provide advice, such as recommended reading, regarding the new investment account to the user.

In background process 2452b, goal manager 2414 may provide notifications related to one or more goals to event store and stream-processing 2410. For example, background process 2452b may provide an update to the event store and stream-processing 2410 in response to a modified target data for a shared goal or creation of a new goal. In background process 2452c, driver 2416 may utilize timing device 2418 to provide timing-related notifications corresponding to one or more users in user set 2446 to event store and stream-processing 2410. In some embodiments, the timing-related notifications may include a time or batch-based trigger. For example, driver 2416 may be utilized to trigger batch refreshes to update advice content (e.g., prioritized client messaging 2428) for sets of users. In one such examples, prioritized client messaging 2428 may be updated for users that have not logged in within the past year. In another example, prioritized client messaging 2428 may be updated for sets of clients, such as based on season, time, events, and/or updates to one or more PAE system components (e.g., advice engine 2426 or rules 2444).

In background process 2452d, event store and stream-processing 2410 may provide updates to the advice manager 2406, such as event-based triggers. In background process 2452e, data aggregator 2430 may get information from domain services 2422. In one embodiment, domain services 2422 may pull information and package it to populate data in profiles. This may include connections to numerous APIs, databases, etcetera. In many embodiments, sources of information may be included in domain services 2422. In one or more embodiments, domain services 2422 may be included in connection manager 320. In background process 2452f, the advice engine 2426 may save a prioritized user messaging list to prioritized client messaging 2428. In many embodiments, a user may access and/or change one or more aspects of the advice manager 2406 via administrator interface 818. For example, an administrator may utilize administrator interface 818 to change or add messages to message repository 2442. In another example, the administrator interface 818 may be utilized to change or add rules to rules 2444.

In various embodiments, other resources 2420 may include a connection to a content management system. In one embodiments, the content management system may format data (e.g., suppress navigation, present in a window) collected from other sources, such as the internet. Accordingly, other resources 2420 may include web-based resources, such as articles, videos, and the like. In one example, other resources 2420 may enable the PAE system to provide videos and other information content within one or more PAE system applications.

Figure 25:
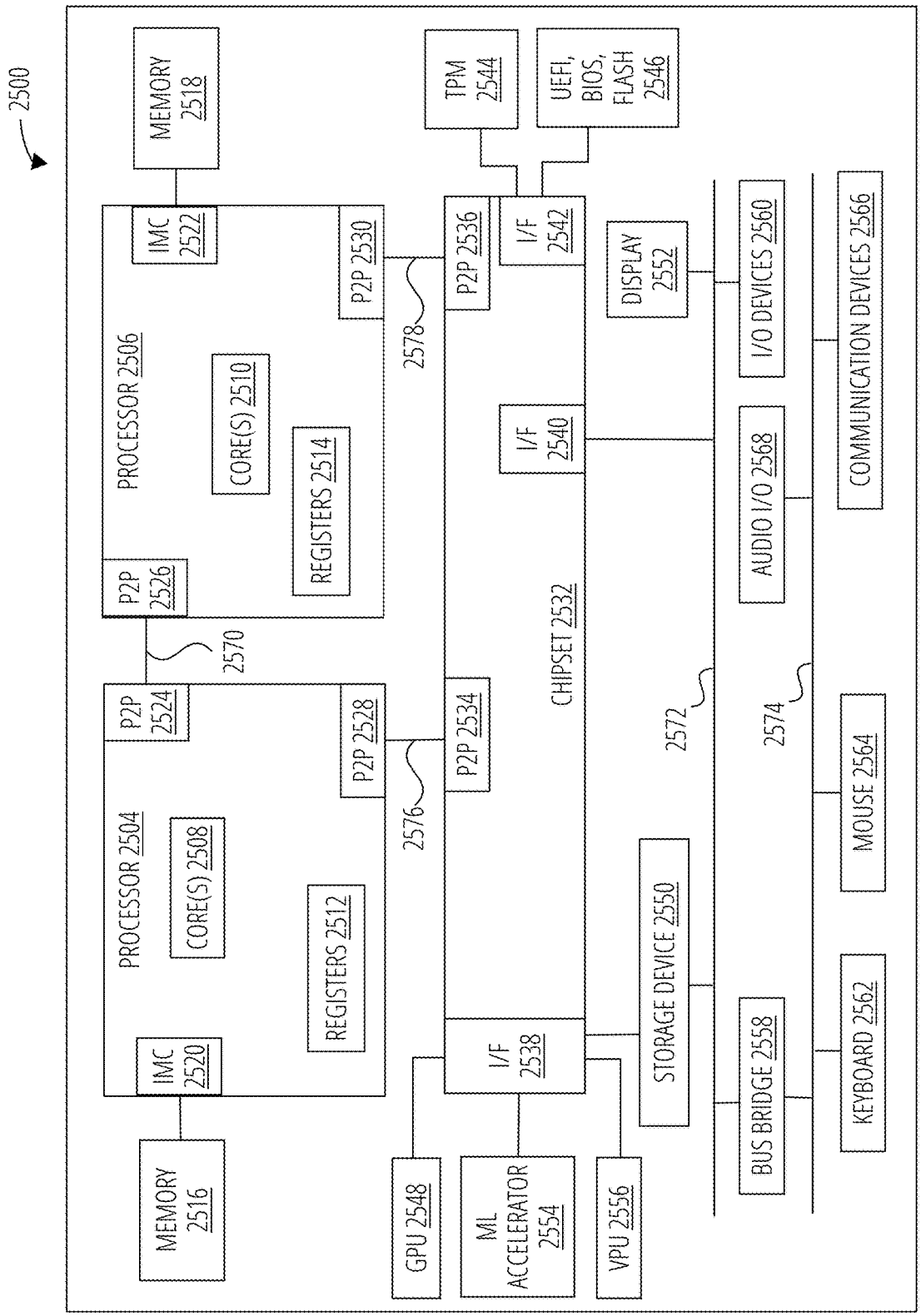
FIG. 25 illustrates exemplary aspects of a computing system according to one or more embodiments described hereby.

FIG. 25 illustrates an embodiment of a system 2500 that may be suitable for implementing various embodiments described hereby. System 2500 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 2500 may have a single processor with one core or more than one processor. Note that the term "processor" refers to a processor with a single core or a processor package with multiple processor cores. In at least one embodiment, the computing system 2400, or one or more components thereof, is representative of one or more components described hereby, such as one or more components of PAE system 302 and/or user device 204. More generally, the computing system 2500 may be configured to implement embodiments including logic, systems, logic flows, methods, apparatuses, and functionality described hereby. The embodiments, however, are not limited to implementation by the system 2500.

As used in this application, the terms "system" and "component" and "module" are generally intended to refer to a computer-related entity, either hardware, a combination of hardware and software, software, or software in execution, examples of which are provided by the exemplary system 2500. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Although not necessarily illustrated, the computing system 2500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. Further, the computing system 2500 may include or implement various articles of manufacture. An article of manufacture may include a non-transitory computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, encrypted code, and the like, implemented using any suitable high-level, low-level, object-oriented, visual, compiled, and/or interpreted programming language. Embodiments may also be at least partly implemented as instructions contained in or on a non-transitory computer-readable medium, which may be read and executed by one or more processors to enable performance of the operations described hereby. In several embodiments, at least one non-transitory computer-readable storage medium may store computer-executable program code instructions that, when executed by a computing apparatus, cause the computing apparatus to perform one or more operations described hereby.

As illustrated in FIG. 25, the system 2500 comprises a motherboard or system-on-chip (SoC) 2502 for mounting platform components. Motherboard or system-on-chip (SoC) 2502 is a point-to-point (P2P) interconnect platform that includes a first processor 2504 and a second processor 2506 coupled via a point-to-point interconnect 2570 such as an Ultra Path Interconnect (UPI). In other embodiments, the system 2500 may be of another bus architecture, such as a multi-drop bus. Furthermore, each of processor 2504 and processor 2506 may be processor packages with multiple processor cores including core(s) 2508 and core(s) 2510, respectively. While the system 2500 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 2504 and chipset 2532. Some platforms may include additional components and some platforms may only include sockets to mount the processors and/or the chipset. Furthermore, some platforms may not have sockets (e.g., SoC, or the like).

The processor 2504 and processor 2506 can be any of various commercially available processors. Dual microprocessors, multi-core processors, and other multi-processor architectures may also be employed as the processor 2504 and/or processor 2506. Additionally, the processor 2504 need not be identical to processor 2506.

Processor 2504 includes an integrated memory controller (IMC) 2520 and point-to-point (P2P) interface 2524 and P2P interface 2528. Similarly, the processor 2506 includes an IMC 2522 as well as P2P interface 2526 and P2P interface 2530. IMC 2520 and IMC 2522 couple the processors processor 2504 and processor 2506, respectively, to respective memories (e.g., memory 2516 and memory 2518). Memories 2516, 2518 can store instructions executable by circuitry of system 2500 (e.g., processor 2504, processor 2506, graphics processing unit (GPU) 2548, ML accelerator 2554, vision processing unit (VPU) 2556, or the like). For example, memories 2516, 2518 can store instructions for one or more of PAE system 302, account manager 402, profile manager 502, resource manager 602, goal manager 702, advice manager 802, insight manager 902, feedback manager 1002, connection manager 1102, and experience manager 1202. In another example, memories 2516, 2518 can store data, such as one or more user accounts 404, user profiles 504, shared goal data objects 704, user activity dataset 1004, and/or user connection data 1104. Memory 2516 and memory 2518 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 2516 and memory 2518 locally attach to the respective processors (i.e., processor 2504 and processor 2506). In other embodiments, the main memory may couple with the processors via a bus and/or shared memory hub.

System 2500 includes chipset 2532 coupled to processor 2504 and processor 2506. Furthermore, chipset 2532 can be coupled to storage device 2550, for example, via an interface (I/F) 2538. The I/F 2538 may be, for example, a Peripheral Component Interconnect-enhanced (PCI-e). In many embodiments, storage device 2550 comprises a non-transitory computer-readable medium. Storage device 2550 can store instructions executable by circuitry of system 2500 (e.g., processor 2504, processor 2506, GPU 2548, ML accelerator 2554, vision processing unit 2556, or the like). For example, storage device 2550 can store instructions for one or more of PAE system 302, account manager 402, profile manager 502, resource manager 602, goal manager 702, advice manager 802, insight manager 902, feedback manager 1002, connection manager 1102, and experience manager 1202. In another example, memories 2516, 2518 can store data, such as one or more user accounts 404, user profiles 504, shared goal data objects 704, user activity dataset 1004, and/or user connection data 1104. In some embodiments, instructions may be copied or moved from storage device 2550 to memory 2516 and/or memory 2518 for execution, such as by processor 2504 and/or processor 2506.

Processor 2504 couples to a chipset 2532 via P2P interface 2528 and P2P interface 2534 while processor 2506 couples to a chipset 2532 via P2P interface 2530 and P2P interface 2536. Direct media interface (DMI) 2576 and DMI 2578 may couple the P2P interface 2528 and the P2P interface 2534 and the P2P interface 2530 and P2P interface 2536, respectively. DMI 2576 and DMI 2578 may be a high-speed interconnect that facilitates, e.g., eight Giga Transfers per second (GT/s) such as DMI 3.0. In other embodiments, the components may interconnect via a bus.

The chipset 2532 may comprise a controller hub such as a platform controller hub (PCH). The chipset 2532 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 2532 may comprise more than one controller hub such as a chipset with a memory controller hub, a graphics controller hub, and an input/output (I/O) controller hub.

In the depicted example, chipset 2532 couples with a trusted platform module (TPM) 2544 and UEFI, BIOS, FLASH circuitry 2546 via I/F 2542. The TPM 2544 is a dedicated microcontroller designed to secure hardware by integrating cryptographic keys into devices. The UEFI, BIOS, FLASH circuitry 2546 may provide pre-boot code.

Furthermore, chipset 2532 includes the I/F 2538 to couple chipset 2532 with a high-performance graphics engine, such as, graphics processing circuitry or a graphics processing unit (GPU) 2548. In other embodiments, the system 2500 may include a flexible display interface (FDI) (not shown) between the processor 2504 and/or the processor 2506 and the chipset 2532. The FDI interconnects a graphics processor core in one or more of processor 2504 and/or processor 2506 with the chipset 2532.

Additionally, ML accelerator 2554 and/or vision processing unit 2556 can be coupled to chipset 2532 via I/F 2538. ML accelerator 2554 can be circuitry arranged to execute ML related operations (e.g., training, inference, etc.) for ML models. Likewise, vision processing unit 2556 can be circuitry arranged to execute vision processing specific or related operations. In particular, ML accelerator 2554 and/or vision processing unit 2556 can be arranged to execute mathematical operations and/or operands useful for machine learning, neural network processing, artificial intelligence, vision processing, etcetera. In some embodiments, Various I/O devices 2560 and display 2552 couple to the bus 2572, along with a bus bridge 2558 which couples the bus 2572 to a second bus 2574 and an I/F 2540 that connects the bus 2572 with the chipset 2532. In one embodiment, the second bus 2574 may be a low pin count (LPC) bus. Various I/O devices may couple to the second bus 2574 including, for example, a keyboard 2562, a mouse 2564, and communication devices 2566.

Furthermore, an audio I/O 2568 may couple to second bus 2574. Many of the I/O devices 2560 and communication devices 2566 may reside on the motherboard or system-on-chip (SoC) 2502 while the keyboard 2562 and the mouse 2564 may be add-on peripherals. In other embodiments, some or all the I/O devices 2560 and communication devices 2566 are add-on peripherals and do not reside on the motherboard or system-on-chip (SoC) 2502. More generally, the I/O devices of system 2500 may include one or more of microphones, speakers, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, displays, augmented/virtual reality devices, printers, actuators, motors, transducers, and the like.

Figure 26:
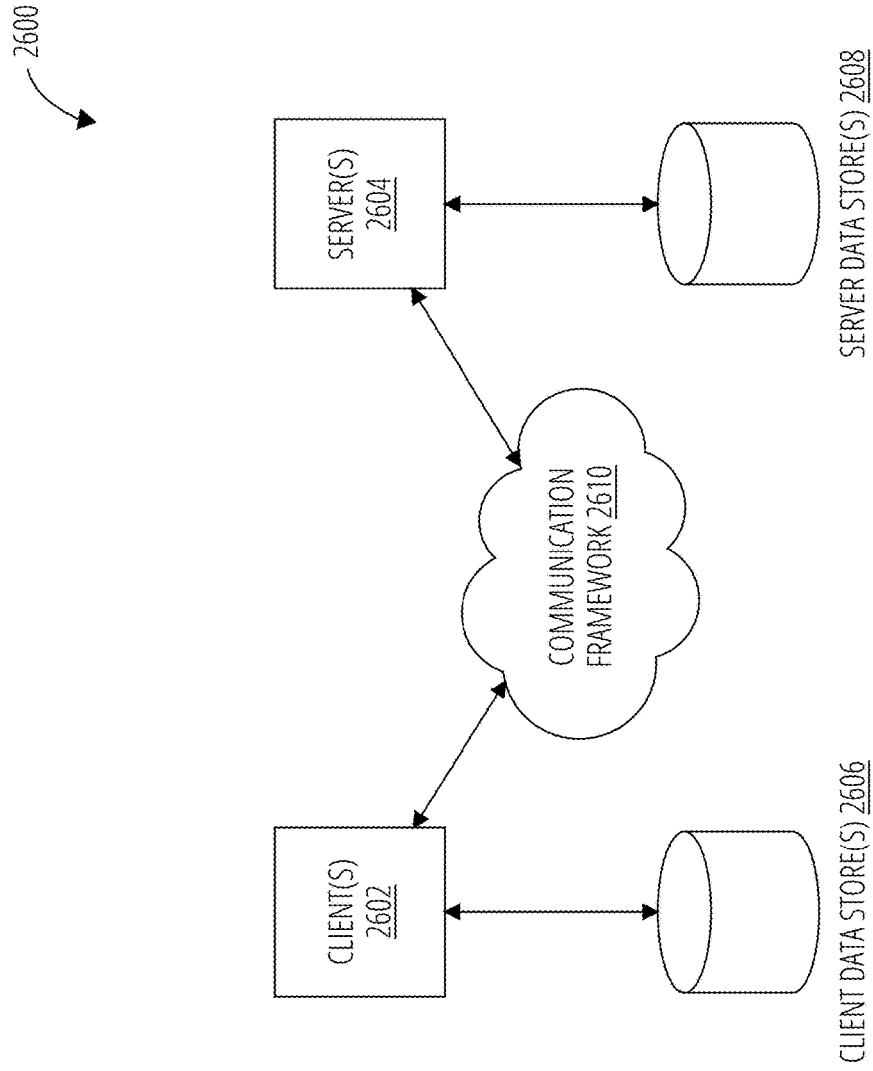
FIG. 26 illustrates exemplary aspects of a communications architecture according to one or more embodiments described hereby.

FIG. 26 is a block diagram depicting an exemplary communications architecture 2600 suitable for implementing various embodiments as previously described, such as communications between PAE system 202 and user device 204. The communications architecture 2600 includes various common communications elements, such as a transmitter, receiver, transceiver, radio, network interface, baseband processor, antenna, amplifiers, filters, power supplies, and so forth. The embodiments, however, are not limited to implementation by the communications architecture 2600.

As shown in FIG. 26, the communications architecture 2600 includes one or more client(s) 2602 and server(s) 2604. In some embodiments, each client 2602 and/or server 2604 may include a computing system (e.g., system 2500) The server(s) 2604 may implement one or more components of PAE system 202. The client(s) 2602 may implement one or more components of PAE system application 214. The client(s) 2602 and the server(s) 2604 are operatively connected to one or more respective client data store(s) 2606 and server data store(s) 2608 that can be employed to store information local to the respective client(s) 2602 and server (s) 2604, such as cookies and/or associated contextual information. In various embodiments, any one of server(s) 2604 may implement one or more logic flows or operations described hereby, such as in conjunction with storage of data received from any one of client(s) 2602 on any of server data store(s) 2608. In one or more embodiments, one or more of client data store(s) 2606 or server data store(s) 2608 may include memory accessible to one or more portions of components, applications, and/or techniques described hereby.

The client(s) 2602 and the server(s) 2604 may communicate information between each other using a communication framework 2610. The communication framework 2610 may implement any well-known communications techniques and protocols. The communication framework 2610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 2610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 2602 and the server(s) 2604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate.

The various devices, components, modules, features, and functionalities described hereby may include, or be implemented via, various hardware elements, software elements, or a combination of both. Examples of hardware elements may include devices, logic devices, hardware components, processors, microprocessors, circuits, circuitry, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, algorithms, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation. It is noted that hardware, firmware, and/or software elements may be collectively or individually referred to herein as "logic", "circuit", or "circuitry".

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores," may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   providing first advice content via a first graphical user interface (GUI) on a first device associated with a user, wherein the first advice content is selected to provide to the user based on a user dataset;
   monitoring input received via the first GUI;
   determining feedback regarding the first advice content based on input received via the first GUI, wherein the input indicates the first advice content as being irrelevant to the user;
   modifying the user dataset based on the feedback to produce an updated user dataset;
   providing second advice content via a second GUI on a second device associated with the user, wherein the second advice content is different from the first advice content, and wherein the second advice content is selected to be provided to the user based on the updated user dataset;
   determining, after providing the second advice content, a life event associated with the user;
   determining a relevance of the first advice content based on the life event; and
   providing, based on the determination of the relevance of the first advice content, third advice content comprising the first advice content via a third GUI.

2. The computer-implemented method of claim 1, wherein the feedback regarding the first advice content includes one of an explicit indication that the first advice content is irrelevant or an implicit indication that the first advice content is irrelevant.

3. The computer-implemented method of claim 1, wherein the feedback regarding the first advice content includes an amount of time the first advice content was displayed on the first GUI.

4. The computer-implemented method of claim 1, wherein the feedback regarding the first advice content includes a click on a link included in the first advice content.

5. The computer-implemented method of claim 1, wherein the feedback includes an implicit component and an explicit component.

6. The computer-implemented method of claim 5, wherein the implicit component includes playing a video associated with the first advice content and the explicit component includes an explicit indication the video associated with the first advice content was useful.

7. The computer-implemented method of claim 1, wherein the first advice content includes a benefit and an action associated with obtaining the benefit.

8. The computer-implemented method of claim 7, wherein the user comprises a first user and the action includes a task corresponding to a second user having a shared goal with the first user.

9. The computer-implemented method of claim 8, wherein the task corresponding to the second user includes discussing a topic corresponding to the shared goal with the second user.

10. The computer-implemented method of claim 1, wherein the first GUI comprises the second GUI or the first device comprises the second device.

11. The computer-implemented method of claim 1, wherein the first device is associated with the user based on the user logging in to an account via the first device.

12. An apparatus, comprising:
a processor; and
memory storing instructions that, when executed by the processor, cause the processor to:
provide first advice content via a first graphical user interface (GUI) on a first device associated with a user, wherein the first advice content is selected to provide to the user based on a user dataset;
monitor input received via the first GUI;
determine feedback regarding the first advice content based on input received via the first GUI, wherein the input indicates the first advice content as being irrelevant to the user;
modify the user dataset based on the feedback to produce an updated user dataset;
provide second advice content via a second GUI on a second device associated with the user, wherein the second advice content is different from the first advice content, and wherein the second advice content is selected to be provided to the user based on the updated user dataset;
determine, after providing the second advice content, a life event associated with the user;
determine a relevance of the first advice content based on the life event; and
provide, based on the determination of the relevance of the first advice content, third advice content comprising the first advice content via a third GUI.

13. The apparatus of claim 12, wherein the feedback regarding the first advice content includes one of an explicit indication that the first advice content is irrelevant or an implicit indication that the first advice content is irrelevant.

14. The apparatus of claim 12, wherein the feedback regarding the first advice content includes an amount of time the first advice content was displayed on the first GUI.

15. At least one non-transitory computer-readable storage medium storing computer-executable program code instructions that, when executed by a computing apparatus, cause the computing apparatus to:

provide first advice content via a first graphical user interface (GUI) on a first device associated with a user, wherein the first advice content is selected to provide to the user based on a user dataset;
monitor input received via the first GUI;
determine feedback regarding the first advice content based on input received via the first GUI, wherein the input indicates the first advice content as being irrelevant to the user;
modify the user dataset based on the feedback to produce an updated user dataset; and
provide second advice content via a second GUI on a second device associated with the user, wherein the second advice content is different from the first advice content, and wherein the second advice content is selected to provide to the user based on the updated user dataset;
determine, after providing the second advice content, a life event associated with the user;
determine a relevance of the first advice content based on the life event; and
provide, based on the determination of the relevance of the first advice content, third advice content comprising the first advice content via a third GUI.

16. The at least one non-transitory computer-readable storage medium of claim 15, wherein the first advice content includes a benefit and an action associated with obtaining the benefit.

17. The at least one non-transitory computer-readable storage medium of claim 16, wherein the user comprises a first user and the action includes a task corresponding to a second user having a shared goal with the first user.

18. The at least one non-transitory computer-readable storage medium of claim 17, wherein the task corresponding to the second user includes discussing a topic corresponding to the shared goal with the second user.

19. The computer-implemented method of claim 1, wherein the third advice content is provided via the third GUI on a third device associated with the user.

20. The apparatus of claim 12, wherein the third advice content is provided via the third GUI on a third device associated with the user.

\* \* \* \* \*